United States Patent [19]

Matyas et al.

[11] Patent Number: 4,941,176
[45] Date of Patent: Jul. 10, 1990

[54] SECURE MANAGEMENT OF KEYS USING CONTROL VECTORS

[75] Inventors: Stephen M. Matyas, Manassas, Va.; Dennis G. Abraham, Concord, N.C.; Donald B. Johnson, Manassas, Va.; Ramesh K. Karne, Herndon, Va.; An V. Le, Arlington, Va.; Rostislaw Prymak, Dumfries, Va.; Julian Thomas, Lagrange, N.Y.; John D. Wilkins, Somerville, Va.; Phil C. Yeh, Poughkeepsie, N.Y.

[73] Assignee: International Business Machines Corporation, Armonk, N.Y.

[21] Appl. No.: 231,114

[22] Filed: Aug. 11, 1988

[51] Int. Cl.⁵ ............................................. H04K 1/00
[52] U.S. Cl. ....................................... 380/21; 380/25; 380/45; 380/47
[58] Field of Search ........................ 380/21, 25, 45, 47

[56] References Cited

U.S. PATENT DOCUMENTS

| | | | |
|---|---|---|---|
| 4,218,738 | 8/1980 | Matyas et al. | 380/25 |
| 4,223,403 | 9/1980 | Kinheim et al. | 380/25 |
| 4,227,253 | 10/1980 | Ehrsam et al. | 380/25 |
| 4,386,233 | 8/1983 | Smid et al. | 380/25 |
| 4,500,750 | 2/1985 | Elander et al. | 380/25 |
| 4,503,287 | 3/1985 | Morris et al. | 380/24 |
| 4,578,530 | 3/1986 | Zeidler | 380/24 |
| 4,683,968 | 8/1987 | Applebaum et al. | 380/45 |
| 4,723,283 | 2/1988 | Nasagawa et al. | 380/23 |
| 4,723,284 | 2/1988 | Munek et al. | 380/23 |
| 4,850,017 | 7/1989 | Matyas et al. | 380/21 |

OTHER PUBLICATIONS

R. W. Jones, "Some Techniques for Handling Encipherment Keys," *ICL Technical Journal*, Nov. 1982, pp. 175-188.

D. W. Davies et al., "Security for Computer Networks," John Wiley & Sons, New York, 1984, Sec. 6.5, pp. 168-172.

*Primary Examiner*—Thomas H. Tarcza
*Assistant Examiner*—David Cain
*Attorney, Agent, or Firm*—John E. Hoel

[57] ABSTRACT

The invention is an apparatus and method for validating that key management functions requested for a cryptographic key by the program have been authorized by the originator of the key. The invention includes a cryptographic facility characterized by a secure boundary through which passes an input path for receiving the cryptographic service requests, cryptographic keys and their associated control vectors, and an output path for providing responses thereto. There can be included within the boundary a cryptographic instruction storage coupled to the input path, a control vector checking unit and a cryptographic processing unit coupled to the instruction storage, and a master key storage coupled to the processing means, for providing a secure location for executing key management functions in response to the received service requests. The cryptographic instruction storage receives over the input path a cryptographic service request for performing a key management function on a cryptographic key. The control vector checking unit has an input coupled to the input path for receiving a control vector associated with the cryptographic key and an input connected to the cryptographic instruction storage, for receiving control signals to initiate checking that the control vector authorizes the key management function which is requested by the cryptographic service request. The control vector checking unit has an authorization output connected to an input of the cryptographic processing means, for signalling that the key management function is authorized, the receipt of which by the cryptographic processing unit initiates the performance of the requested key management function with the cryptographic key. The invention enables the flexible control of many cryptographic key management functions in the generation, distribution and use of cryptographic keys, while maintaining a high security standard.

67 Claims, 55 Drawing Sheets

FIG. 8

| TYPE OF SEPARATION | PRIORITY LEVEL | | | |
|---|---|---|---|---|
| | 1 | 2 | 3 | 4 |
| FUNDAMENTAL KEYS | | | | |
|   KD : KEK, PIN KEY | X | | | |
|   KEK : PIN KEY | X | | | |
| DATA KEYS | | | | |
|   COMPAT : ALL OTHERS | X | | | |
|   ANSI : ALL OTHERS | X | | | |
|   MAC : PRIVACY, XLATE CIPHERTEXT | X | | | |
|   XLATE CIPHERTEXT : PRIVACY | X | | | |
|   MACGEN : MACVER | X | | | |
|   ENCIPHER : DECIPHER | | X | | |
|   XLT CTEXT (IN) : XLT CTEXT (OUT) | | X | | |
| PIN KEYS | | | | |
|   PIN GENERATING KEYS : PIN ENCRYPTING KEYS | X | | | |
| PIN GENERATING KEYS | | | | |
|   GENERATE PIN : ENCIPHER PIN | | X | | |
| PIN ENCRYPTING KEYS | | | | |
|   CREATE PIN BLOCK AND GENERATE PIN : REFORMAT, VERIFY, AND XLATE PIN | | X | | |
|   CREATE PIN BLOCK : GENERATE PIN | | | | X |
|   REFORMAT AND VERIFY PIN : XLATE PIN | | | | X |
| KEY ENCRYPTING KEYS | | | | |
|   NOTARIZATION : NON-NOTARIZATION | X | | | |
|   CV KEKs : NON-CV SYSTEM KEKs | X | | | |
|   NON-CV RTMK : NON-CV RFMK | X | | | |
|   KEK SENDER : KEK RECEIVER | X | | | |
|   GENKEYSET, XLATE : RFMK, GENKEYSET, XLATE | | | X | |
|   GENKEYSET (EXPORT ONLY), XLATE | | | X | |
|   : GENKEYSET (GENERAL USE) | | | | |

| CV TYPE MAIN TYPE  SUB TYPE | EXPORT CONTROL | USAGE | AV | SOFTWARE BITS | EXTEN-SION | RESERVED | PARITY |
|---|---|---|---|---|---|---|---|
| 4b  3b | 1b |  | 2b | 12b | 2b |  | 8b |
| CF | CF | CF | CF | CFAP | CF | CF | CF |

| CV TYPE DATA KEY  PRI-VACY | EXPORT CONTROL | USAGE E  D | AV | SOFTWARE CV USAGE VERSION | EXTEN-SION | RESERVED | PARITY |
|---|---|---|---|---|---|---|---|
| 4b  3b | 1b | 1b  1b | 2b | 6b  6b | 2b | 30b | 8b |
| CF | CF | CF | CF | CFAP | CF | CF | CF |

FIG. 13

| CV TYPE DATA MAC KEY | EXPORT CONTROL | USAGE MG MV | AV | SOFTWARE CV USAGE VERSION | EXTEN-SION | RESERVED | PARITY |
|---|---|---|---|---|---|---|---|
| 4b        3b | 1b | 1b    1b | 2b | 6b        6b | 2b | 30b | 8b |
| CF | CF | CF | CF | CFAP | CF | CF | CF |

FIG. 14

| CV TYPE DATA COMP KEY | EXPORT CONTROL | USAGE E D MG MV | AV | SOFTWARE CV USAGE VERSION | EXTEN-SION | RESERVED | PARITY |
|---|---|---|---|---|---|---|---|
| 4b        3b | 1b | 1b    1b | 2b | 6b        6b | 2b | 30b | 8b |
| CF | CF | CF | CF | CFAP | CF | CF | CF |

FIG. 15

| CV TYPE DATA XLATE KEY | EXPORT CONTROL | USAGE XDIN XDOUT | AV | SOFTWARE CV USAGE VERSION | EXTEN-SION | RESERVED | PARITY |
|---|---|---|---|---|---|---|---|
| 4b        3b | 1b | 1b    1b | 2b | 6b        6b | 2b | 30b | 8b |
| CF | CF | CF | CF | CFAP | CF | CF | CF |

FIG. 16

| CV DATA KEY | TYPE ANSI | EXPORT CONTROL | USAGE E D MG MV ACMB | AV | SOFTWARE CV USAGE VERSION | EXTEN-SION | RESERVED | PARITY |
|---|---|---|---|---|---|---|---|---|
| 4b | 3b | 1b | 1b 1b 1b 1b 1b | 2b | 6b 6b | 2b | 27b | 8b |
| CF | CF | CF | CF | CF | CFAP | CF | CF | CF |

FIG. 17

| CV PIN KEY | TYPE PEK | EXPO CTRL | USAGE CREATE PINBLK  GEN PIN  VER PIN  XPIN IN  XPIN OUT | AV | SOFTWARE CV USAGE VERS. | EXTEN-SION | RESERV-ED | PARITY |
|---|---|---|---|---|---|---|---|---|
| 4b | 3b | 1b | 1b  1b  1b  1b  1b | 2b | 6b  6b | 2b | 27b | 8b |
| CF | CF | CF | CF | CF | CFAP | CF | CF | CF |

FIG. 18

| CV PIN KEY | TYPE PGK | EXPORT CONTROL | USAGE GENPIN  GPIN  VERPIN  VPIN | AV | SOFTWARE CV USAGE VERS. | EXTEN-SION | RESERV-ED | PARITY |
|---|---|---|---|---|---|---|---|---|
| 4b | 3b | 1b | 2b  1b  1b  1b | 2b | 6b  6b | 2b | 27b | 8b |
| CF | CF | CF | CF | CF | CFAP | CF | CF | CF |

FIG. 19

| CV KEK | TYPE SENDER | EXPORT CONTROL | USAGE GKS | USAGE RFMK | USAGE XLT KEY OUT | KEY FORM | LINK CONTROL | AV | SOFTWARE CV USAGE VERSION | | EXTENSION | RESERV. | PARITY |
|---|---|---|---|---|---|---|---|---|---|---|---|---|---|
| 4b | 3b | 1b | 3b | 1b | 1b | 2b | 2b | 2b | 6b | 6b | 2b | 23b | 8b |
| CF | CF | CF | CF | | | CF | CF | CF | CFAP | | CF | CF | CF |

FIG. 20

| CV KEK | TYPE RECEIVER | EXPORT CONTROL | USAGE GKS | USAGE RTMK | USAGE XLT KEY IN | KEY FORM | LINK CONTROL | AV | SOFTWARE CV USAGE VERSION | | EXTENSION | RESERV. | PARITY |
|---|---|---|---|---|---|---|---|---|---|---|---|---|---|
| 4b | 3b | 1b | 2b | 1b | 1b | 2b | 2b | 2b | 6b | 6b | 2b | 24b | 8b |
| CF | CF | CF | CF | | | CF | CF | CF | CFAP | | CF | CF | CF |

FIG. 21

| CV KEK | TYPE ANSI | EXPORT CONTROL | USAGE ARFMK | USAGE ARTMK | USAGE AXLT KEY | USAGE APNOTR | KEY FORM | LINK CONTROL =B'00' | AV | SOFTWARE CV USAGE VERS | |
|---|---|---|---|---|---|---|---|---|---|---|---|
| 4b | 3b | 1b | 1b | 1b | 1b | 1b | 2b | 2b | 2b | 6b | 6b |
| CF | CF | CF | CF | | | | CF | CF | CF | CFAP | |

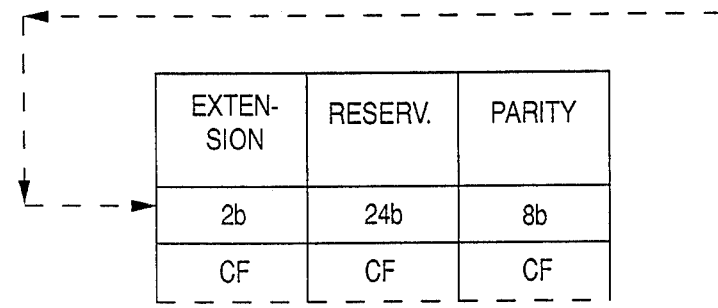

| EXTENSION | RESERV. | PARITY |
|---|---|---|
| 2b | 24b | 8b |
| CF | CF | CF |

| CV TYPE KEY 000 PART | EXPORT CONTROL | KEY FORM | AV | SOFTWARE CV USAGE VERSION | | EXTEN-SION | RES-ERVED | PARITY |
|---|---|---|---|---|---|---|---|---|
| 4b 3b | 1b | | 2b | 2b | 6b 6b | 2b | 30b | 8b |
| CF | CF | CF | CF | CFAP | | CF | CF | CF |

| CV TYPE ICV 000 | EXPORT CONTROL | SOFTWARE CV USAGE VERSION | | AV | EXTENSION | RESERVED | PARITY |
|---|---|---|---|---|---|---|---|
| 4b 3b | 1b | 6b | 6b | 2b | 2b | 32b | 8b |
| CF | CF | CFAP | | CF | CF | CF | CF |

| CV TYPE TOKEN 000 | EXPORT CONTROL | AV | SOFTWARE CV USAGE VERSION | | EXTENSION | RESERVED | PARITY |
|---|---|---|---|---|---|---|---|
| 4b 3b | 1b | 2b | 6b | 6b | 2b | 32b | 8b |
| CF | CF | CF | CFAP | | CF | CF | CF |

FIG. 32

| MODE | TYPE OF KEYS GENERATED |
|---|---|
| OP-OP | DATA/PRIV, DATA/MAC |
| OP-IM | DATA/PRIV, DATA/MAC, DATA/XLATE |
| OP-EX | DATA/PRIV, DATA/MAC, DATA/XLATE, KEK/SENDER, KEK/RECEIVER, PIN/PEK |
| EX-EX | DATA/PRIV, DATA/MAC, DATA/XLATE, KEK/SENDER, KEK/RECEIVER, PIN/PEK |
| IM-EX | DATA/PRIV, DATA/MAC, DATA/XLATE, KEK/SENDER, KEK/RECEIVER, PIN/PEK |

FIG. 34

|  | C3 | C4 |
|---|---|---|
| CV TYPE | DATA/ PRIV | DATA/ PRIV |
|  | DATA/ MAC | DATA/ MAC |

FIG. 35

|  | C2L | C2R |
|---|---|---|
| KEY FORM | 00 | 00 |
|  | 01 | 01 |
|  | 10 | 11 |
|  | 11 | 10 |
| LINK CONTROL | 01 (CV ONLY) | 01 (CV ONLY) |

FIG. 36

| | C3 | C4 |
|---|---|---|
| CV TYPE | DATA/PRIV | DATA/PRIV |
| | DATA/PRIV | DATA/XLT |
| | DATA/XLT | DATA/PRIV |
| | DATA/XLT | DATA/XLT |
| | DATA/MAC | DATA/MAC |
| | PIN/PEK | PIN/PEK |
| | KEK/SENDER | KEK/RECEIVER |
| | KEK/RECEIVER | KEK/SENDER |
| LINK CONTROL IF CV TYPE = KEK | 01 | 01 |
| | 10 | 10 |
| | 11 | 11 |
| | 00 | 00 |
| KEY FORM IF CV TYPE = KEK | 00 | 00 |
| | 01 | 01 |
| | 10 | 10 |
| | 11 | 11 |
| | 01 | 00 |
| | 10 | 00 |
| | 11 | 00 |

FIG. 37

| | C3 | C4 |
|---|---|---|
| CV TYPE | DATA/PRIV | DATA/PRIV |
| | DATA/PRIV & E = 1 | DATA XLT & XDIN = 1 |
| | DATA/XLT & XDIN = 1 | DATA/PRIV & E = 1 |
| | DATA/MAC | DATA/MAC |

| KEY FORM | C1L | C1R |
|---|---|---|
| | 00 | 00 |
| | 01 | 01 |
| | 10 | 11 |
| | 11 | 10 |

| E | D | MG | MV | ACMB |
|---|---|----|----|------|
| 1 | 1 | 0  | 0  | 0    |
| 0 | 0 | 1  | 1  | 0    |

| CV TYPE OF C2 | KEY FORM | | |
|---------------|----|-----|-----|
|               | C2 | C1L | C1R |
| DATA/ANSI     | N/A | 01 | 01 |
|               |     | 10 | 11 |
| KEK/ANSI      | 01  | 01 | 01 |
|               |     | 10 | 11 |
|               | 10  | 10 | 11 |
|               | 11  | 10 | 11 |

| E | D | MG | MV | ACMB |
|---|---|----|----|------|
| 0 | 0 | 1  | 1  | 0    |
| 0 | 0 | 0  | 0  | 1    |

| E | D | MG | MV | ACMB |
|---|---|----|----|------|
| 1 | 1 | 0  | 0  | 0    |
| 0 | 0 | 1  | 1  | 0    |

| CV TYPE OF C2 | KEY FORM | | |
|---------------|----|-----|-----|
|               | C2 | C1L | C1R |
| DATA/ANSI     | N/A | 01 | 01 |
|               |     | 10 | 11 |
| KEK/ANSI      | 01  | 01 | 01 |
|               |     | 10 | 11 |
|               | 10  | 10 | 11 |
|               | 11  | 10 | 11 |

| E | D | MG | MV | ACMB |
|---|---|----|----|------|
| 0 | 0 | 1  | 1  | 0    |
| 0 | 0 | 0  | 0  | 1    |

FIG. 65

| | KEY MANAGEMENT REQUIREMENT | CA INSTRUCTIONS TO BE USED |
|---|---|---|
| MASTER KEY INITIALIZ. | ■ MANUAL ENTRY OF MASTER KEY<br><br>■ MASTER KEY ACTIVATION | LFMKP, CMKP, CVP (NOT MANDATORY, SEE NOTE 1)<br><br>SMK |
| KEY ENCRYPTING KEY INITIALIZ. | ■ MANUAL ENTRY OF KEY ENCRYPTING KEYS VIA PHYSICAL INTERFACE<br><br>■ ENTRY OF KEY ENCRYPTING KEYS VIA PROGRAMMING INTERFACE | LFKP, CKP, CVP (NOT MANDATORY, SEE NOTE 1)<br><br>EMK |
| GENERATE CLEAR OR CLEAR /ENC- RYPTED KEY | ■ GENERATE CLEAR KEYS VIA PROGRAMMING INTERFACE<br><br>■ GENERATE CLEAR KEYS FOR DISTRIBUTION VIA COURIER AND FOR LOCAL STORAGE IN ENCRYPTED FORM | KEYGEN<br><br><br>KEYGEN, EMK |
| GENERATE KEYS FOR LOCAL USE | ■ GENERATE A KEY FOR LOCAL STORAGE AND USE.<br><br>■ GENERATE TWO COPIES OF A KEY FOR LOCAL USAGE, EACH COPY WITH DIFFERENT USAGE ATTRIBUTES, WHERE THE GENERATED KEY IS A<br>   a. DATA/PRIVACY<br>   b. DATA/MAC<br>   b. DATA/OTHER SUBTYPES<br>   d. KEK<br>   e. PIN KEY | KEYGEN<br><br><br><br><br><br><br>GENKEYSET (OP-OP MODE)<br>GENKEYSET (OP-OP MODE)<br>PROHIBITED BY CCA<br>PROHIBITED BY CCA<br>PROHIBITED BY CCA |

FIG. 66

| KEY MANAGEMENT REQUIREMENT | | CA INSTRUCTIONS TO BE USED |
|---|---|---|
| GENERATE KEYS FOR LOCAL USE AND FOR EXPORTING TO ANOTHER NODE. | ■ GENERATE TWO COPIES OF A KEY, WITH DIFFERENT USAGE ATTRIBUTES, 1ST COPY FOR LOCAL USE AND 2ND COPY FOR EXPORTING TO ANOTHER NODE USING A CV CNANNEL, WHERE THE GENERATED KEY IS A : <br>  a. DATA/COMPATIBILITY <br>  b. DATA/OTHER SUBTYPES <br>  c. KEY-ENCRYPTING KEY <br>  d. PIN/PEK | <br><br><br><br><br> NOT SUPPORTED BY CA <br> GENKEYSET (OP-EX MODE) <br> GENKEYSET (OP-EX MODE) <br> GENKEYSET (OP-EX MODE) |
| | ■ GENERATE TWO COPIES OF A KEY, WITH DIFFERENT USAGE ATTRIBUTES, 1ST COPY FOR LOCAL USE AND 2ND COPY FOR EXPORTING TO ANOTHER NODE USING A CV = 0 CHANNEL. | NOT SUPPORTED BY CA |
| | ■ GENERATE A SINGLE COPY OF A KEY FOR LOCAL USE AND FOR EXPORTING TO ANOTHER NODE USING A CV CHANNEL. | KEYGEN AND RFMK |
| | ■ GENERATE A SINGLE COPY OF A KEY FOR LOCAL USE AND FOR EXPORTING TO ANOTHER NODE USING A CV = 0 CHANNEL, WHERE THE GENERATED KEY IS A : <br>  a. DATA/COMPATIBILITY KEY <br>  b. DATA/ WITH OTHER SUBTYPES <br>  c. KEY - ENCRYPTING KEY <br>  c. PIN KEYS | <br><br><br><br> KEYGEN AND RFMK <br> PROHIBITED BY CA <br> PROHIBITED BY CA <br> PROHIBITED BY CA |

FIG. 67

| | KEY MANAGEMENT REQUIREMENT | CA INSTRUCTIONS TO BE USED |
|---|---|---|
| GENERATE KEYS FOR LOCAL USE AND FOR EXPORTING TO n NODES (n IS GREATER THAN 1) | ■ GENERATE TWO COPIES OF A KEY, WITH DIFFERENT USAGE ATTRIBUTES, 1ST COPY FOR LOCAL USE AND 2ND COPY FOR EXPORTING TO n NODES, USING THE CV = 0 CHANNEL. | NOT SUPPORTED BY CA |
| | ■ GENERATE TWO COPIES OF A KEY, WITH DIFFERENT USAGE ATTRIBUTES, 1ST COPY FOR LOCAL USE AND 2ND COPY FOR EXPORTING TO n NODES, USING THE CV CHANNEL. | NOT SUPPORTED BY CA |
| | ■ GENERATE A SINGLE COPY OF A KEY FOR LOCAL USE AND FOR EXPORTING TO n NODES USING THE CV = 0 CHANNEL, WHERE THE GENERATED KEY IS A : <br> a. DATA/COMPATIBILITY <br> b. DATA/OTHER SUBTYPES <br> c. KEY-ENCRYPTING KEY <br> d. PIN KEYS | KEYGEN AND RFMK PROHIBITED BY CA. PROHIBITED BY CA. PROHIBITED BY CA. |
| | ■ GENERATE A SINGLE COPY OF A KEY FOR LOCAL USE AND FOR EXPORTING TO n NODES USING THE CV CHANNEL, WHERE THE GENERATED KEY IS A KEY OF ANY KEY TYPE. | KEYGEN AND RFMK |

FIG. 68

| | KEY MANAGEMENT REQUIREMENT | CA INSTRUCTIONS TO BE USED |
|---|---|---|
| GENERATE SESSION KEYS OR FILE KEYS FOR COMPATIBILITY WITH CUSP/ 3848 | ■ GENERATE A SESSION KEY OR A FILE KEY FOR COMPATIBILITY WITH IBM 3848/CUSP AND PCF | GENKEYSET (OP-EX MODE) |
| | ■ GENERATE A SESSION KEY, SNA MULTI-DOMAIN | GENKEYSAT (IM-EX MODE) |
| KEY DISTRIBUTION CENTER | ■ GENERATE 2 COPIES OF A KEY, NO LOCAL USE, EACH WITH DIFFERENT USAGE ATTRIBUTES, 1ST COPY FOR ELECTRONIC DISTRIBUTION TO A 1ST NODE, USING A CV CHANNEL, AND 2ND COPY FOR ELECTRONIC DISTRIBUTION TO A 2ND NODE, USING A CV CHANNEL, WHERE THE GENERATED KEY IS A<br>  a. DATA/COMPATIBILITY<br>  b. DATA/OTHER SUBTYPES<br>  c. KEY-ENCRYPTING KEY<br>  d. PIN KEY | NOT SUPPORTED BY CA<br>GENKEYSET (EX-EX MODE)<br>GENKEYSET (EX-EX MODE)<br>GENKEYSET (EX-EX MODE) |
| | ■ GENERATE 2 COPIES OF A KEY, NO LOCAL USE, EACH WITH DIFFERENT USAGE ATTRIBUTES, 1ST COPY FOR ELECTRONIC DISTRIBUTION TO A 1ST NODE, USING A CV = 0 CHANNEL, AND 2ND COPY FOR ELECTRONIC DISTRIBUTION TO A 2ND NODE, USING A CV = 0 CHANNEL. | PROHIBITED BY CA |
| KEY TRANSLATION CENTER | ■ RECEIVE AND TRANSLATE KEYS | TRANSLATE KEY |
| IMPORT OF KEYS | ■ ELECTRONIC IMPORT VIA THE PROGRAMING INTERFACE OF<br>  a. DATA/COMPATIBILTY, USING A CV = 0 CHANNEL<br>  b. ANY KEY TYPE, USING A CV CHANNEL<br>  c. ANT KEY TYPE OTHER THAN DATA/COMPATIBILITY, USING A CV = 0 CHANNEL | RTMK<br><br>RTMK<br><br>PROHIBITED BY CA |

FIG. 70

| CV TYPE/SUBTYPE | CV ONLY | CHANNEL TYPE CV = 0 ONLY | ANSI |
|---|---|---|---|
| DATA / PRIVACY | Y | N | N |
| DATA / MAC | Y | N | N |
| DATA / XLATE | Y | N | N |
| DATA / COMP | Y* | Y | N |
| DATA / ANSI | N | N | Y |
| KEK / SENDER | Y | N | N |
| KEK / RECEIVER | Y | N | N |
| KEK / ANSI | N | N | Y |
| PIN / ENCRYPTING | Y | N | N |
| PIN / GENERATING | Y | N | N |
| ICV / NOT APPLICABLE | N | N | N |
| KEY PART / NOT APPLICABLE | Y | N | N |

FIG. 71

| MODE (SPECIFIED IN INSTRUCTION) | LINK CONTROL (IN CV OF KEK) | IS COMBINATION VALID? |
|---|---|---|
| CV | CV | YES |
| CV | CV = 0 | NO |
| CV | CV OR CV = 0 | YES |
| CV | NOT APPLICABLE | NO |
| CV = 0 | CV | NO |
| CV = 0 | CV = 0 | YES |
| CV = 0 | CV OR CV = 0 | YES |
| CV = 0 | NOT APPLICABLE | NO |

FIG. 72
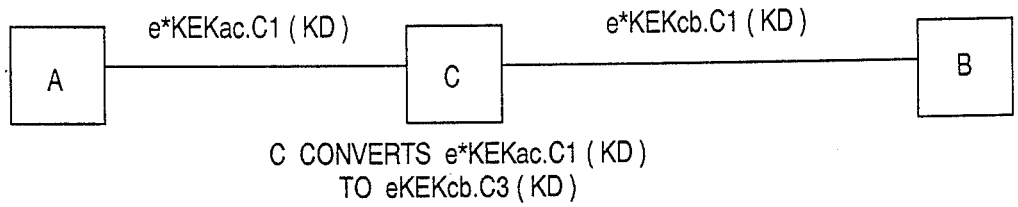
C CONVERTS e*KEKac.C1 (KD)
TO eKEKcb.C3 (KD)
FIG. 73
```
LABEL1, C1L, C1R, e*KM.C1L (KEK1L), E*KM.C1R(KEK1R)
LABEL2, C2L, C2R, e*KM.C2L (KEK2L), E*KM.C2R (KEK2R)
LABEL3, C3L, C3R, e*KM.C3L (KEK3L), E*KM.C3R (KEK3R)
     .
     .
LABELn, CnL, CnR, e*KM.CnL (KEKnL), E*KM.CnR (KEKnR)
```
FIG. 74
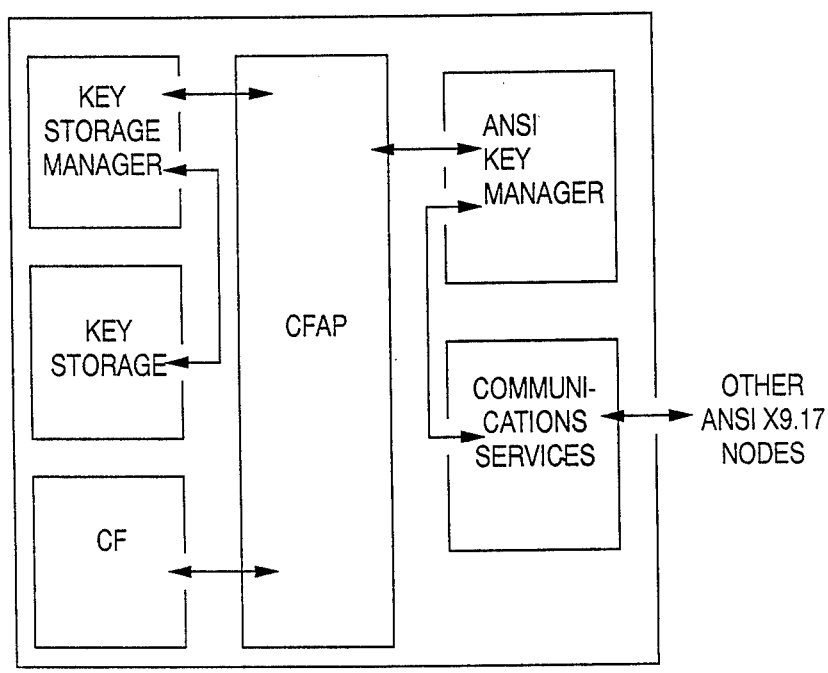

| ENV | NOD | RCVS | FROM | UNDR¹ | GENS | | UNDR² | SNDS | TO | UNDR³ | SUP? |
|---|---|---|---|---|---|---|---|---|---|---|---|
| P-P | A | | | | KD | KD | *KMa | KD | B | NEW KKab | NO |
| | | | | | | | | | | NEW *KKab | YES |
| | | | | | | | | | | KKab | YES |
| | | | | | | | | | | *KKab | YES |
| | | | | | | | | | | KNab | YES |
| | | | | | | | | | | *KNab | YES |
| | B | KD | A | NEW KKab | | KD | *KMb | | | | YES |
| | | | | NEW *KKab | | | | | | | YES |
| | | | | KKab | | | | | | | YES |
| | | | | *KKab | | | | | | | YES |
| | | | | KNab | | | | | | | YES |
| | | | | *KNab | | | | | | | YES |

FIG. 79

| ENV | NOD | RCVS | FROM | UNDR$^1$ | GENS | STORES | UNDR$^2$ | SNDS | TO | UNDR$^3$ | SUP? |
|---|---|---|---|---|---|---|---|---|---|---|---|
| KTC | A | | | | KK | KK\|\|KK | *KMa | KK | KTC | *KKac | NO |
| | | | | | *KK | *KK | *KMa | *KK | KTC | *KKac | YES |
| | KTC | KK | A | *KKac | KK\|\|KK (TEMP) | *KMc | KK | B VIA A | *KNcb | | YES |
| | | *KK | A | *KKac | | *KK (TEMP) | *KMc | *KK | B VIA A | *KNcb | YES |
| | B | KK | KTC VIA A | *KNcb | | KK\|\|KK | *KMb | | | | YES |
| | | *KK | KTC VIA A | *KNcb | | *KK | *KMb | | | | YES |
| KDC | | | | | NOT APPLICABLE | | | | | | |
| P-P | A | | | | KK | KK\|\|KK | *KMa | KK | B | KKab | NO |
| | | | | | | | | | | *KKab | NO |
| | | | | | | | | | | KNab | NO |
| | | | | | | | | | | *KNab | NO |
| | | | | | *KK | *KK | *KMa | *KK | B | *KKab | YES |
| | | | | | | | | | | *KNab | YES |
| | B | KK | A | KKab | KK\|\|KK | *KMb | | | | | YES |
| | | | | *KKab | | | | | | | YES |
| | | | | KNab | | | | | | | YES |
| | | | | *KNab | | | | | | | YES |
| | | *KK | A | *KKab | *KK | *KMb | | | | | YES |
| | | | | *KNab | | | | | | | YES |

FIG. 81

| ENV | NOD | RCVS | FROM | UNDR$^1$ | GENS | STORES | UNDR$^2$ | SNDS | TO | UNDR$^3$ | SUP? |
|---|---|---|---|---|---|---|---|---|---|---|---|
| KDC | KDC | | | | KD | KD (TEMP) | *KMc | KD | A AND B VIA A | *KNca and *KNcb | YES |
| | A | KD | KDC | *KNca | | KD | *KMa | | | | YES |
| | B | KD | KDC VIA A | *KNcb | | KD | *KMb | | | | YES |
| KTC | A | | | | KD MAC | KDMAC (TEMP) | *KMa | KDMAC | KTC | NEW KKab | NO |
| | | | | | | | | | | NEW *KKab | YES |
| | | | | | KD | KD | *KMa | KD | KTC | *KKac | YES |
| | | | | | | | | | B | NEW *KKab | YES |
| | KTC | KD MAC | A | NEW KKab | | | | | | | YES |
| | | | | NEW *KKab | | | | | | | YES |
| | | KD | A | *KKac | | KD (TEMP) | *KMc | KD | B VIA A | *KNcb | YES |
| | B | KD | A | NEW KKab | | KD | *KMb | | | | YES |
| | | | | NEW *KKab | | | | | | | YES |
| | | | KTC VIA A | *KKcb | | KD | *KMb | | | | YES |

FIG. 86

| INST. | EQUATIONS |
|---|---|
| ENC | KD, A ⟶ eKD(A) : ECB MODE, 8 BYTE DATA AND KEY, ENCODE |
| DEC | KD, eKD(A) ⟶ A : ECB MODE, 8 BYTE DATA AND KEY, DECODE |
| ENCI | e*KM.C1(KD1), ICV, A, n, C1 ⟶ eKD1(ICV, A) ENCIPHER OP |
| DECI | e*KM.C1(KD1), ICV, eKD1(ICV, A), n, C1 ⟶ A DECIPHER OP |
| GMAC | e*KM.C1(KD1), <e*KM.C2(KD2)>,<br>ICV <e*KM.C3(OCV)>, A, n,<br>ICV-TYPE, OUTPUT-TYPE, MAC-ENC, C1, <C2>, <C3> ⟶ MAC (64 BIT)<br>OR<br>e*KM.C3(OCV) |
| VMAC | e*KM.C1(KD1), <e*KM.C2(KD2)>,<br>ICV <e*KM.C3(OCV)>, A, MAC, n,<br>ICV-TYPE, OUTPUT-TYPE, MAC-ENC, C1, <C2>, <C3> ⟶ YES/NO<br>OR<br>e*KM.C3(OCV) |
| TCTXT | e*KM.C1(KD1), ICV1, eKD1(ICV1, A),<br>e*KM.C2(KD2), ICV2, n, C1, C2 ⟶ eKD2(ICV2, A) |

FIG. 85

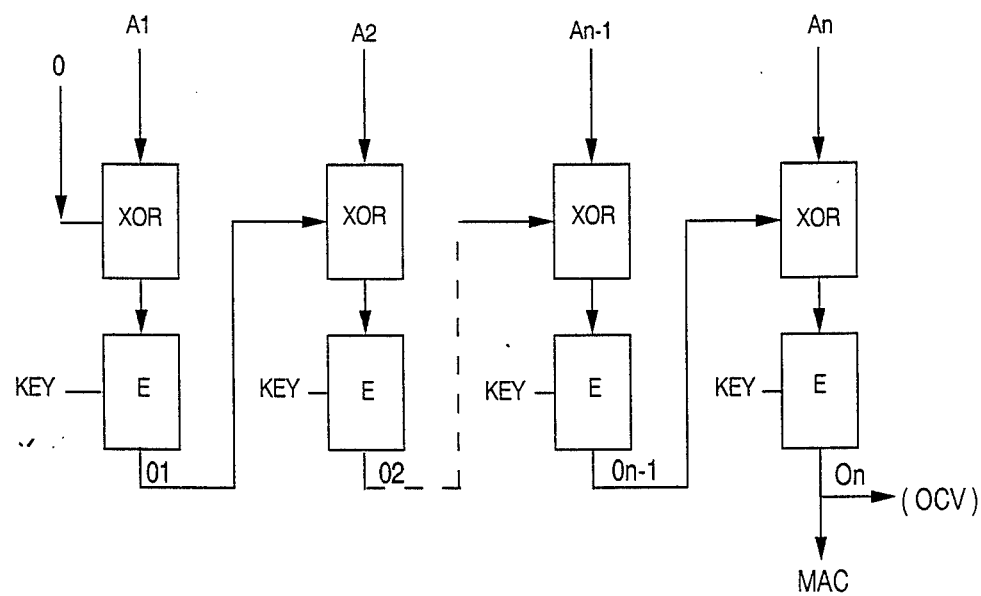

FIG. 87

| INST. | EQUATIONS |
|---|---|
| GKS | OP-OP : MODE, C3, C4 ⟶ e*KM.C3 (K), e*KM.C4 (K)<br>OP-EX : MODE, C2L, C2R, C3, C4, e*KM.C2L (KKE2L),<br>        e*KM.C2R (KKE2R) ⟶ e*KM.C3 (K), e*KEK2.C4 (K)<br>EX-EX : MODE, C1L, C1R, C2L, C2R, C3, C4,<br>        e*KM.C1L (KKEIL), e*KM.C1R (KKE1R),<br>        e*KM.C2L (KKE2L), e*KM.C2R (KK E2R)<br>        ⟶ e*KEK1.C3 (K), e*KEK2.C4 (K)<br>OP-IM : SAME AS OP-EX<br>IM-EX : SAME AS EX-EX |
| RFMK | DIST-MODE, e*KM.C1L (KEK1L), e*KM.(KEK1R), e*KM.C2 (K),<br>    C1L, C1R, C2, C3 ⟶ e*KEK1.C3 (K) |
| RTMK | DIST-MODE, e*KM.C1L (KEK1L), e*KM.C1R (KEK1R), e*KEK1.C3 (K),<br>    C1L, C1R, C2, C3 ⟶ e*KM.C2 (K) |
| KGEN | OUTPUT-TYPE, C1 ⟶ K OR<br>            ⟶ e*KM.C1 (K) |
| EMK | K, C1 ⟶ e*KM.C1 (K) |
| XLTKEY | e*KM.C1L (KEK1L), e*KM.C1R (KEK1R),<br>e*KM.C2L (KEK2L), e*KM.C2R (KEK2R), e*KEK1.C3 (K),<br>    C1L, C1R, C2L, C2R, C3 ⟶ e*KEK2.C3 (K) |
| RTNMK | MODE, e*KMC.C1 (K), C1 ⟶ e*KMN.C1 (K) |
| RTCMK | MODE, e*KMO.C1 (K), C1 ⟶ e*KMC.C1 (K) |
| SMK | ( ) ⟶ NMK FLAG RESET |
| MDCOP | — |

FIG. 88

| INST. | EQUATIONS |
|---|---|
| CLRCF | CLEARS ALL THE REGISTERS IN THE CRYPTO FACILITY |
| CLRKPR | CLEARS THE KEY PART REGISTER |
| CLRNMK | CLEARS THE NEW MASTER KEY REGISTER |
| LCVA | $e^*KM.C1(K), C1, C2 \longrightarrow e^*KM.C2(K)$ |
| LFMKP | $(\ ) \longrightarrow$ KP REGISTER TRANSFERRED TO NMK REGISTER |
| CMKP | MODE $\longrightarrow$ NMK REGISTER = NMK REGISTER XOR KEYPART REGISTER |
| LFKP | — |
| CKP | — |
| CVP | — |
| APNOTR | MODE, $e^*KM.C1L(KK1). e^*KM.C1R\ 9KKr)$, FMID, TOID, C1L, C1R, C2L, C2R $\longrightarrow e^*KM.C2L(KKNIL), e^*KM.C2R(KKNIR)$ |
| ARFMK | $e^*KM.C1L(KKL<KKNIL>), e^*KM.C1R(KKR<KKNIR>)$, $e^*KM.C2(KEY), CNTR, C1L, C1R, C2 \longrightarrow e^*KK(KEY)$ |
| ARTMK | $e^*KM.C1L(KKL<KKNIL>), e^*KM.C1R(KKR<KKNIR>)$, $e^*KK(KEY), CNTR, KEY\text{-}TYPE, C1L, C1R, C2, <C3>$ <br> $\longrightarrow e^*KM.C2(KEY), e^*KM.C3(KEY)$ (FOR KD) <br> $\longrightarrow e^*KM.C2(KEY)$ (FOR KK) |
| AXLTKEY | $e^*KM.C1L(KK1L<KKNI1L>), e^*KM.C1R(KK1R<KKNI1R>)$, $e^*KM.C2L(KK2L<KKNI2L>), e^*KM.C2R(KK2R<KKNI2R>)$, $e^*KK1(KEY), CNTR1, CNTR2, KEY\text{-}TYPE, C1L, C1R, C2L, C2R, C3$ <br> $\longrightarrow e^*KK2(KEY), e^*KM.C3(KEY)$ (FOR KD) <br> $\longrightarrow e^*KK2(KEY), e^*KM.C3(KDMAC)$ (FOR KK) |
| ACOMBKD | $e^*KM.C1(KD1), e^*KM.C2(KD2), C1, C2, C3 \longrightarrow e^*KM.C3(KD)$ |

SECURE MANAGEMENT OF KEYS USING CONTROL VECTORS

BACKGROUND OF THE INVENTION

1. Technical Field
2. Related Applications
3. Background Art

The following copending patent application is related to this invention and is incorporated herein by reference: B. Brachtl, et al., "Controlled Use of Cryptographic Keys via Generating Stations Established Control Values", Ser. No. 55,502, filed March 1987, and assigned to IBM Corporation.

The cryptographic transformation of data is ordinarily defined by a selected algorithm, or procedure, under the control of a key. Since the algorithm is normally public knowledge, protection of the transformed, or enciphered, data depends on secrecy of the key. Thus the key must be kept secret to prevent an opponent from simply using the known algorithm and key to recover the enciphered data. The protection of the data therefore hinges on the protection of secret keys.

Key Management encompasses the facilities, functions and procedures in a cryptographic system to handle cryptographic keys and key-related information in such a way as to protect the secrecy and integrity of the keys.

In order to support the primary cryptographic requirements of a user or host system, the system Key Management facility usually supports several capabilities including, Key Installation, Key Storage, Key Generation, and Key Distribution for both importing and exporting keys.

In all cases the general objective is to prevent unauthorized disclosure or modification of cryptographic keys.

Since enciphered data may be exchanged by systems employing the same cryptographic algorithm, the ability to exchange a secret key or keys may be necessary. In order to protect the privacy of a secret key during its shipment from the key originator to the intended recipient, the key itself must be enciphered under another secret key (already shared by the two parties). Key distribution protocols must be defined to support compatible, secure exchange of keys among cryptographic systems.

The storage of keys on insecure media (i.e., storage not within a secure area) requires that keys themselves be enciphered. The Master Key concept is one in which all keys used by a cryptographic system are stored in enciphered form under a single key called the Master Key. The Master Key itself must be protected from disclosure or modification. Non-cryptographic means are usually provided to protect the Master Key (such as physical access control).

The prior art has failed to provide a practical and flexible Key Management system which maintains high data security standards.

OBJECTS OF THE INVENTION

It is therefore an object of the invention to provide integrity for the cryptographic algorithm and certain higher-level cryptographic functions.

It is another object of the invention to provide for protection of the integrity of stored or distributed keys.

It is another object of the invention to provide for prevention of the misuse of stored or distributed keys (e.g., using a privacy key as an authentication key).

It is another object of the invention to provide for restricting the usage of stored or distributed keys (e.g., authentication verification only).

It is another object of the invention to provide for secure installation of the Master Key and other manually-installed key-encrypting keys.

It is another object of the invention to provide for secure generation of new key-encrypting keys and data encrypting keys.

SUMMARY OF THE INVENTION

These and other objects, features and advantages are accomplished by the invention disclosed herein. The invention referred to herein as the Cryptographic Architecture (CA), is implemented in a data processing system. The system executes a program which outputs cryptographic service requests for the management of cryptographic keys which are associated with control vectors defining the functions which each key is allowed by its originator to perform. The invention is an apparatus and method for validating that key management functions requested for a cryptographic key by the program have been authorized by the originator of the key.

The invention includes a cryptographic facility characterized by a secure boundary through which passes an input path for receiving the cryptographic service requests, cryptographic keys and their associated control vectors, and an output path for providing responses thereto. There can be included within the boundary a cryptographic instruction storage coupled to the input path, a control vector checking means and a cryptographic processing means coupled to the instruction storage, and a master key storage coupled to the processing means, for providing a secure location for executing key management functions in response to the received service requests.

The cryptographic instruction storage receives over the input path a cryptographic service request for performing a key management function on a cryptographic key. The control vector checking means has an input coupled to the input path for receiving a control vector associated with the cryptographic key and an input connected to the cryptographic instruction storage, for receiving control signals to initiate checking that the control vector authorizes the key management function which is requested by the cryptographic service request.

The control vector checking means has an authorization output connected to an input of the cryptographic processing means, for signalling that the key management function is authorized, the receipt of which by the cryptographic processing means initiates the performance of the requested key management function with the cryptographic key.

The invention further includes a cryptographic key storage means coupled to the cryptographic facility over the input and output paths, for storing the cryptographic key in an encrypted form in which the cryptographic key is encrypted under the storage key which is a logical product of the associated control vector and a master key stored in the master key storage.

For example, the cryptographic instruction storage can receive over the input path a cryptographic service request for recovering the cryptographic key from the cryptographic key storage means and the control vector checking means outputs in response thereto, an authorization signal to the cryptographic processing means that the function of recovering the cryptographic key is authorized. The cryptographic processing means then operates in response to the authorization signal, to receive the encrypted form of the cryptographic key from the cryptographic key storage means and to decrypt the encrypted form under the storage key which is a logical product of the associated control vector and the master key stored in the master key storage.

The control vector includes fields defining authorized types of cryptographic functions including key management functions, data encryption/decryption functions and PIN processing functions. The associated control vector also includes fields defining export control and usage of the keys. These various fields enforce the separation of several types of keys which have intended uses which should be made mutually exclusive in order to maintain the security of the system.

The invention enables the flexible control of many cryptographic key management functions in the generation, distribution and use of cryptographic keys, while maintaining a high security standard.

BRIEF DESCRIPTION OF THE DRAWINGS

These and other objects, features and advantages of the invention will be more fully appreciated with reference to the accompanying figures:

FIG. 8 summarizes the relative priority of implementing the various types of key separation.

FIG. 13 shows the CV format for MAC keys.

FIG. 14 shows the CV format for Data Compatibility keys.

FIG. 15 shows the CV format for Data Translate (XLATE) keys.

FIG. 16 shows the CV format for ANSI Data keys.

FIG. 17 shows the CV format for PIN-encrypting keys.

FIG. 18 shows the CV format for PIN-generating keys.

FIG. 19 shows the CV format for Key Encrypting Key (KEK) Sender.

FIG. 20 shows the CV format for KEK Receiver.

FIG. 21 shows the CV format for ANSI KEKs.

FIG. 32 lists the types and subtypes of keys which may be generated for each mode of the Generate Key Set (GKS) instruction.

FIG. 34 shows the valid combinations of CV Types for the pair of keys generated by GKS OP-OP mode.

FIG. 35 shows the valid combinations of Left versus Right CV attributes of Importing or Exporting KEKs used in the various modes of GKS. "Key Form and Link Control attributes are specified.

FIG. 36 shows the valid combinations of CV Key Forms and Link Control for pairs of Imported or Exported keys generated by various modes of GKS.

FIG. 37 shows the valid combinations of CV Types for the pair of keys generated by GKS OP-IM mode.

FIG. 51 shows the valid CV Usage attributes for a data key to be exported by ARFMK.

FIG. 52 shows the valid combinations of CV Type and Key Form for the Left and Right halves of the exporting KEK versus the corresponding attributes of the key to be exported in the ARFMK instruction.

FIG. 53 shows the valid CV Usage attributes which may be specified for the CSM MAC key produced as a by-product of ARFMK.

FIG. 55 shows the valid CV Usage attributes for a data key to be imported by ARTMK.

FIG. 56 shows the valid combinations of CV Type and Key Form for the Left and Right halves of the importing KEK versus the corresponding attributes of the key to be imported in the ARTMK instruction.

FIG. 57 shows the valid CV Usage attributes which may be specified for the CSM MAC key produced as a by-product of ARTMK.

FIGS. 65, 66, 67 and 68 show a mapping from common key management requirements or activities to instructions from which these requirements may be satisfied.

FIG. 70 shows the valid CV types which may be imported or exported on each Channel Type (CV, CV=), and ANSI).

FIG. 71 shows the valid combinations of Distribution Modes and CV Link Control attributes.

FIG. 72 depicts the Key Translation process performed at a node C on behalf of nodes A and B.

FIG. 73 shows a portion of the Key Encrypting Key Data Set (KDDS) where KEKs are stored.

FIG. 74 is an ANSI X9.17 System Node Diagram.

FIG. 76 is an ANSI Point-to-Point Environment System Diagram.

FIG. 79 shows the distribution of KEKs ((*KK) in a CCA ANSI X 9.17 implementation in tabular form.

FIG. 80 and FIG. 81 show the distribution of Data Keys (KD) in a CCA ANSI X 9.17 implementation in tabular form.

FIG. 85 shows the Message Authentication (MAC) algorithm.

FIGS. 86, 87 and 88 summarize the equations for each of the instructions.

DESCRIPTION OF THE BEST MODE FOR CARRYING OUT THE INVENTION

A flexible key usage control method and apparatus are described, which is referred to herein as the Cryptographic Architecture (CA). The method enforces strict key separation within the local cryptographic facility and between systems (I.e. "on-the-link"). The method uses Control Vectors which force the recipient or user of a key to use the key in a manner consistent with the intentions of the originator of the key.

All keys stored on insecure media outside the cryptographic facility are encrypted under a key formed from a function of the Master Key and a specific Control Vector value dictated by the originator of the stored key. The Master Key and possibly a few other keys are stored in the clear within the physically secure cryptographic facility. At no time does any key unintentionally appear in the clear outside the secure cryptographic facility.

Keys transmitted from one system to another are encrypted under a key formed from a function of a key-encrypting key and a specific Control Vector value dictated by the originator (and possibly the sender) of the key. Where such key usage control interferes with support for specific key distribution protocols, on-the-link control is not be enforced.

A set of primitive cryptographic functions, or instructions, are defined. These instructions form the basis of the functional security baseline. Each instruction is specified in terms of its input and output parameters, function description, and Control Vector processing. For integrity, the instructions are intended to be implemented completely within the secure cryptographic facility.

A very strong and positive feature of the cryptographic design is the strict adherence to the principle of limited function. This principle calls for the cryptographic interfaces to be implemented such that only the desired, and anticipated, cryptographic functions are permitted, and nothing else. It is the "nothing else" that is important. It has been found that attacks are frequently developed by using the architected interfaces of prior systems in some way not specifically required, or called for under the architecture, but which have not been prohibited by the implementation.

Figure 1:
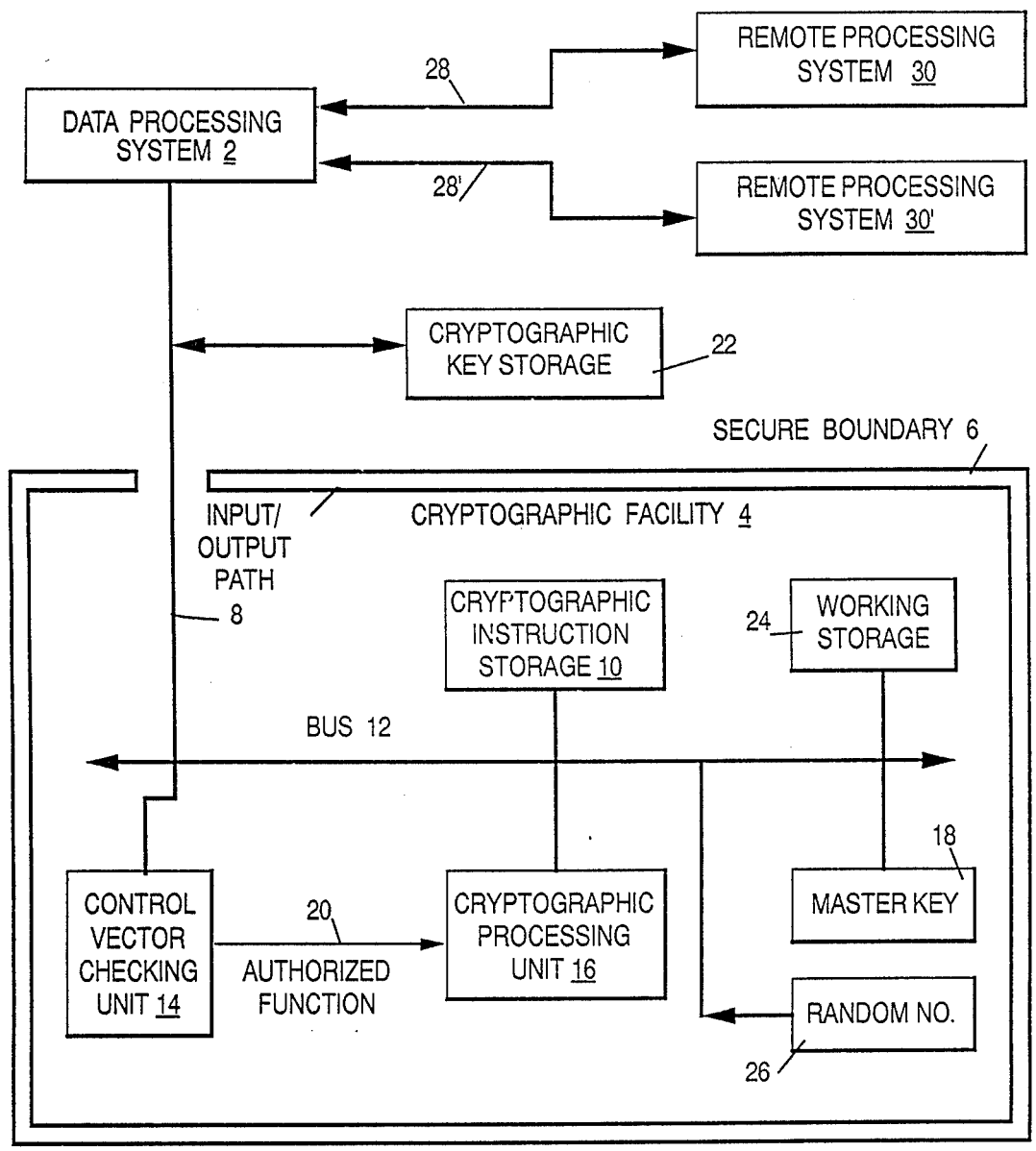
FIG. 1 is a System Diagram showing the major components of the Cryptographic Facility (CF).
Figures 10, 11, 12:
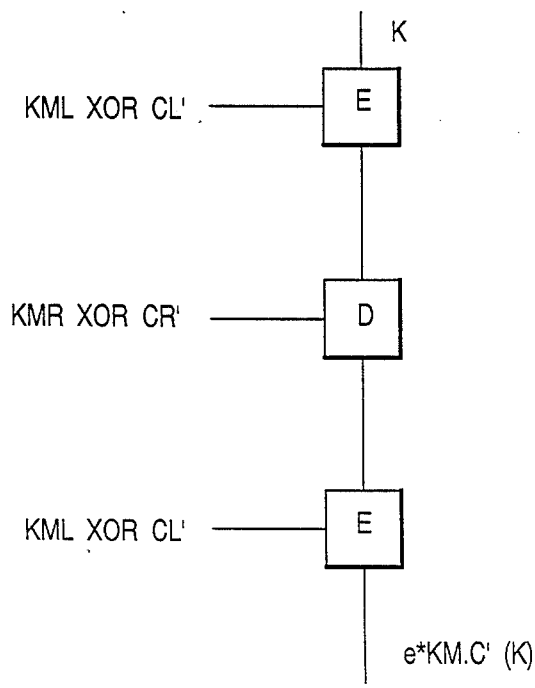
FIG. 10 shows the general format for Control Vectors (CV).
FIG. 11 shows the CV format for Privacy keys.
FIG. 12 illustrates the method of encrypting a key K under the Master Key with an Extended Control Vector.

FIG. 1 gives a Block Diagram representation of the data processing system with the cryptographic facility therein. In FIG. 1, the data processing system 2 executes a program such as the crypto facility access programs and the application programs illustrated in FIG. 2. These programs output cryptographic service requests for the management of the cryptographic keys which are associated with control vectors. The general format for a control vector is shown in FIG. 10. Control vectors define the function which the associated key is allowed by its originator to perform. The cryptographic architecture invention herein is an apparatus and a method for validating that key management functions requested for a cryptographic key by the program, have been authorized by the originator of the key.

As is shown in FIG. 1, contained within or associated with the data processing system 2 is a cryptographic facility 4 which is characterized by a secure boundary 6.

An input/output path 8 passes through the secure boundary 6 for receiving the cryptographic service request, cryptographic keys and their associated control vectors from the program. The input/out path 8 outputs responses to those cryptographic requests from the cryptographic facility. Included within the secure boundary 6 is a cryptographic instruction storage 10 which is coupled by units of the bus 12 to the input/output path 8. A control vector checking units 14 is coupled to the instruction in storage 10 and a cryptographic processing units 16 is also coupled to the instruction storage 10. A master key storage 18 is coupled to the cryptographic processing unit 16. The cryptographic facility 4 provides a secure location for executing key management functions in response to the received service request.

The cryptographic instruction storage 10 receives over the input/output path 8 a cryptographic service request for performing a key management function with a cryptographic key. The control vector checking unit 14 has an input coupled to the input/output path 8, for receiving a control vector associated with the cryptographic key. The control vector checking unit 14 also has an input connected to the cryptographic instruction storage 10, for receiving control signals to initiate checking that the control vector authorizes the key management function which is requested by the cryptographic service request.

The control vector checking unit 14 has an authorization output 20 which is connected to an input of the cryptographic processing unit 16, for signalling that key management function is authorized, the receipt of the authorization signal by the cryptographic processing unit 16 initiates the performance of the requested key management function with the cryptographic key. A cryptographic key storage unit 22 is coupled to the cryptographic facility 14 over the input/output path 8. The cryptographic key storage unit 22 stores the cryptographic key in an encrypted form in which the cryptographic key is encrypted under a storage key which is a logical product of the associated control vector and the master key stored in the master key storage 18.

An example of recovering an encrypted key from the cryptographic key storage 22 occurs when the cryptographic instruction storeage 10 receives over the input-/output path 8 a cryptographic service request for recovering the cryptographic key from the cryptographic key storage units 22. The control vector checking unit 14 will then output in response thereto, an authorization signal on line 20 to the cryptographic processing unit 16 that the function of recovering the cryptographic key is authorized. The cryptographic processing unit 16 will then operate in response to the authorization signal on line 20, to receive the encrypted form of the cryptographic key from the cryptographic key storage 22 and to decrypt the encrypted form under the storage key which is a logical product of the associated control vector and the master key stored in the master key storage 18.

The storage key is the exclusive-OR product of the associated control vector and the master key stored in the master key storage 18. Although the logical product is an exclusive OR operation in the preferred embodiment, it can also be other types of logical operations.

The associated control vector, whose general format is shown in FIG. 10, is stored with the encrypted form of its associated cryptographic key in the cryptographic key storage 22. Since all keys stored on a cryptographic storage encrypted under the master key, a uniform method for encryption and decryption of encrypted keys thereon can be performed.

The associated control vector, whose general format is shown in FIG. 10, includes fields defining the authorized types of cryptographic functions, including key management functions, data encryption/decryption functions and personal identification numbers (PIN) processing functions. In the key management applications, the key management functions type is designated for the type field. The associated control vector also includes additional fields which can define export control for the keys and associated encrypted information and the usage of the keys and associated encrypted information.

The invention shown in FIG. 1 can perform the generation of a key set, which is a pair of keys having several classes of uses. A random number source 26 or a stored random number in the working storage 24 of the cryptographic facility 4, has an input connected to the cryptographic processing units over the bus 12, for supplying a random number thereto.

The cryptographic instruction storage 10 will then receive over the input/output path 8 a cryptographic service request for the generation of a key pair from the random number output from the random number source 26, with associated first and second control vectors C3 and C4. The control vector checking unit 14 will then output in response thereto, an anthorization signal on line 20 to the cryptographic processing unit 16 that the function of generating a key pair from the random number is authorized. The cryptographic processing unit 16 then operates in response to the authorization signal on line 20, to output the random number as a first generated key in an encrypted form in which the random number is encrypted in a key which is a logical product of the first associated control vector C3 and a first key K1. The cryptographic processing unit 16 then further operates in response to the authorization signal on line 20, to output the random number as a second generated key in an encrypted form in which the random number is encrypted under a key which is a logical product of the second associated control vector C4 and a second key K2. There are a variety of combinations of usages which can be authorized by the control vectors C3 and C4 in accordance with the invention. One combination is for the production of two keys which are operational in the local data processing system 2 and, in this case, the first and second keys K1 and K2 are the random number and the first and second control vectors C3 and C4 only authorize operational usage within the local data processing system 2. A second combination can be for the production of a first generated key which is only operational in the local data processor 2 and a second generated key which can be exported to a remote data processing system 30 just connected to the local system 2, and in this case the first key K1 is the random number and the first control vector C3 only authorizes operational usage within the local data processing system 2 whereas, the second key K2 is a key encrypting key KEK2 and the second control vector C4 authorizes exportation to the remote data processing system 30. A third case is for the production of a first generated key which can be exported to a first remote data processing system 30 connected to the local data processing system 2 and a second generated key which can be exported to a second remote data processing system 30' connected to the local data processing system 2, and in this case, the first key K1 is a key encrypting key KEK1 and the first control vector C3 authorizes exportation to the first remote data processing system 30, whereas the second key K2 is a key encrypting key KEK2 and the second control vector C4 authorizes exportation to the second remote data processing system 30'. A fourth combination is for the production of a first generated key which is only operational in the local data processing system 2 and a second generated key which can be imported from a remote data processing system 30 connected to the local system 2, and in this case, the first key K1 is the random number and the first control vector C3 only authorizes operational usage within the local data processing system 2, whereas the second key K2 is a key encrypting key KEK2 and the second control vector C4 authorizes importation from the remote data processing system 30 to the local data processing system 2. A fifth case is for the production of a first generated key which can be imported from a first remote data processing system 30 connected to the local data processing system 2 and a second generated key which can be exported to a second remote data processing system 30' connected to the local system 2, and in this case the first key K1 is a key encrypting key KEK1 and a first control vector C3 authorizes importation from the first remote data processing system 30, whereas a second key K2 is a key encrypting key KEK2 and a second control vector C4 authorizes exportation to the second remote data processing system 30'.

The invention shown in FIG. 1 can perform the operation of reenciperment from master key function as follows. The data processing system 2 is connected over the communications link 28 to a remote data processing 30, with which a secret key encrypting key KEK is shared. The cryptographic key storage unit 22 stores the key encrypting key KEK in an encrypted form in which KEK is encrypted under a storage key which is a logical product of an associated control vector C1 and the master key. The cryptographic key storage units 22 also stores the cryptographic key as key K in an encrypted form in which key K is encrypted under a storage key which is a logical product of an associated control vector C2 and the master key.

The cryptographic instruction storage 10 will receive over the input/out path 8 a cryptographic service request for reencyphering the cryptographic key K from the master key to encipherment under the key encrypting key KEK for the purpose of export with an associated control vector C3 to the remote data processing system 30. The control vector checking unit 14 will output in response thereto, an authorization signal on line 20 to the cryptographic processing unit 16 that the function of reenciphering the cryptographic key K from the master key to encipherment under the key encrypting key KEK for export is authorized.

The cryptographic processing unit 16 will operate in response to the authorization signal on line 20, to receive the encrypted form of the cryptographic key K from the cryptographic key storage units 22 and to decrypt the encrypted form thereof under a storage key which is a logical product of the associated control vector C2 and the master key. The cryptographic processing unit 16 will further operate in response to the authorization signal on line 20, to receive the encrypted form of the key encrypting key KEK from the cryptographic key storage unit 22 and to decrypt the encrypted form thereof under a storage key which is a logical product of the associated control vector C1 and the master key.

The cryptographic processing unit 16 will then operate in response to the authorization signal on line 20, to reencipher the cryptographic key K under a logical product of the associated control vector C3 and the key encrypting key KEK and will output the reencipher cryptographic key K and the associated control vector C3 for transmission over the communications link 28 to the first remote data processing system 30.

The invention of FIG. 1 can perform the operation of a reencipherment to the master key function as follows. The data processing system 2 is connected over the communication link to the remote data processing system 30 with which it shares a secret key encrypting key KEK. The cryptographic key storage units 22 stores the key encrypting key KEK in an encrypted form in which KEK is encrypted under a storage key which is a logical product of an associated control vector C1 and the master key.

The remote data processing system 30 transmits over the communications link 28 to the local data processing system 2 a cryptographic key K enciphered under the key encrypting key KEK with an associated control vector C3. The cryptographic instruction storage 10 receives over the input/output path 8 a cryptographic service request for reenciphering the cryptographic key K from the key encrypting key KEK to encipherment under the master key with an associated control vector C2 for storage in the cryptographic key storage 22. The control vector checking unit 14 then outputs in response thereto, an authorization signal on line 20 to the cryptographic processing units 16 that the function of reenciphering the cryptographic key K from the key encrypting key KEK to encipherment under the master key for storage, is authorized. The cryptographic processing unit 16 then operates in response to the authorization signal on line 20 to reencipher the key K from the key encrypting key KEK to encipherment under the master key with the control vector C2 and outputs the reenciphered key K to the cryptographic key storage 22.

The invention of FIG. 1 can be further applied to generate a single key as follows. The random number source 26 has an output connected to the cryptographic processing unit 16 over the bus 12, for supplying a random number thereto. The cryptographic instruction storage 10 receives over the input/output path 8 a cryptographic service request for the generation of a key from the random number with an associated control vector C1. The control vector checking unit 14 outputs in response thereto, an authorization signal on line 20 to the cryptographic processing unit 16 that the function of generating a key from random numbers is authorized. The cryptographic processing unit 16 operates in response to the authorization signal on line 20, through output the random number as a generated key in an encrypted form in which the random number is encrypted under a key which is a logical product of the associated control vector C1 and the master key.

The invention of FIG. 1 can further operate to perform a translate key function, as follows. The data processing system 2 of FIG. 1 is a local system which is connected over a communications link 28 to a first remote data processing system 30 with which it shares a secret import key encrypting key KEK1. The local data processing system 2 is also connected over a communications link 28' to a second remote data processing system 30' with which it shares a secret export key encyrpting key KEK2. The cryptographic key storage 22 stores the import key encrypting key KEK1 in an encrypted form in which KEK1 is encrypted under a storage key which is a logical product of an associated control vector C1 and the master key. The cryptographic storage key 22 stores the export key encrypting key KEK2 in an encrypted form in which KEK2 is encrypted under a storage key which is a logical product of an associated control vector C2 and the master key.

The first remote data processing system 30 transmits over the communications link 28 to the local data processing system 2 a cryptographic key K enciphered under the import key encrypting key KEK1 with an associated control vector C3. The cryptographic instruction storage 10 receives over the input/output path 8 a cryptographic request for translating the cryptographic key K from encipherment under the import key encrypting key KEK1 to encipherment under the export key encrypting key KEK2 with an associated control vector C3 for transmission over the communications link 28' to the second data processing system 30'. The control vector checking unit 14 outputs in response thereto, an authorization signal on line 20 to the cryptographic processing unit 16 that the function of translating the cryptographic key K from encipherment under the import key encrypting key KEK1 to encipherment under the export key encrypting key KEK2 is authorized.

The cryptographic processing unit 16 operates in response to the authorization signal on line 20, to translate the cryptographic key K from encipherment under the import key encrypting key KEK1 to encipherment under the export key encrypting key KEK2 with the associated control vector C3 for transmission over the communications link 28' to the second data processing system 30'.

Various restrictions can be applied using the control vectors C1, C2 and C3 so as to prevent the local data processing system 2 from reading or from operating with the key K so that it can be transferred from the originating data processing unit 30 to the destination data processing unit 30' in a secure manner.

The invention of FIG. 1 can operate to perform a reencipherment from current master key to new master key function, as follows. A current master key storage such as the working storage 24, will store a current master key and a new master key can be stored in the master key storage 18, and both the current master key storage 24 and the master key storage 18 are coupled to the cryptographic processing unit 16 and the cryptographic facility 4. The cryptographic key storage 22 stores a cryptographic key such as key K in an encrypted form in which key K is encrypted under a storage key which is a logical product of an associated control vector C1 and the current master key. The cryptographic instruction storage will receive over the input/output path 8 a cryptographic service request for reenciphering the cryptographic key K from the current master key to encipherment under the new master key with the associated control vector C1 and the control vector checking units will output in response thereto an authorization signal on line 20 to the cryptographic processing unit 16 that the function of reenciphering the cryptographic key K from the current master key to encipherment under the new master key, is authorized.

Cryptographic processing unit 16 will operate in response to the authorization signal on line 20, to receive the encrypted form of the cryptographic key K from the cryptographic storage 22 and to decrypt the decrypted form thereof under a storage key which is a logical product of the associated control vector C1 and the current master key. Cryptographic processing unit 16 will then operate in response to the authorization signal on line 20, to reencipher the cryptographic key K under a logical product of an associated control vector C1 and the new master key and output the reenciphered cryptographic key K and the associated control vector C1 to the cryptographic key storage 22.

The invention of FIG. 1 will operate to perform a lowering of the authority specified by a control vector for the usage of a key, and this is accomplished as follows. The cryptographic key storage 22 stores the cryptographic key as key K in an encrypted form in which the key K is encrypted under a storage key which is a logical product of an associated control vector C1 and the master key. The associated control vector C1 includes a field which defines export control, for example. The cryptographic instruction storage 10 receives over the input/output path 8 a cryptographic service request for lowering the control vector authority for the associated control vector C1 and the control vector checking unit 14 outputs in response thereto, an authorization signal on line 20 to the cryptographic processing unit 16 that the function of lowering the control vector authority for the associated control vector C1, is authorized.

Cryptographic processing unit 16 then operates in response to the authorization signal on line 20, to receive encrypted form of the cryptographic key K from the cryptographic key storage 22 and to decrypt the encrypted form thereof under a storage key which is a logical product of the associated control vector C1 and the master key. The cryptographic processing unit 16 then operated in response to the authorization signal on line 20, to substitute a second control vector C2 for the associated control vector C1, with the second control vector C2 having an export control field which designates a lower authority than that which was designated for the previous control vector C1. The cryptographic processing unit 16 then operates in response to the authorization signal on line 20, to encipher the key K under the master key with the second control vector C2 and to output the enciphered key K to the cryptographic storage 22 with the second control vector C2.

The invention of FIG. 1 will operate to perform a reencipherment from master key function with a reduction in the export authority for the recipient, in the following manner. The data processing system is a local data processing system 2 which is connected to a first remote data processing system 30 with which a secret key encrypting is shared. The cryptographic storage 22 stores the key encrypting key KEK in an encrypted form in which the KEK is encrypted under a storage key which is a logical product on an associated control vector C1 and the master key. The cryptographic key storage 22 stores the cryptographic key as key K in an encrypted form in which a key K is encrypted under a storage key which is a logical product of an associated control vector C2 and the master key, the associated control vector C2 having an export field designating a first export authority. The cryptographic instruction storage 10 receives over the input/output path 8 a cryptographic service request for reenciphering the cryptographic key K from the master key to encipherment under the key encrypting key KEK for export with an associated control vector C3 to the first remote data processing 30, the associated control vector C3 having an export field designating a second export authority which is less than the first export authority of C2.

The control vector checking unit 14 outputs in response thereto, an authorization signal on the line 20 to the cryptographic processing unit 16 that the function of reenciphering the cryptographic key K from the master key to encipherment under the key encrypting key KEK for export is authorized. The cryptographic processing unit 16 operates in response to the authorization signal on line 20, to receive the encrypted form of the encrypted key K from the cryptographic key storage 22 and to decrypt the encrypted form thereof under a storage key which is a logical product of the associated control vector C2 and the master key. The cryptographic processing unit 16 operates in response to the authorization signal on line 20, to receive the encrypted form of the key encrypting key KEK from the cryptographic key storage 22 and to decrypt the encrypted form thereof under a storage key which is a logical product of the associated control vector C1 and the master key.

The cryptographic processing unit 16 then operates in response to the authorization signal on line 20, to reencipher the cryptographic key K under a logical product of the associated control vector C3 and the key encrypting key KEK and outputs the reenciphered cryptographic key K and the associated control vector C3 for transmission to the first remote data processing system 30. The first remote data processing system now has a lower authority for reexportation of the cryptographic key K because of the lower authority designated in the export field of the associated control vector C3.

The invention of FIG. 1 can further provide for link control operations in the following manner. The associated control vector includes a field which defines link control which specifies whether the control vector associated with the cryptographic key should be omitted from transmission from the local data processing system to a remote data processing system 30 connected thereto, due to the characteristics of the remote data processing system 3. For example, the remote data processing system may not be capable of assimilating and processing control vectors. The control vectors which provide for allowing their separation from the associated cryptographickey upon transmission, confer a lower security trustworthiness to the resulting operations performed by the associated cryptographic key. In this manner, those systems such as the local data processing system 2 which are able to make use of the control vectors, have a higher security trustworthiness conferred upon them than can be conferred upon remote systems that do not have the capacity to use control vectors. The associated control vector can also include a field which specifies whether the key associated therewith can be processed by an ANSI-type data processing system as the remote processing 30.

Figure 7:
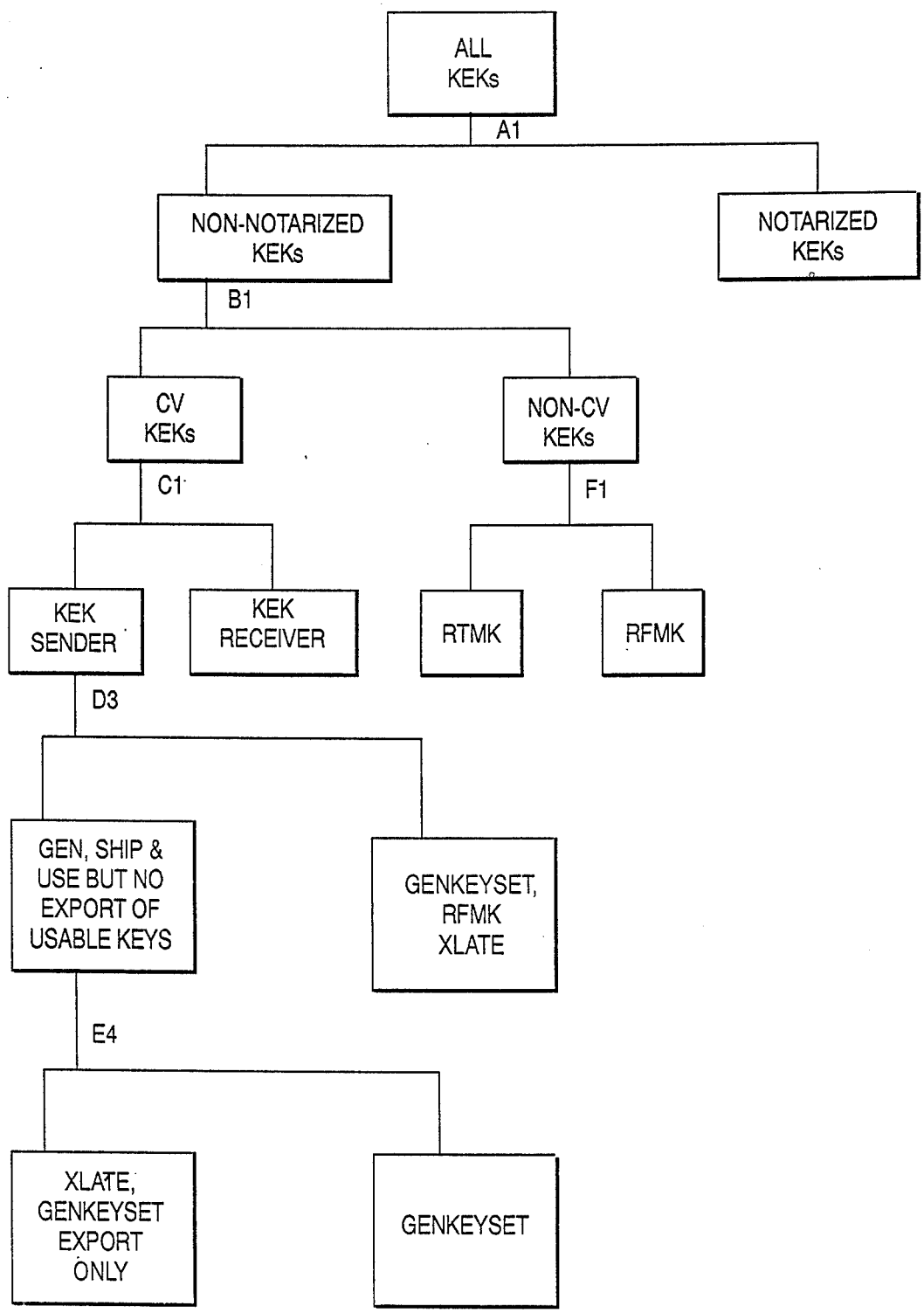
FIG. 7 illustrates Key Encrypting Key separation.

The invention of FIG. 1 has the associated control vector, generally shown in FIG. 10, which includes fields for enforcing the separation of key encrypting keys based on two mutually exclusive intended uses. FIG. 7 illustrates the organization of separating the various key encrypting keys by their intended usage. For example, mutually exclusive intended uses can be for notarized and non-notarized keys. Another form of mutually exclusive intended uses would be for first-type key encrypting key which uses control vectors and a second-type key encrypting key which does not use control vectors. Another example of mutually exclusive intended uses is for a first-type of key encrypting keys to be used only by senders and a second-type of key encrypting keys to be used only by receivers. Another example of mutually exclusive intended uses for which control vectors enforce key separation is for a first-type of key encrypting keys which can be used for the generation of key sets and for the translation of keys for shipment without allowing the export of existing data keys stored under a master key and a second-type of key encrypting keys which can be used for the generation of key sets and the translation of keys for shipment which do allow for the export of existing data keys stored under a master key. Another example of mutually exclusive intended uses for which the control vector enforces key separation is for a first-type of key encrypting keys which can be generated for export only and a second-type of key encrypting keys which can be generated for operational use and for export. Another example of mutually exclusive intended uses for which control vectors enforce key separation is for a first-type of key encrypting keys which can be used in translation without allowing local operational use and a second-type of key encrypting keys which can be used in translation and also will allow local operational use. Another example of mutually exclusive intended uses for which control vectors enforce key separation is for a first-type of key encrypting keys which can be used in the reencipher from master key operation and a second-type of key encrypting keys which cannot be used in a reencipher from master key operation.

The control vector, as generally shown in FIG. 10, can also include a field to designate whether the cryptographic key associated therewith is a single length key or a double length key.

The following provides a more detailed description of the components and operations of the invention.

Figure 2:
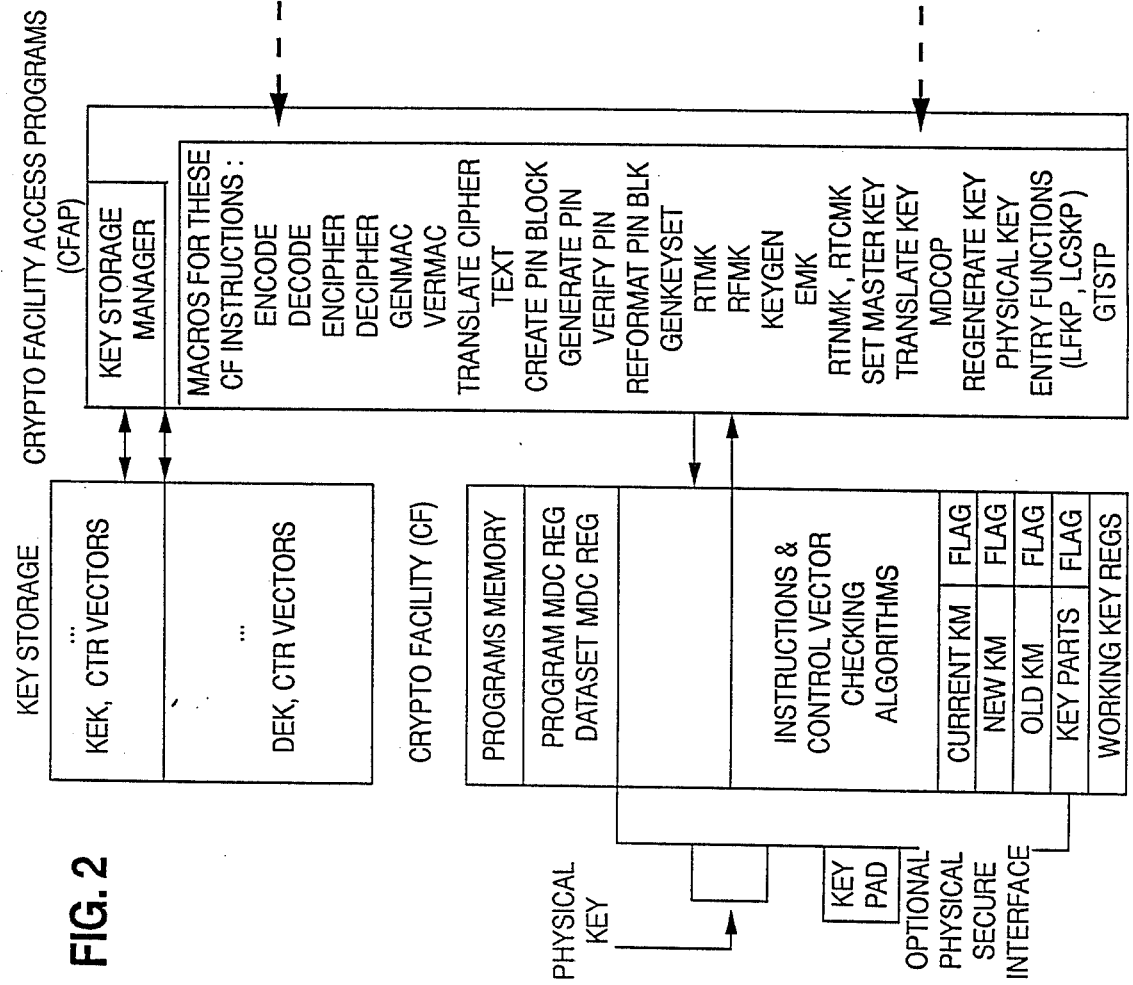
FIG. 2 is a System Diagram showing the components of the CF, software driver CFAP and cryptographic application programs.

FIG. 2 shows the major components of a crypto subsystem. The cryptographic subsystem consists of a Crypto Facility (CF), Crypto Facility Access Program (CFAP), and Application Program (AP). Normally, the CF is implemented in hardware, inside a physically secure box. Depending upon the implementation, the CF, CFAP, and AP could all be in a physically secure box.

The Cryptographic Facility 4 consists of:
Key Registers
The registers and their usages are described below:
Master Key Register 18
  The master key register is 128 bits wide, containing the master key.
New Master Key (NMK) register:
  The new master key register is 128 bits wide, containing the new master key that is going to become the current master key. The New Master Key will become the current master key only after a special instruction, the SMK instruction is issued to load the value of new master key into the master key register.
Old Master Key Register
  The old master key register is 128 bits wide, containing the master key that was replaced by the current master key. The master key update mechanism is such that the current master key becomes the old master key prior to the new master key becoming the current master key.

Part Register

The key part register is 128 bits wide, containing the value of a key part (component), or a complete key that is being installed via a key loading device such as a key pad or key board attached to the CF via an optional secured physical interface.

Working Key Register(s)

For performance reasons, the system has working register(s), 128 bit wide each, to contain immediate working key(s) for fast accesses. For example, a key that is used to encrypt data is brought into the CF in encrypted form on the first use. It then is decrypted and the clear value can be stored in one of the working key registers. In subsequent uses to encrypt or decrypt the data, this clear key can be quickly accessed from a specific working key register, thus eliminating the repeated steps of decrypting the key prior to using it.

Program MDC Register (PMDC Reg)

The program MDC register is 64 bits wide, containing the MDC of the program to be loaded in the program memory inside the CF.

Dataset MDC register (DMDC Reg)

The dataset MDC register is 64 bits wide, containing the MDC of the datasets whose integrity is validated by CFAP. This normally is, at least, the key storage datasets.

Cryptographic instructions and control vector checking algorithms.

The instruction set and control vector checking algorithms are implemented in the secured cryptographic facility and are stored in the cryptographic instruction storage 10 which is a random access memory. They are executed in a microprocessor such as an Intel 80286 which can serve as the cryptographic processing unit 16. The control vector checking unit 14 can also be implemented in the cryptographic processing unit 16 or it can be implemented by a second microprocessor such as an Intel 80286 serving as the control vector checking unit 14.

Program Memory and Processing Engine.

The system can also employ a memory inside the CF to store user's programs and a processing engine to execute the programs. An example of this is a program or macro for performing new algorithms for PIN verifications on new PIN formats.

Random Number Generator 26

The random number generator is an algorithmic procedure for producing 64 bit pseudorandom numbers. The algorithm itself is nonsecret, but makes use of two 128 bit secret keys and a 64 bit nonsecret incrementing counter. Although nonsecret, the integrity and proper management of the counter are essential to security.

The Crypto Facility (CF) is a secure implementation containing the Data Encryption Algorithm and storage for a small number of key and data parameters in the cryptographic instruction storage 10. It can be accessed only through involute interfaces (secure against intrusion, circumvention, and deception) which allow processing requests, key, and data parameters to be presented, and transformed output(s) to be received.

The ANSI Data Encryption Algorithm (DEA) is a standard cryptographic algorithm for commercial data security products. The DEA is a symmetric block cipher algorithm that uses a 56-bit secret key to encipher 64 bits of plaintext to form 64 bits of cipher text. DEA keys are normally stored with 1 parity bit per byte, forming a 64-bit key. DEA forms the basis for the National Bureau of Standards approved Federal Data Encryption Standard, so it is also called DES.

The cryptographic facility must resist probing by an insider adversary who has limited access to the cryptographic hardware. "Limited" is measured in minutes or hours as opposed to days and weeks, and the adversary is constrained to a probing attack at the location where the system is installed, using limited electronic devices as opposed to a laboratory attack launched at a site under the control of the adversary using sophisticated electronic and mechanical equipment.

The cryptographic facility must detect attempts at physical probing or intrusion. This may be accomplished using a variety of electro-mechanical sensing devices.

The cryptographic facility must provide for the automatic zeroization of all internally stored clear keys. Such zeroization must be performed automatically whenever an attempted probing or intrusion has been detected. The cryptographic facility must also provide a manual capability to zeroize key storage via the front panel interface.

The crypto facility contains one master key KM. All other keys can reside on mass storage encrypted under a key formed by Exclusive ORing the master key with a valid control vector. Refer to U.S. Pat. No. 4,386,234 entitled "Cryptographic Communications and File Security Using Germinals" by Ehrsam, et al., assigned to IBM Corporation, and incorporated herein by reference, for a description of an example Cryptographic Facility.

The CFAP is the programming interface between the CF and the application program. Since users do not have direct access to the cryptographic facility, the CFAP is the programming interface through which the users can request the CF to perform specific operations.

Associated with the CFAP is the Key Storage outside the CF where encrypted keys are stored. No clear keys are stored outside the CF. The Key Storage 22 is also referred to herein as the "Cryptographic Key Data Set" (CKDS).

The CFAP typically consists of the following:

Key Storage Manager to manage keys stored in the key storage mentioned above.

CFAP Macros through which users access to the CF to perform cryptographic functions.

Application programs include user's application programs, some utilities such as a key installation utility, and communication programs such as IBM VTAM.

User's application programs consist of statements that will invoke certain CFAP macros to perform a specific task. As mentioned, the CFAP is the only interface through which application programs can request CF to execute a cryptographic operation. For example, a user might want to encipher a file prior to shipping it to another node on the network. His application program might have one statement that calls a CFAP nacro to generate a key, and another statement that invokes another CFAP macro to encipher the data of the file with the given key.

Another example of a user's application program is one that allows the manual installation of keys on the system, similar to the installation program mentioned above.

Figure 3:
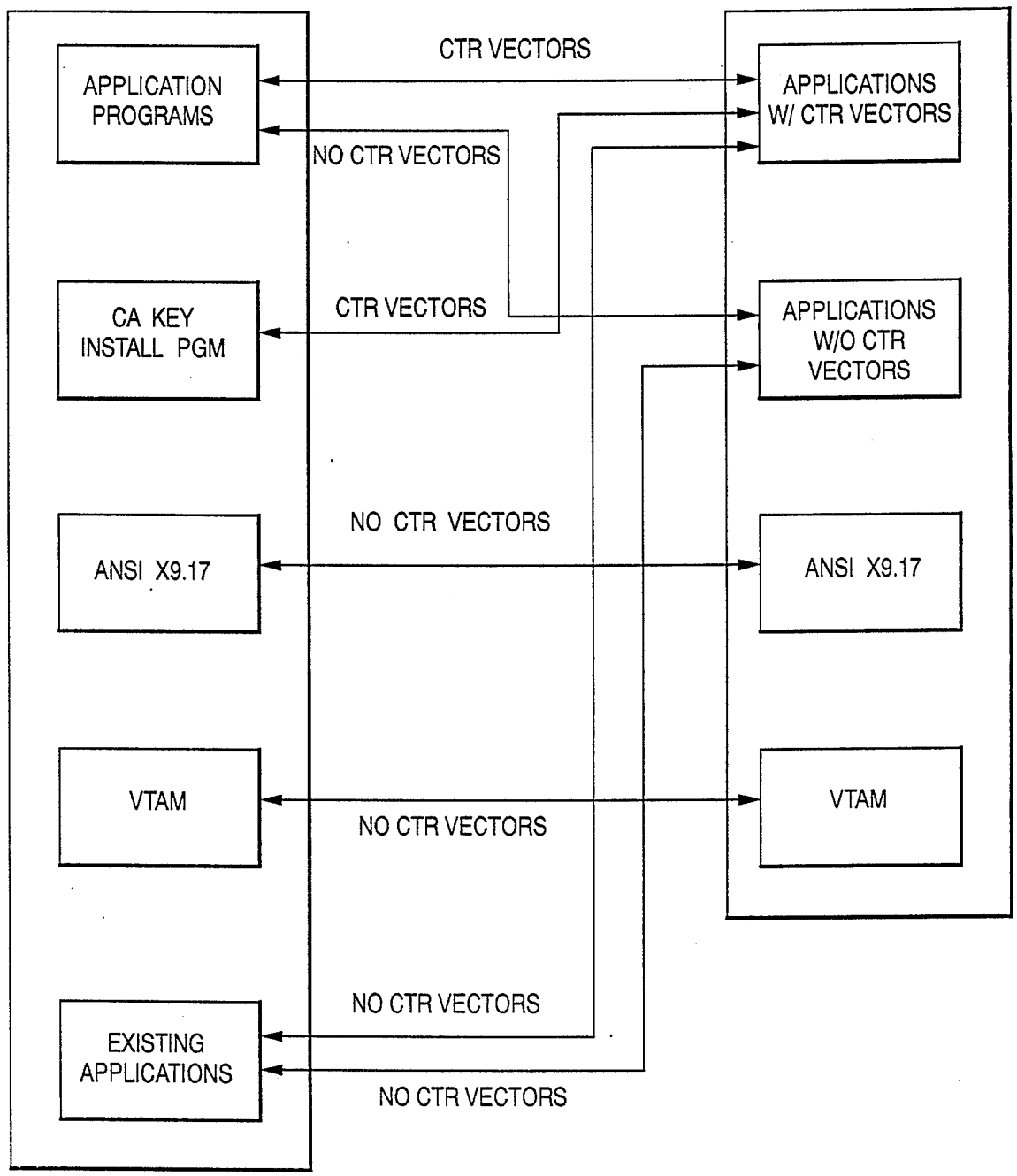
FIG. 3 shows where Control Vectors are applied in various inter-system communications scenarios.

FIG. 3 shows the use of control vectors for the key distribution between various applications in a multi-system communications environment. Note that for compatibility purposes some keys must be distributed without control vectors.

| Notation | The following notation is used herein: |
|---|---|
| ECB | Electronic code book |
| CBC | Cipher block chaining |
| KM | 128 bit Master key |
| KEK | 128 bit Key encrypting key |
| K | 64 bit key |
| *K | 128 bit key |
| (*)K | 64 or 128 bit key |
| KD | 64 bit data encrypting key |
| KK | 64 bit Key encrypting key |
| *KK | 128 bit Key encrypting key |
| KKo | offset 64 bit Key encrypting key |
| *KKo | offset 128 bit Key encrypting key |
| (*)KKo | offset 64 or 128 bit Key encrypting key |
| *KKNI | 128 bit partial notarizing Key encrypting key |
| *KN | 128 bit notarizing key, equivalent to *KKNIo |
| cx | 64 bit control vector |
| CxL | 64 bit left control vector |
| CxR | 64 bit right control vector |
| XOR or xor | exclusive or operation |
| or | logical or operation |
| X '0' | Hex notation |
| 11 | concantentation operation |
| [x] | optional parameter x |
| not = | not equal |
| E or e | single encryption |
| D or d | single decryption |
| EDE or ede | triple encryption |
| DED or ded | triple decryption |
| Equations | The function of each instruction is mathematically denoted in the form: I1, I2, I3, I4, . . . - O1, O2, O3, . . . where I1, I2, I3, . . . are the inputs to the function and O1, O2, O3, . . . are the outputs from the function. |
| KM.Cx | (KML XOR Cx) 11 (KMR XOR Cx) = KMY 11 KMX where, KML = Left 64 bits of the master key KM, KMR = right 64 bits of the master key KM, KMY = KML XOR Cx KMX = KMR XOR Cx |
| e*KM.Cx(key) | e*KM.Cx(key) = eKMY(dKMX(eKMY(key))) where, KMY = KML XOR Cx KMX= KMR XOR Cx key = 64 bit key |
| e*KEKn.CX(key) | e*KEKn.Cx(key) = eKEKY(dKEKX(eKEKY(key))) where, KEKY = KEKnL XOR CxL KEKX = KEKnR XOR CxR key = 64 bit key |
| e*KM.CxL(KEKnL) | e*KM.CxL(KEKL) = eKMY)dKMX(eKMY(KEKnL))) where, KEKL = left 64 bits of KEK KMY = KML XOR CxL KMX = KMR XOR CxL |
| e*KM.CxR(KEKnR) | e*KM.CxR(KEKR) = eKMY(dKMX(eKMY(KEKnR))) where, KEKR = right 64 bits of KEK KMY = KML XOR CxR KMX = KMR XOR CxR |
| e*KEKo(key) | e*KEKo(key) = eKEKLo(dKEKRo(eKEKLo(key)) where, KEKLo = KEKL XOR cntr KEKRo = KEKR XOR cntr |

| Notation | The following notation is used herein: |
|---|---|
| cntr | = implicit 64-bit key-message counter for KEK |
| key | = 64 bit key |

Cryptographic Separation of Keys

Keys are separated cryptographically by the invention according to key type and key usage attributes.

1. The architecture guarantees that cryptographic keys can be used only in the way or ways prescribed and intended.

2. Internal Versus On-The-Link Separation. Internally (i.e., within the cryptographic facility), keys are separated via control vectors or other appropriate/equivalent mechanism. On the link, keys are separated using control vectors.

3. Hardware Versus Software Enforcement. Certain cryptographic separation is implemented in hardware; other cryptographic separation can be implemented via software.

4. Control vector key types and compatibility-mode key types. In order that the compatibility-mode key types will not diminish the security, certain rules governing generation, distribution, and usage of these two classes of key types is imposed.

5. A list of required key separations provided by the invention is listed below:
   (a) Data Privacy. ENCIPHER from DECIPHER, allows public key protocols such as mailbox, ballot and pass on.
   (b) Data MAC. MACGEN from MACVER, allows for nonrepudiation (equivalent of electronic signature).
   (c) Data XLATE. Allows a secure translate channel to be established, where intermediate devices cannot decrypt encrypted data.
   (d) Data COMPAT. Allows compatibility mode without weakening security of other data keys.
   (e) Data ANSI. Allows ANSI X9.17 key management to be coexist with non-ANSI X9.17 key management without loss of security to either approach.
   (f) Key Encrypting Keys. KEK Sender from KEK Receiver.
   (g) PIN Keys. PIN Generating Key from PIN Encrypting Key. The following notation is used for FIGS. 4 through 9:

Notation:

Near each line leaving a box is a separation letter and a priority number.

The separation letter will correspond with descriptions below:

The range of priority numbers (1 through 4) should be interpreted as follows:
1. Absolute necessity
2. Strongly recommended
3. Recommended
4. Desirable

Fundamental Key Separation

Figure 4:
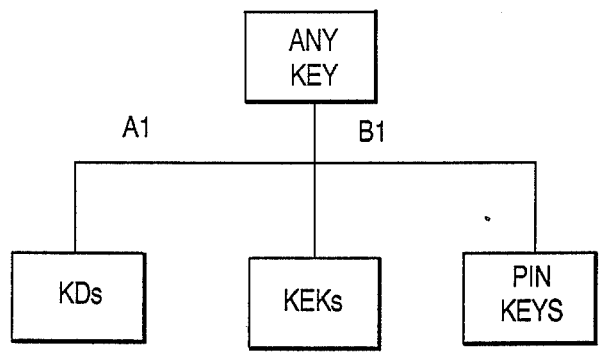
FIG. 4 illustrates the fundamental cryptographic key separation.

FIG. 4 illustrates the fundamental cryptographic key separation. An explanation of the separation is given below:
1. A. Data Keys : KEKs and PIN keys If KDs (Data Keys) are not separated from KEKs and PIN keys, then Decipher data function used with data keys could be misused to decipher KEKs and PINs.

2. B. Key Encrypting Keys : PIN keys If KEKs (Key Encrypting Keys) are not separated from PIN Keys it would be possible for an outsider to wiretap an encrypted PIN block and replay it in place of an encrypted KD. Ahead of time, an insider accomplice could replace the encrypted stored KEK with the encrypted stored PIN Key in the receiving node's cryptographic key data set. The PIN block would be then recovered and used as a data key at the receiving node. Subsequently, data that would be encrypted under this PIN block used as a data key would be much easier to subject to a key exhaustion attack as the variability of PINs (normally four to six decimal digits) is much less than that of a random 56 bit data key.

Data Keys Separation

Figure 5:
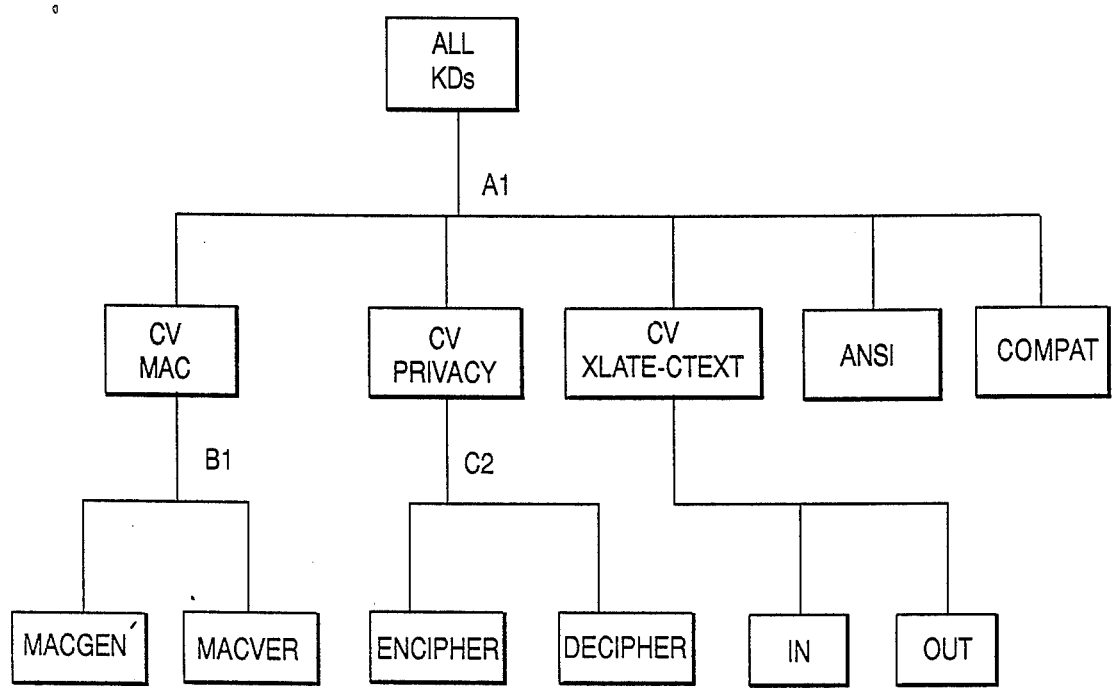
FIG. 5 illustrates data key separation.

FIG. 5 shows the flow chart of the Data keys separation. The justifications for the separation are given below.

1. A—Authentication : Privacy

An insider who can collect plain and corresponding ciphertext encrypted with a MAC key can perpetrate an attack against the MAC procedure. For example, it would be possible to construct fraudulent messages and MACs that would be authenticated and accepted by the MAC algorithm. Thus, the data keys used for encryption/decryption should not be used for authentication of data.

On the link, if an intercepted data key can be substituted for a MAC key, the transmitted ciphertext (under that data key) could be used to construct a fraudulent message and MAC.

B—Xlate Ciphertext: Privacy

By definition, Xlate Ciphertext implies the use of a pair of data keys KD1 and KD2, where ciphertext encrypted under KD1 is decrypted under KD1 and then reencrypted under KD2 without exposing the data to the calling application program. Otherwise, Xlate Ciphertext could be performed using the existing Decipher and Encipher functions.

C—ANSI: all others

ANSI keys have their own protocol for key distribution and an additional possible usage referred to as ANSI COMBINE KEYS. These differences mandate a separate pool for all ANSI keys.

D—Data COMPATIBILITY: All others

Data Compatibility keys exist due to requirements to be compatible with previous systems such as IBM CUSP/3848, IBM PCF, and IBM 4700. As the enforced internal separation in these systems does not extend to the level of separating MAC from Privacy keys, these keys need to be distinguished from the CV keys which support such an improved level of separation.

2. B—MACGEN:MACVER

Provides an audit trail to "prove" who originated a message and MAC (called nonrepudiation). This method is no more secure than the CF, and assumes a mutual trust in the integrity and secrecy of keys stored in the CF.

3. C—Encipher: Decipher

Provides true separation of the encipher and decipher functions, thus permitting data to be enciphered under a data key without exposing the right to decipher under that same data key. For example, an encipher only data key could be used in a 'vote and pass on' balloting scheme. A decipher only data key could be used in an environment where a user is authorized to read but not write some data.

Pin Keys Separation

Figure 6:
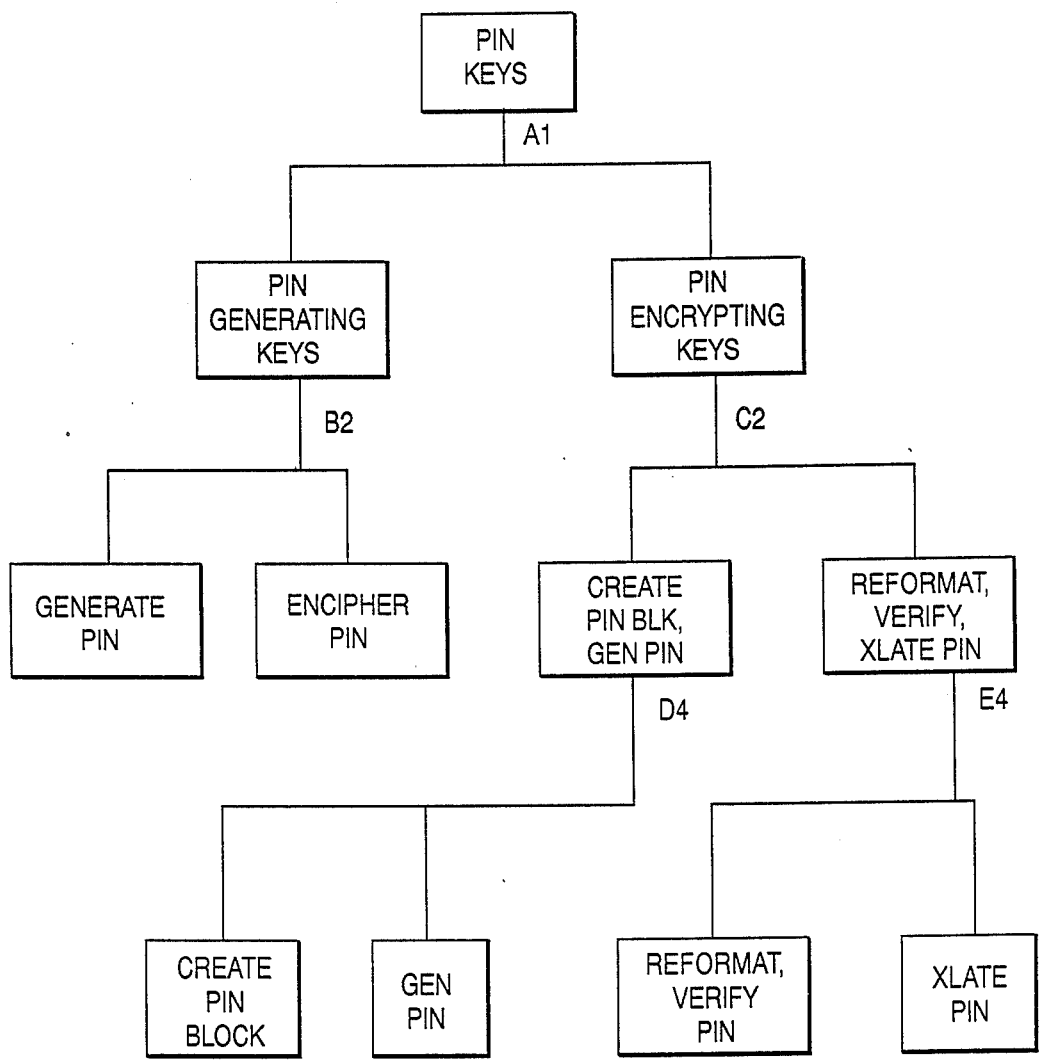
FIG. 6 illustrates PIN key separation.

FIG. 6 shows the flow chart of the Pin keys separation. The justifications for the separation are given below:

1. A—PIN Generating Keys: PIN Encrypting Keys

An insider who could cause a PIN block to be forced equal to a valid ID value and then encrypted under a PIN generating key instead of a PIN encrypting key, could expose PINs.

2. B—Generate PIN function : Encipher PIN function During PIN generation, the Encipher PIN attribute allows separation of PIN Generating keys that allow clear PINs to be generated from those that always must output encrypted PINs.

3. C—Create PIN Block & Generate PIN : Reformat PIN, Verify PIN & Xlate PIN

Permits the PIN encrypting key to be used with routine PIN processing functions like Reformat PIN, Verify PIN and Xlate PIN without allowing PIN keys to be used or create or otherwise "introduce" PINs into the network at electronic speeds. This would prevent dictionaries of plain and encrypted PINs to be collected at electronic speeds, which would be useful in attacking and recovering PINs without directly deciphering them. Tight control needs to be enforced over where and when and under what conditions PINs may be introduced into the system.

4. D—Create PIN Block : Generate PIN

Greater control can be exercised over the introduction of PINs into the network. A node with a requirement to create PIN blocks need not necessarily have a right or need to generate PINs.

5. E—Reformat PIN and Verify PIN : Xlate PIN

Greater control can be exercised over the PIN processing functions in the network. A node with a need and right to translate PINs does not necessarily have a right or need to reformat a PIN or verify a PIN. The later two functions might be used in combination to exhaust PINs via an internal attack, whereas the Xlate PIN function could be used by some nodes without giving away full processing capabilities.

Key Encrypting Keys Separation

FIG. 7 shows the flow chart of the Key encrypting keys separation. The justifications for the separation are given below:

1. A—Notarization: non-Notarization

An insider might be able to cause a key intended for use with offset to be used without offset/notarization, such that the variant on the key is equal to an old offset counter value. Conversely, an insider might be able to cause a key intended for use only for non-offset/authorization to be used with an offset process, such that the offset on the key is equal to a variant not intended to be created or generated via a privileged mode in the crypto facility or by an entry in the authorized variant table.

2. B—CV KEKs: non-CV KEKs

Cryptographic operations in support of other non-CV network nodes, executed by a CV cryptographic facility, must not allow CV network node security to be weakened or diminished. For example, a CV system must support the import of both privacy and authentication (MAC) keys from a non-CV IBM 4700 or IBM 3848 system. In all cases, these data keys are received under variant 0 of the shared cross domain key. If the shared cross domain keys of these non-CV systems are not separated cryptographically from the CV system cross domain keys, then it would be possible to import a CV cyctem data key intended for one purpose (specified by variant 0 of the cross domain key) and translate it for another purpose (specified by some other variants).

3. C—KEK Sender: KEK Receiver

Maintain the same unidirectionality feature on cross domain keys as is present in the current IBM 3848/CUSP and IBM PCF. Also provides better control in preventing the unauthorized creation of bidirectional KEK's.

4. D—GENKEYSET/XLATE: RFMK/GENKEYSET/XLATE

Permit KEK's in support of the GENKEYSET and LXATE for shipment of data keys without necessarily allowing the export of existing data keys stored under the master key (or variant of master key). Thus, data keys used by the CV system are not exposed for export unless this feature is needed or desired.

5. E—GENKEYSET (Export only)/XLATE: GENKEYSET (general use)

Permits a node to act as a Key Distribution Center (KDC) or a Key Translation Center (KTC) without the ability to use the generated data keys within the generating node.

6. F—RTMK: RFMK on IBM 3848/CUSP (and compatible system)

Supports unidirectionality on IBM 3848/CUSP and other systems that are compatible with CV systems.

FIG. 8 shows a summary of the key separations and assigns a relative priority to them. Highest priority is '1' and lowest is '4'.

Figure 9:
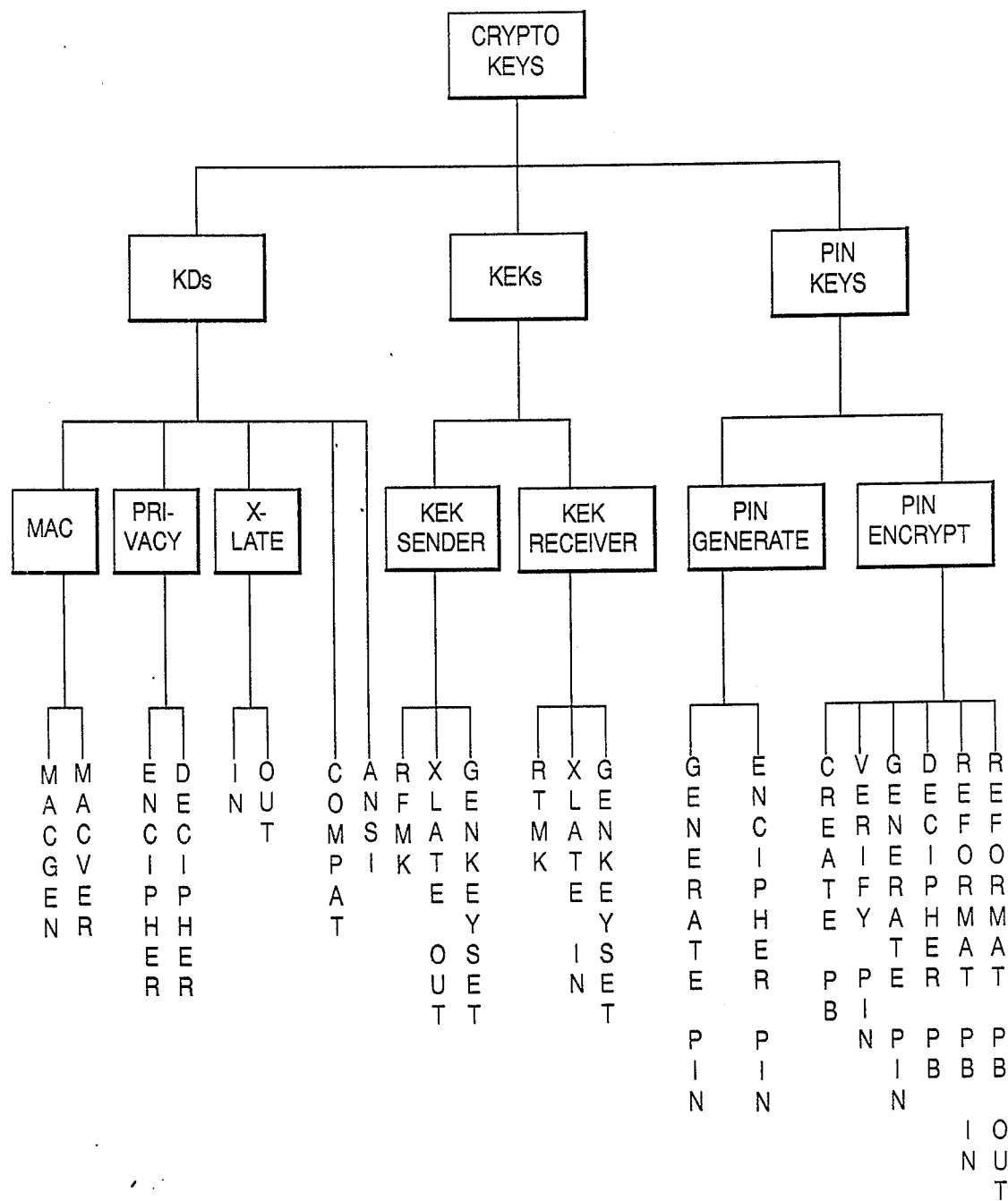
FIG. 9 summarizes the separation provided for each of the defined key types.

FIG. 9 summarizes the separation flows. The 'leaves' on the tree indicate the cryptographic instructions that make use of the separate key types.

Control Vectors

Control Vectors Concept

The control vector is a 64 bit nonsecret cryptographic variable for controlling the usage of keys. Each key K defined to the cryptographic system has an associated control vector C, i.e., the key and control vector define a tuple (K, C).

Each control vector specifies a CV TYPE, which broadly defines how the key may be used and the rules governing how that key may be communicated on the link. A key may be a data key, sender key encrypting key, receiver key encrypting key, PIN encrypting key, PIN generating key, Intermediate ICV, Key part or Token. Additional bits in the control vector specify exactly in which cryptographic instructions and parameter inputs the key may operate. Still other bits control the export of the key, i.e., whether the key can be exported or not.

The control vector is coupled cryptographically to the key via a special encryption function. For example, when the K is stored in a Key Storage, K is encrypted under a key formed by Exclusive-ORing the control vector with the master key, i.e., K is stored as the tuple (eKM.C(K), C), where KM.C denotes KM xor C. When K is transmitted on the link (from one device to another), a similar encrypted form is used. In this case, the master key KM is replaced by a key encrypting key KEK, where KEK is a key shared between the sender and receiver. Thus, K is transmitted as the tuple ( eKEK.C(K), C). The architecture does not require that the control vector be stored or transmitted with the key in situations where its value is defined implicitly from the context or can be reconstructed from available key-related information.

Since the control vector (C) is tightly coupled to the key (K), via the encrypted form eKM.C(K) or eKEK.C(K), it is apparent that K cannot be recovered from its encrypted form unless C is correctly specified. Thus, if the tuple (EKM.C(K), C) is provided as an input to a requested cryptographic instruction, the cryptographic facility will first check the supplied value of C to determine that the requested usage of the key is permitted. Only then will C be used to decrypt eKM.C(K) to recover the clear value of K internal to the cryptographic facility. If a false value C* is specified, the cryptographic facility may be fooled temporarily into accepting C*, but K will not be recovered properly. Thus, there is no opportunity for a user to recover the correct value of K unless the correct value of C is also specified. The cryptographic principle is thus the basis upon which the entire architecture is built; and additional security is provided as necessary and where appropriate.

The control vector is a compact data structure for defining the usage attributes of a cryptographic key. The control vector is cryptographically coupled to the key via an encryption process. This process is such that the key can be decrypted properly only if the control vector is correctly specified. (Even a single bit change in the control vector will cause an entirely different key to be recovered.)

CV Checking

The control vector is designed to minimize CV checking. Control vector usage bits are defined and structured so that each usage attribute, by itself, grants or denies a specific usage. Thus, the capability to encipher data via the Encipher Data instruction is controlled via a single "Encipher" bit within the control vector whose type/subtype is "data/privacy".

Thus, each usage attribute is defined independently from all other usage attributes. This guarantees a CV checking process such that each instruction checks only the usage attributes called for by the requested function. A design wherein usage attributes are enabled only when certain other attributes are enabled or disabled is specifically avoided, since this increases CV checking. Some cross checking of attributes among two or more control vectors is required, but is kept to a minimum.

To facilitate and simplify CV checking, each cryptographic instruction, where necessary, is passed a "mode" parameter declaring a specified use of the key or keys passed as parameters to the instruction. Thus, the CV checking process tests each control vector according to the specified "mode". This eliminates costly cross checking among control vector attributes to ensure consistency.

The design also follows a principle that no cryptographic instruction generates a control vector. All control vectors are supplied to the cryptographic instructions as parameter inputs.

Where possible, like usage attributes and field definitions are located at the same bit positions in the control vector, regardless of CV type. This facilitates CV checking. For example, the translate ciphertext instruction interrogates the same bit positions in the data/privacy and the data/xlate control vectors, even though the usage bits are "E" and "D" for the data/privacy CV and "XOUT" and "XIN" for the data/xlate CV, respectively.

CV Structure

In general, the control vector structure (including formats, field and bit assignments) has been defined to minimize and to facilitate CV checking, while at the same time providing cryptographic security. The CV structure, so to speak, is the variable with the greatest degree of freedom in the design process.

The following design options have been employed in the control vector:

1. Vertical Separation. The control vector has a "CV Type" field that provides vertical separation within the control vector structure, much like the separation provided by variants. Control vector types are defined along intuitive lines, following existing key terminology and key management. However, vertical separation is implemented only where necessary under the CA, thus ensuring architectural simplicity and ease of comprehension of the CV checking rules.

By first defining broad classes of CV Main Types (e.g. Data Keys, Key Encrypting Keys, PIN Keys) and then further defining CV Subtypes and usage attributes within CV Type, the CV checking rules can be optimized much in the same way that a "divided and conquer" search can be employed more effectively than a brute force approach.

2. Horizontal Separation. The control vector is ideally suited as a data structure for recording the usage attributes to be associated with a key (or other cryptographic variable). Within the CA, this is accomplished by specifying a bit in the control vector for every cryptographic instruction (or key parameter within the instruction, if more than one key parameter may participate) where the key may be used as an input. A bit value of "1" signifies that a usage of the key is "enabled" by the CF whereas a bit value of "0" signifies that a usage of the key is "disabled" by the CF. This form of control vector structuring is called horizontal separation.

3. Encoded Fields. A field of two or more bits is sometimes encoded for reasons of security. An encoded field has the property that individual bits have no significance by themselves, but the bits together define a set of possible values. Encoded fields have the advantage that they define mutually exclusive events since the field can take on only one value at a time. Encoded fields have the potential disadvantage that CV checking is not always optimized from a performance standpoint. However, encoded fields are sometimes necessary to ensure that usage attributes cannot be mixed in inappropriate combinations that give rise to cryptographic attack or introduce some cryptographic weakness.

4. Protection From Non-System Generated Keys. The method for coupling the control vector and key is such that CV checking is unable to detect a system generated key (via KGEN or GKS) from a non-system generated key. For this reason, a "back-door" method exists within the architecture for generating a keys and control vectors. It consists of defining a control vector "of choice" and a random number which is then represented as a key encrypted in the manner described under the architecture using the selected control vector. (However, the method has no capability to control the key actually recovered within the cryptographic facility.)

The so-called "back-door" method of key generation is primarily an annoyance, although in some cases cryptographic attacks would be possible if additional measures of defense were not taken in the architecture. It would be a simple matter to define an architecture that eliminates this "back-door" key generation (once and for all), but doing so would introduce additional unwarranted complexity and processing. A more practical approach is followed by the CA, viz., the "back-door" key generation problem is prevented only where necessary for security reasons. Thus, a good balance among security, complexity, and performance is achieved. Techniques to avoid cryptographic weaknesses introduced by the "back-door" method of key generation are these:

(a) Where necessary, conflicting usage attributes within a single control vector are split among two control vectors. The GKS instruction has checking that prevents so-called bad combinations of key pairs from being generated.

(b) Where necessary, conflicting usage attributes within a single control vector are grouped into a single encoded field.

(c) As a last resort, extra redundancy is used so that the CF can validate its own system generated keys.

5. Even Parity for Control Vectors. Even parity is enforced on the control vector. This ensures that the Exclusive-OR of an odd parity key with the control vector will result in an internal key of odd parity. This, in turn, ensures compatibility with hardware that may check such internally derived keys for odd parity (if such checking is enforced). Saying it another way, the CA cannot ensure that hardware will not enforce this odd parity on internal keys.

A control vector of 64 bits, numbered 0 through 63. The most significant bit is bit 0, by convention. Of the 64 bits, there are 8 parity bits.

6. Anti-Variant Bits. This guarantees cryptographic separation between variants and control vectors, which may unavoidably be mixed in some implementations internal to a node.

7. Avoid Onto Mappings. The control vector design and the manipulation of the control vector via the cryptographic instruction set avoids instances where CV fields with multiple values are mapped into a single value. Some specific instances of such onto mappings are allowed (e.g., LCVA, RFMK, and RTMK instructions) where security is not jeopardized.

CFAP Control

Certain bits in the control vector are reserved for CFAP. These bits can be used by CFAP for further key management control. These bits are not checked by the CF, but are entirely managed by CFAP.

General Format for Control Vectors

FIG. 10 shows the general format for control vectors. The first row of FIG. 10 shows the fields that are in common for most of the control vectors. They are briefly described as follows: (Further details can be found in subsequent subsections.)

CV Type

This field indicates the type of control vector, and is also the key type of the key to which this control vector is attached. The CV Type field consists of main-type and sub-type.

The main types of a control vector are:

Data key
  Data keys are used to encrypt/decrypt data, or to authenticate data.
PIN key
  PIN keys are used to encrypt PINs or to generate PINs.
Key-encrypting key
  Key-encrypting keys are used to encrypt keys.
Key part
  A key part is a part or a component of a key, having the same length as the key. For example, a key K may have two key parts Ka and Kb such that Ka XOR Kb=K.
Intermediate ICV
  An Intermediate ICV is used during MAC processing to encrypt the intermediate Output Chaining Value of a segment of data or message. This OCV is then fed into the next segment of the data and used as an ICV. This occurs when a message or data on which a MAC to be generated or verified is long and must be divided into shorter segments.
Token
  Tokens are variables used to protect the integrity of the data keys stored in the Data Key Dataset (a key storage for Data keys). They help prevent the access of data keys by unauthorized users.

The sub type differentiates the classes of keys of the same main type. For example, a key of main type data key can have the sub type of privacy (capable of doing encryption and decryption); or MAC (capable of doing data authentication); or XLATE Data (capable of translating ciphertext); etc. When no sub-type distinction is made, the keys are normally referred by the main type (e.g., Data key, PIN key, etc.)

Export Control

This field indicates how the export of the key associated to this control vector is controlled, and whether the key is allowed to be exported.

CF Enforced Usage

This field indicates for what CA functions the key can be used, and how it is used. For example, a data privacy key may have the usage attributes E=1 and D=1, which indicate that the key can be used in the Encipher and Decipher function to encrypt and decrypt the data, respectively.

AV (Anti-Variant)

This field differentiates any valid control vector from the 64 predefined variants that are used in variant-based crypto systems. Since all 8 bytes of the any variant of the 64 predefined variants are the same, setting the value of the AV field such that at least two bytes of the control vector are not the same will differentiate a valid control vector from a predefined variant.

Software Bits

This field represents control vector bits that are controlled/managed entirely by CFAP; The software field is not checked/enforced by the hardware (CF). When no control vector exists, CFAP builds a control vector from information supplied to CFAP (normally via parameter in a macro). When a control vector already exists, CFAP will check the control vector (including the software field) to determine whether the key is allowed to operate in the manner specified/requested. The hardware (CF), unlike software (CFAP), checks only those bits associated with a CA instruction, other usage bits are not checked).

Extension

This field indicates whether the control vector is a 64 bit control vector or an extended control vector of 128 bits. In the current CA, all the control vectors have 64 bits in length. This field is defined now to ease the expanding of the control vector in the future when the number of bits required to specify the control vector exceeds the 4 bit length.

Reserved Bits

This field is reserved for the system for future use.

Parity Vector

Every parity bit is the even parity of the preceding 7 bits of the byte.

For key-encrypting key control vectors, besides the common fields listed above, there are two additional fields, KEY FORM and LINK CONTROL.

Key Form

This field indicates the length of the key (single or double length) and whether the key half associated with the control vector key is the right or left half of the key. Note that for a single length key, the right half is the same as the left half and is the key itself.

Link Control

This field indicates how the key-encrypting key associated to this control vector is used to transmit other keys on the link, and what type of system (e.g., CV system or non-CV system) can keys be shipped to or received from, under this key-encrypting key.

Note that the descriptions in the second row and the third row in the general figure and other referenced figures in this section are not part of the control vector. They are put there to give information on the fields of the control vector as follows:
  The second row indicates the bit length of the fields. The abbreviation 'b' stands for 'bit'. For example, 1b stands for 1 bit, 3b stands for 3 bits, etc.
  The third row indicates whether the field is checked by hardware (CF) or software (CFAP).

Control Vector Format for Data Key

Data keys are divided into the following subtypes:
Data Compatibility Key. This is the data key that would be used to maintain compatibility with existing systems such as IBM 3848/CUSP or IBM 4700 FCS. Since these existing systems do not have the cryptographic separation between privacy and authentication, this key can be used to perform any or all of the following functions: encipher, decipher, generate MACs and verify MACs. This control vector can be removed (i.e., substituted by CV=0 on-the-link) when it is exported to other systems (via the RFMK instruction), whereas the control vectors for all other data keys except ANSI data keys cannot be removed.

Privacy Key. This is the key used for enciphering and/or deciphering only.

MAC Key. This is the key used for the purpose of data authentication only. That is, it can only be used to generate MACs and/or verify MACs.

Data Translation Key (Data XLT Key). This is the key used in the translation of ciphertext.

ANSI Key. This is the key that is used in ANSI applications. It can be used to encipher and decipher data or to generate and verify MACs. It can also be combined with another ANSI key to form an ANSI MAC key (i.e., a Data ANSI key with generate MAC/verify MAC capability). This control vector can be removed when exported to other systems (i.e., substituted by CV=0 on-the-link) via the ARFMK instruction, whereas the control vectors for all other data keys except compatibility keys cannot be removed.

Depending on the CV subtype of the control vector, the bits in the USAGE field have specific meaning to be described shortly.

Control Vector for Privacy Keys

Refer to FIG. 11. The following is a detailed description of each field and subfield of this figure.

CV Type

CV Type for privacy key (main type="DATA KEY", subtype="PRIVACY".

Export Control (controls exporting of this key):

This field occupies 1 bit:

EXPORT CONTROL=1: This key can be exported by RFMK.

Also, the RFMK, RTMK and LCVA instruction can reset this bit to 0.

EXPORT CONTROL—0: This key cannot be exported by RFMK.

Also, it cannot be changed to 1 by any instruction. As an example, suppose node X generates a key K and control vector C and sends them to node Y.

Usage (a) E

E=1: This key can be used in the ENCIPHER instruction to encrypt the data.

E=0: This key cannot be used in the ENCIPHER instruction to encrypt the data.

(b) D

D=1: this key can be used in the DECIPHER instruction to decrypt the data.

D=0: This key cannot be used in the DECIPHER instruction to decrypt the data.

AV (Anti-Variant)

This field occupies two bits, used to differentiate the control vector from 64 predefined variants that are used in variant-based crypto systems. Since all 8 bytes of the any variant of the 64 predefined variants are the same, setting the value of the AV field such that at least two bytes of the control vector are not the same will differentiate a valid control vector from a predefined variant.

Software bits

This field occupies 12 bits.
(a) CV Version

This field is 6 bits long and is used by CFAP to distinguish the current control vector definition from future definitions.

(b) Software=Enforced Usage

See also the CFAP section.

CVDPIM (Control Vector Data Privacy Icv Mandatory)

CVDPCU (Control Vector Data Privacy CUsp)

CVDP47 (Control Vector Data Privacy 4700)

CVDPM8 (Control Vector Data Privacy Multiple of 8)

Extension

This field indicates whether the control vector is a 64 bit control vector or an extended control vector of more than 64 bits.

Reserved bits

This field is reserved for the system for future use.

Parity

This field consists of the last bit of every byte of the control vector. The parity bit of each byte is set to achieve even parity for the byte.

Control Vector for MAC keys

Refer to FIG. 13. The following is a detailed description of each field and subfield of this figure.

CV Type:

CV TYPE for MAC key (main type=:DATA KEY, sub type="MAC").

Export Control (controls exporting of this key):

Same description as that of Privacy keys.

Usage (a) MG

MG=1: This key is permitted to be used in the GMAC instruction to generate MACs on data.

MG=0: This key is not permitted to be used in the GMAC instruction to generate MACs on data.

(b) MV

MV=1: This key is permitted to be used in the VMAC instruction to verify MACs on data.

MV=0: This key is not permitted to be used in the VMAC instruction to verify MACs on data.

AV (Anti-Variant)

Same description as that of Privacy keys.

Software bits

This field occupies 12 bits.

(a) CV Verson—Same description (b) Software-Enforced Usage

See also the CFAP section

CVDML4 (Control Vector Data MACLEN=4)

CVDM99 (Control Vector Data MAC MODE=ANSI X 9.9)

CVDM19 (Control Vector Data MAC MODE=ANSI X 9.19)

CVDM00 (Control Vector Data MAC MODE=IBM 4700)

CVDM30 (Control Vector Data MAC MODE=IBM 4730)

·Extension

Same description as that of Privacy keys.

Reserved bits

Same description as that of Privacy keys.

Parity bits

Same description as that of Privacy Keys.

Control Vector for Data Compatibility Keys

Refer to FIG. 14. The following is a detailed description of each field and subfield of this figure.

CV Type CV TYPE=for data compatibility key (main type="DATA KEY", sub type="COMPATIBILITY"

Export Control

Same description as that of Privacy keys.

Usage (a) E
E=1: This key can be used in the ENCIPHER instruction to encrypt the data.
E=0: This key cannot be used in the ENCIPHER instruction to encrypt the data.
(b) D
D=1: This key can be used in the DECIPHER instruction to decrypt the data.
D=0: This key cannot be used in the DECIPHER instruction to decrypt the data.
(c) MG
MG=1: This key can be used in the GMAC instruction to generate MACs on data.
MG=0: This key cannot be used in the GMAC instruction to generate MACs on data.
(d) MV
MV=1: This key can be used in the VMAC instruction to verify MACs on data.
MV=0: This key cannot be used in the VMAC instruction to verify MACs on data.

AV (Anti-Variant)

Same description as that of Privacy keys.

Software bits

This field occupies 12 bits.
(a) CV Version
  Same description as that of Privacy keys.
(b) Software-Enforced Usage Extension Same description as that of Privacy keys.

Reserved bits

Same description as that of Privacy keys.

Parity bits

Same description as that of Privacy keys.

Control Vector for Data XLATE key

Refer to FIG. 15. The following is a detailed description of each field and subfield of this figure.

CV Type

CV Type for data XLATE key (main type="DATA KEY", sub type="XLATE")

Export Control (controls exporting of this key)

Same description as that of Privacy keys.

Usage (a) XDout
XDout=1: This key is permitted to be used as the output data key in the TRANSLATE CIPHERTEXT instruction.
XDout=0: This key is not permitted to be used as the output data key in the TRANSLATE CIPHERTEXT instruction.
(b) XDin
XDin-1: This key is permitted to be used as the input data key in the TRANSLATE CIPHERTEXT instruction.
XDin=0: This key is not permitted to be used as the input data key in the TRANSLATE CIPHERTEXT instruction.

AV (Anti-Variant)

Same description as that of Privacy keys.

Software Bits

This field occupies 12 bits
(a) CV Version
(b) Software-Enforced Usage
  None.

Extension

Same description as that of Privacy keys.

Reserved Bits

Same description as that of Privacy keys.

Parity Bits

Same description as that of Privacy keys.

Control Vector for ANSI Data Keys

Refer to FIG. 16. The following is a detailed description of each field and subfield of this figure.

CV Type

CV Type for data ANSI key (main type="DATA KEY", sub type="ANSI")

Export control

Same description as that of Privacy keys.

Usage (a) E
E=1: This key can be used in the ENCIPHER instruction to encrypt the data.
E=0: This key cannot be used in the ENCIPHER instruction to encrypt the data.
(b) D
D=1: This key can be used in the DECIPHER instruction to decrypt the data.
D=0: This key cannot be used in the DECIPHER instruction to decrypt the data.
(c) MG
MG=1: This key can be used in the GMAC instruction to generate MACs on data.
MG=0: This key cannot be used in the GMAC instruction to generate MACs on data.
(d) MV
MV-1: This key can be used in the VMAC instruction to verify MAC on data.
MV=0: This key cannot be used in the VMAC instruction to verify MAC on data.
(e) ACMB This bit indicates whether the data key can be XORed with another data key having the ACOMBKD attribute. The XORing process is done by the ACOMBKD instruction, as will be described in section "ANSI Combine KDs (ACOMBKD)." The resulting key is used to verify and generate MACs for the messages communicated via the ANSI X9.17 protocol.

ACMB=1: This data key can be combined in the ACMB instruction.
ACMB=0: This data key cannot be combined in the ACMB instruction.

AV (Anti-Variant)

Same description as that of Privacy keys.

Software Bits (a) CV Version
Same description as that of Privacy keys.
(b) Software-Enforced Usage
None.

Extension

Same description as that of Privacy keys.

Reserved Bits

Same description as that of Privacy keys.

Parity Bits

Same description as that of Privacy Keys.

Control Vector Format for PIN Keys

PIN keys are divided into the following subtypes:
PIN-encrypting keys (PEKs)
  These are the keys that are used to encrypt PINs.
PIN-generating keys (PGKs)
  These are the keys that are used to generate PINs. In some cases, the PGKs are also called PIN validating keys since they are used to validate/verify PINs.

Control Vector for PIN-Encrypting Keys

Refer to FIG. 17. The following is a detailed description of each field and subfield of this figure.

CV Type

CV TYPE for PIN-encrypting key (PEK) (maintype="PIN key", subtype="PIN-encrypting key"

Export Control

Same description as that of Privacy keys.
(a) Create PINBLK
CREATE PINBLK=1: This key is allowed to encipher the PIN Block in the CREATE PIN BLOCK instruction.
CREATE PINBLK=0: This key is not allowed to encipher the PIN Block in the CREATE PIN BLOCK instruction.
(b) GINPIN
GENPIN=1: This key is allowed to encrypt the input customer PIN (CPIN) in the GENERATE PIN instruction.
GENPIN=0: This key is not allowed to encrypt the input customer PIN (CPIN) in the GENERATE PIN instruction.
(c) VERPIN
VERPIN=1: This key is allowed to encrypt the PIN input to the VERIFY PIN instruction.
VERPIN=0: This key is not allowed to encrypt the PIN input to the VERIFY PIN instruction.
(d) XPIN in
XPIN in=1: This key is allowed to encrypt the input PIN in the TRANSLATE PIN instruction.
XPIN in=0: This key is not allowed to encrypt the input PIN in the TRANSLATE PIN instruction.
(e) XPIN out
XPIN out=1: This key is allowed to encrypt the output PIN in the TRANSLATE PIN instruction.
XPIN out=0: This key is not allowed to encrypt the output PIN in the TRANSLATE PIN instruction.

AV (Anti-Variant)

Same description as that of Privacy keys.

Software Bits

This field occupies 12 bits.
(a) CV Version
Same description as that of Privacy keys.
(b) Software-Enforced Usage
None.

Extension

Same descriptionas that of Privacy keys.

Reserved Bits

Same description as that of Privacy keys.

Parity Bits

Same description as that of Privacy keys.

Control Vector for PIN-Generating Keys

Refer to FIG. 18. The following is a detailed description of each field and subfield of this figure.

CV TYPE

CV TYPE for PIN-generating keys (maintype="PIN key", subtype="PIN-generating key"

Export Control

Same description as that of Privacy keys.

Usage (a) GENPIN
This field occupies 2 bits, indicating the conditions under which the key is allowed to generate PINs or PIN Offsets in the GENERATE PIN instruction.
GENPIN=B'00': not allowed to generate PINs or PIN offsets.
GENPIN=B'01': allowed to generate a clear PIN or clear PIN offset.
GENPIN=B'10': allowed to generate an encrypted PIN or encrypted PIN offset.
GENPIN=B'11': allowed to generate a clear or encrypted PIN, or a clear or encrypted PIN offset.
(b) GPIN
This bit indicates whether the customer selected PIN(CPIN) can be input to the GENPIN instruction in the form of a clear PIN or an encrypted PIN.
GPIN=0: Clear or encrypted PIN is allowed.
GPIN=1: Only encrypted PIN is allowed.
(c) VERPIN
This bit indicates whether the key can be used as a PIN-validating key to verify PINs in the VERIFY PIN instruction.
VERPIN=1: Allowed to be used to verify PINs.
VERPIN=0: Not allowed to be used to verify PINs.

(d) VPIN

This bit indicates whether the PIN to be verified in the VERIFY PIN instruction can be input to the instruction in the form of a clear PIN or an encrypted PIN.

VPIN=0: Clear or encrypted PIN is allowed.
VPIN=1: Only encrypted PIN is allowed.

AV (Anti-Variant)

Same description as that of Privacy keys. This field occupies 12 bits.

Software Bits (a) CV VERSION
Same description as that of privacy keys.
(b) Software-Enforced Usage
None.

Extension

Same description as that of Privacy keys.

Reserved Bits

Same description as that of Privacy keys.

Parity bits

Same description as that of Privacy keys.

Control Vector Format for Key-Encrypting Keys

Key-encrypting keys are divided into the following sub-types:
  KEK (Key-encrypting key) sender This type of KEK is used to send or export keys.
  KEK receiver This type of KEK is used to receive or import keys.
  KEK ANSI This type of KEK is ANSI X9.17 key management environment.

Control Vector Format for KEK Sender

Refer to FIG. 19. The following is a detailed description of each field and subfield of this figure.

CV Type

CV TYPE for KEK sender (maintype="Key encrypting key (KEK)", subtype="Sender"

Export Control

Same description as that of Privacy keys.

Usage (a) GKS
This field occupies 3 bits, indicating whether the key can participate as an exporter key in one or more of the following nodes of the GKS instruction: Import-Export, Operational-Export and Export-Export.
Bit 0: Import-Export mode.
  This is the mode where the GKS instruction generates 2 copies of the key, one copy, referred to as the import copy, is in a form ready to be later imported by the generating node; the other copy, referred to as the export copy, is in a form ready to be shipped to another node.
  Bit 0=1: This key is allowed to ship the export copy of the key generated in the IM-EX (Import-Export) mode.
  Bit 0=0: This key is not allowed to ship the export copy of the key generated in the Im-Ex (Import-Export) mode.

Bit 1: Operational-Export mode.
  This is the mode where the GKS instruction generates 2 copies of the key, one copy of the key is for local use (Operational copy) and the other copy is in a form ready to be shipped to another node (Export copy).
  Bit 1=1: This key is allowed to ship the export copy of the key generated in the Op-Ex (Operational-Export) mode.
  Bit 1=0: This key is not allowed to ship the export copy of the key generated in the Op-Ex (Operational-Export) mode.
Bit 2: Export-Export mode.
  This is the mode where the GKS instruction generates 2 copies of the key, each copy is in a form ready to be shipped to a different node.
  Bit 2=1: This key is allowed to ship one of the export copies of the key generated in the Ex-Ex (Export-Export) mode. The copy to be shipped is specified by a parameter in the GKS instruction.
  Bit 2=0: This key is not allowed to ship keys generated in the export-export mode.

(b) RFMK
This field occupies one bit.
RFMK=1: This key is allowed to export keys to other nodes via the RFMK instruction.
RFMK=0: This key is not allowed to export keys to other nodes via the RFM instruction.

(c) XLTKEY out
XLTKEY out=1: This key can be used as the KEK in the TRANSLAT KEY instruction to re-encrypt a key that was previously encrypted under a different key.
XLTKEY out=1: This key cannot be used as the KEK in the TRANSLAT KEY instruction to re-encrypt a key that was previously encrypted under a different key.

Key Form

This field occupies two bits, indicating whether the KEK is a short key (i.e., single length) or a long key (i.e., double length) and whether it is the right half or the left half of the key.

Link Control

This field occupies two bits, indicating how this KEK is used to send or receive keys on the link.
LINK CONTROL=B'00': Not applicable.
LINK CONTROL=B'01': CV only. That is, a key K being sent must be encrypted under a key formed by the XOR of this KEK and the control vector associated to the key K. Obviously, this type of link environment or channel is appropriate for the exchanges of keys when both the communicating nodes are the nodes that implement CA.
LINK CONTROL=B'10': CV=0 only. That is, a key K being sent is encrypted under this KEK rather than with the key formed by the KEK XORed with a non-zero control vector. This type of channel is appropriate when either the receiving node, or the sending node is a non-CV node.
LINK CONTROL=B'11': CV or CV=0. That is, a key K being sent may be encrypted under the KEK only, or may be encrypted under a key formed by the XORing of the KEK to the control vector associated with the key K. This type of channel is appropriate for a CA node that, besides applications running in a CA environment, it has some existing applications that do not recognize control vectors. For existing applications that do not recognize control vectors, the node exports keys encrypted under the encryption of KEK only. For applications running in a CA environment, the node exports keys encrypted under the key formed by KEK XORed with the control vector associated to the key being shipped.

The Key management section describes in more details the use of these types of channels to exchange keys.

AV (Anti-Variant)

Same description as that of Privacy keys.

Software Bits

This field occupies 12 bits.
(a) CV Version
  Same description as that of Privacy keys.
(b) Software-Enforced Usage
  See also the CFAP section.
  CVKSKD (Control Vector KEK Sender—Send Data Key)
  CVKSKP (Control Vector KEK Sender—Send PIN Key)
  CVKSKK (Control Vector KEK Sender—Send KEK)

Extension

Same description as that of Privacy keys.

Reserved Bits

Same description as that of Privacy keys.

Parity Bits

Same description as that of Privacy keys.

Control Vector Format for KEK Receiver

Refer to FIG. 20. The following is a detailed description of each field and subfield of this figure.

CV Type

CV TYPE for KEK receiver (maintype="Key encrypting key (KEK)", subtype=Receiver)

Export Control

Same description as that of Privacy keys.

Usage (a) GKS
This field occupies 2 bits, indicating whether the key can participate as an exporter key in one or more of the following nodes of the GKS instruction: Import-Export and Operational-Import.
  Bit 0: Import-Export mode.
    This is the mode where the GKS instruction generates 2 copies of the key, one copy, referred here as the import copy, is in the form ready to be later imported by the generating node; the other copy, referred here as the export copy, is in the form ready to be shipped to another node.
    Bit 0=1: This key is allowed to encrypt the import copy of the key generated in the Im-Ex (Import-Export) mode.
    Bit 0=0: This key is not allowed to encrypt the import copy of the key generated in the Im-Ex (Import-Export) mode.

Bit 1: Operational-import mode.
    This is the mode where the GKS instruction generates 2 copies of the key, one copy of the key is for local use (operational copy) and the other copy is in the form ready to be imported to the generating node (import copy).
    Bit 1=1: This key is allowed to encrypt the import copy of the key generated in the Op-Imp (Operational-Import) mode.
    Bit 1=0: This key is not allowed to encrypt the import copy of the key generated in the Op-Imp (Operational-Import) mode.

(b) RTMK
This field occupies one bit.
  RTMK=1: This key is allowed to receive keys via the RTMK instruction.
  RTMK=0: This key is not allowed to receive keys via the RTMK instruction.

(c) XLTKEY in
  XLTKEY in=1: This key is allowed to encrypt the input key to the TRANLATE KEY instruction.
  XLTKEY in=0: This key is not allowed to encrypt the input key to the TRANSLATE KEY instruction.

Key Form

This field is two bits long, indicating whether the KEK is a short (i.e., single length) key or a long (i.e., double length) key; and if the key is long, then the key half is the right half or the left half.

Link Control

Same description as that of KEK sender key.

AV (Anti-Variant)

Same description as that of Privacy keys.

Software bits

This field occupies 12 bits.
(a) CV Version
  Same description as that of Privacy keys.
(b) Software-Enforced Usage
  See also the CFAP section.
  CVKRKD (Control Vector KEK Receiver—Receive Data Key)
  CVKRKP (Control Vector KEK Receiver—Receive PIN Key)
  CVKRKK (Control Vector KEK Receiver—Receive KEK)

Extension

Same description as that of Privacy keys.

Reserved Bits

Same description as that of Privacy keys.

Parity Bits

Same description as that of Privacy keys.

Control Vector Format for ANSI KEK

Refer to FIG. 21. The following is a detailed description of each field and subfield of this figure.

CV Type

CV TYPE (maintype="Key encrypting key (KEK)", subtype="ANSI")

Export Control

Same description as that of Privacy keys.

Usage (a) ARFMK

Specifies whether the key can be used as a key-encrypting key in the ARFMK instruction to ship keys to other nodes.

(b) ARTMK

Specifies whether the key can be used as a key-encrypting key in the ARTMK instruction to receive keys from other nodes.

(c) AXLTKEY

Specifies whether the key can be used as a key-encrypting key in the AXLTKEY instruction to translate keys. Note that there is not indication of input translate key or output translate key on the ANSI KEK control vector. This is because ANSI Keks are bidirectional.

(d) APNOTR

Specifies whether transformations can be performed on this key to produce a partial notarizing key that is allowed to later notarize other keys. Once the transformation is done, the resulting partial notarizing key KKPN must have this APNOTR bit clear to zero so that KKPN will not be fed into the APNOTR instruction to compute another partial notarizing key.

KEY Form

Same description as that of KEK sender keys.

Link Control

This field is not applicable to the ANSI KEK. See also the description of this field for KEK sender.

AV (Anti-Variant)

Same description as that of Privacy keys.

Software Bits.

This field occupies 12 bits.
(a) CV VERsion
   Same description as that of Privacy keys.
(b) Software-Enforced Usage
   None.

Extension

Same description as that of Privacy keys.

Reserved Bits

Same description as that of Privacy keys.

Parity Bits

Same description as that of Privacy keys.

Control Vector Format for Key Parts

Figures 22, 23, 24, 25:
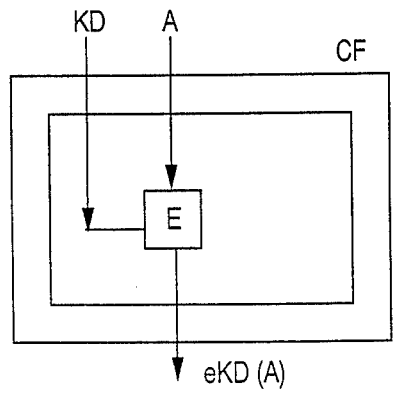
FIG. 22 shows the CV format for Key Parts.
FIG. 23 shows the CV format for Intermediate ICVs.
FIG. 24 shows the CV format for Tokens.
FIG. 25 is a Block Diagram of the Encode instruction.

Refer to FIG. 22. The following is a detailed description of each field and subfield of this figure.

CV TYPE

CV TYPE, where the last three bits xxx of CV TYPE are set to zero but are checked by the instructions. (maintype=Key part, subtype=Not applicable)

Export Control

Same description as that of Privacy keys.

Key Form

Same description as that of KEK sender.

AV (Anti-Variant)

Same description as that of Privacy keys.

Software bits

This field occupies 12 bits.
(a) CV VERSION
   Same description as that of Privacy keys.
(b) Software-Enforced Usage
   None.

Extension

Same description as that of Privacy keys.

Reserved Bits

Same description as that of Privacy keys.

Parity Bits

Same description as that of Privacy keys.

Control Vector Format for Intermediate ICV

Refer to FIG. 23. The following is a detailed description of each field and subfield of this figure.

CV TYPE

CV TYPE, where the last three bits xxx of CV TYPE are set to zero but are not checked by the instructions (maintype="Intermediate ICV", subtype=Not applicable)

Export Control

Same description as that of Privacy keys. The ICV keys are normally not imported ot other nodes except in the case of a hot backup. Thus, normally, this field assumes the value B'00' for an ICV control vector.

AV (Anti-Variant)

Same description as that of Privacy keys.

Software Bits (a) CV VERSION
Same description as that of Privacy keys.
(b) Software-Enforced Usage
None.

Extension

Same description as that of Privacy keys.

Reserved Bits

Same description as that of Privacy keys.

Parity Bits

Same description as that of Privacy keys.

Control Vector Format for Tokens

Refer to FIG. 24. The following is a detailed description of each field and subfield of this figure.

CV TYPE

CV TYPE, where the last three bits xxx of CV TYPE are set to zero but are not checked by the instructions (maintype="Token", subtype=Not applicable).

Tokens are secret quantities used to protect the integrity of Data keys stored in the Data Keys Dataset (DKDS). Data keys are stored in the DKDS in the form token+e*KM.C1(K),e*KM.C2(token). Token control vector type is allowed in several instructions such as EMK, RTNMK and RTCMK.

Export Control

Same description as that of Privacy keys. The ICV keys are normally not imported to other nodes except in the case of a hot backup. Thus, normally, this field assumes the value B'00' for an ICV control vector.

AN (Anti-Variant)

Same description as that of Privacy keys.

Software Bits (a) CV VERSION
Same description as that of Privacy keys.
(b) Software-Enforced Usage
None.

Reserved Bits

Same description as that of Privacy keys.

Extension

Same description as that of Privacy keys.

Parity Bits

Same description as that of Privacy keys.

Instruction Set

The instruction set described here is a common cryptographic function set which is implemented in the CF. There may be exceptions to this requirement; for instance, MDC can be implemented at a CFAP level. Other deviations in the instruction set implementation should be carefully considered based on security requirements and product environment.

The instruction set is based on a control vector approach. There are several fields in the control vectors which may or may not be implemented in a particular system. However, the minimum control vector checking as described here must be performed in each system in the CF. If the full crypto separation is not required or only a subset of the instruction set is sufficient for a given application, the control vector checking can be excluded for the functions not implemented in a given design. (The checking on subtype fields in the control vector, an encoded field, ensures that control vectors can not be mixed and matched in the crypto instructions using invalid combinations. This checking is crucial to security.)

The instruction set equations represent the inputs required to the function and outputs expected from the function related to a cryptographic function described. Instead of passing actual data to the function, the implementation may pass the addresses of data to the function. This addressing would depend upon the given system implementation and is not described here.

The equations describe all the parameters and data required to perform a given function. Depending upon the modes of the operation, some or all the parameters are used in the function, however, the fields in the equation have to be treated as inputs and outputs rather than the actual values of inputs and outputs as passed to the function in a given implementation. For example: the "A" field in the equation represent the data to be passed to a function, the physical form of this may be a 32 bit address pointing to the data to be fetched by the instruction from memory or to be stored to the memory. The data bus width from memory is also implementation dependent, whereas the input data to be encrypted or decrypted by crypto function operations is always a multiple of 8 bytes.

There are two fundamental ways in which CV checking can be done.

1. Test Bits in Control Vector: Test the control vector bits according to what they should be, if it does not match then set a condition code and abort the operation. For example, in ENCIPHER instruction "E" bit of the CV is tested for "1", if it is not one then the operation is aborted. For more complicated instructions, the testing is not as trivial as this, and we need to pass some parameters to specify the intent of input and output operation and the usage of control vector. For example, in generate key set (GKS), "mode" is specified to the instruction to generate a particular from of output, and the control vector checking has to be performed according to the "mode" specification.

2. Set bits in Control Vector: Set a bit in control vector as appropriate then perform the operation. This does not require any testing of control vectors. For example, in ENCIPHER instruction "E" bit is set in the control and the operation is performed. Now, each instruction has to know, what bits to set and under what conditions? This strategy may not work in all cases. For instance, how would the instruction know what is the bit setting for "target control"? This means, there has to be a parameter specified to the instruction indicating to choose a particular setting in the control vector. This approach will take away all the flexibility in the control vector specification.

Either of the above two techniques will satisfy the cryptographic requirements of the control vector checking. We have chosen the "Test bits in Control vector" approach (no bits in the control vector are set by the instruction) for the following reasons:

1. Instruction does not have to know what bits to set nor when.

2. It is very flexible to pass a parameter like "mode" and get the possible combination of outputs, and provide a combination of inputs to the instruction.

3. If the setting is hardcoded in the CF, then it is very hard to make extension to the architecture, and it is also very difficult to know all the possible combinations ahead of time.

4. It simplifies hardware implementation, and provides greater flexibility to software.

5. It preserves the intent of control vectors: Control vectors (at the present time) are used for cryptographic separation and specifically for security reasons. Control vectors are not used in CA for "specifying an operation or a function to the instruction". In other words, control vectors are not like an "extended opcode" for the instruction.

Encode (ENC)

Equation

KD, A→eKD(A)

Inputs:
KD 64 bit clear key
A 64 bit plain text
Outputs:
eKD(A) 64 bit encrypted data
Description: The encode function is used to encipher an 8 byte plain text data in ECB mode using a 64 bit clear key. No control vector is passed to this instruction.

FIG. 25 is a block diagram of this instruction.

CC:
1. successful operation
2. unsuccessful operation (error)

NOTE: Unsuccessful operation can be any hardware error specific to a given implementation. The condition codes (CC described here merely represent suggested condition codes for the instruction, however, there may be more condition codes implemented in a given system. Furthermore, the CC codes do not represent the actual condition codes that have to be passed by the function in a given implementation, the numbering used here is for a convenient description of crypto architecture.

Control Vector Checking: None.

Decode (DEC)

Equation:

$$KD, eKD(A) \rightarrow A$$

Inputs:
KD 64 bit clear key
eKD(A) 64 bit encrypted data

Outputs:
A 64 bit encrypted data

Description: The decode function is used to encipher an 8 byte plain text data in ECB mode using a 64 bit clear key. No control vector is passed to this instruction.

Figure 26:
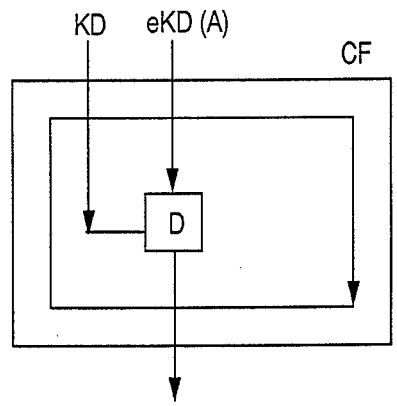
FIG. 26 is a Block Diagram of the Decode instruction.

FIG. 26 is a block diagram of this instruction.

CC:
1. successful operation
2. unsuccessful operation (error)

Control Vector Checking: None

Encipher (ENCI)

Equation:

$$e^*KM.C1(KD1), ICV, A, n, C1 \rightarrow eKD1(ICV,A)$$

Inputs:

| Inputs: | |
|---|---|
| e*KM.C1(KD1) | 64 bit data key (KD1) triple encrypted under the master key (KM) with a control vector C1. |
| ICV | 64 bit encrypted data<br>NOTE: Encrypted ICVs are managed by CFAP as described in the "ICV/OCV Management" and "Software Interface."<br>If output chaining value (OCV) is required, the last 8 byte output (En) must be used as OCV, however, this is not a standard approach. Each system implementation treats the encryption and decryption of the last block differently. Refer to "Software Interface" for more details on the last block treatment and OCV generation techniques. CFAP handles all the possible last block encipherment and decipherment and also OCV management. |
| A | Data to be encrypted, in multiples of 8 byte blocks. The 8 byte blocks are A1, A2,. A2, ... An. If the last block An is not a multiples of 8 bytes, padding should be performed by CFAP before calling this instruction. CF instructions always assume multiples of 8 bytes data as inputs and outputs. |
| n | number of 8 byte blocks to be encrypted. |
| | n should be as large as possible, however, this may be system dependent. CA does not define any maximum limit on n.<br>For example: If number of 8 byte blocks = 10,000 and n max = 4,000, then Encipher instruction will be invoked as follows:<br>Encipher n=4000<br>Encipher n=4000<br>Encipher n=2000<br>Note: After each call of Encipher, the last 8 bytes enciphered data En (OCV) has to be fed back as ICV input to the next Encipher call. |
| c1 | 64 bit control vector for data key (KD1). |
| Outputs: | |
| ekD1(ICV,A) | encrypted data, n blocks, each block is 8 bytes (E1, E2 ... En). |

Description: The input data is encrypted via the CBC mode of DEA encryption. Multiples of 8 byte blocks are encrypted by this instruction until all n blocks are encrypted.

The architecture defines only plain ICV input to the function. If encrypted ICV is required, the ICV can be encrypted using a data key (KD2) using encipher instruction. Encrypted ICV's can be decrypted using decipher instruction. All the encrypted ICV's and OCV's are managed by the CFAP program.

If the input data is not in multiples of 8 byte blocks then padding must be done. This padding has to be performed by CFAP before invoking the encipher function.

Figure 27:
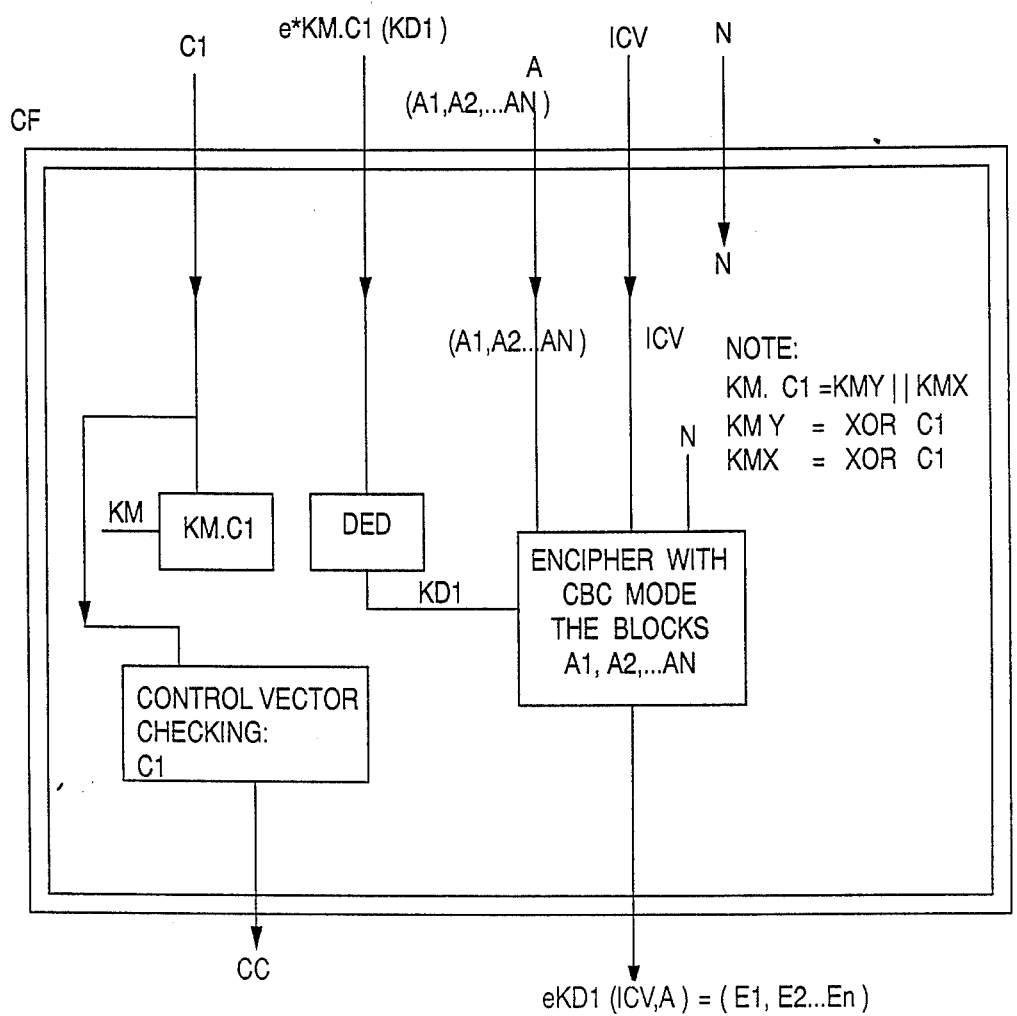
FIG. 27 is a Block Diagram of the Encipher instruction.

FIG. 27 is a block diagram of this instruction.

CC:
1. successful operation
2. C1 is invalid
3. unsuccessful operation (error)

Control Vector Checking:
1. Checking on C1

| cv type = . | "data/compatability" or<br>"data/privacy" or<br>"data/ANSI' |
|---|---|
| E usage bit = | 1 |
| reserved (48:63) = | X'0' |

NOTE:
For all the instructions described here, control vector checking implies that if the check is not passed then the instruction must be aborted and the corresponding control vector invalid condition code (CC) be turned on. If there are one or more checks to be performed on the control vectors, all the checks are performed and all the checks have to be passed to perform the operation. If any of the checks fail, the operation must be aborted.

Decipher (DECI)

Equation:

$$e^*KM.C1(KD1), ICV, eKD1(ICV,A), n, C1 \rightarrow A$$

Inputs:

| | |
|---|---|
| Inputs: | |
| e*KM.C1(Kd1) | 64 bit data key (KD1) triple encrypted under the master key (KM) with a control vector C1. |
| ICV | 64 bit plain input chaining value. Note: Encrypted ICVs are managed by CFAP as described in the "ICV/OCV Management" and "Software Interface." If output chaining value (OCV) is required, the last 8 byte input (En) must be used as OCV, however, this is not a standard approach. Each system implementation treats the encryption and decryption of the last block differently. Refer to "Software Interface" for more details on the last block treatment and OCV generation techniques. CFAP handles all the possible last block encipherment and decipherment and also OCV management. |
| eKd1(ICV,A) | encrypted data, n blocks, each block is 8 bytes (E1, E2 ... En). |
| n | number of 8 byte blocks to be decrypted. n should be as large as possible, however, this may be system dependent. CA does not define any maximum limit on n. Note: After each call of Decipher, the last 8 bytes enciphered data En (OCV) has to be fed as input ICV to the next Decipher call. This is being managed by CFAP. For example: If number of 8 byte blocks = 10,000 and n max = 4000, then Decipher instruction will be invoked as follows: Decipher n = 4000 Decipher n = 4000 Decipher n = 2000 |
| C1 | 64 bit control vector for data key (KD1). |
| Outputs: | |
| A | Plain data, in a multiples of 8 byte blocks. The 8 byte blocks are A1, A2, ... An. |

Description: The input data is decrypted via the CBC mode of DEA encryption. The multiples of 8 byte blocks are decrypted by this instruction until all n blocks are decrypted.

The architecture defines only plain ICV input to the function. If encrypted ICV is required, the CV can be encrypted using a data key (KD2) using encipher instruction. Encrypted ICV's can be decrypted using decipher instruction. All the encrypted ICV's and OCV.='s are managed by the CFAP.

Figure 28:
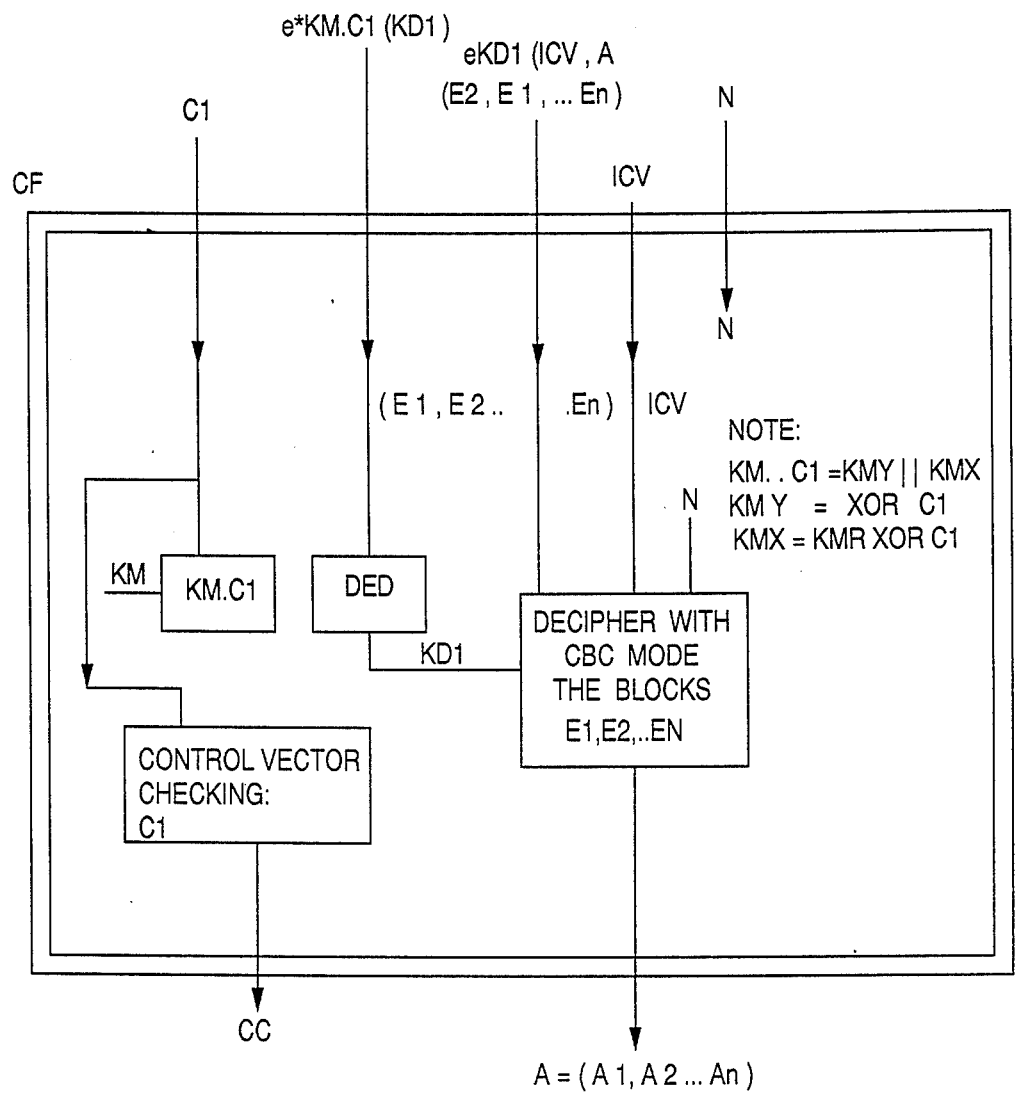
FIG. 28 is a Block Diagram of the Decipher instruction.

FIG. 28 is a block diagram of this instruction.

CC:
1. successful operation
2. C1 is invalid
3. unsuccessful operation (error)

Control Vector Checking
1. Checking on C1

| | |
|---|---|
| cv type = | "data/compatibility" or "data/privacy" or "data/ANSI" |
| D usage bit = | 1 |
| reserved (48:63) = | X'0' |

GENMAC (GMAC)

Equation:

Equation:
e*KM.C1(KD2=1), [e*KM.C2(KD2)],
ICV[e*KM.C3(OCV)],
A, n, icv-type,output-type, mac-enc, C1, [C2], [C3]
MAC (64 bit)
or
e*KM.C3(OCV)

| | |
|---|---|
| Inputs: | |
| e*KM.C1(KD1) | KD1 is a MAC generation key for single encrypting MAC, triple encrypted under KM with a control vector C1. |
| e*KM.C2(KD2) | KD2 is an optional MAC generation key for triple encrypting MAC, triple encrypted under KM with a control vector C2. This is an optional input required for triple encrypting mac output if mac-enc=1. |
| ICV | ICV equal to zero is the default Initial Chaining Value, and is standard to CA architecture, ANSI X9.9 and ANSI X9.19. Non-zero plain ICV can also be used to be compatible with systems which require plain ICV input. Encrypted ICV input is not supported by CA as it was found that it does not provide any more security for the function. Encrypted intermediate ICVs are supported by CA. Note: Encrypted ICVs if required are managed by CFAP as described in the "ICV/OCV Management" and "Software Interface." |
| e*KM.C3(OCV) | This is a 64 bit intermediate ICV encrypted under the master key with a special control vector C3. This is an optional input which must be provided if large blocks of data (/n) are used to generate MAC. Decrypting the ICV is done internal to the function. Intermediate OCV can not be shipped from the local node, as it is stored under the master key with a control vector in the form for local use only. |
| A | Data to be MAC'd, in multiples of 8 byte blocks (A1, A2 ... An). |
| n | number of 8 byte blocks to be MAC'd. n should be as large as possible, however, this may be system dependent. CCA does not define any maximum limit on n. If large number of blocks have to be MAC'd then GMAC is invoked multiple number of times until all blocks are complete. For example: If n max is 4000 for the system, and the data to be MAC's are 10,000 8 byte blocks, then GMAC is invoked as follows: GMAC n=4000,output-type=1,icv-type=0 GMAC n=4000,output-type=1,icv-type=2 GMAC n=2000,output-type=1,icv-type=2 Note: After each call of GMAC, the intermediate ICV e*KM.C3(OCV) must be fed back to next GMAC call as ICV input. The decryption of this intermediate ICV must be done internally in the CF |
| icv-type | icv-type indicates whether the ICV passed to the function is zero, plain, or intermediate. Intermediate ICV is triple encrypted under the master key with a control vector C3. Zero ICV is a default value. 0: zero ICV (default) 1: plain ICV 2: intermediate ICV (OCV) |
| output-type | indicates the stage of the mac generation process to the instruction. 0: MAC output 1: Intermediate ICV output (OCV) |
| mac-enc | mac-enc indicates a single or triple encryption mac output 0: single encrypting mac output 1: triple encrypting mac output(ANSI 9.19 requirement) |
| C1,C2,C3 | 64 bit control vectors for KD1, KD2, and OCV respectively. C2 and C3 are optional inputs to the instruction, C2 must be input if mac-enc=1, and C3 must be input if icv-type=2 or output-type=1. |
| Outputs: | |
| MAc | is a 64 bit output, resulted from the single encryption or triple encryption of the final input block of data, depending upon mac-enc parameter. This output is valid only if output-type=0. |
| e*KM.C3(OCV) | OCV is a 64 bit intermediate ICV triple | encrypted under KM with control vector C3.
This output is valid only if output-type=1.
MAC output and Intermediate OCV outputs
both must not be output at the same time for
security reasons.

Description: The input data is encrypted with CBC mode of DEA encryption, and the final block of encrypted data is output. There are two modes, the single encryption mode and triple encryption mode. With the single encryption mode, a single key KD1 is used to create the MAC. In the triple encryption mode, the single encryption mode is employed with KD1 to create a MAC, except the MAC is then decrypted with KD2, and reencrypted again with KD1 to produce the final 64 bit MAC.

The instruction outputs 64 bit MAC, however, X9.9 specifies 32 bit MAC which is 32 left most bits of the 64 bit MAC output. CFAP has to extract the appropriate MAC bits from the 64 bit MAC output.

ICV is zero as a standard and optionally can be a plain or intermediate ICV to GMAC instruction. If encrypted ICV's are required then CFAP must encrypt ICV under (KDS) and must pass a plain ICV to the GMAC instruction. The ANSI X9.9 MAC standard specifies a zero ICV for the first block and thus is defined here as a standard input. However, architecture provides plain and intermediate inputs to satisfy every possible need of MAC generation.

If MAC generation is required for the blocks greater than n, intermediate ICV option must be used to generate MAC. This requirement provides additional security by not exposing intermediate ICVs in clear.

If the data block is not multiples of 8 byte blocks, padding must be done. The padding has to be performed by the CFAP before invoking this function. MAC computation must be for the binary data as specified by the ANSI X9.9-1986 section 5.0 and Coded character sets authentication if needed must be implemented by CFAP.

Figure 29:
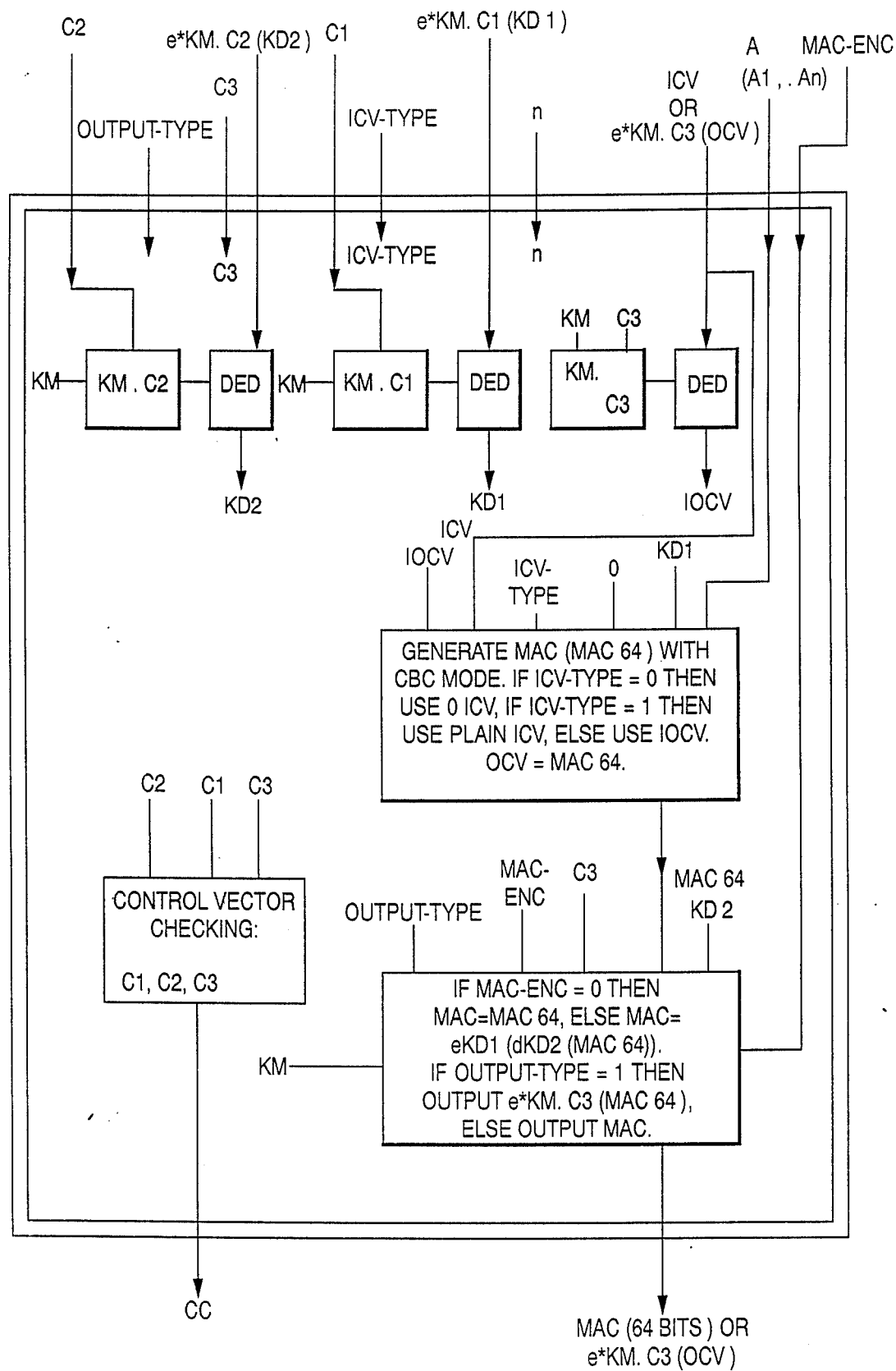
FIG. 29 is a Block Diagram of the Generate Message Authentication Code (Genmac) instruction.

FIG. 29 is a block diagram of this instruction.

CC:
1. successful operation
2. C1 is invalid
3. C2 or C3 is invalid
4. unsuccessful operation (error).

Control Vector Checking:

1. Checking on C1
CV type="data/compatibility" or "data/mac" or "data/ANSI"
MG usage bit=1
reserved (48:63)=X'0'
2. Checking on C2 if (mac-enc=1).
cv type="data/compatibility" or "data/mac" or "data/ANSI"
MG usage bit=1
reserved (48:63)=X'0'
3. Checking on C3 if (icv-type=2 OR output-type=1).
CV type="Intermediate ICV"

Verify MAC (VMAC)

Equation:

Equation:
e*KM.C1(KD1), [e*KM.C2(KD2)]
ICV[e*KM.C3(OCV)],
A,MAC, n, icv-type,output-type,mac-enc,mac-len, C1, [C2],[C3]-yes/no
OR
e*KM.C3(OCV)

Inputs:

| | |
|---|---|
| e*KM.C1(KD1) | KD1 is a mac verification key for single encrypting mac, triple encrypted under KM with a control vector C1. |
| e*KM.C2(KD2) | KD2 is a mac verification key for triple encrypting mac, triple encrypted under KM with a control vector C2. This is an optional input required for triple encrypting mac output-if mac-enc=1. |
| ICV | ICV equal to zero is the default Initial Chaining Value, and is standard to CA architecture,ANSI X9.9 and ANSI X9.19. Non-zero plain ICV can also be used to be compatable with systems which require plain ICV input. Encrypted ICV input is not supported by CA as it was found that it does not provide any more security for the function. Encrypted intermediate ICVs are supported by CA. NOTE: Encrypted ICVs if required are managed by CFAP as described in the "ICV/OCV Management" and "Software Interface." |
| e*KM.C3(OCV) | This is a 64 bit intermediate ICV encrypted under the master key with a special control vector C3. This is an optional input must be provided if large blocks of data (] n) are used to verify MAC. Decrypting the ICV is done internal to the function. Intermediate OCV can not be shipped from the local node, as it is stored under the master key with a control vector in the form for local use only. The intermediate ICV's must be secret in the MAC verification process to protect from attacks. |
| A | Data used in MAC, in multiples of 8 byte blocks (A1,A2 ... An). |
| MAC | 64 bit MAC input to the instruction either single or triple encrypted. By default, only left most 32 bits of this MAC are used for MAC comparison. mac-len may be used to explicitly specify other comparison lengths. |
| n | number of 8 byte blocks MAC'ed. n should be as large as possible, however, this may be system dependent. If large number of blocks have to be mac verified then VMAG is invoked multiple number of times until all blocks are complete. For example: if n max is 4000 for the system, and the data to be verified are 10,000 8 byte blocks, then VMAC is invoked as follows: NOTE: After each call of VMAC, the intermediate ICV e*KM.C3(OCV) must be fed back to next VMAC call as ICV input. The decryption of this intermediate ICV must be done internally in the CF. VMAC n=4000,output-type=1,icv-type=0 VMAC n=4000,output-type=1,icv-type=2 VMAC n=2000,output-type=0,icv-type=2 |
| icv-type | icv-type indicates whether the ICV passed to the function is zero, plain, or intermediate. Intermediate ICV is triple encrypted under the master key with a control vector C3. 0:zero ICV (default) 1:plain ICV 2:intermediate ICV (OCV) |
| output-type | indicates the stage of the mac verification process to the instruction 0 : MAC Verification output 1 : Intermediate ICV output (OCV) |
| mac-enc | mac-enc indicates a single or triple encryption mac input. 0 : single encrypting mac input 1 : triple encrypting mac input (ANSI 9.19 |

-continued

Figure 30:
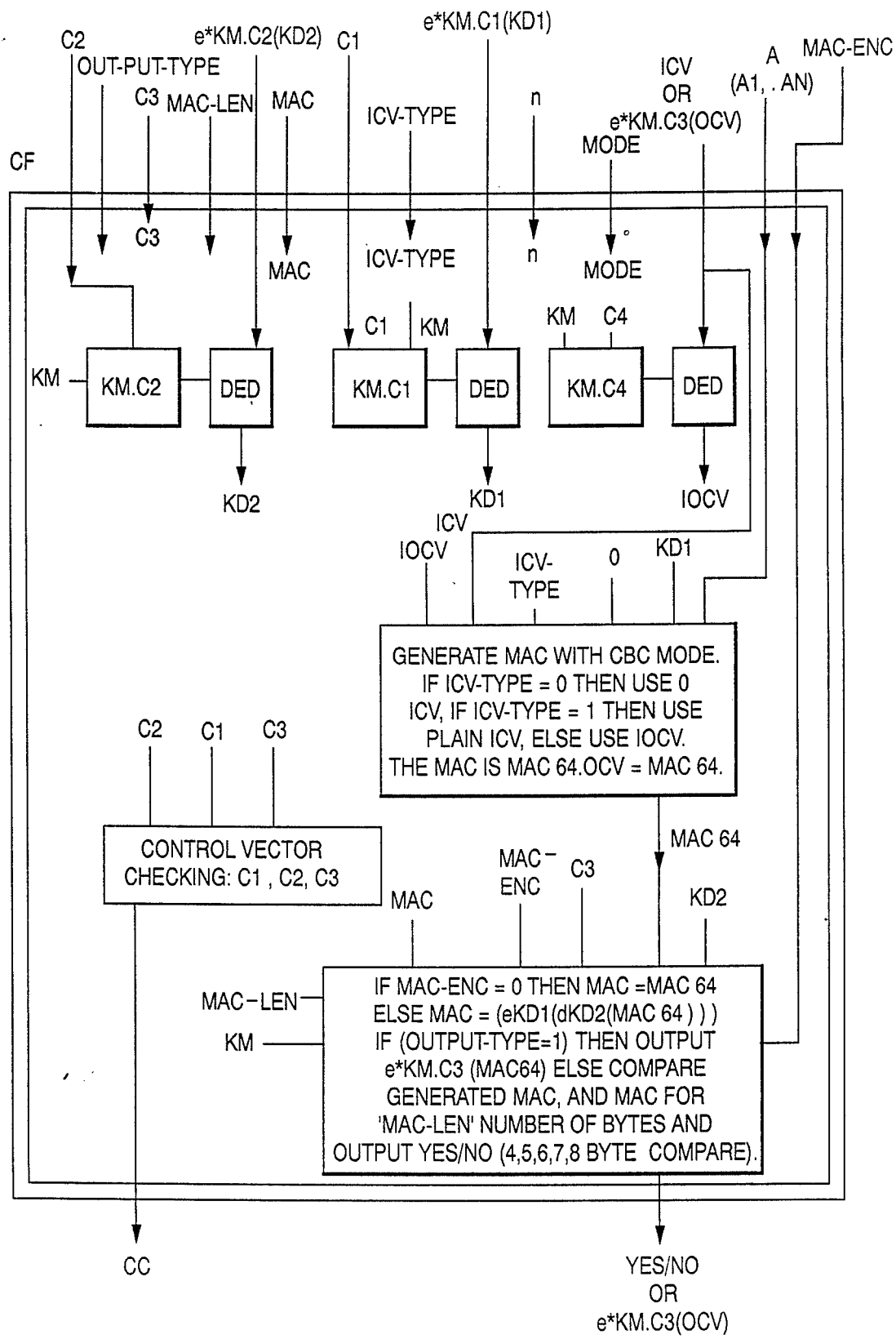
FIG. 30 is a Block Diagram of the Verify Message Authentication Code (Vermac) instruction.

| | requirement) |
|---|---|
| mac-len | mac-len specifies the number of bytes of the mac to be compared. 4 left most bytes are compared as a default.<br>0 : 4 left most bytes<br>1 : 5 left most bytes<br>2 : 6 left most bytes<br>3 : 7 left most bytes<br>4 : 8 bytes<br>NOTE: provision of 4, 5, 6, 7, 8 byte MAC verification may subvert MAC generation pro- for 8 byte MAC. We do not have any solution to solve this problem in crypto facility, but CFAP may consider some checking for different length MAC verification. Further investigation is needed for this problem. |
| C1,C2,C3 | 64 bit control vectors for KD1, KD2, and OCV respectively. C2 and C3 are optional inputs to the instruction, C2 is required if mac-enc=1, and C3 is required if icv-type=2 or output-type=1. |
| Outputs: | |
| yes/no | mac is verified or not. |
| e*KM.C3(OCV) | OCV is a 64 bit intermediate ICV triple encrypted under KM with control vector C3. This is an optional output valid for output-type=1. |
| Description: | The input data is encrypted with CBC mode of DEA encryption using data key KD1 and 32 left most bits of the final encrypted block are compared for equality with the supplied MAC.32 bit MAC compare is a default value, and other comparisons must be made as specified by the mac-len parameter. CC = 1 is set for macs equal and CC=2 is set if macs are not equal. There are two encryption modes: single encryption mode, a single key KD1 is used to create the MAC. In the triple encryption mode, the single encryption mode is employed with KD1 to create a MAC, except the MAC is then decrypted with KD2, and reencrypted again with KD1 to produce the final 64 bit MAC. The MAC is generated as specified by mac-enc input and then compared with the supplied mac to the function.<br>The first ICV is zero as a standard and optionally can be plain. Intermediate ICV must be used if the mac'd data is greater than n blocks in length. If the data block is not multiples of 8 byte blocks, padding must be done. The padding has to be performed by the CFAP before invoking this instruction.<br>FIG. 30 is a block diagram of this instruction. |

CC:
1. MACs equal
2. MACs not equal
3. C1 is invalid
4. C2 or C3 is invalid
5. unsuccessful operation (error)

Control Vector Checking:

1. Checking on C1
cv type="data/compatibility" or "data/mac" or "data/ANSI"
MV usage bit=1
reserved (48:63)=X'0'
2. Checking on C2 if (mac-enc=1).
cv type="data/compatibility" or "data/mac" or "data/ANSI"
MG usage bit=1
reserved (48:63)=X'0'
3. Checking on C3 if (icv-type=2 OR output-type=1).
CV type="Intermediate ICV"

Translate Cipher Text (TCTXT)

Figure 31:
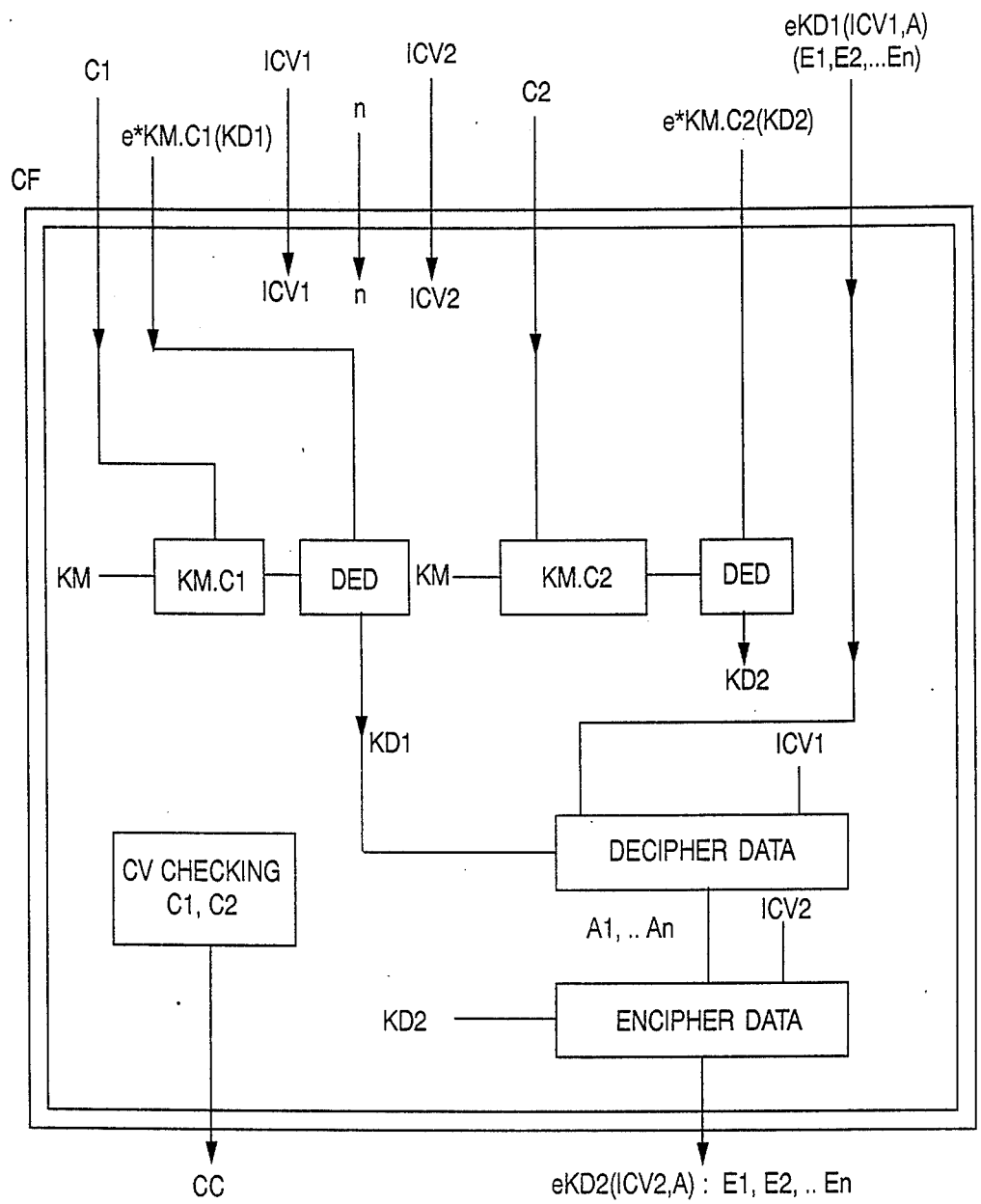
FIG. 31 is a Block Diagram of the Translate Cipher Text instruction.

| Equation: | e*KM.C1(KD1),ICV1,eKD1(ICV1,A), e*KM.C2(KD2),ICV2, n, C1, C2 eKD2(ICV2,A) |
|---|---|
| Inputs: | |
| e*KM.C1(KD1) | KD1 is an input data key, triple encrypted under KM with a control vector C1. |
| ICV1 | 64 bit clear ICV. |
| eKD1(ICV1,A) | KD2 is an output data key, triple encrypted under KM with a control vector C2 |
| ICV2 | 64 bit clear ICV. |
| n | Number of 8 byte blocks of data to be translated. |
| C1, C2 | Control vectors for KD1, KD2 respectively. |
| Outputs: | |
| eKD2(ICV2,A) | outputs Data A encrypted with data key KD2 using ICV2. |
| Description: | Translate cipher text instruction translates data from one data key and ICV to another data key and ICV. This instruction operates with data/xlt keys, and data/compatibility keys. CV keys or CV=0 keys can be used to translate data, no mix and match of these key types are permitted by this instruction. The data can be up to n 8 byte blocks, the translation is done in the crypto facility without exposing the clear data outside the crypt facility. The ICV inputs ICV1 and ICV2 can only be plain ICV inputs to the instruction. No intermediate ICV is provided by the instruction. If more than n blocks of data have to be translated, and the data has to be chained then CFAP has to pass the last 8 byte encrypted block(En) as input to ICV. If encrypted ICVs are used then CFAP must decipher the ICVs before passing ICVs to the instruction.<br>NOTE: The xlate Ciphertext instruction is specifically designed to operate with CV-only keys (i.e., xlate data keys). There is no compatibility mode xlate ciphertext option offered. To get around this, the xlate ciphertext instruction will accept data keys with the D and E attributes as well as the XDin and XDout attributes. But this is provided as a service to reduce the accidental exposure of clear data, since an insider adversary could recover data unclear using the decipher instruction. It is not possible to isolate the xlate ciphertext keys in the compatibility mode, and to architect a control vector for this would give an illusion of security, when in fact, an attack could be perpetrated with the RTMK instruction by importing an intended xlate key (sent over CV=0 channel) as a decipher key. Thus, the xlate ciphertext data channel could be subverted by deciphering data sent over that channel.<br>FIG. 31 is a block diagram of this instruction. |

CC:
1. successful operation
2. C1 or C2 is invalid
3. unsuccessful operation (error)

Control Vector Checking:

1. Checking on C1
cvy type="data/xlt" or "data/compatibility"
If (cv type="data/xlt") then XDin=1
reserved (48:63)=X'0'
2. Checking on C2 if (mac-enc=1).
cv type="data/lxt" or "data/compatibility"
If (cv type="data/xlt") then XDout=1.
reserved (48:63)=X'0'
3. Checking on C1 and C2
CV type(C1)="cv type (C2)

Generate Key Set (GKS)

Equation: OP-OP mode
mode, C3, C4 — e*KM.C3(K), e*KM.C4(K)
Equation: OP-EX mode
mode, C2L,C2R,C3,C4,e*KM.C2L(KEK2L),e*KM.C2R(KEK2R)
— e*KM.C3(K),e*KEK2.C4(K)
Equation: EX-EX mode
mode, C1L,C1R,C2L,C2R,C3,C4,e*KM.C1L(KEK1L),e*KM.C1R(KEK1R),
e*KM.C2L(KEK2L),e*KM.C2R(KEK2R)
— e*KEK1.C3(K), e*KEK2.C4(K)
Equation: OP-IM mode
mode, C2L,C2R,C3,C4,e*KM.C2L(KEK2L),e*KM.C2R(KEK2R)
— e*KM.C3(K), e*KEK2.C4(K)
Equation: IM-EX mode
mode, C1L,C1R,C2L,C2R,C3,C4, e*KM.C1L(KEK1L), e*KM.C1R(KEK1R),
e*KM.C2L(KEK2L), e*KM.C2R(KEK2R)
— e*KM.C3(K), e*KEK2.C4(K)

Inputs:

| | |
|---|---|
| mode | indicates the input and output formats of GKS instruction, and the key generation modes. The explanation for the key generation modes are further described in the "KEY MANAGEMENT" section.<br>0 : OP-OP (operational - operational)<br>1 : OP-EX (operational - export)<br>2 : EX-EX (export - export)<br>3 : OP-IM (Operational - import)<br>4 : IM-EX (import - export) |
| C1L,C1R | These are 64 bit control vectors, left and right control vectors for 128 bit KEK1. C1L is the control vector for KEK1L and C1R is the control vector for KEK1R key. The actual implementation may pass only one CV and let the CF set the "key form" bits in the control vector implicitly. The CA architecture has chosen to pass the left and right control vectors separately for KEKs. CFAP has to generate and manage these two types of CVs for the KEKs. |
| C2K,C2R | These are 64 bit control vectors, left and right control vectors for 128 bit KEK2. C2L is the control vector for KEK2L and C2R is the control vector for KEK2R key. |
| C3,C4 | These are 64 bit control vectors for output key. |
| e*KM.C1L(KEK1L) | KEK1L is a 64 bit left key encrypting key, which is a part of 128 bit key encrypting key KEK1, triple encrypted under the master key KM with a control vector C1L. |
| e*KM.C1R(KEK1R) | KEK1R is a 64 bit right key encrypting key, which is a part of 128 bit key encrypting key KEK1, triple encrypted under the master key KM with a control vector C1R. |
| e*KM.C2L(KEK2L) | KEK2L is a 64 bit left key encrypting key, which is a part of 128 bit key encrypting key KEK2, triple encrypted under the master key KM with a control vector C2L. |
| e*KM.C2R(KEK2R) | KEK2R is a 64 bit right key encrypting key, which is a part of 128 bit key encrypting key KEK2, triple encrypted under the master key "M with a control vector C2R. |

Note: For compatibility purposes the architecture supports both single length (64 bits) and double length (128 bits) key encrypting keys (KEKs). All KEKs, however, are stored on the CKDS (Key Storage) as 128 bit keys. A true double length key KEK = KEKleft 11 KEKright (where KEKleft is left-most 64 bits and kekright are rightmost 64 bits of KEK) is stored triple encrypted under the master key *KM using some cv LC and CR. The stored form is 128 bits denoted by : e*KM.C(KEK) = e*KM.CL(KEKleft) 11 e*KM.CR(KEKright). A single length key KEK is handled by replicating key to form a 128 bit key; KEK 11 KEK is then triple encrypted under *KM and a control vector CL,CR. The stored form is therefore 128 bits denoted by : e*KM.C(KEK$^{33}$KEK) = e*KM.CL(KEK) 11 e*KM.CR(KEK). The "key form" bits for replicated KEK control vector are "01" in each of control vectors CL, and CR so that the key can be recovered at the destination which only stores KEK in 64 bit form. The "key form" bits for normal KEK control vector are "10" for CL and "11" for CR so that they achieve complete separation and preserve 2**112 work factor.

Outputs:

| | |
|---|---|
| e*KM.C3(K) | K is a 64 bit randomly generated key, triple encrypted under KM with a control vector C3. Control vector C3 is always used. The Key K is odd parity adjusted. This key is an operational key that can be used internal to the node. |
| e*KM.C4(K) | K is a 64 bit randomly generated key, triple |

Figure 33:
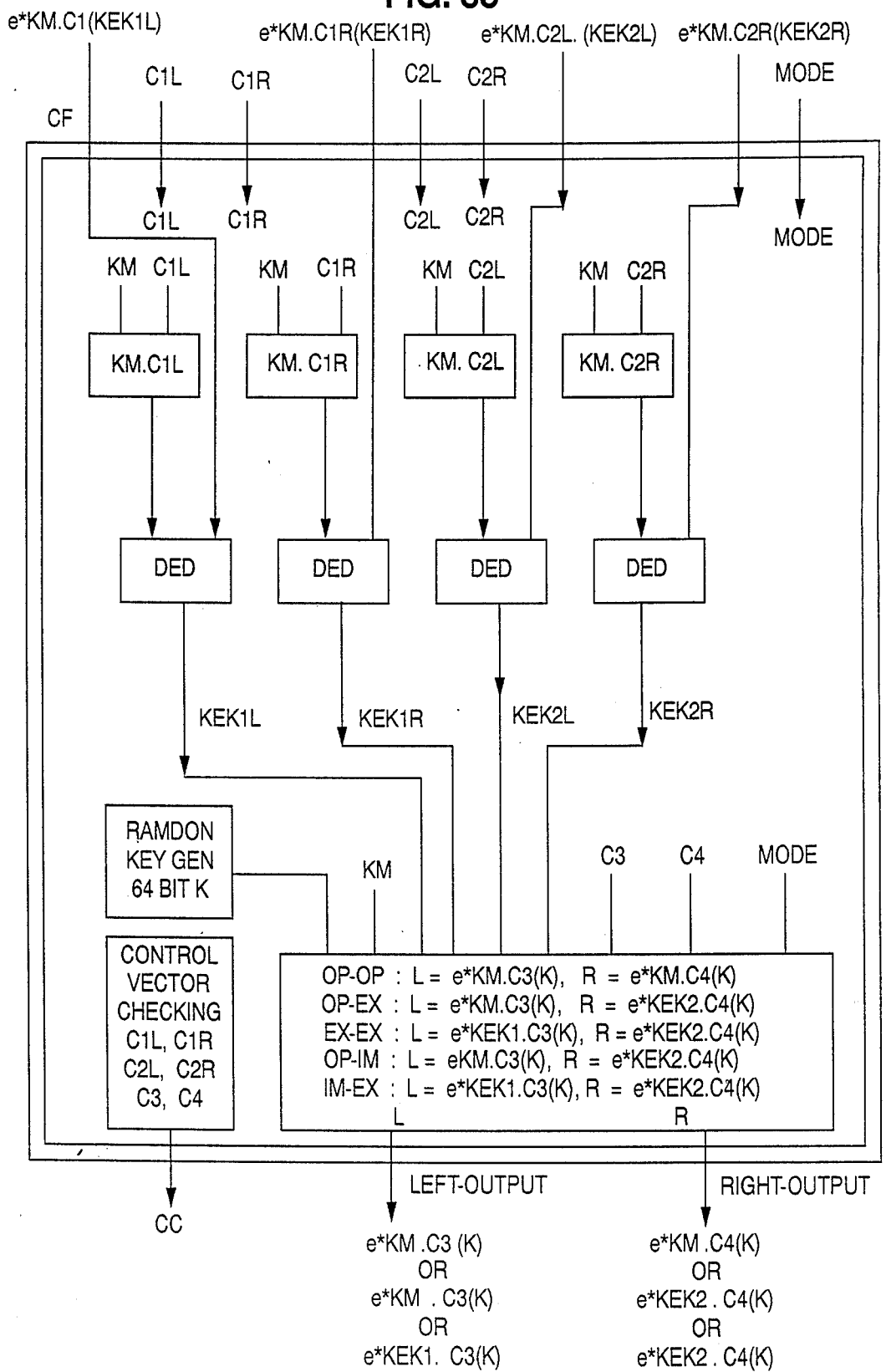
FIG. 33 is a Block Diagram of the Generate Key Set instruction.

| | |
|---|---|
| | encrypted under KM with a control vector C4. Control vector C4 is always used. The Key K is odd parity adjusted. This key is always used. This key is a operational key that can be used internal to the node. |
| e*KEK1.C3(K) | K is a 64 bit randomly generated key, encrypted under KEK1 with a control vector C3. Control vector C3 is always used. The Key K is odd parity adjusted. 128 bit KEKs can be generated by calling GKS twice with C3L and C3R in place of C3 control vector. CFAP must control the passage of these control vectors as needed. |
| e*KEK2.C4(K) | K is a 64 bit randomly generated key, encrypted under KEK2 with a control vector C4. Control vector C4 is always used. The Key K is odd parity adjusted. 128 bit KEKs can be generated by calling GKS twice with C4L and C4R in place of C4 control vector. CFAP must control the passage of these control vectors as needed. |
| Description: | The GKS instruction generates a random, odd parity adjusted 64 bit key, with two attributes indicated by the two control vectors C3 and C4. A 128 bit parity adjusted key can be generated by issuing the GKS instruction twice. The GKS instruction can only ship keys to control vector systems on a CV channel. No compatibility mode keys are generated by the GKS instruction. All compatibility mode keys are generated using KGEN and must be shipped via RFMK. A compatibility mode key may be shipped on a CV channel (using CV on the link) or a CV=0 channel. The GKS instruction provides high security by creating only two copies of the generated key, which are encrypted under keys belonging to two target systems. The control vectors associated with these two copies of the generated key, designated C3 and C4, may be the same or different depending on the intended usage of the keys. The GKS instruction is used to generate and distribute the keys shown in FIG. 32. All keys in the CA system are output triple encrypted (EDE) under a 128 bit KEK. A replicated 64 bit KEK is used to send keys to nodes that only support 64 bit KEKs. If a receiving node supports 128 bit KEKs it can recover a key by triple decryption (DED). If the recipient only supports 64 bit KEKs, a key can be recovered by single decryption. All KEKs are stored under the master key as e*KM.C1L(KEKL) 11 e*KM.C1R(IKEKR) which is a 128 bit encrypted quantity. C1L is a left part key control vector and C1R is a right partkey control vector. The C1L and C1R control vectors have a "key form" field which distinguishes from a left and right part. This eliminates an insider attack on double length keys (where left and right parts are unequal) of work factor about 256. Insider attacks on a 128 bit key should be in the order of 256). FIG. 33 is a block diagram for this instruction. |

CC:
1. successful operation
2. C1L or C1R is invalid
3. C2L or C2R is invalid
4. C3 is invalid
5. C4 is invalid
6. unsuccessful operation (error).

Control Vector Checking: If mode=O(OP-OP), then do the following checking:
1. Checking on C3
cv type="data/priv" or "data/mac"
anti-variant(30)='0'
anti-variant(38)='1'
reserved(48:63)=X'0'
2. Checking on C4
cv type="data/priv" or "data/mac"
anti-variant(30)='0'
anti-variant(38)='0'
reserved(48:63)=X'0'

3. Checking on C3 & Cr
FIG. 34 shows the valid combinations of C3 and C4 attributes which must be checked. Any combination other than those in the table is cryptographically invalid and thus must not be allowed.
If mode=1(OP-EX), then do the following checking:
1. Checking on C2L
cv type="KEK/sender"
GKS usage bits (1)=1
reserved (48:63)=X'0'
2. Checking on C2R
cv type="KEK/sender"

GKS usage bits (1)=1
reserved(48:63)=X'0'
3. checking on C3
cv type="data/priv" or "data/mac" or "data/xlt" or "KEK/sender" or "KEK/receiver" or "PIN/PEK"
anti-variant(30)='0'
anti-variant(38)='1'
reserved(48:63)=X'0'
4. Checking on C4
cv type ="data/priv" or "data/mac" or "data/xlt" or "KEK/sender" or "KEK/receiver" or "PIN/PEK"
anti-variant(30)='0'
anti-variant(38)='1'
reserved(48:63)=X'0'
5. Checking on C3 & C2L,C2R
If cv type (C3) ="KEK/sender" or "KEK/receiver" & key form(C3)='10' or '11' then key form (C2L)='10' & key form (C2R) ='11'
6. checking on C4 & C2L,C2R
If cv type (C4)="KEK/sender" or "KEK/receiver" & key form(C4)='10' or '11' then key form (C2L) ='10' & key form (C2R) ='11'
7. Checking on C2L & C2R
FIG. 35 shows the valid combinations of C2L and C2R attributes which must be checked. Any combination other than those in the table is cryptographically invalid and thus must not be allowed.
8. Checking on C3 & C4
C3 and C4 must satisfy the combinations shown in FIG. 36. No other combinations are permitted.
If mode=2(EX-EX), then do the following checking.
1. Checking on KEK1 and KEK2
KEK1L 11 KEK1R =KEK2L 11 (128 bit keys)
NOTE: Checking the KEKs are not equal will ensure that BiDi keys are not shipped to a node.
2. Checking on C1L
cv type="KEK/sender"
GKS usage bits(2)=1
reserved (48:63) =X'0'
3. Checking on C1R
cv type ="KEK/sender"
GKS usage bits(2)=1
reserved (48:63) =X'0'
4. Checking on C2L
cv type ="KEK/sender"
GKS usage bits(2)=1
reserved (48:63) =X'0'
5. Checking on C2R
cv type ="KEK/sender"
GKS usage bits(1)=1
reserved (48:63) =X'0'
6. Checking on C3
cv type ="data/priv" or "data/mac" or data/xlt" or "KEK/sender" or "KEK/receiver" or "PIN/PEK"
anti-variant(30)='0'
anti-variant(38)='1'
reserved(48:63)=X'0'
7. Checking on C4
cv type ="data/priv" or "data/mac" or "data/xlt" or "KEK/sender" or "KEK/receiver" or "PIN/PEK"
anti-variant(30)='0'
anti-variant(38)='1'
reserved(48:63)=X'0'
8. Checking on C1L & C1R same as described in FIG. 35
9. Checking on C2L & C2R
same as described in FIG. 35
10. Checking on C3 & C4
same as described in FIG. 36.
11. Checking on C3 & C2L, C2R
If cv type (C3) ="KEK/sender" or "KEK/receiver" & key form(C3)='10' or '11' then key form (C2L)='10' & key form (C2R) ='11'
12. Checking on C4 & C2L,C2R
If cv type (C4) ="KEK/sender" or "KEK/receiver" & key form(C4) ='10' or '11' then key form (C2L) ='10' & key form (C2R) ='11'
If mode =3(OP-IM), then do the following checking:
(This mode supports file applications)
1. Checking on C2L
cv type ="KEK/receiver"
GKS usage bits(1)=1
reserved(48:63)=X'0'
2. Checking on C2R
cv type ="KEK/receiver"
GKS usage bits(1)=1
reserved(48:63)=X'0'
3. Checking on C3
cv type ="data/priv" or "data/mac" or "data/xlt"
anti-variant(30)='0'
anti-variant(38)='1'
reserved(48:63)=X'0'
5. Checking on C2L & C2R
same as described in FIG. 35.
6. Checking on C3 & C4
FIG. 37 shows the valid combinations of C3 and C4 attributes which must be checked. Any combination other than those in the table is cryptographically invalid and thus must not be allowed.
If mode =4(IM-EX), then do the following checking:
(This mode is used for IBM SNA multi-domain application)
1. Checking on C1L
cv type="KEK/receiver"
GKS usage bits(0)=1
reserved(48:63)=X'0'
2. Checking on C1R
cv type ="KEK/receiver"
GKS usage bits(0)=1
reserved(48:63)=X'0'
3. Checking on C2L
cv type ="KEK/sender"
GKS usage bits(0)=1
reserved(48:63)=X'0'
4. Checking on C2R
cv type ="KEK/sender"
GKS usage bits(0)=1
reserved(48:63)=X'0'
5. Checking on C3
cv type ="data/priv" or "data/mac" or data/xlt" or "KEK/sender"
anti-variant(30) ='0'
anti-variant(38) ='1'
reserved(48:63)=X'0'
6. Checking on C4
cv type ="data/priv" or "data/mac" or "data/xlt" "KEK/sender" or "KEK/receiver" or "PIN/PEK"
anti-variant(30) - '0'
anti-variant(38) - '1'
reserved(48:63)=X'0'
7. Checking on C1L & C1R same as described in FIG. 35.
8. Checking on C2L & C2R
same as described in FIG. 35.
9. Checking on C3 & C4
same as described in FIG. 36.
10. Checking on C3 & C2L,C2R
If cv type (C3) = "KEK/sender" or "KEK/receiver" & key form(C3) - '10' or '11' then key form(C2L) - '10' & key form (C2R) - '11'.
11. Checking on C4 & C2L,C2R
If cv type (C4) = "KEK/sender" or "KEK/receiver" & key form(C4) = '10' or '11' then key form(C2L) = '10' & key form (C2R) = '11'.

REENCIPHER FROM MASTER KEY (RFMK) EQUATION dist-mode,e*KM.C1L(KEK1L),e*KM.C1R-(KEK1R),e*KM.C2(K),C1L,C1R,C2,C3—e*-KEK1.C3(K)

INPUTS:

| INPUTS: | |
|---|---|
| dist-mode | indicates the channel type used to ship a key. For example, CV, CV = 0 channels are used to ship keys.<br>0: CV=0 (channel)<br>1: CV (channel) |
| e*KM.C1L(KEK1L) KEK1L | is a 64 bit left key encrypting key, which is a part of 128 bit key encrypting key KEK1, triple encrypted under the master key KM with a control vector C1R. |
| e*KM.C1L(KEK1L) KEK1L | is a 64 bit right key encrypting key, which is a part of 128 bit key encrypting key KEK1, triple encrypted under the master key KM with a control vector C1R. |
| e*KM.C2(K) | K is a 64 bit key triple encrypted under KM with a control vector C2. C2 is the input control vector which is used to recover the key. K is the key being exported. A 128 bit key is exported, using two RFMK instructions. |
| C1L,C1R | These are 64 bit control vectors, left and right control vectors for 128 bit KEK1. C1L is the control vector for KEK1L and C1R is the control vector for KEK1R key. The actual implementation may pass only one CV and let the CF set the "key form" bits in the control vector implicitly. The CA architecture has chosen to pass the left and right control vectors separately for KEKs. CFAP has to generate and manage these two types of CVs for the KEKs. |
| C2 | 64 bit input control vector the key K. |
| C3 | 64 bit output control vector for key K. |
| OUTPUTS: | |
| e*KEK1.C3(K) | K is the 64 bit key being exported. It can be exported with C3 being a control vector or C3 = 0 control vector. The key K is triple encrypted under 128 bit KEK1 with control vector C3. In situations where KEKIL = KEK1R, the receiver can recover K with a single decryption of this output. |

Figure 38:
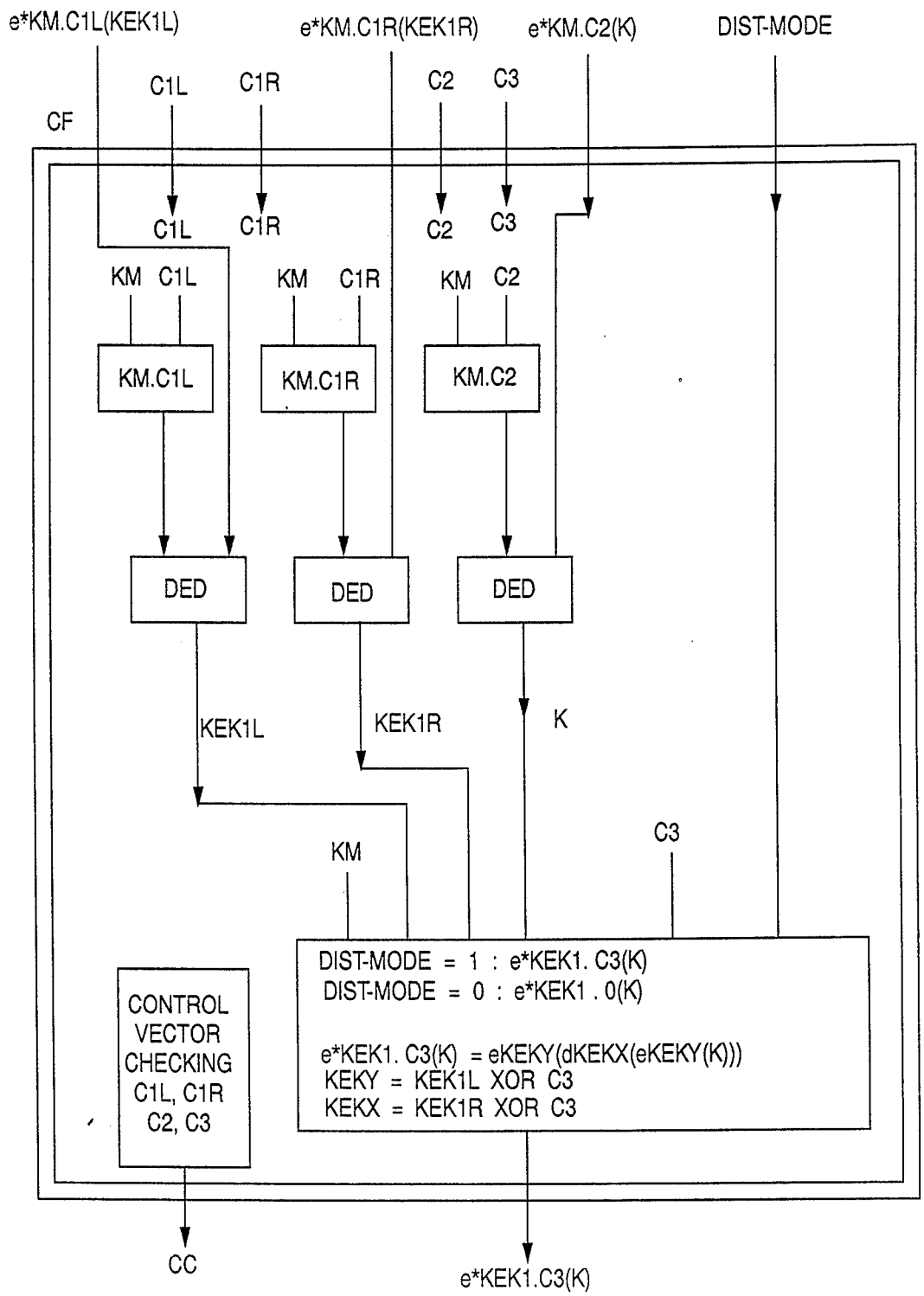
FIG. 38 is a Block Diagram of the Reencipher From Master Key instruction.

DESCRIPTION: The RFMK instruction reenciphers a 64 bit key K from encipherment under the master key to encipherment under a 128 bit key KEK1 (called the EXPORT KEY).
A 128 bit key K (i.e., two 64 bit keys) can be exported by issuing two RFMK instructions.
A key exported to a system employing control vectors is encrypted under KEK1.C3, i.e., the control vector accompanies the exported key. A key exported to a system without control vectors is encrypted under KEK1.0, i.e., the output control vector specified must be zero.
RFMK is used to export keys in situations where three or more keys must be distributed (i.e., Genkeyset is incapable of generating the required keys). RFMK is also used to ship data/compatibility keys to non-control vector systems. If the dist-mode = 0, then the control vector specified C3 must be zero. Data keys, KEKs, Pin encrypting keys, Pin generating keys, intermediate ICV, key parts, and tokens can be shipped to a CV system using RFMK instruction.
RFMK can't be used to export a GKS created key on CV = 0 channel, this restriction is imposed by the instruction to guarantee CV and CV=0 channel separation.
FIG. 38 is a block diagram for this instruction.
CC:
1. successful operation
2. C1L or C1R is invalid
3. C2 is invalid
4. C3 is invalid
5. unsuccessful operation (error).

CONTROL VECTOR CHECKING:

1. Checking on C1L (Export Key):
   cv type = "KEK/sender"

RFMK usage bit=1
reserved(48:63)=X'0'
2. Checking on C1R (Export Key):
cv type ="KEK/sender"
RFMK usage bit=1
reserved(48:63)=X'0'
3. Checking on C2 (Exported Key):
cv type ="data/compatability" or "data/priv" or "data/mac" or "data/xlt" or "KEK/receiver" or "KEK/sender" or "PIN/PEK" or "PIN/PGK" or "KEYPART" or "Intermediate ICV" or "token"
reserved(48:63)=X'0'
4. If dist-mode=1 then do the following checking:
link control (C1L) ="01" or "11"
link control (C1R) ="01" or "11"
export control bit (C2)=1
cv type (C2) =cv type (C3)
usage bits(C2) =usage bits(C3)
anti-variant bit 30(C3) ='0'
anti-variant bit 38(C3) ='1'
reserved (48:63) (C3) =X'0'
5. If dist-mode =0 then do the following checking:
link control (C1L) ="10" or "11"
link control (C1R) ="10" or "11"
export control bit (C2)=1
cv type (C2)="data/compatability"
C3=0
6. Checking on C1L & C1R
same as specified in FIG. 35.
7. Checking on C3 & C1L,C1R
If cv type (C3) ="KEK/sender" or "KEK/receiver" & key form(C3) ='10' or '11' then key form (C1L) ='10' & key form (C1R) ='11'.

REENCIPHER TO MASTER KEY (RTMK)
EQUATION:

dist-mode,e*KM.C1L(KEK1L),e*KM.C1R-
(KEK1R),e*KEK1.C3(K),
C1L,C1R,C2,C3→e*KM.C2(K)

INPUTS:

| INPUTS: | |
|---|---|
| dist-mode | indicates the channel type used in receiving a key. For example CV, CV = 0 channels are used to ship keys.<br>0: CV = 0 (channel)<br>1: CV (channel) |
| e*KM.C1L(KEK1L) | KEK1L is a 64 bit left key encrypting key, which is a part of 128 bit key encrypting key KEK1, triple encrypted under the master key KM with a control vector C1L. |
| e*KM.C1R(KEK1R) | KEK1R is a 64 bit right key encrypting key, which is a part of 128 bit key encrypting key KEK1, triple encrypted under the master key KM with a control vector C1R. (KEK1 is an input key). |
| e*KEK1.C3(K) | K is a key shipped from some other node under the key encrypting key (KEK1) with a control vector C3. The key can be shipped single encrypted or triple encrypted, it will be recovered in either case. The key can be shipped using a CV channel or CV=0 channel and the dist-mode must be zero if CV=0 channel is used. The received key may or may not have an odd parity, thus no parity checking is required by CF. C3 is also called an input control vector. |
| C1L, C1R | These are 64 bit control vectors, left and right control vectors for 128 bit KEK1. C1L is the control vector for KEK1L and C1R is the control vector for KEK1R key. The actual implementation may pass only one CV and let the CF set the "key form" bits in the control vector implicitly. The CA architecture has chosen to pass the left and right control vectors separately for KEKs. CFAP has to generate and manage these two types of CVs for the KEKs. |
| C2 | 64 bit output control vector for key K. |
| C3 | 64 bit input control vector for key K. |
| OUTPUTS: | |
| e*KM.C2(K) | K is a received key, triple encrypted under KM with a control vector C2. The key is odd parity adjusted before encrypting with the master key. |

DESCRIPTION: The RTMK instruction reenciphers a 64 bit key K from encipherment under a 128 bit key encrypting key KEK (called the IMPORT KEY) to encipherment under the master key.

A 128 bit key K (i.e., two 64 bit keys) can be imported by issuing two RTMK instructions.

A key imported from a system employing control vectors is expected to be encrypted under KEK1.C3, i.e., the control vector accompanies the key to be imported. This is also called importing a key using CV channel. A key imported from a system employing no control vectors is expected to be encrypted under KEK1.0, i.e., the control vector is zero. This is also called importing a key using CV=0 channel. There are no other channels available to import or export keys in CA systems. The dist-mode must be specified appropriately indicating the channel used to ship the key. For dist-mode =0, the input control vector specified must be zero. CV =0 can only be used to ship or receive "data/compatability" keys and no other keys can be shipped or received using this channel in CA system.

The key imported from any system is always encrypted under the master key with a control vector C2, which must always be supplied to the instruction, i.e., all keys are stored using the control vector in CA systems.

Figure 39:
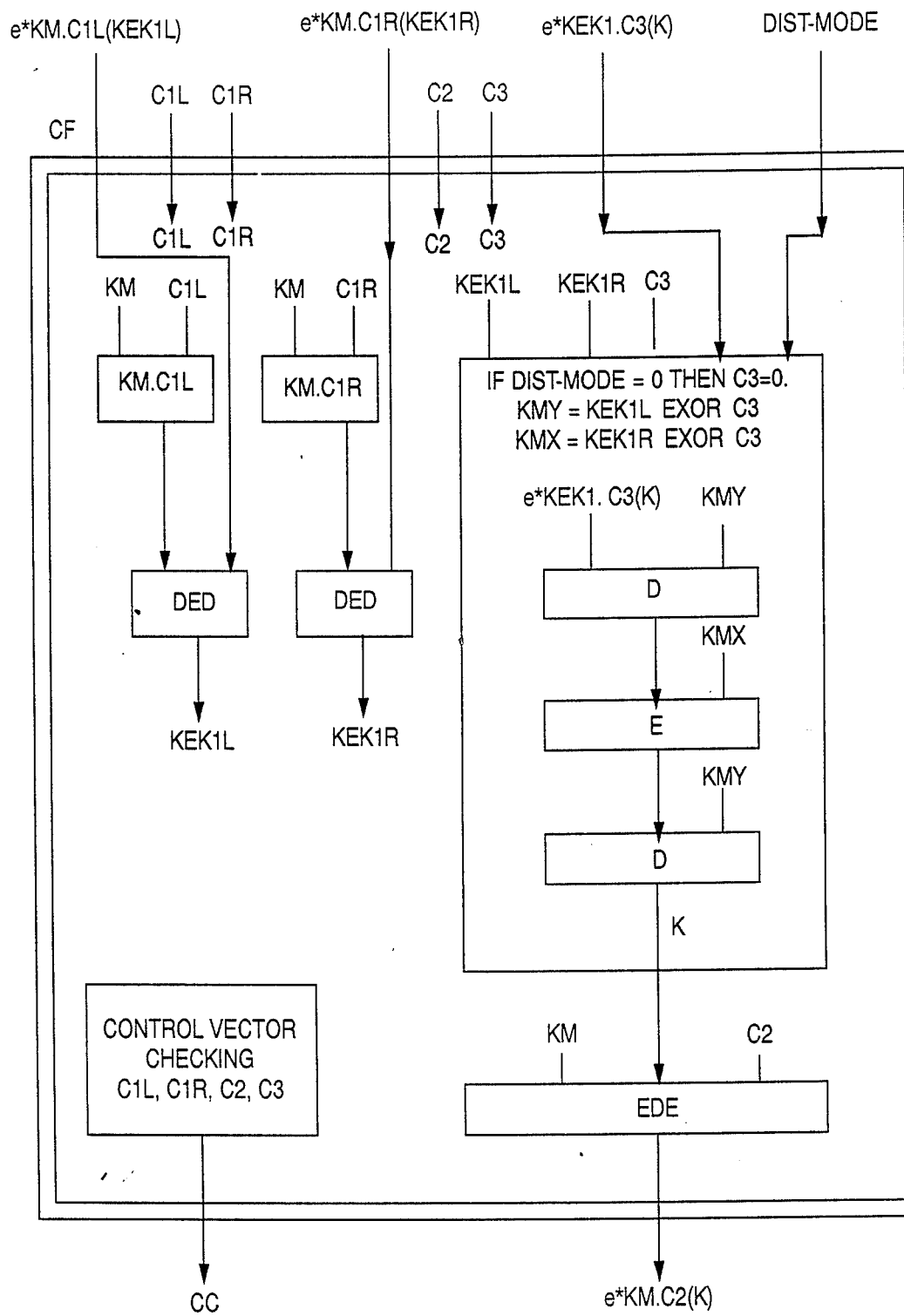
FIG. 39 is a Block Diagram of the Reencipher to Master Key instruction.

FIG. 39 is a block diagram for this instruction.

CC:
1. successful operation
2. C1L or C1R is invalid
3. C2 is invalid
4. C3 is invalid
5. unsuccessful operation (error).

CONTROL VECTOR CHECKING:

1. Checking on C1L (Import Key):
cv type ="KEK/receiver"
RTMK usage bit=1
reserved(48:63) =X'0'
2. Checking on C1R (Import Key):
cv type ="KEK/receiver"
RTMK usage bit=1
reserved(48:63) =X'0'
3. If dist-mode=1 then do the following checking:
link control (C1L) ="01" or "11"
link control (C1R) ="01" or "11"

cv type = "data/compatability" or "data/priv" or "data/mac" or "data/xlt" or "KEK/receiver" or "KEK/sender" or "PIN/PEK" or "PIN/PGK" or "KEYPART" or "Intermediate ICV" or "token".

reserved(48:63) = X'0'

If export control bit (C3) = 0 then export control bit (C2) = 0.

cv type (C3) = cv type (C2)
usage bits(C3) = usage bits(C2)
anti-variant bit 30 (C2) = '0'
anti-variant bit 38 (C2) = '1'

4. If dist-mode = 0 then do the following checking:
link control (C1L) = "10" or "11"
link control (C1R) = "10" or "11"
cv type (C2) = "data/compatability"
anti-variant bit 30 (C2) = '0'
anti-variant bit 38 (C2) = '1'
C3 = 0

5. Checking on C1L & C1R
same as specified in FIG. 35.

6. Checking on C2 & C1L,C1R
If cv type (C2) = "KEK/sender" or "KEK/receiver" & key form(C2) = '10' or '11' then key form(C1L) = '10' & key form (C1R) = '11'.

KEYGEN (KGEN)

EQUATION:

| | |
|---|---|
| output-type | indicates the following output format of the instruction. |
| | 0: output 64 bit odd parity adjusted random number (key) |
| | 1: output 64 bit random number, no parity adjusted |
| | 2: output 64 bit odd parity adjusted random number (key), encrypted under KM with a control vector C1. |
| C1 | 64 bit control vector for the key generated. |
| OUTPUTS: | |
| K | 64 bit clear random number or parity adjusted key. |
| e*KM.C1(K) | K is the 64 bit key being generated and triple encrypted under KM with a control vector C1. |

DESCRIPTION: The Keygen function produces a 64 bit odd parity adjusted key or it produces a 64 bit odd parity adjusted clear key encrypted under KM with a control vector C1 or a plain 64 bit random number without adjusting the parity. Output-type specifies the type of output required. Keygen instruction can be used to only generate data/compatability, data/priv, data/mac, and data/xlt keys, and ANSI keys. All other key types have to be generated using GKS.

Figure 40:
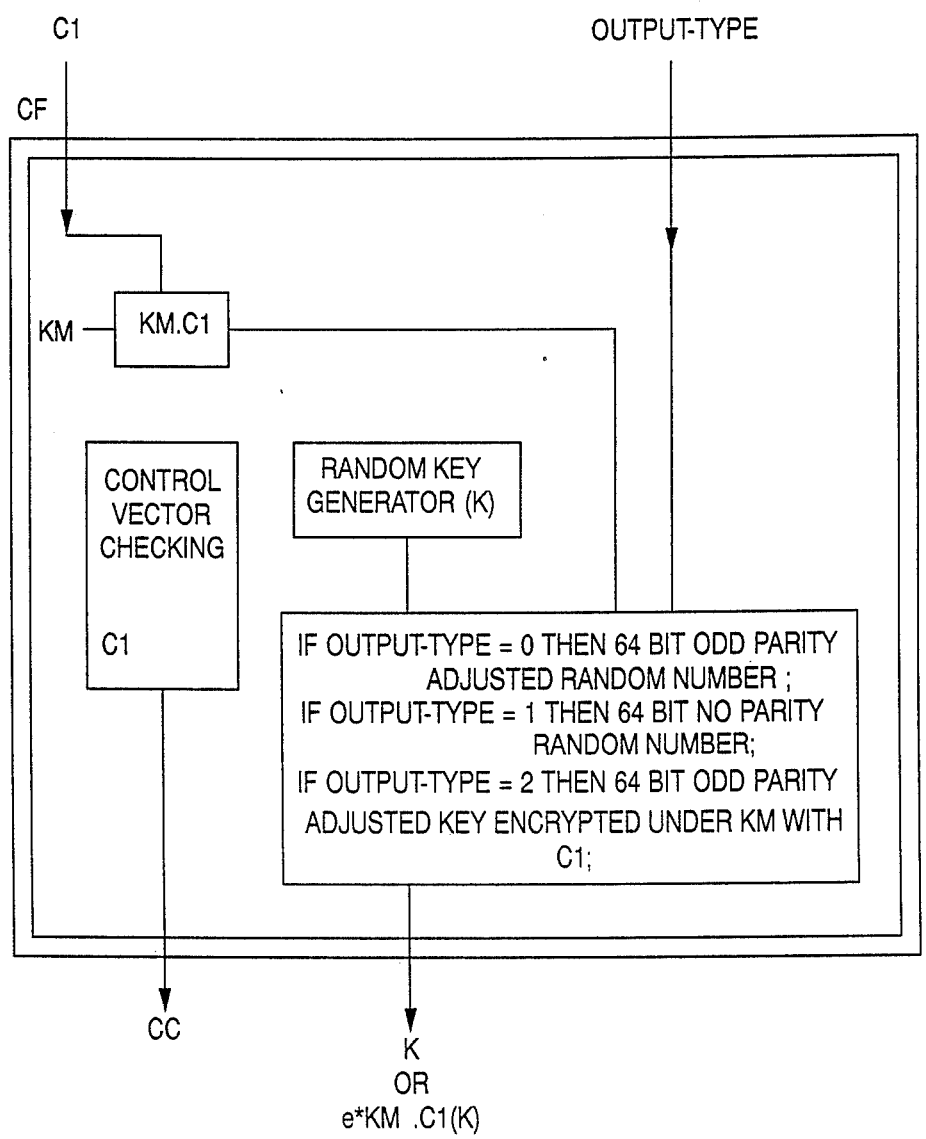
FIG. 40 is a Block Diagram of the Keygen instruction.

FIG. 40 is a block diagram for this instruction.
CC:
1. successful operation
2. C1 is invalid
3. unsuccessful operation (error).

CONTROL VECTOR CHECKING:

1. Checking on C1 if output-type = 2.
cv type = "data/compatability" or "data/priv" or "data/mac" or "data/xlt" or "data/ANSI" or "ANSI/KEK"
anti-variant(30) = '0'
anti-variant(38) = '1'
reserved bits(48:63) = X'0'

ENCIPHER UNDER MASTER KEY (EMK)

EQUATION:

$$K, C1 \rightarrow e*KM.C1(K)$$

INPUTS:

| | |
|---|---|
| INPUTS: | |
| K | 64 bit clear odd parity adjusted key supplied to the function or it could be a 64 bit token for a data key. The token is stored along with the data key on CKDS. Refer to RTNMK instruction to see the usage of the token for the data keys. |
| C1 | 64 bit control vector for the key or token supplied. |
| OUTPUTS: | |
| e*KM.C1(K) | K is the 64 bit key being supplied and triple encrypted under KM with a control vector C1. K can also be a 64 bit token which is stored with the data key on CKDS. |

DESCRIPTION: The encipher under master key instruction produces a 64 bit key or a token encrypted under KM with a control vector C1.

If the key or a token is passed to the function is a "data/priv" or a "token" type then it is encrypted under KM with a control vector C1. Otherwise, the function can be performed only if the system is in "super secure" mode. In "super secure" mode this function can encrypt any clear key with any of the cv type.

Figure 41:
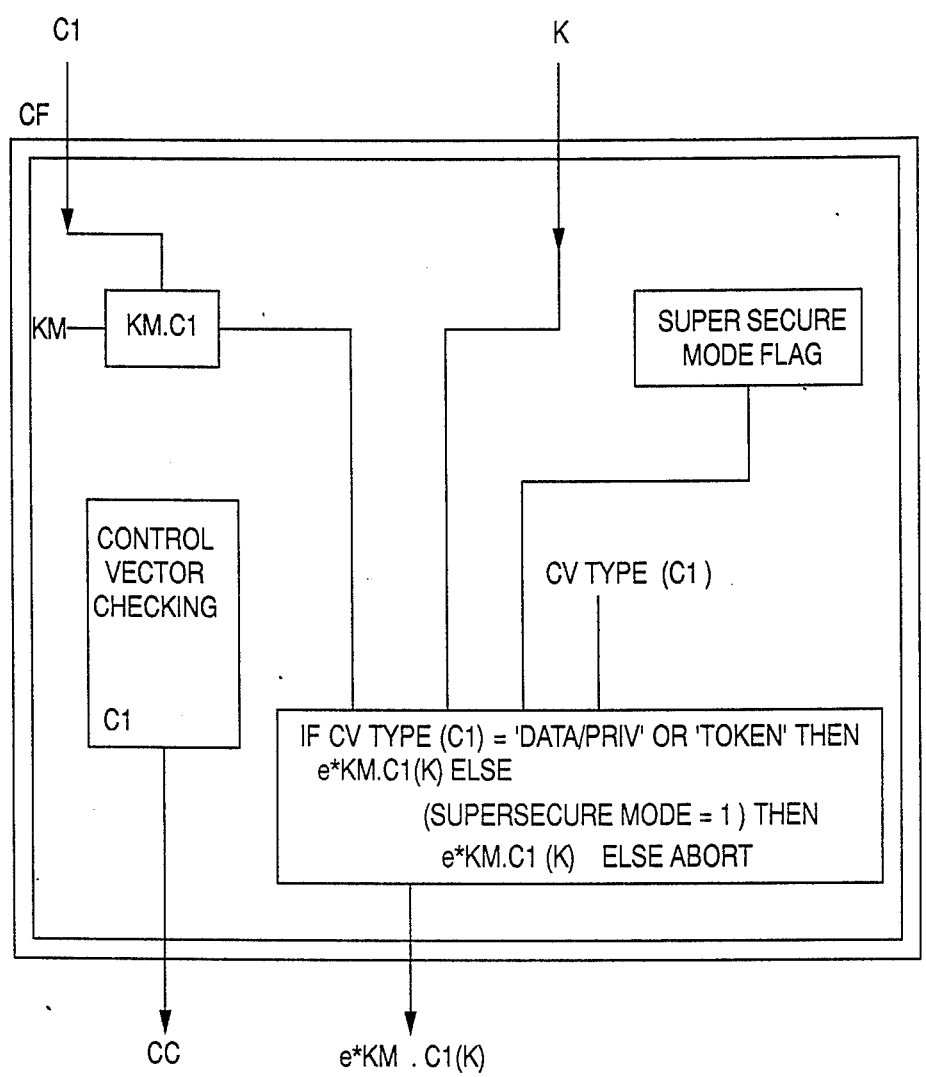
FIG. 41 is a Block Diagram of the Encipher Under Master Key instruction.

FIG. 41 is a block diagram for this instruction.
CC:
1. successful completion
2. C1 is invalid
3. Not in super secure mode
4. unsuccessful operation (error).

CONTROL VECTOR CHECKING:

1. Checking on C1:
cv type = "data/compatability" or "data/priv" or "data/mac" or "data/xlt" or "data/ANSI" or "ANSI/KEK" or "KEK/sender" or "KEK/receiver" or "token" or "Intermediate ICV" or "PIN/PGK" or "PIN/PEK"
anti-variant(30) = '0'
anti-variant(38) = '1'
reserved bits(48:63) = X'0'
If (cv type ( ) ("data/compatability" or "token") then supersecure-mode-flat = 1.

TRANSLATE KEY (XLTKEY)

EQUATION:

e*KM.C1L(KEK1L),e*KM.C1R(KEK1R),

-continued e*KM.C2L(KEK2L),e*KM.C2R(KEK2R),e*KEK1.C3(K),
mode,C1L,C1R,C2L,C2R,C3 - e*KEK2.C3(K)

INPUTS:

| | |
|---|---|
| e*KM.C1L(KEK1L) | KEK1L is a 64 bit left key encrypting key, which is a part of 128 bit key encrypting key KEK1, triple encrypted under the master key KM with a control vector C1L (This is an Import KEK). |
| e*KM.C1R(KEK1R) | KEK1R is a 64 bit right key encrypting key, which is a part of 128 bit key encrypting key KEK1, triple encrypted under the master key KM with a control vector C1R (This is an Import KEK). |
| e*KM.C2L(KEK2L) | KEK2L is a 64 bit left key encrypting key, which is a part of 128 bit key encrypting key KEK2, triple encrypted under the master key KM with a control vector C2L (This is an Import KEK). |
| e*KM.C2R(KEK2R) | KEK2L is a 64 bit right key encrypting key, which is a part of 128 bit key encrypting key KEK2, triple encrypted under the master key KM with a control vector C2R (This is an Import KEK). |
| e*KEK1.C3(K) | K is a 64 bit key triple encrypted under KM with a control vector C3. K is the key being translated. a 128 bit key is translated using two XLTKEY instructions. |
| mode | 0: C3 = non-zero control vector<br>1: C3 = 0 |
| C1L,C1R | These are 64 bit control vectors, left and right control vectors for 128 bit KEK1. C1L is the control vector for KEK1L and C1R is the control vector for KEK1R key. The actual implementation may pass only one CV and let the CF set the "key form" bits in the control vector implicitly. The CCA architecture has chosen to pass the left and right control vectors separately for KEKs. CFAP has to generate and manage these two types of CVs for the KEKs. |
| C2L,C2R | These are 64 bit control vectors, left and right control vectors for 128 bit KEK2. C2L is the control vector for KEK2L and C2R is the control vector for KEK2R key. |
| C3 | 64 bit control vector for the key K. The same control vector is also used to output the key under KEK2. |

OUTPUTS:

| | |
|---|---|
| e*KEK2.C3(K) | K is the 64 bit translated key. |

DESCRIPTION: The XLTKEY instruction reenciphers a 64 bit key K from encipherment under the 128 bit key encrypting key KEK1 (called the IMPORT key) to the 128 bit key encrypting key KEK2 (called the EXPORT key). Locally all KEK's are 128 bits which are stored under the master key with a control vector. KEKL and KEKR parts of 128 bit KEK are encrypted separately under KM to produce two 64 bit encrypted key quantities and stored locally as 128 bit concatenated quantities. In order to recover 128 bit KEK, there has to be 2 decipherments of type DED operations.

A 128 bit key K (i.e., two 64 bit keys) can be translated by issuing two XLTKEY instructions.

Mode parameter specifies the type of the key being translated. The key must be recovered using this mode parameter: if mode=1 then C3=0 must be used to recover the key and also translate the key. No mix and match of CV =0 with CV is allowed by this instruction.

Figure 42:
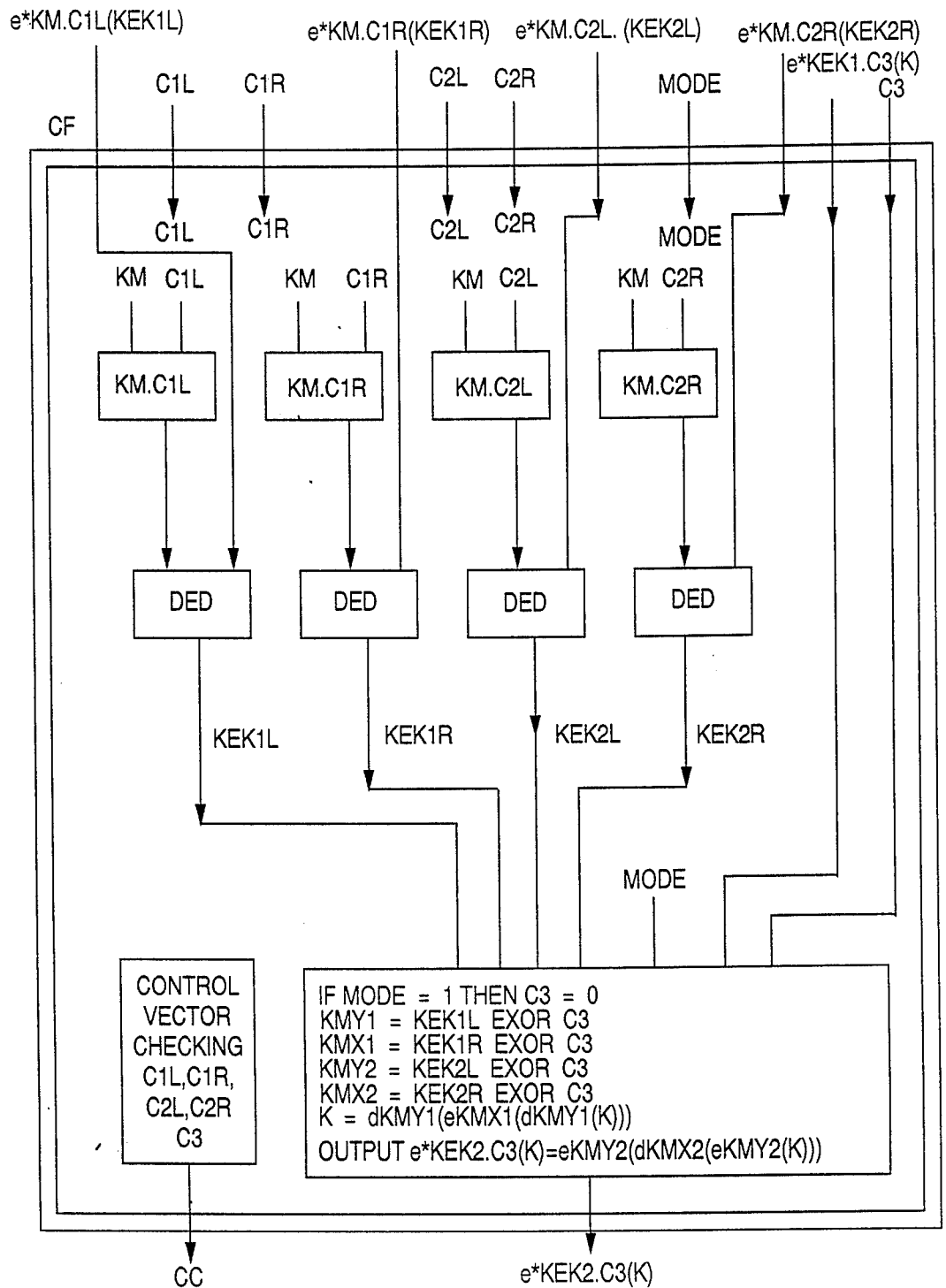
FIG. 42 is a Block Diagram of the Translate Key instruction.

FIG. 42 is a block diagram for this instruction.

CC:
1. successful operation
2. C1L or C1R is invalid
3. C2L or C2R is invalid
4. C3 is invalid
5. unsuccessful operation (error).

CONTROL VECTOR CHECKING:

1. Checking on C1L (Importer Key):
cv type ="KEK receiver"
XLATE IN usage bit =1
reserved (48:63) =X'0'
2. Checking on C1R (Importer Key):
cv type ="KEK receiver"
XLATE IN usage bit=1
reserved (48:63) =X'0'
3. Checking on C2L (Exporter Key):
cv type ="KEK sender"
XLATE OUT usage bit=1
reserved (48:63) =X'0'
4. Checking on C2R (Exporter Key):
cv type ="KEK sender"
XLATE OUT usage bit=1
reserved (48:63) =X'0'
5. Checking on C1L & C2L:
As described in FIG. 43.
6. Checking on C1R & C2R:
As described in FIG. 43.
7. Checking on C1L,C1R,C2L,C2R:
If mode =0 then
  (link control(C1L) =(link control(C1R) ='01' or
  (link control(C1L) =(link control(C1R) ='11'
If mode =0 then
  (link control(C2L) =(link control(C2R) ='01' or
  (link control(C2L) =(link control(C2R) ='11'
If mode =1 then
  (link control(C1L) =(link control(C1R) ='10' or (link control(C1L) = (link control(C1R) = '11'
If mode =1 then
(link control(C2L) = (link control(C2R) = '10' or
(link control(C2L) = (link control(C2R) = '11'
8. Checking on C3 & C1L,C1R
If cv type (C3) = "KEK/sender" or "KEK/-receiver" & key form(C3) = '10' or '11' then key form (C1L) = '10' & key form (C1R) = '11'.
9. Checking on C3 & C2L,C2R
If cv type (C3) = "KEK/sender" or "KEK/-receiver" &
key form (C3) = '10' or '11' then
key form (C2L) = '10' & key form (C2R) = '11'.

REENCIPHER TO NEW MASTER KEY (RTNMK)
EQUATION: KEY-MODE mode, e*KMC.C1(K), C1—e*KMN.C1(K)

EQUATION: TOKEN-MODE mode, (token+e*KMC.C1(K),e*KMC.C2 (token),
C1, C2—(token +e*KMN.C1(K)),e*KMN.C2
(token)

INPUTS:

to be set in the crypto facility to perform RTNMK instruction. Loading the new master key into the crypto facility will set this flag, and at the cut-over point the SMK instruction will reset the NMK flag. There must be new master key and current master key facilities in the crypto facility, and there could be additionally an old master key location in the CF which contains the previous master key just one level before the current master key. Each master key must have a flag associated with it in the CF, and the current master key flag must be set in order to perform the RTNMK operation. The master key flags are set by the SMK instruction at cut-over point.

In some systems, there may be applications which are offline at the cut-over point. Some keys, therefore, may still be encrypted under the old master key. Once the application is online after cut-over, it may translate such keys from the old master key to the current master key via the instruction reencipher to current master key (RTCMK).

If CMK and NMK flags are not set the operation is aborted.

The RTNMK instruction can also be used to reencipher a token and a special value associated with the token in one atomic operation. The specific value is an

| INPUTS: | |
|---|---|
| mode | indicates the RTNMK mode as follows:<br>0: KEY-MODE<br>1: TOKEN-MODE<br>Key-mode is used to translate keys into new master keys. Token-mode is used to translate key and token into new master key which is stored on DKDS in a special form. CFAP will generate a random number and assign it as a token, the encrypted data key e*KM.C1(KD) is exclusive or'd with this token and the resultant value is stored on the DKDS. The token itself is a secret quantity, it is encrypted using EMK (e*KM.C2(token)) and also stored on DKDS. When a master key is changed the token and the key must be reenciphered using the RTNMK as an atomic operation. |
| e*KMC.C1(K) | K is a 64 bit key, triple encrypted under the current master key with a control vector C1. |
| C1 | is a control vector for the 64 bit key K. |
| (token + e*KMC.C1(K)) | is a 64 bit quantity, which is a special quantity stored on DKDS ('+' operation is an exclusive or). CFAP generates this quantity and stores it on DKDS. This input is valid for mode = 1. |
| e*KMC.C2(token) | is a 64 bit token encrypted under the current master key with a control vector C2 (This is generated using EMK instruction). This input is valid for mode = 1. |
| C2 | is a control vector for the 64 bit token. This input is valid for mode = 1. |
| OUTPUTS: | |
| e*KMN.C1(K) | K is a 64 bit key triple encrypted under the new master key with a control vector C1. |
| (token + e*KMN.C1(K)) | This is a special quantity generated under the new master key which can be stored on DKDS. This output is valid only for mode = 1. |
| e*KMN.C2(token) | This is a token reenciphered under the new master key with a control vector C2. This output is valid only for mode = 1. |

DESCRIPTION: The RTNMK instruction causes a 64 bit encrypted key to be decrypted under the current master key and reencrypted with a new master key.

RTNMK instruction is used to reencipher all the keys in the system when a master key is changed. This instruction preserves the current master key and new master key in their respective registers in the crypto facility. There should be a new master key (NMK) flag exclusive or of a token and the encrypted data key. The data keys are stored on DKDS as this special value and the encrypted value of the token is also stored as a secret quantity. The encrypted token value can only be decrypted internal to the RTNMK or RTCMK instructions in the crypto facility. There is no other capability of decrypting the token in the CA. The token value is encrypted using EMK and the token is associated with a special control vector. The control vector checking is performed in EMK and RTNMK to ensure the token's security in the system.

Figures 43, 44:
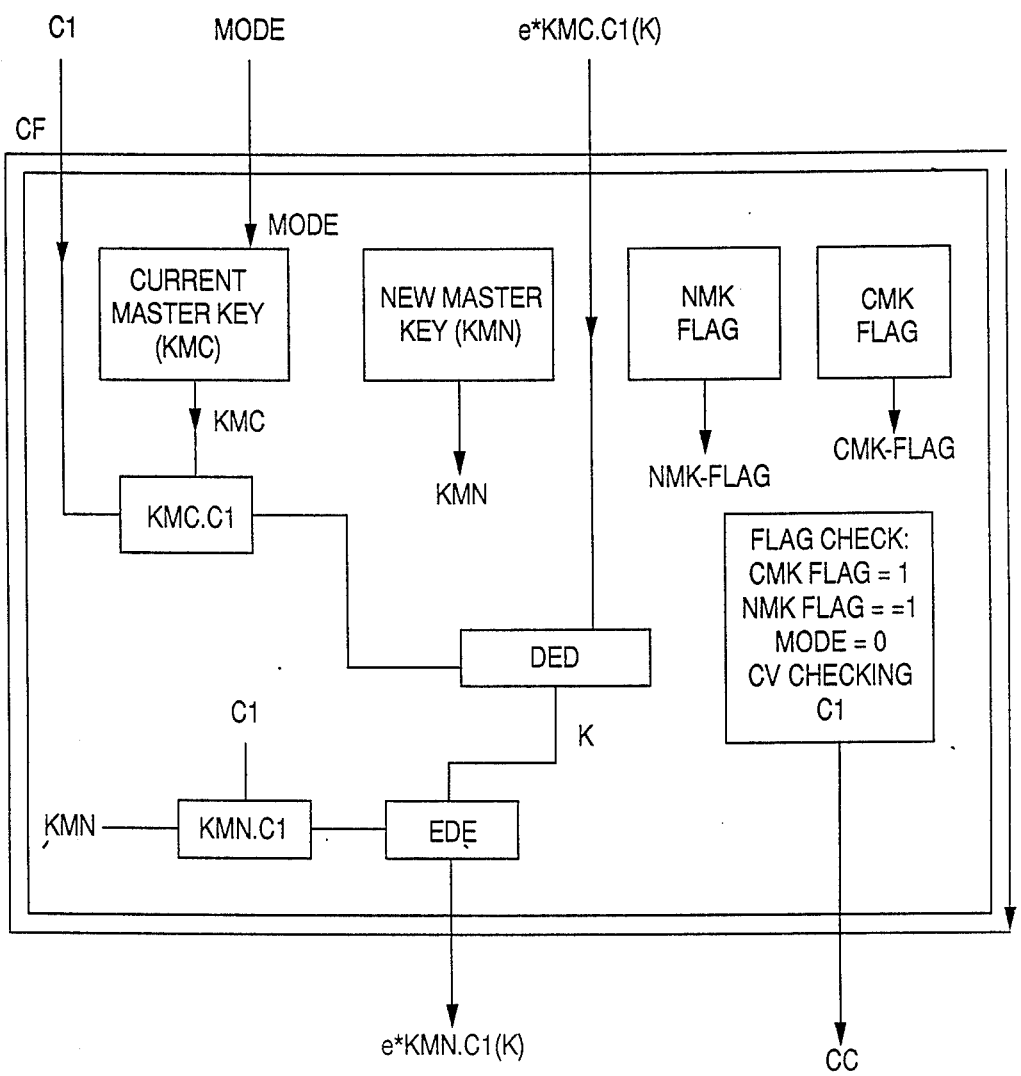
FIG. 43 shows the valid combinations of Left versus Right CV Key Form attributes for the Importing and Exporting KEKs used in the Translate Key instruction.
FIG. 44 shows the Block Diagram for Mode 0 (Key Mode) of the Reencipher to New Master Key instruction.
Figure 45:
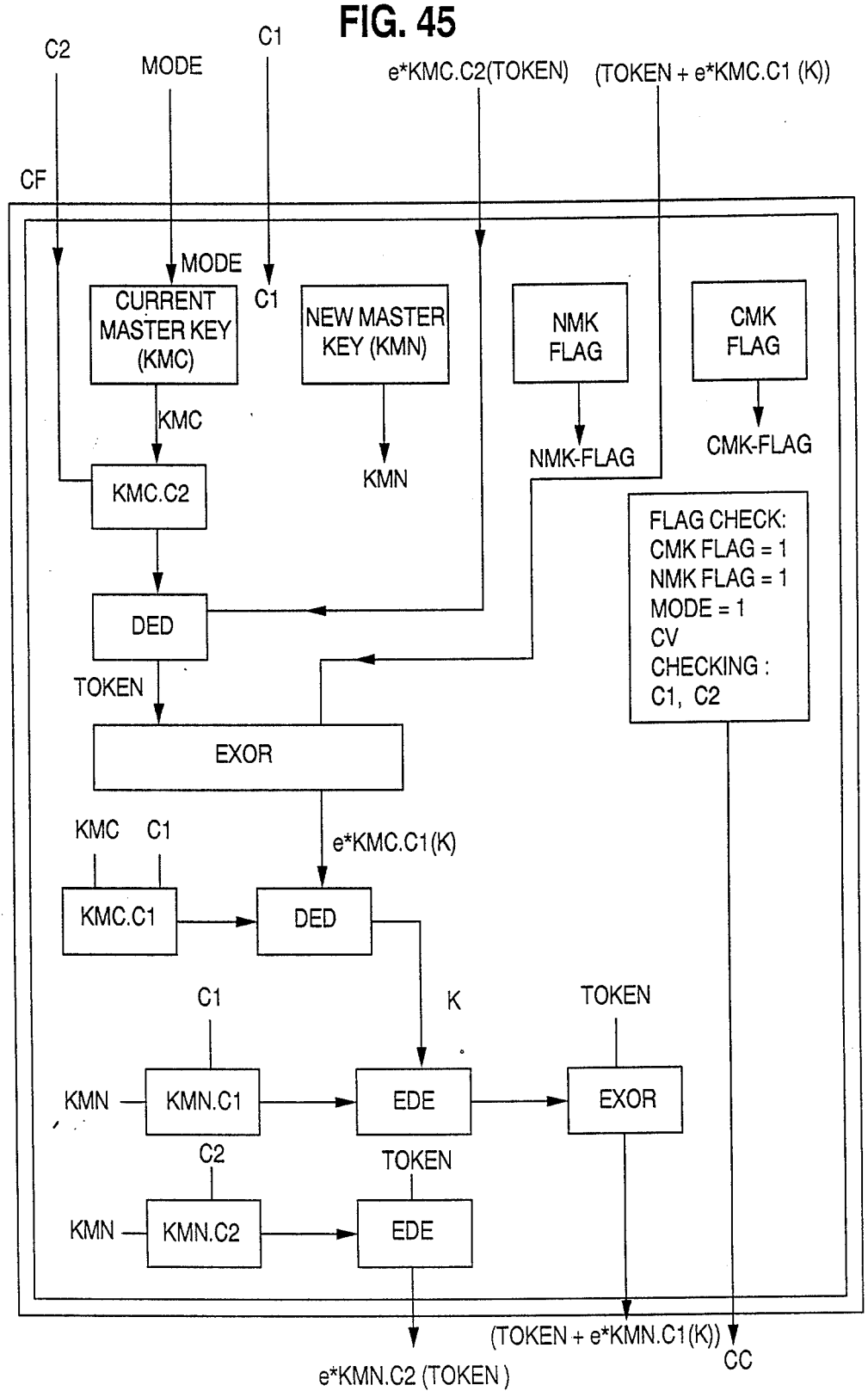
FIG. 45 shows the Block Diagram for Mode 1 (Token Mode) of the Reencipher to New Master Key instruction.

FIG. 44 and FIG. 45 are block diagrams for this instruction.

CC:
1. successful operation
2. NMK flag not set, illegal sequence
3. CMK flag not set, illegal sequence
4. C1 is invalid
5. C2 is invalid
6. unsuccessful operation (error).

CONTROL VECTOR CHECKING:

1. Checking on C1 if mode=0.
reserved (48:63)=X'0'
2. Checking on C2 if mode=1.
cv type ="token"
reserved (48:63) =X'0'

REENCIPHER TO CURRENT MASTER KEY (RTCMK)

EQUATION: KEY-MODE mode, e*KMO.C1(K), C1—e*KMC.C1(K)

EQUATION: TOKEN-MODE mode, (token+e*KMO.C1(K)),e*KMO.C2(token), C1, C2— (token+e*KMC.C1(K)),e*KMC.C2(token)

INPUTS:

NMK flag must be reset in the CF. This instruction preserves the current master key and new master key in their respective registers in the crypto facility.

CFAP in the crypto subsystem must be aware of the usage of RTNMK and RTCMK instructions and the level of the master key. Only one level previous to the master key can be optionally maintained in the CF to solve the old master key problem and the CFAP has to keep track of the keys encrypted under the old master key and the current master key.

RTCMK instruction is an optional instruction which can be implemented only if one wants to do RTCMK after the cutover point of the new master key.

If OMK and CMK flags are not set and NMK flag not reset then the operation must be aborted.

The RTCMK instruction can also be used to reencipher a token and a special value associated with the token in one atomic operation. The special value is an exclusive or of a token and the encrypted data key. The data keys are stored on DKDS as this special value and the encrypted value of the token is also stored as a secret quantity. The encrypted token value can only be decrypted internal to the RTNMK or RTCMK instructions in the crypto facility. There is no other capability of decrypting the token in the CA. The token value is encrypted using EMK and the token is associated with a special control vector. The control vector checking is performed in EMK and RTCMK to ensure the token's security in the system.

Figure 46:
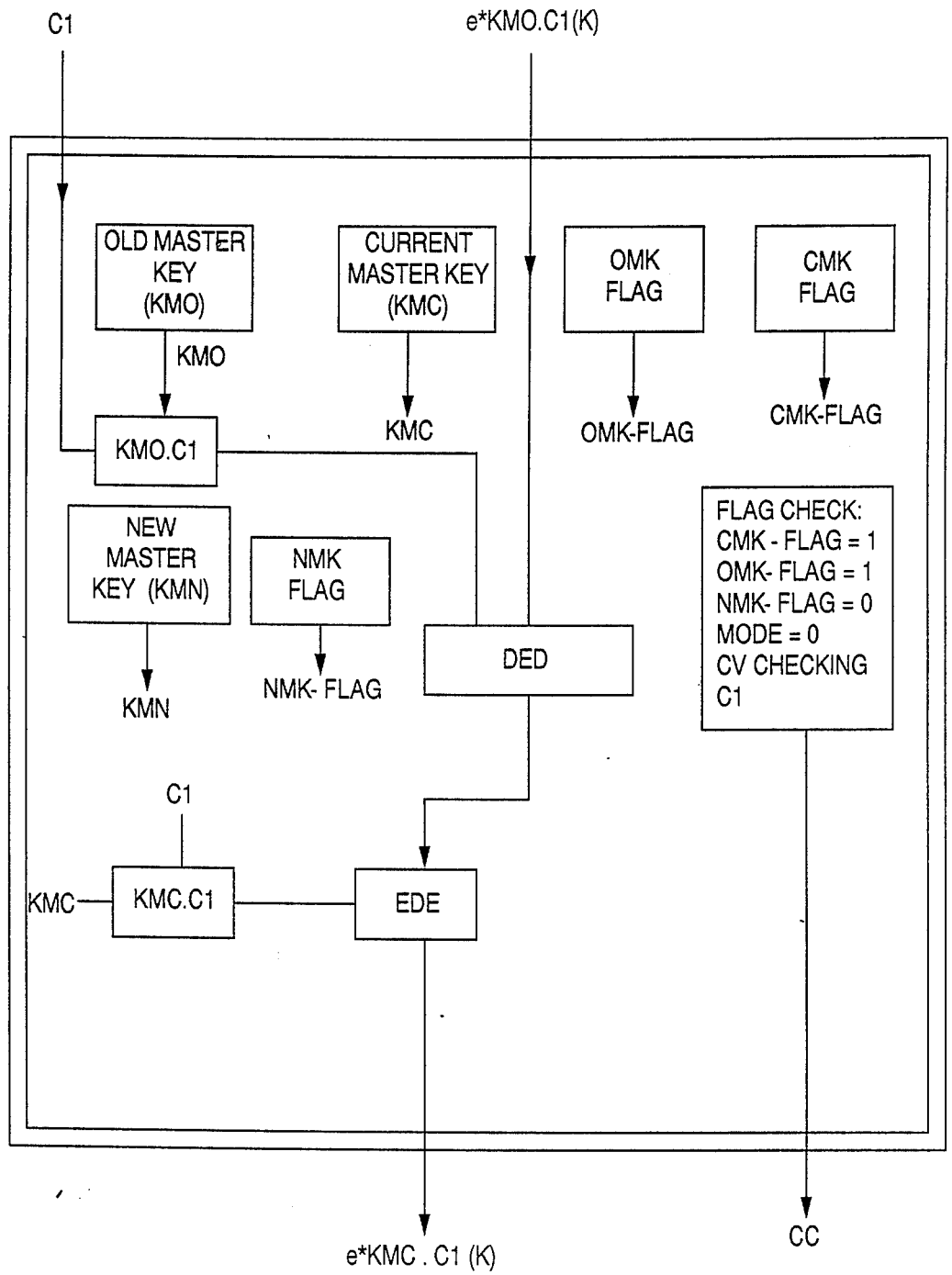
FIG. 46 shows the Block Diagram for Mode 0 (Key Mode) of the Reencipher to Current Master Key instruction.
Figure 47:
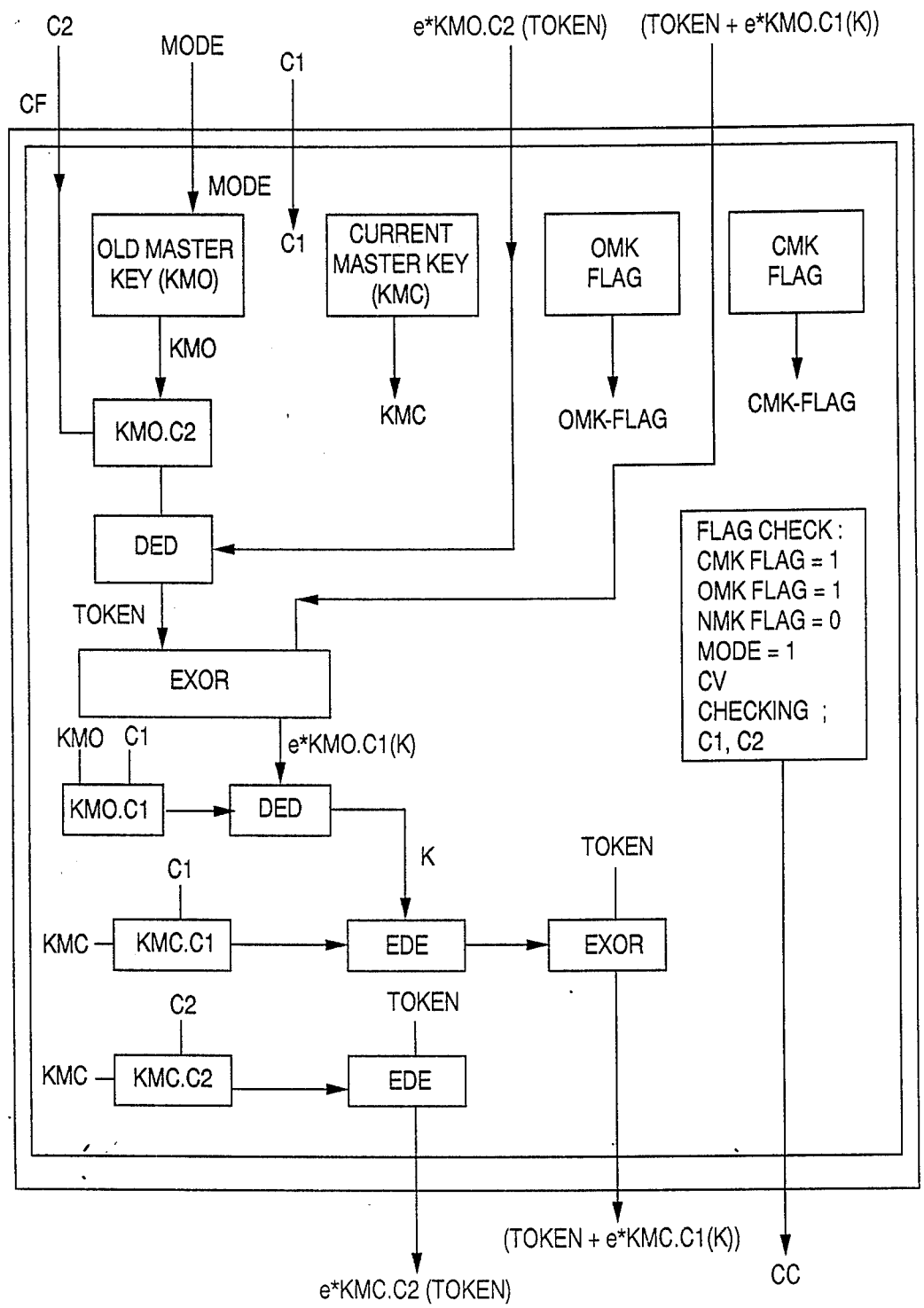
FIG. 47 shows the Block Diagram for Mode 1 (Token Mode) of the Reencipher to Current Master Key instruction.

FIG. 46 and FIG. 47 are block diagrams for this instruction.

CC:

| INPUTS: | |
|---|---|
| mode | indicates the RTCMK mode as follows:<br>0: KEY-MODE<br>1: TOKEN-MODE |
| e*KMO.C1(K) | K is a 64 bit key, triple encrypted under the old master key with a control vector C1. |
| C1 | is a control vector for the 64 bit key K. |
| (token + e*KMO.C1(K)) | is a 64 bit quantity, which is a special quantity stored on DKDS ('+' operation is an exclusive or). CFAP generates this quantity and stores it on DKDS. This input is valid for mode = 1. |
| e*KMO.C2(token) | is a 64 bit token encrypted under the old master key with a control vector C2 (This is generated using EMK instruction). This input is valid for mode = 1. |
| C2 | is a control vector for the 64 bit token. This input is valid for mode = 1. |
| OUTPUTS: | |
| e*KMC.C1(K) | K is a 64 bit key triple encrypted under the current master key with a control vector C1. |
| (token + e*KMC.C1(K)) | This is a special quantity generated under the current master key which can be stored on DKDS. This output is valid only for mode = 1. |
| e*KMC.C2(token) | This is a token reenciphered under the current master key with a control vector C2. This output is valid only for mode = 1. |

DESCRIPTION: The RTCMK instruction causes a 64 bit encrypted key to be decrypted under the old master key and reencrypted with a current master key.

RTCMK instruction is used to reencipher the keys in the system which were encrypted under the old master key and since then the master key has been changed. That is, the NMK flag is not set and SMK instruction has been already executed. The current master key is the new master key for the keys which were not translated using RTNMK. In order the execute this instruction, the CMK flag and OMK flags must be set and the 1. successful operation
2. OMK flag not set, illegal sequence
3. CMK flag not set, illegal sequence
4. NMK flag not reset, illegal sequence
5. C1 is invalid
6. C2 is invalid
7. unsuccessful operation (error).

CONTROL VECTOR CHECKING:

1. Checking on C1 if mode =0.

reserved (48:63)=X'0'
2. Checking on C2 if mode=1.
cv type ="token"
reserved (48:63) =X'0'

SET MASTER KEY (SMK)

EQUATION:

()

INPUTS: None
OUTPUTS: None
DESCRIPTION: The SMK instruction cause the following:
1. (old master key=current master key)
2. (old master key flag=1)
3. current master key=new master key
4. current master key flag=1
5. new master key flag=0.

This instruction must only execute in "super secure" mode, i.e., the physical key position must be in "super secure" position an in the crypto facility super secure flag must be set to execute this instruction. The left and right parts of the master key is checked for non equality from the new master key register and operation must be aborted if the two parts are equal.

After SMK is executed in the CF, the CF from now on will use the new master key for all the crypto operations. The cutover point is in effect after execution of this instruction. If there are more keys in the system which are encrypted under the old master key, then the optional instruction RTCMK is the only way to reencipher the keys.

If NM flag is not set in the CF, the operation must be aborted.
CC:
1. successful operation
2. NMK flag not set
3. left and right parts are equal
4. super secure flag not set, invalid sequence
5. unsuccessful operation (error).

MDCOP (MDC OPERATION)

DESCRIPTION: It is within the skill of the art to provide an instruction which calculates a Modification Detection Code (MDC) as described in copending patent application entitled "Data Authentication Using Modification Detection Codes Based on a Public One-Way Encryption Function," by B. 0. Brachtl, et al., Ser. No. 90,633, filed Aug. 23, 1987, and assigned to IBM Corporation, and incorporated herein by reference.

CLEAR CRYPTO FACILITY (CLRCF)

EQUATION:

()

INPUTS: None
OUTPUTS: None
DESCRIPTION: Crypto facility (CF) registers, flags and all the local memory are cleared. This function can be used to clear the master keys and flags if the master key is compromised. If the master keys flags are reset, the intruder cannot execute RTNMK or RTCMK to translate the keys from the compromised key to his own master key.

This function may be implemented under the control of a physical key or as a privileged instruction, depending on the degree of protection desired to prevent loss of service from unauthorized users.
CC:
1. successful operation
2. unsuccessful operation (error).

CLEAR KEY PART REGISTER (CLRKPR)

EQUATION:

()

INPUTS: None
OUTPUTS: None
DESCRIPTION: This instruction clears the key part register in the crypto facility (CF). This instruction may be used to clear an erroneous or compromised entry in the key part register. CLRKPR permits clearing the key part register without disrupting the entire CF; however, CLRCF instruction may also be used. It is up to the implementer how he chooses to implement the instructions CLRCF and CLRKPR; for example, there could be a single instruction which can selectively reset a CF register. A given implementation may use a physical key or as a privileged instruction, depending on the degree of protection desired to prevent loss of service from unauthorized users.
CC:
1. successful operation
2. unsuccessful operation (error).

CLEAR NMK REGISTER (CLRNMK)

EQUATION ()

INPUTS: None
OUTPUTS: None
DESCRIPTION: This instruction clears the NMK register in the crypto facility (CF). If the NMK entered erroneously into the CF or the NMK is compromised then this instruction can be used. Clear crypto facility instruction is too general to use and thus this instruction can be used to clear a new master key register. It is up to the implementer how he chooses to implement the instructions like CLRCF CLRKPR and CLRNMK, for example, there could be a single instruction which can selectively reset a CF register. A given implementation may use a physical key or as a privileged instruction, depending on the degree of protection desired to prevent loss of service from unauthorized users.
CC:
1. successful operation
2. unsuccessful operation (error).

LOWER CV AUTHORITY (LCVA)

EQUATION:

e*KM.C1(K),C1,C2—e*KM.C2(K)

INPUTS:

| INPUTS: | |
|---|---|
| e*KM.C1(K) | K is a 64 bit key, triple encrypted under the master key with a control vector C1. |

| | |
|---|---|
| C1 | 64 bit input control vector. |
| C2 | 64 bit output control vector. |
| OUTPUTS: | |
| e*KM.C2(K) | K is a 64 bit key triple encrypted under KM with a 64 bit control vector C2. |
| DESCRIPTION: | LCVA is a control vector instruction is architected for lowering authority on the export control field in the CV. |

CC:
1. successful operation
2. C1 or C2 is invalid
3. unsuccessful operation (error).

CONTROL VECTOR CHECKING:

1. Checking on C1 and C2.
cv type(C1) = cv type(C2)
reserved (48:63)(C1) = reserved (48:63)(C2) = X'0'
Usage bits for KEKs (C1) = Usage bits for KEKs (C2)
Usage bits for PIN keys(C1) = Usage bits for PIN keys(C2)
Export Control Bits:
export control bit 1 (C2) = 1 (no further RFMK)

LOAD FIRST MASTER KEY PART (LFMKP)

EQUATION:

| | |
|---|---|
| 0 ====== | Content of the KP register is transferred to the NMK register Flag(NMK Reg) = "partially full" and flag(KP Reg) = "Empty". |

DESCRIPTION: This instruction loads the first part of the master key stored in the Key Part register into the NMK (New Master Key) register. Also, the flag of the NMK Reg is set to "partially full" state (from the "empty" state) to indicate that the NMK Register is not complete, and the content of the Key Part register is set to "Empty" state (from the "full" state) to indicate that the Key Part register is now empty. This operation is performed only if the Key Part register is now in the "full" state and the NMK register is in the "empty" state.

NOTE: It is assumed that prior to the execution of this instruction, the first master key part has been brought into the Key Part register by a key-entry device (such as a key pad) or a key board, with a triggering button (e.g., "Enter key"). (The triggering button is usually employed to initiate the action of loading the value of the key entered via the key pad or key board into the Key Part register).

The following additional feature is optional, can be implemented on systems that have physical key(s):

For this instruction to be carried out, beside the requirement on the flags of the registers as mentioned above, the key switch position is sensed and it must be in an appropriate position (e.g., first master key part enable).

CC:
1. successful operation
2. CKP1 is not valid
3. unsuccessful operation (error).

CONTROL VECTOR CHECKING:

None

COMBINE MASTER KEY PARTS (CMKP)

EQUATION:

| | |
|---|---|
| mode ====== | Content of NMK = (Content of NMK Reg) XOR (Content of KP Reg), flag(KP Reg) = "Empty" and flag(NMK) = "Partially full" if mode=0 or flag(NMK) = "full" if mode 1. |

Where mode is the input of the instruction, indicating whether the master key part to be combined is the last key part or not.

If mode=0 then the master key part to be combined is not the last key part, and more key parts are expected to be combined later to form the complete master key.

If mode=1 then the master key part to be combined is the last key part, and the complete new master key is to be formed in the NMK reg after the execution of this instruction.

DESCRIPTION: This instruction XORs the jth master key part KPj stored in the Key Part register with other Key Part(s) stored in the NMK register, and stores the result in the NMK register.

The instruction also:

Sets the flag of KP Reg to the "Empty" state (from the "full" state)

Sets the flag of the NMK Reg to the "full" state if mode=1, or to the "partially full" state if mode=0.

This instruction is performed only if the Key Part register is in the "full" state and the NMK register is in the "partially full" state.

Note: It is assumed that prior to the execution of this instruction, the master key part KPj has been brought into the Key Part register by a key-entry device (such as a key pad) or a key board, with a triggering button (e.g., "Enter key"). (The triggering button is usually employed to initiate the action of loading the value of the key entered via the key pad or key board into the Key Part register).

The use of this instruction and the Load first master key part instruction in the installation of a master key of multiple parts (e.g., a master key KM may have n parts KM1, KM2, ... KMn such that KM=KM1 XOR KM2 ... XOR KMn) is described in the key installation procedures of the Key management section.

The following additional feature is optional, can be implemented on systems that have physical key(s):

For this instruction to be carried out, beside the requirement on the flags of the registers as mentioned above, the key switch position is sensed and it must be in an appropriate position (e.g., second master key part enable position).

CC:
1. successful operation
2. Ckp1 or Ckp2 or Ckek is not valid.

3. unsuccessful operation (error).

CONTROL VECTOR CHECKING:

None.

LOAD FIRST KEY PART (LFKP)

DESCRIPTION: This instruction encrypts the first key part of a key that has been stored in the Key Part register. The encrypted key part is then stored in the key storage by CFAP for later retrieval and combining (by the Combine Key Part instruction) with other key parts of the key. Execution of this instruction also sets the flag of the Key Part register from the "full" state to the "empty" state.

For this operation to be carried out, the Key Part register must be in the "full" state.

COMBINE KEY PARTS (CKP)

DESCRIPTION: The Combine Key Part instruction combines a key part stored in the Key Part register with the previous key part of a key. The combining of the key parts are done by XORing them together. Execution of this instruction also sets the flag of the Key Part register to the "empty" state (from the full state).

This instruction is carried out only if the flag of the Key Part register is in the "full" state.

COMPUTE VERIFICATION PATTERN (CVP)

DESCRIPTION: The CVP instruction computes a verification pattern on a given key K. The verification pattern may be used to verify if a manually installed key is entered correctly. Details of the instruction are outside the scope of the invention.

ANSI GENERATE ERROR DETECTION CODE (AGEDC)

EQUATION:

$$A ==== EDC$$

INPUTS:

A Data for which Error Detection Code is to be generated.

OUTPUTS:

ECC 64 bit Error Detection Code computed for the data specified by A.

DESCRIPTION: Error Detection Codes are used in ANSI X9.17-1985 to detect transmission errors or process errors when other means (such as authentication under a secret key) is unavailable. The EDC is generated using the authentication technique (MAC) defined in ANSI X9.9-1982 and a fixed, non-secret key KDX=X'0123456789ABCDEF'.

AGEDC may be simulated in CFAP using the ENCODE instruction and the clear value KDX. This instruction should NOT be simulated using other CA instructions (e.g., GMAC or ENCIPHER) with a pre-computed form of KDX encrypted under the master key (since it represents a known value encrypted under the master key).

ANSI VERIFY ERROR DETECTION CODE (AVEDC)

EQUATION:

$$A, EDC ==== yes/no$$

INPUTS:

| INPUTS: | |
|---|---|
| A | Data to be verified against supplied Error Detection Code. |
| EDC | 64 bit Error Detection Code to be verified for the data specified by A. |
| OUTPUTS: | |
| yes/no | indicates that the Error Detection Code computed on data specified by A matches the supplied EDC. |

DESCRIPTION: Error Detection Codes are used in ANSI X9.17-1985 to detect transmission errors or process errors when other means (such as authentication under a secret key) is unavailable. The EDC is generated using the authentication technique (MAC) defined in ANSI X9.9-1982 and a fixed, non-secret key KDX=X'0123456789ABCDEF'.

AVEDC may be simulated in CFAP using the ENCODE instruction and the clear value KDX. This instruction should NOT be simulated using other CA instructions (e.g., GMAC or VMAC) with a pre-computed form of KDX encrypted under the master key (since it represents a known value encrypted under the master key).

ANSI CREATE PARTIAL NOTARIZING KEY (APNOTR)

EQUATION:

mode,e*KM.C1L(KK1),e*KM.C1R(KKr), FMID, TOID, C1L,C1R, C2L,C2R
==== e*KM.C2L(KKNIL),e*KM.C2R(KKNIR)

INPUTS:

| INPUTS: | |
|---|---|
| mode | indicates whether the input *KK = KK1 // KKr is a replicated 64 bit (i.e., KK1 = KKr) or true 128 bit KEK.<br>0: true 128 bit KEK<br>1: replicated 64 bit KEK<br>The algorithm for creating partial notarizing keys differs slightly for 64 bit KEKs and 128 bit KEKs (see "Notarization Algorithms"). The Mode parameter selects the correct algorithm since the correct choice cannot be inferred from the input KEK itself (i.e., both 64 bit KEKs and 128 bit KEKs are input as 128 bits.) |
| e*KM.C1L(KK1) | 64 bit KK1 encrypted under the master key with a control vector C1L. KK1 is the left part of a 128 bit key encrypting key *KK. |
| e*KM.C1R(KKr) | 64 bit KKr encrypted under the master key with a control vector C1R. KKr is the right part of a 128 bit key encrypting key *KK. |
| | NOTE: In CA, all KEKs (including ANSI KEKs) are stored |

|  | -continued |
|---|---|
|  | in 128 bit form, as left and right 64 bit parts. (64 bit KEks are replicated to form 128 bits. In this case, the left and right parts are equal.) The left part of the *KK is encrypted under the master key with a left control vector and stored on CKDS. Similarly, the right part of the *KK is encrypted under the master key with a right control vector and stored on CKDS. Key form bits in the control vector differentiate between left and right parts and between 64 or 128 bits KEKs. |
| FMID | 16 ASCII characters as defined in ANSI X3.4-1977. This is a "from" node ID which is used as a notarization parameter. If the ID is not 16 characters then the ID must be repeated until 16 characters are formed as described in Section 7.5 of ANSI X9.17-1985, "Notarization of Keys." (See "References"). |
| TOID | 16 ASCII characters as defined in ANSI X3.4-1977. This is a "to" node ID which is used as a notarization parameter. If the ID is not 16 characters then the ID must be repeated until 16 characters are formed as described in Section 7.5 of ANSI X9.17-1985, "Notarization of Keys." (See "References"). |
| C1L,C1R | 64 bit control vectors for left and right part of *KK respectively. |
| C2L,C2R | 64 bit control vectors for left and right part of *KKNI respectively. |
| OUTPUTS: | |
| e*KM.C2L(KKNIL) | 64 bit KKNIL encrypted under the master key with a control vector C2L. This is the left part of 128 bit *KKNI which is a partial, or Intermediate, Notarizing form of the input KEK, *KK. A 'partial' notarizing key is a notarizing key which has not been offset. Offsetting must be performed on *KKNI prior to using it as a notarizing key for the import or export of notarized keys. Offsetting is implicitly performed by ARTMK, ARFMK, and AXLTKEY. |
| e*KM.C2R(KKNIR) | 64 bit KKNIR encrypted under the master key with a control vector C2R. This is the right part of 128 bit *KKNI which is a partial notarizing form of the input KEK, *KK. NOTE: All KEKs and partial notarizing KEKs are stored in 128 bit form in CA. |

DESCRIPTION: ANSI Notarization is a method for sealing keys with the identities of the communicating pair, that is, the sender the receiver of the keys. Once notarized, keys can only be recovered with knowledge of the original key encrypting key and the identities of the communicating pair. A data key or key encrypting key may be notarized before transmission by encrypting using a Notarizing Key (*)KN.

In ANSI, (*)KN is formed by exclusive-ORing a KEK (*)KK with a notary seal NS, which is composed of the identity of the key sender, the identity of the intended key recipient, and the current value of a key-message counter associated with (*)KK. Note that the (*)KN must be recomputed for each transmission, since the counter value is a dynamic quantity, i.e., it increments with each use of (*)KK.

In CA, the process of forming (*)KN has been divided into two separate steps. APNOTR is called first to compute an intermediate form of (*)KN, denoted *KKNI, which is based just on the static quantities of NS, namely the identity of the sender, the identity of the intended recipient, and (*)KK itself. The final step, known as Offsetting, combines *KKNI and the current counter value associated with (*)KK to form (*)KN. The reason for splitting the formation of (*)KN in CA into two steps is two-fold:

1. Efficiency. Since (*)KN is composed of three static quantities (the two pair identities and (*)KK itself) and only one dynamic quantity (the counter associated with (*)KK) there is no need to recompute (*)KN completely every time the (*)KK-counter is updated. The process of forming (*)KN can therefore be divided into a one-time event using the static quantities and a simpler, repeated event using the dynamic quantity.

2. Transparency. In ANSI, ALL KEKs must be offset prior to using them to encrypt a key (KD or (*)KK) for transmission, whether notarization is used or not. Thus, offsetting was included as an implicit operation in all CA ANSI instructions which use a KEK to encrypt or decrypt another key, namely ARTMK, ARFMK, and AXLTKEY. By dividing the (*)KN formulation in the prescribed manner, notarization becomes transparent to the instructions ARTMK, ARFMK, and AXLTKEY.

APNOTR is used to generate a partial notarizing key *KKNI for a given KEK. Partial notarizing keys are used whenever a notarized key (KD or (*)KK) is to be imported via ARTMK, translated via AXLTKEY, or exported via ARFMK. For example, suppose a data key DK1 is to be translated from encryption under an offset KEK, *KK1, to encryption under the notarizing form of another KEK, *KK2. APNOTR is called with *KK2 and the identities of the caller and the intended recipient to create *KKN11, the partial notarizing form of *KK2. *KK1 and *KKNI2 are then passed to AXLTKEY as the input and output KEKs, respectively. AXLTKEY offsets *KK1 and *KKNI2 with their respective counter values and uses the resulting KEKs to recover KD1 internally and reencipher it for output. (Note that APNOTR need only be called once for *KK2; *KKNI2 could be saved on CKDS (Key Storage) for subsequent use whenever notarization is desired. However, it is up to the implementer whether APNOTR is done dynamically or once for each (*)KK with this key management approach.) Using this same example, if notarization under *KK2 had not been required, *KK1 and *KK2 could have been passed directly to AXLTKEY for offsetting, recover, and reencipherment of KD1.

Offsetting is always implied in the use of all ANSI KEKs so the offset function is imbedded in the hardware and implicitly performed by the ARTMK, ARFMK, and AXLTKEY instructions in the crypto facility. This method avoids a separate instruction for Offset and facilitates the transparency of notarizing keys to these functions. APNOTR was designed to improve notarization performance assuming that there is a separate (*)KK shared between each pair of communicating nodes and the node IDs do not change.

Figure 48:
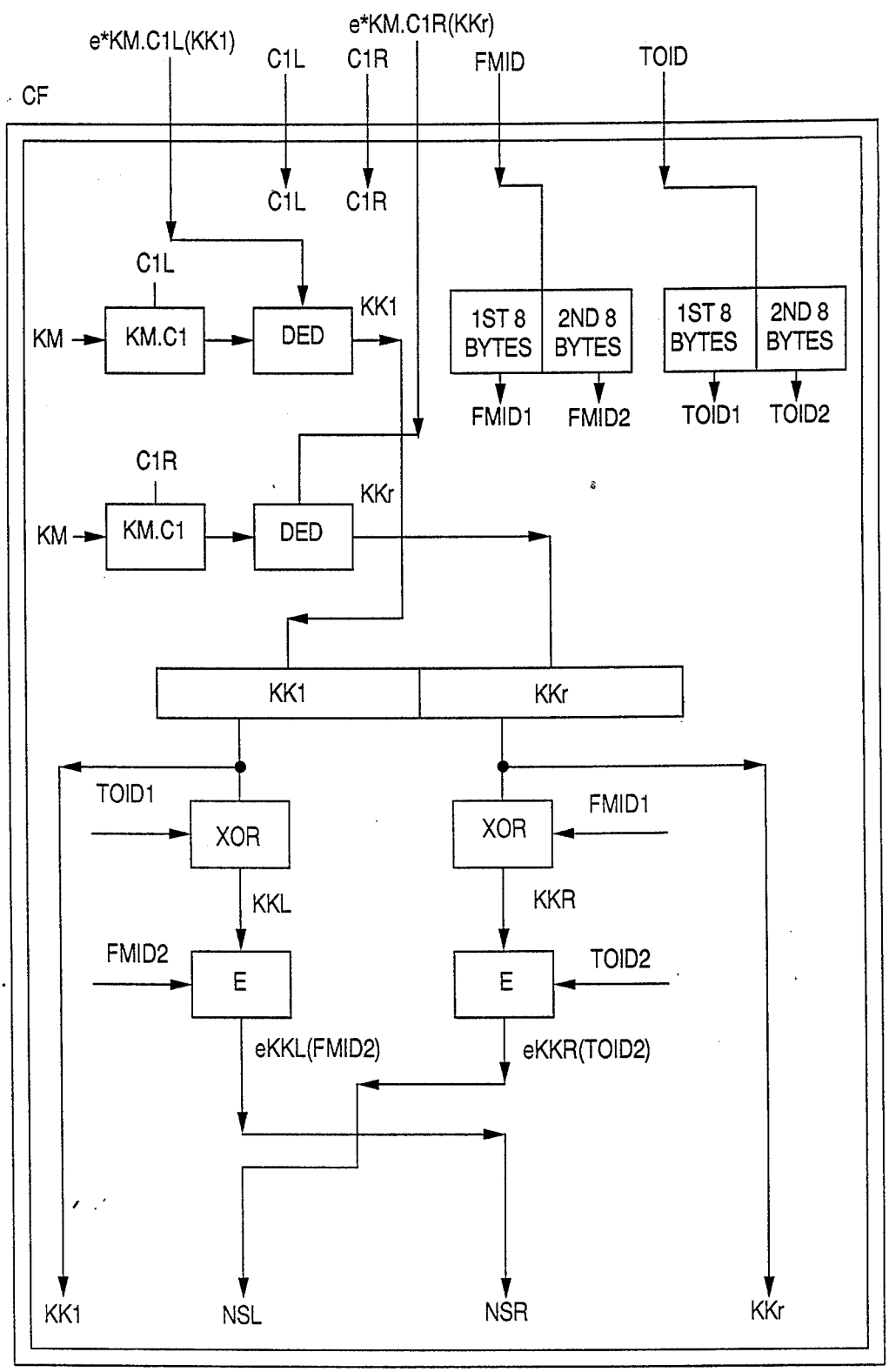
FIG. 48 and FIG. 49 show the Block Diagram of the ANSI Create Partial Notarizing Key instruction.
Figure 49:
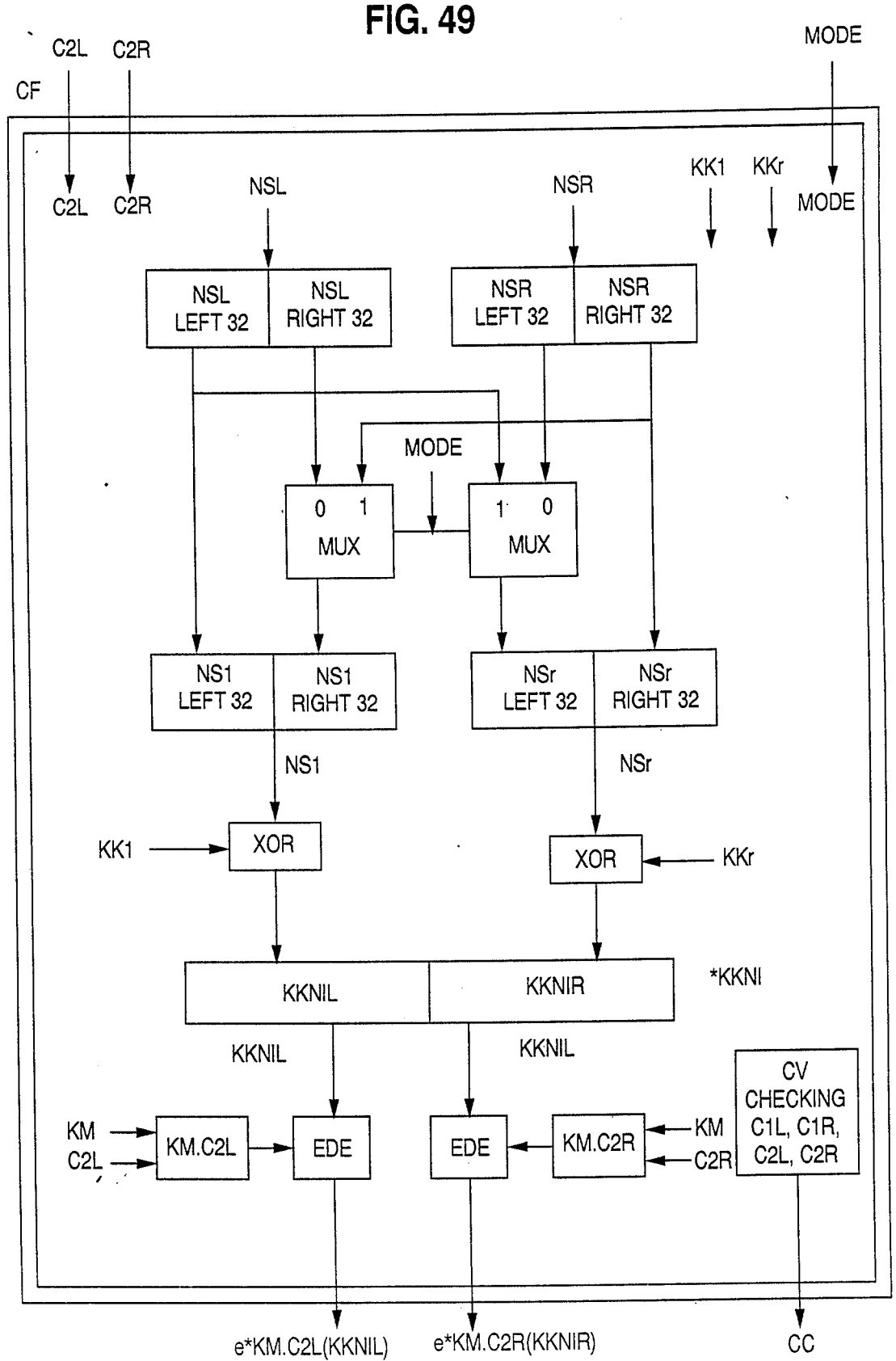

The partial notarizing key formation algorithm is shown in FIG. 48 and FIG. 49. The algorithm was designed to exploit the steps in common between the separate algorithms for single length and double length KEKs. If the input KEK and output partial notarizing KEK are treated as 128 bits, then the only difference is in the formation of the quantities NS1 and NSr, which are exclusive-ORed with the input KEK to form *KKNI. The Mode parameter, which indicates the actual key size of the input KEK, controls the formation of NS1 and NSr. A MUX, under the control of Mode, selects one of two 32 bit inputs to use in forming the right half of NS1. Likewise a MUX selects one of two inputs to use in forming the left half of NSr. The selection process is shown in FIG. 49. Use of the Mode parameter and MUXs permits the formation of a *KKNI which is independent of the actual key size of the input *KK, is equivalent to the notarizing key defined in ANSI X9.17 (after offsetting), and is storage compatible with other CA ANSI KEKs.

The input to APNOTR is always a 128 bit KEK; the output is always 128 bits. If APNOTR is passed a replicated 64 bit KEK, then the Mode parameter must be set to 1, and APNOTR returns a replicated 64 bit partial notarizing KEK on output. The Key Form fields of C1L, C1R, C2L, and C2R must be consistent with the value of the passed Mode parameter (see CV Checking below). Partial notarizing keys cannot be re-input to APNOTR. This aspect of the key management design is enforced via the hardware checking on control vectors C1L, C1R, C2L, and C2R, left 64 bits and right 64 bits of *KKNI, and is invoked once to create a partial notarizing key. This is in contrast to other CA functions which require an invocation for each 64 bit part of a 128 bit KEK.

CC:
1. successful operation
2. C1L or C1R is invalid
3. C2L or C2R is invalid
4. unsuccessful operation (error).

CONTROL VECTOR CHECKING:

1. Checking on C1L:
cv type = "KEK/ANSI"
APNOTR Usage bit = '1'
key form (C1L) = key form (C2L)
reserved (48:63) = X'0'
2 Checking on C1R:
cv type = "EK/ANSI"
APNOTR Usage bit = '1'
key form (C1R) = key form (C2R)
reserved (48:63) = X'0'
3. Checking of C2L:
cv type = "EK/ANSI"
APNOTR Usage bit = '0'
reserved (48:63) = X'0'
4. Checking on C2R:
cv type = "KEK/ANSI"
APNOTR Usage bit = '0'
reserved (48:63) = X'0'

ANSI REENCIPHER FROM MASTER KEY (ARFMK)

EQUATION:

---

EQUATION:
e*KM.C1L(KKL),e*KM.C1R(KKR),
e*KM.C2(K),cntr, key-type, C1L,C1R,C2,(C3)
=====    e*KKo(K), e*KM.C3(K) (key-type = 0, data key)
          or
          e*KKo(K)    (key-type = 1, KEK)

INPUTS:

e*KM.C1L(KKL)    left 64 bits of *KK, denoted KKL, encrypted under the master key with a control vector C1L. *KK is a 128 bit key encrypting key or partial notarizing key.

e*KM.C1R(KKR)    right 64 bits of *KK, denoted KKR, encrypted under the master key with a control vector C1R. *KK is a 128 bit key encrypting key or partial notarizing key.
NOTE: In CA, all KEKs (including ANSI KEKs) are stored in 128 bit form, as left and right 64 bit parts. (64 bit KEKs are replicated to form 128 bits. In this case, the left and right parts are equal.) The left part of the *KK is encrypted under the master key with a left control vector and stored on CKDS. Similarly, the right part of the *KK is encrypted under the master key with a right control vector and stored on CKDS. Key form bits in the control vector differentiate between left and right parts and between 64 or 128 bit KEKs.

e*KM.C2(K)    64 bit ANSI key K to be exported; K is triple encrypted under the master key with a control vector C2. This key can be a data key, a 64 bit key encrypting key, or the left or right half of a 128 bit key encrypting key.

cntr    64 bit clear send-counter value associated with key encrypting key *KK. This value is ordinarily transmitted along with the exported key to the intended recipient. The recipient uses the received counter to detect replay, to synchronize its local receive-counter for *KK, and to

|  |  |
|---|---|
|  | recover the exported key. Local counters are maintained by the CFAP with integrity. |
| key-type | specifies the type of key to be exported. NOTE: For a data key the encrypted output of ARFMK is in two forms. One form of output is for export to the intended recipient; the key is encrypted under an offset form of the specified key encrypting key. The other form can either be used directly to MAC CSMs (in the case where a single KD is to be exported) or can be later combined with another such key to form a CSM MAC key (in the case where two KDs are exported at a time). ACOMBKD instruction is used to combine these 'partial' MAC keys into a CSM MAC key.<br>0: KD<br>1: KK |
| C1L,C1R | 64 bit control vectors for the left and right parts respectively of the key encrypting key or partial notarizing key *KK. |
| C2 | 64 bit control vector for the input key K. |
| C3 | 64 bit control vector for the CSM MAC key or partial CSM MAC key to be stored under KM. This input is only valid when key-type = 0. |
| OUTPUTS: |  |
| e*KKo(K) | 64 bit key K triple encrypted under key encrypting key or notarizing key *KKo, where *KKo is *KK offset with cntr. If *KK is a partial notarizing key, denoted *KKNI, then *KKo is a notarizing key, denoted *KN, and K is said to be 'notarized.' |
| e*KM.C3(K) | 64 bit data key K triple encrypted under the master key KM with a control vector C3. This output is valid only for key-type - 0 and is either used directly to MAC CSMs or is combined via ACOMBKD with another such key to MAC CSMs. |
| cntr | 64 bit clear send-counter value associated with key encrypting key *KK. This value is ordinarily transmitted along with the exported key to the intended recipient. The recipient uses the received counter to detect replay, to synchronize its local receive-counter for *KK, and to recover the exported key. Local counters are maintained by the CFAP with integrity. |
| key-type | specifies the type of key to be exported. NOTE: For a data key the encrypted output of ARFMK is in two forms. One form of output is for export to the intended recipient; the key is encrypted under an offset form of the specified key encrypting key. The other form can either be used directly to MAC CSMs (in the case where a single KD is to be exported) or can be later combined with another such key to form a CSM MAC key (in the case where two KDs are exported at a time). ACOMBKD instruction is used to combine these 'partial' MAC keys into a CSM MAC key.<br>0: KD<br>1: KK |
| C1L,C1R | 64 bit control vectors for the left and right parts respectively of the key encrypting key or partial notarizing key *KK. |
| C2 | 64 bit control vector for the input key K. |
| C3 | 64 bit control vector for the CSM MAC key or partial CSM MAC key to be stored under KM. This input is only valid when key-type = 0. |
| OUTPUTS: |  |
| e*KKo(K) | 64 bit key K triple encrypted under key encrypting key or notarizing key *KKo, where *KKo is *KK offset with cntr. If *KK is a partial notarizing key, denoted *KKNI, then *KKo is a notarizing key, denoted *KN, and K is said to be 'notarized'. |
| e*KM.C3(K) | 64 bit data key K triple encrypted under the master key KM with a control vector C3. This output is valid only for key-type = 0 and is either used directly to MAC CSMs or is combined via ACOMBKD with another such key to MAC CSMS. |

DESCRIPTION; ARFMK instruction reenciphers a 64 bit key K from encipherment under the master key to encipherment under a 128 bit or replicated 64 bit key encrypting key *KK (called the EXPORT KEY). A 128 bit key K can be exported by invoking ARFMK twice, once for each 64 bit half; however, *KK must be a true 128 bit KEK in this case. This rule is enforced by hardware (see CV checking below).

ARFMK may be used to export keys in either notarized or non-notarized form in accordance with ANSI X9.17. ANSI keys may be export in non-notarized form by invoking ARFMK with a key encrypting key shared with the intended recipient. ARFMK internally performs offsetting on the specified key encrypting key. ANSI keys may be export in notarized form by invoking ARFMN with the partial notarizing form of a key encrypting key shared with the intended recipient. ARFMK internally performs offsetting on the specified partial notarizing key to create the notarizing key. Partial notarizing keys are formed from key encrypting keys by the APNOTR instruction.

For example, let *KKab be a key encrypting key shared by nodes A and B. Let *KKNIab be a partial notarizing key formed from *KKab by invoking APNOTR. Then key K may be exported from A to B in non-notarized form by invoking ARFMK with *KKab as the key encrypting key. Key K may be exported from A to B in notarized form by invoking ARFMK with *KKNIab as the key encrypting key.

In ANSI X9.17, one or two KDs may be exported in a single CSM. If one KD is shipped, it may be ultimately used as either a privacy key or MAC key. The CSM itself is authenticated with the shipped KD. If two KDs are shipped, the first KD is a MAC key and the second is a privacy key. The CSM is authenticated with the exclusive-OR of the two KDs.

ARFMK supports CSM authentication by outputting exported data keys in two forms. The first form of the KD is for export, i.e., encrypted under an offset form of the specified key encrypting key. The second form of the KD may be used operationally to directly MAC the CSM (as in the case of a single KD above), or may be combined (exclusive-ORed) with another KD of this form to create a key to MAC the CSM. The latter usage corresponds to the case of two KDs in a single CSM. Parameter C3 controls whether the second output form is a MAC key or 'partial' MAC key. The ACOMBKD is used to combine partial MAC keys from two ARFMK invocations into a single CSM MAC key.

Figure 50:
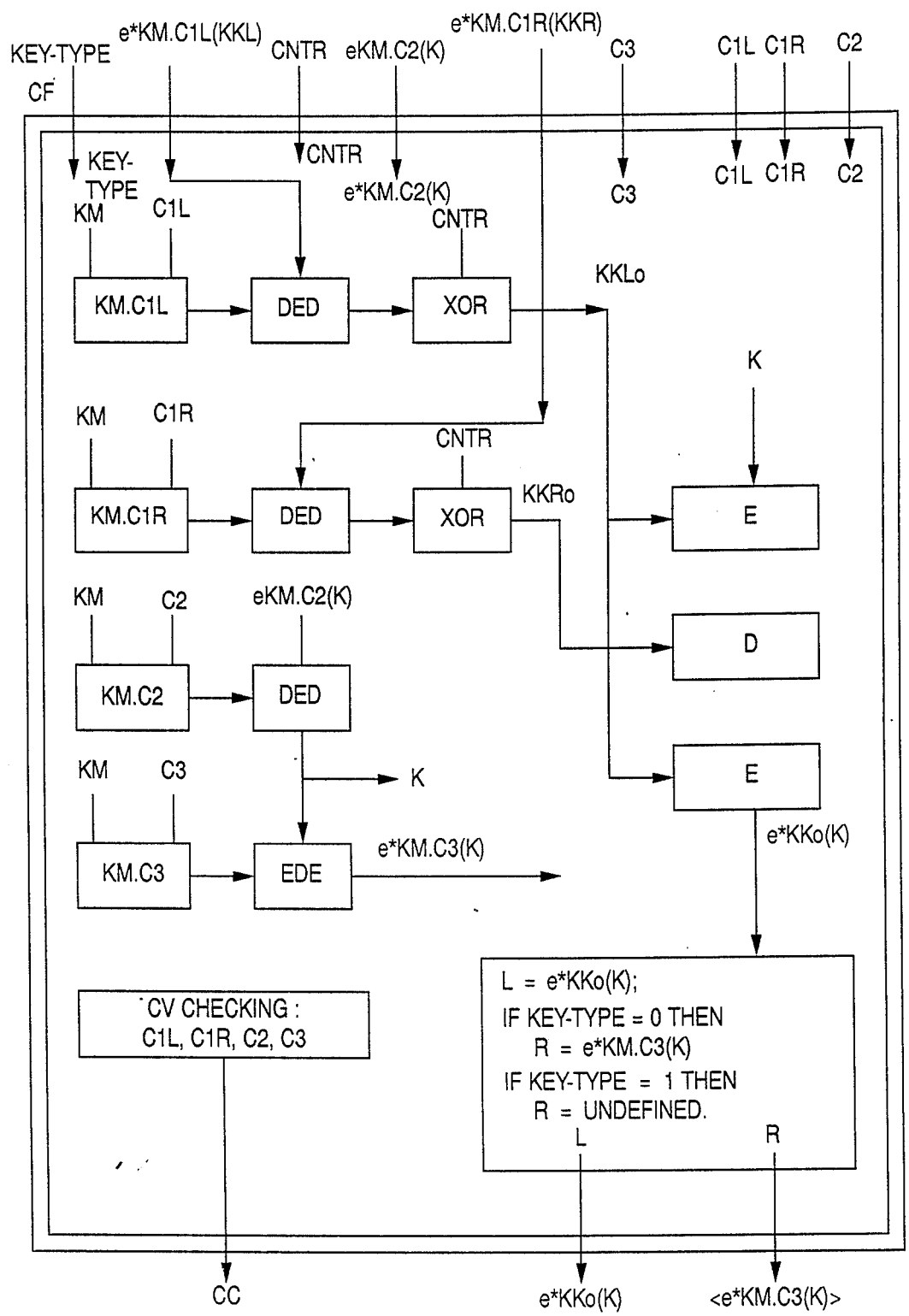
FIG. 50 shows the Block Diagram for the ANSI Reencipher From Master Key (ARFMK) instruction.

FIG. 50 shows the ARFM functional block diagram.

CC:
1. successful operation
2. C1L or C1R is invalid
3. C2 is invalid
4. unsuccessful operation (error).

CONTROL VECTOR CHECKING

1. Checking on C1L:
  cv type="KEK/ANSI"
  ARFMK Usage bit='1'
  =reserved (48:63)=X'0'
2. Checking on C1R:
  cv type="KEK/ANSI"
  ARFMK Usage bit='1'
  reserved (48:63)=X'0'
3. Checking on C2:
  cv type="KEK/ANSI? or "data/ANSI"
  export control bit 1=0 (RFMK allowed)
  If cv type="data/ANSI" then do the following checking:
   FIG. 51 shows the valid combinations of C2 attributes which must be checked. Any combination other than those in the table is cryptographically invalid and thus must not be allowed. E, D, MG, MV, ACMB are the usage bits for the data key control vector.
4. Checking on C2 & C1L,C1R:
   FIG. 52 shows the valid combinations of C2 type and Key Form versus C1L and C1R Key Form attributes. These attributes are checked to enforce left versus right half separation and to ensure that a true 128 bit KEK may only be exported under a 128 bit KEK. Any other combinations of these attributes other than those in this table are cryptographically invalid and thus must not be allowed.
4. Checking on C3:
  cv type="data/ANSI"
  reserved (48:63)=X'0'
  export control bit 1=1 (no export)
   FIG. 53 shows the valid combinations of C3 attributes which must be checked. Any combination other than those in the table is cryptographically invalid and thus must not be allowed. E, D, MG, MV, ACMB are the usage bits for the data key control vector.

ANSI REENCIPHER TO MASTER KEY (ARTNK)

EQUATION:

```
e*KM.C1L(KKL),e*KM.C1R(KKR),
e*KKo(K),cntr,key-type,C1L,C1R,C2,(C3)
 ==== e*KM.C2(K), e*KM.C3(K)   (key-type = 0, data key)
                or
       e*KM.C2(K)               (key-type = 1, KEK)
INPUTS:
```

| | |
|---|---|
| e*KM.C1L(KKL) | left 64 bits of *KK, denoted KKL, encrypted under the master key with a control vector C1L. *KK is a 128 bit key encrypting key or partial notarizing key. |
| e*KM.C1R(KKR) | right 64 bits of *KK, denoted KKR, encrypted under the master key with a control vector C1R. *KK is a 128 bit key encrypting key or partial notarizing key. NOTE: In CA, all KEKs (including ANSI KEKs) are stored in 128 bit form, as left and right 64 bit parts. (64 bit KEKs are replicated to form 128 bits. In this case, the left and right parts are equal.) The left part of the *KK is encrypted under the master key with a left control vector and stored on CKDS. Similarly, the right part of the *KK is encrypted under the master key with a right control vector and stored on CKDS. Key form bits in the control vector differentiate between left and right parts and between 64 or 128 bit KEKs. |
| e*KKo(K) | 64 bit ANSI key K to be imported; K is triple encrypted under key encrypting key or notarizing key *KKo, where *KKo is *KK offset with cntr. If *KK is a partial notarizing key, denoted *KKNI, then *KKo is a notarizing key, denoted *KN, and K is said to be notarized. Note |

| | |
|---|---|
| | that if *KK is a replicated 64 bit key, i.e. *KK = KK//KK, then e*KKo(K) is equivalent to eKKo(K), an ANSI key K singly encrypted under an offset 64 bit key. |
| cntr | 64 bit clear counter value associated with the key encrypting key *KK. This value is ordinarily supplied by the key sender and represents the counter used to offset *KK before encrypting K. Cntr should be compared with the corresponding local receive-counter for *KK in accordance with ANSI X9.17 Counter Management before invoking ARTMK to import the received key. The comparison step and ARTMK-invocation step should be performed atomically within CFAP to preserve integrity. The local counters are maintained by the CFAP with integrity. |
| key-type | specifies the type of key to be imported. NOTE: For a data key the encrypted output of ARTMK is in two usable forms. One form of output is for the ultimate usage of the imported key; it can be used as a privacy key or MAC key. The other form can either be used directly to MAC CSMs (in the case where a single KD is to be imported) or can be later combined with another such key to form a CSM MAC key (in the case where two KDs are imported at a time). ACOMBKD instruction is used to combine these 'partial' MAC keys into a CSM MAC key.<br>0: KD<br>1: KK |
| C1L,C1R | 64 bit control vectors for the left and right parts respectively of the key encrypting key or partial notarizing key *KK. |
| C2 | 64 bit control vector for the key K to be stored under KM. This control vector specifies the ultimate intended usage of the imported key K. |
| C3 | 64 bit control vector for the CSM MAC key or partial CSM MAC key to be stored under KM. This input is only valid when key-type = 0. |
| OUTPUTS: | |
| e*KM.C2(K) | 64 bit received key K triple encrypted under the master key KM with a control vector C2. |
| e*KM.C3(K) | 64 bit received data key K triple encrypted under the master key KM with a control vector C3. This output is valid only for key-type = 0 and is either used directly to MAC CSMs or is combined via ACOMBKD with another such key to MAC CSMs. |

DESCRIPTION: The ARTMK instruction reenciphers a 64 bit key K from encipherment under a 128 bit or replicated 64 bit key encrypting key *KK (called the IMPORT KEY) to encipherment under the master key. A 128 bit key K can be imported by invoking ARTMK twice, once for each 64 bit half.

ARTMK may be used to import notarized or non-notarized keys in accordance with ANSI X9.17. ANSI non-notarized keys may be imported by invoking ARTMK with a key encrypting key shared with the key sender. ARTMK internally performs offsetting on the specified key encrypting key using the specified counter value. ANSI notarized keys may be imported by invoking ARFMK with the partial notarizing form of a key encrypting key shared with the key sender. ARTMK performs offsetting on the specified partial notarizing key using the specified counter value to internally form the notarizing key. Partial notarizing keys are formed from key encrypting keys by the APNOTR instruction.

In ANSI X9.17, one or two KDs may be received in a single CSM. If one KD is received, it may be ultimately used as either a privacy key or MAC key. The CSM itself is authenticated with the received KD. If two KDs are received, the first KD is a MAC key and the second is a privacy key. The CSM is authenticated with the exclusive-OR of the two KDs.

ARTMK supports CSM authentication by outputting imported data keys in two operational forms. The first form of the KD is its ultimate usage, i.e., privacy or MAC, as specified by parameter C2. The second form of the KD may be used to directly MAC the CSM (as in the case of a single KD above), or may be combined (exclusive-ORed) with another imported KD of this form to create a key to MAC the CSM. The latter usage corresponds to the case of two KDs in a single CSM. Parameter C3 controls whether the second output form is a MAC key or 'partial' MAC key. The ACOMBKD is used to combine partial MAC keys from two ARTMK invocations into a single CSM MAC key.

Figure 54:
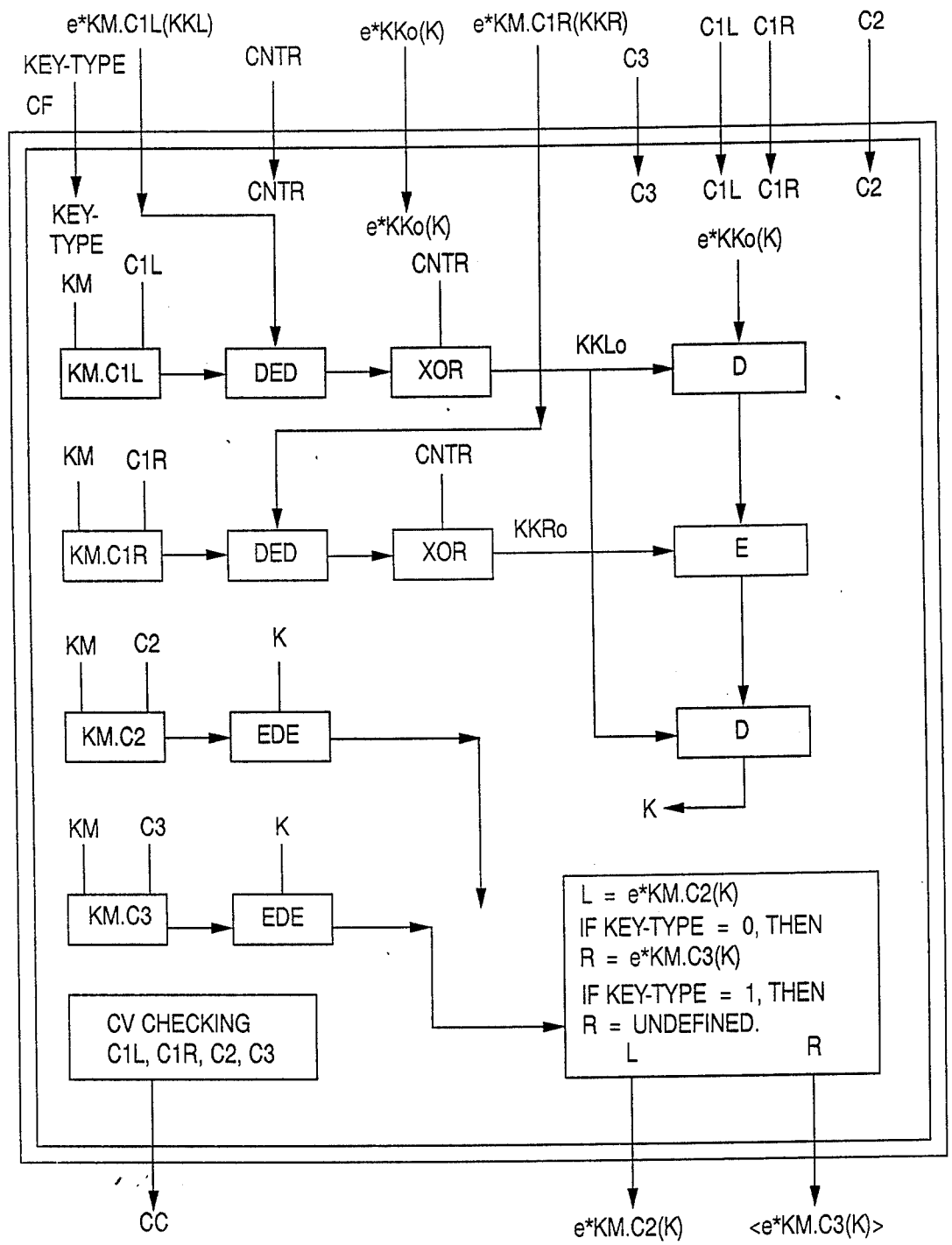
FIG. 54 shows the block diagram for the ANSI Reencipher to Master Key (ARTMK) instruction.

FIG. 54 shows the ARTMK functional block diagram.

CC:
1. successful operation
2. C1L or C1R is invalid
3. C2 is invalid
4. C3 is invalid
5. unsuccessful operation (error).

CONTROL VECTOR CHECKING

1. Checking on C1L:
cv type="KEK/ANSI"
ARTMK Usage bit='1'
reserved (48:63)=X'0'
2. Checking on C1R:
cv type="KEK/ANSI"
ARTMK Usage bit='1'
reserved (48:63)=X'0'
3. Checking on C2:
cv type="KEK/ANSI" or "data/ANSI"

ARTMK Usage bit='1'
If cv type="data/ANSI" then do the following checking:
  FIG. 55 shows the valid combinations of C2 attributes which must be checked. Any combination other than those in the table is cryptographically invalid and thus must not be allowed. E, D, MG, MV, ACMB are the usage bits for the data key control vector.
4. Checking on C2 & C1L,C1R:
  FIG. 56 shows the valid combinations of C2 type and Key Form versus C1L and C1R Key Form attributes. These attributes are checked to enforce left versus right half separation and to ensure that a true 128 bit KEK may only be imported under a 128 bit KEK. Any other combinations of these attributes other than those in this table are cryptographically invalid and thus must not be allowed.
5. Checking on C3:
  cv type="data/ANSI"
  reserved (48:63)=X'0'
  export control bit 1=1 (no export)
    FIG. 57 shows the valid combinations of C3 attributes which must be checked. Any combination other than those in the table is cryptographically invalid and thus must not be allowed. E, D, MG, MV, ACMB are the usage bits for the data key control vector.

ANSI TRANSLATE A KEY (AXLTKEY)

EQUATION:

```
e*KM.C1L(KK1L), e*KM.C1R(KK1R),
e*KM.C2L(KK2L), e*KM.C2R(KK2R),
e*KK1o((*)K), (e(*)Ko(KDmac)),
cntr1, cntr2, key-type, C1L,C1R, C2L,C2R, C3
 = = = = e*KK2o(K), e*KM.C3(K) (key-type = 0, KD)
                      or
         e*KK2o((*)K), e*KM.C3(KDmac) (key-type = 1, KEK),
```

INPUTS:

| | |
|---|---|
| e*KM.C1L(KK1L) | left 64 bits of *KK1, denoted KK1L, encrypted under the master key with a control vector C1L. *KK1 is a 128 bit KEK or partial notarizing KEK. |
| e*KM.C1R(KK1R) | right 64 bits of *KK1, denoted KK1R, encrypted under the master key with a control vector C1R. *KK1 is a 128 bit KEK or partial notarizing KEK. NOTE: *KK1 is offset with counter cntr1 to internally form *KK1o, the input key encrypting key. If the key to be translated is input in notarized form, *KK1 must be partial notarizing key, denoted *KKNI1, as created by the APNOTR instruction. *KK1o in this case is a notarizing key. |
| e*KM.C2L(KK2L) | left 64 bits of *KK2, denoted KK2L, encrypted under the master key with a control vector C2L. *KK2 is a 128 bit KEK or partial notarizing KEK. |
| e*KM.C2R(KK2R) | right 64 bits of *KK2, denoted KK2R, encrypted under the master key with a control vector C2R. *KK2 is a 128 bit KEK or partial notarizing KEK. NOTE: *KK2 is offset with counter cntr2 to internally form *KK2o, the output key encrypting key. If the key to be translated is input in notarized form, *KK2 must be partial notarizing key, denoted *KKNI2, as created by the APNOTR instruction. *KK2o in this case is a notarizing key. |
| e*KK1o((*)K) | 64 bit or 128 bit ANSI key (KD or KEK), denoted (*)K, to be translated. (*)K is triple encrypted under *KK1o, where *KK1o is *KK1 offset by cntr1. If (*)K is 128 bits, i.e., I* = Kl//Kr, then this parameter is input as e*KK1o(Kl)//e*KK1o(Kr). Otherwise if (*)K is 64 bits, then this parameter is input as e*KK1o(K). |
| e(*)Ko(KDmac) | optional 64 bit MAC key, KDmac, encrypted under (K)Ko; i.e., single encrypted under 64 bit K offset by zero or triple encrypted under 128 bit *K offset by zero. In this case, (*)Ko = (*)K, so e(*)Ko(KDmac) = e(*)K(KDmac). KDmac is a temporary MAC key used in ANSI X9.17 to authenticate Cryptographic Service Messages (CSM) at a Key Translation Center (KTC). A KDmac always accompanies a CSM request to translate a KEK at the KTC. No KDmac accompanies a CSM request to translate KDs since the data key(s) themselves are used as a MAC key to authenticate CSMs to/from the KTC. Thus, this parameter is valid only if the key-type is 1, i.e., (*)K is a KEK. |
| cntr1 | 64 bit clear counter value associated with the key encrypting key *KK1. This value is ordinarily supplied by the key sender and represents the counter used to offset *KK1 before encrypting (*)K. Cntr1 should be compared with the corresponding local receive-counter for *KK in accordance with ANSI X9.17 Counter Management before invoking AXLTKEY to translate the received key. The comparison and AXLTKEY-invocation step should be performed atomically within CFAP to preserve integrity. KEK counters are maintained by the CFAP with integrity. |
| cntr2 | 64 bit clear send-counter value associated with key encrypting key *KK2. This value is ordinarily |

| | |
|---|---|
| | transmitted along with the translated key to the intended recipient. The recipient uses the received counter to detect replay, to synchronize its local receive-counter for *KK2, and to recover the translated key. Local counters are maintained by the CFAP with integrity. |
| key-type | specifies the type of the key to be translated.<br>0: KD<br>1: (*)KK, i.e., 64 bit or 128 bit KEK |
| C1L,C1R | 64 bit control vectors for the left and right parts of the input key encrypting key or partial notarizing key, respectively. |
| C2L,C2R | 64 bit control vectors for the left and right parts of the output key encrypting key or partial notarizing key, respectively. |
| C3 | 64 bit control vector for the CSM MAC key to partial MAC key to be stored under KM. If one KEK or exactly one KD is to be translated, C3 should specify MACGEN and MACVER attributes. If two KDs are to be translated, C3 should specify ACOMBKD attribute to create a 'partial' MAC key. Two calls to AXLTKEY are required to translate two KDs. The two resulting partial MAC keys can be combined using ACOMBKD instruction to form a CSM MAC key with MACGEN and MACVER attributes. |
| OUTPUTS: | |
| e*KK2o((*)K) | 64 bit or 128 bit key, (*)K, triple encrypted under *KK2o is the output key encrypting key *KK2 offset by counter cntr2. If key-type is 0, (*)K is a 64 bit data key (i.e., (*)K = K) and this parameter is denoted e*KK2o(*). (*)K is translated from *KK1o to *KK2o. |
| e*KM.C3(K) | 64 bit MAC key or partial MAC key equal to translated data key K, triple encrypted under the master key with a control vector C3. This output is valid only if a KD is translated, i.e., key-type is 0. In ANSI X9.17, a KD to be translated is also used to authenticate the Cryptographic Service Messages to/from the KTC. If only one KD is to be translated, then the MAC key is the KD itself. In this case, e*KM.C3(K) is just the KD, K, in a form directly usable by GENMAC and VERMAC to MAC the CSMs. If two KDs are to be translated, the MAC key is formed by exclusive-ORing the two KDs. In this case, AXLTKEY must be called twice, i.e., once to translate each KD. Then e*KM.C3(K) from each call is a partial MAC key. The two partial MAC keys may be combined with ACOMBKD instruction to form a key directly usable by GENMAC and VERMAC to MAC the CSMs. |
| e*KM.C3(KDmac) | 64 bit MAC key KDmac, triple encrypted under the master key with a control vector C3. This output is valid only if a KEK is translated, i.e., key-type is 1. In ANSI X9.17, KDmac is used to authenticate CSMs to/from the KTC. |

DESCRIPTION: AXLTKEY instruction translates a 64 bit or 128 bit key, denoted (*)K, from encryption under offset key encrypting key *KK1 to encryption under offset key encrypting key *KK2. Besides offsetting, AXLTKEY supports translation from/to notarized key forms. If (*)K is input in notarized form, *KK1 must be a partial notarizing key. Likewise, if (*)K is to be output in notarized form, *KK2 must be a partial notarizing key. Partial notarizing keys are formed from KEKs by the APNOTR instruction.

AXLTKEY also produces a secondary output: a MAC key or MAC key component, which may be used to authenticate Cryptographic Service Messages between the translation requestor and the KTC. The MAC key formation is controlled by the key-type parameter.

If key-type is 1, i.e. KEK translation, then the MAC key is supplied to the instruction as an optional parameter, KDmac, encrypted under the KEK itself (offset by 0). AXLTKEY recovers KDmac internally and outputs it re-enciphered under KM with control vector specified by parameter C3. Typically C3 is specified with GENMAC and VERMAC usage attributes; hardware enforces no-export control.

If key-type is 0, i.e., KD translation, then the MAC key is based on the KDs to bed translated. AXLTKEY recovers the KD internally and outputs it re-enciphered under KM with attributes controlled by C3. If exactly one KD is to be translated, the MAC key is KD itself and C3 is typically specified with GENMAC and VERMAC usage. Again, the hardware enforces export control. If two KDs, KD1 and KD2 are to be translated, AXLTKEY must be invoked twice, the MAC key is KD1 XOR KD2, and C3 must be specified with ACOMBKD attributes. The resultant MAC key components, e*KM.C3(KD1) and e*(KM.C3(KD2), may then be passed to the ACOMBKD instruction, which recovers them internally and produces e*KM.CxKD1 XOR KD2), the required MAC key.

Figure 58:
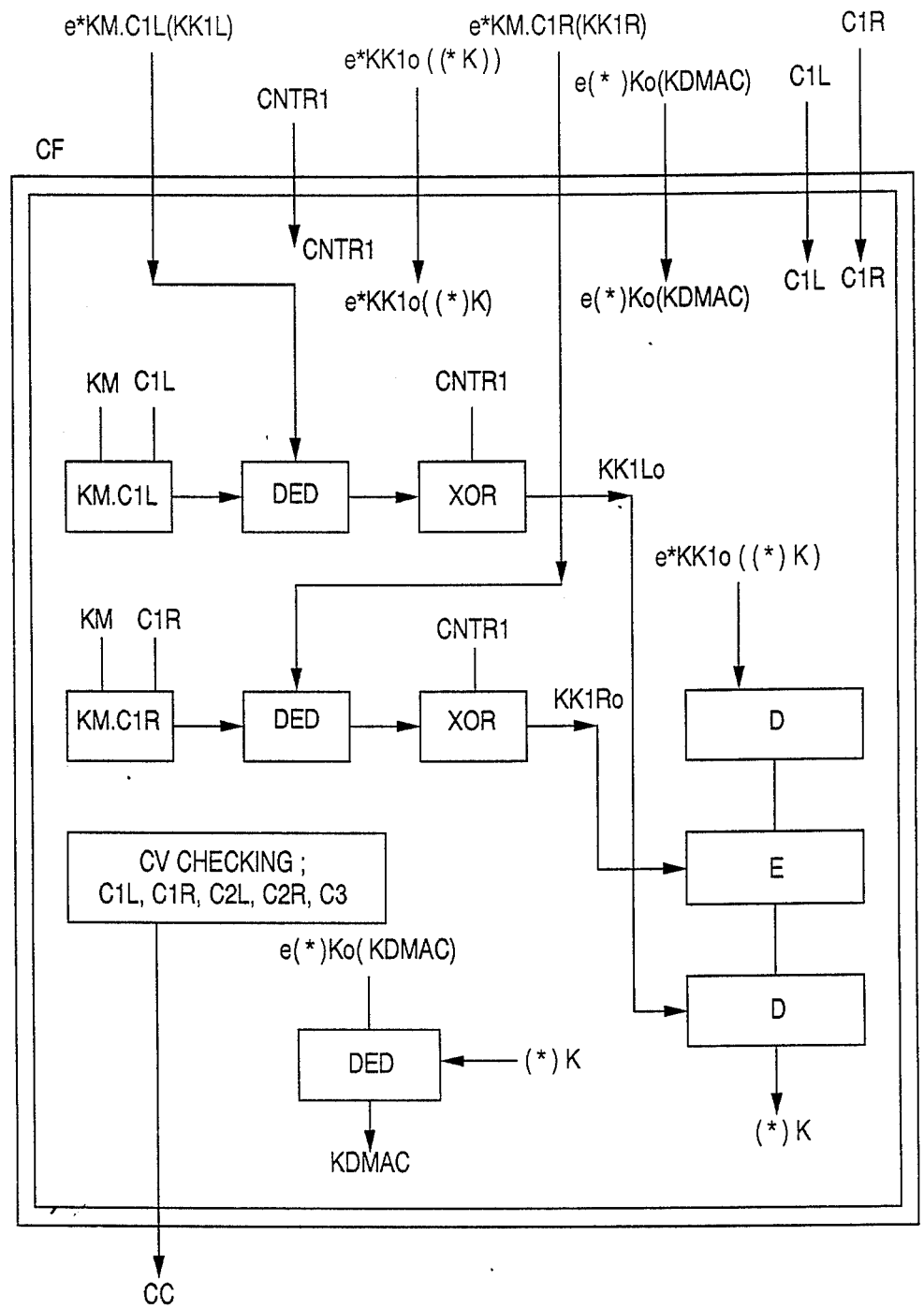
FIG. 58 and FIG. 59 show the Block Diagram for the ANSI Translate Key (AXLTKEY) instruction.
Figure 59:
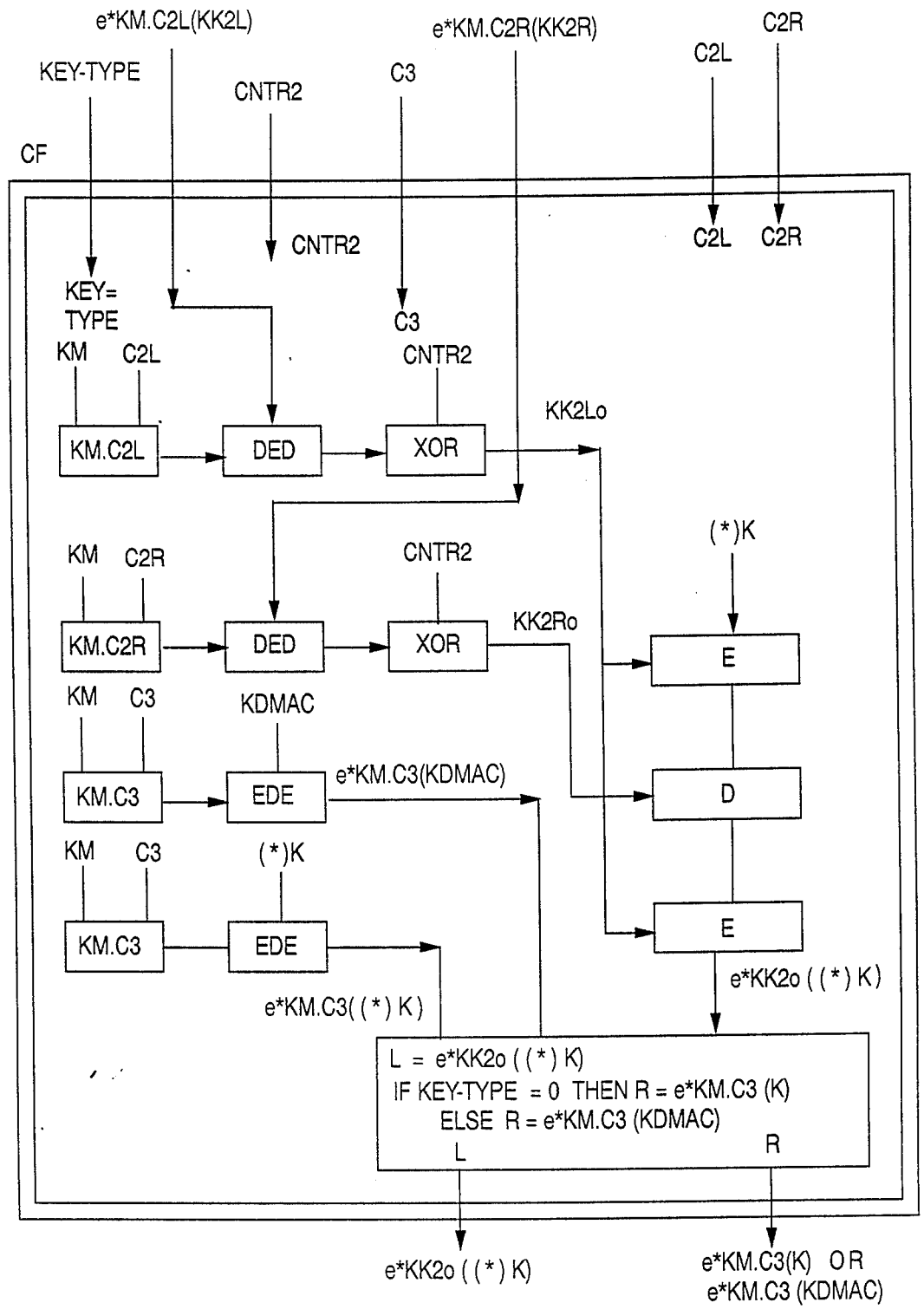

FIGS. 58 and 59 show the AXLTKEY functional block diagram.

AXLTKEY instruction is used in the ANSI X9.17 KTC environment. The instruction supports the processing of the Request for Service (RFS) CSM and the generation of the corresponding Response to Request (RTR) CSM. The RFS may contain one of the following translation requests:

Translate one data key "D1; use KD1 to MAC these CMSs.

Translate two data keys KD1, KD2; use (KD1 XOR KD2) to MAC CSMs.

Translate one KK or *KK; use supplied data key KDmac to MAC CSMs.

When one data key KD1 has to be translated, the AXLTKEY function translates the key and also outputs e*KM.C3(KD1), which can be used for verifying the MAC in the RFS and generating a MAC for the corresponding RTR.

When two data keys, KD1 and KD2 have to be translated, AXLTKEY function is invoked twice. It generates e*KM.C3(KD1) and e*KM.C3(KD2) as intermediate outputs in two respective calls. CFAP then calls ACOMBKD to combine the two outputs into one MAC key e*KM.CX(KD1 XOR KD2), which can be used to MAC the RFS and RTR CSMs. The intermediate outputs generated by AXLTKEY can only be used locally with no export authority; this is enforced by the control vector checking.

When one (*)KK key has to be translated, the AXLTKEY function translates the key and also outputs e*KM.C3(KDmac) which can be used for MACint the CSMs. KDmac accompanies the (*)KK to be translated in the RFS; it is encrypted under the (*)KK offset with constant zero. Note that e*KM.C3(KDmac) can only be used locally; the export control is enforced by control vector checking in the instruction.

CC:
1. successful operation
2. C1L or C1R is invalid
3. C2L or C2R is invalid
4. C3 is invalid
5. unsuccessful operation (error).

Control Vector Checking

Figures 60, 61, 62, 63, 64:
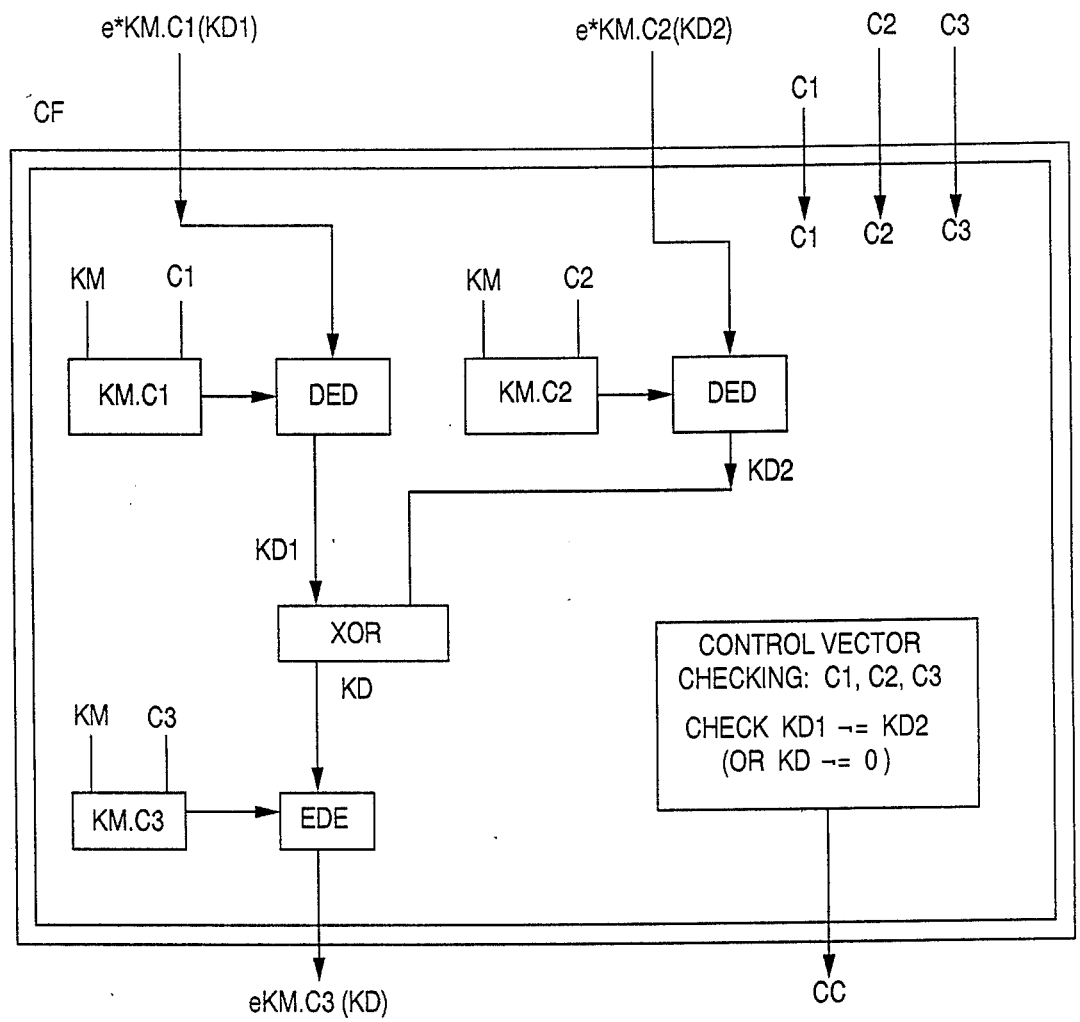
FIG. 60 shows the valid CV Usage attributes which may be specified for the CSM MAC key produced as a by-product of AXLTKEY.
FIG. 61 shows the Block Diagram for the ANSI Combine KDs (ACOMBKD) instruction.
FIG. 62 shows the valid CV Usage attributes for the first of two "partial" CSM MAC keys input to the ACOMBKD instruction.
FIG. 63 shows the valid CV Usage attributes for the second of two "partial" CSM MAC keys input to the ACOMBKD instruction.
FIG. 64 shows the valid CV Usage attributes which may be specified for the CSM MAC key produced by ACOMBKD.

1. Checking on C1L:
cv = "KEK/ANSI"
AXLTKEY Usage bit = 1
reserved (48:63) = X'0'
2. Checking on C1R:
cv type = "KEK/ANSI"
AXLTKEY Usage bit = 1
reserved (8:63) = X'0'
3 Checking on C2L:
cv type = "KEK/ANSI"
AXLTKEY Usage bit = 1
reserved (48:63) = X'0'
4. Checking on C24:
cv type = "KEK/ANSI"
AXLTKEY Usage bit = 1
reserved (48:63) = X'0'
5. Checking on C1L and C2L:
key form (C1L) = key form(C2L)
6. Checking on C1R and C2R:
key form (C1R) = key form(C2L)
7 Checking on C3:
key type = "kata key"
export control bits 1 = 1 (no export)
FIG. 60 shows the valid combinations of C3 attributes which must be checked. Any combination other than those in the table is cryptographically invalid and thus must not be allowed. E, D, MG, MV, ACMB are the usage bits for the data key control vector.

ANSI Combine KDS (ACOMBKD)

Equation:

$$e^*KM.C1(KD1), e^*KM.C2(KD2), C1, C2, C3 \longrightarrow e^*KM.C3(KD)$$

Inputs:

| Inputs: | |
|---|---|
| e*KM.C1(KD1) | 64 bit ANSI data key triple encrypted under the master key KM with a control vector C1. |
| e*KM.C2(KD2) | 64 bit ANSI data key triple encrypted under the master key KM with a control vector C2. |
| C1 | 64 bit control vector for the data key KD1. |
| C2 | 64 bit control vector for the data key KD2. |
| C3 | 64 bit control vector for the output MAC key, KD. |
| Outputs: | |
| e*KM.C3(KD) | 64 bit ANSI data key triple encrypted under the master key with control vector C3. This key can be used to authenticate ANSI X9.17 Cryptographic Service Message using the GMAC and VMAC instructions. |

Description: In ANSI X9.17, keys are exchanged by communicating parities via a sequence of Cryptographic Service Messages (CSMs). Every exchange includes one or two data keys. The integrity of certain CSMs is protected by MACing the CSM with the data itself, if one KD is being exchanged, or with the exclusive-OR of the two data keys, if two KDs are being exchanged. ACOMBKD instruction addresses the latter case, i.e., the computation of a CSM MAC key from two data keys.

ACOMBKD accepts two 'partial' MAC keys, i.e., data keys encrypted under the master key with a control vector which permits their use in ACOMBKD. Partial MAC keys are created as an optional by-product of importing or exporting ANSI data keys with ARTMK or ARFMK, respectively.

ACOMBKD recovers the data keys KD1 and KD2 internally and outputs (KD1 XOR KD2), enciphered under the master key with a control vector which permits its operational use with GMAC and VMAC instructions. These instructions may be used to authenticate incoming and outgoing CSMs as required by the ANSI X9.17 CSM protocol.

NOTE: ACOMBKD must verify that the input KDs are not equal, or equivalent, that (KD1 XOR KD2) is not equal to zero. This is to prevent creation of a MAC key with a known value (zero).

FIG. 61 shows the block diagram of the ACOMBKD instruction.

CC:
1. successful operation
2. C1 is invalid
3. C2 is invalid
4. C3 is invalid
5. unsuccessful operation (error)

Control Vector Checking

1. Checking on C1:
cv type = "data/ANSI"
ACMB Usage bit = 1
reserved (48:63) = X'0'
FIG. 62 shows the valid combination of C1 attributes which must be checked. Any combination other than the one in the table is cryptographically invalid and thus must not be allowed. E, D, G, MV, ACMB are the usage bits for the data key control vector.

2. Checking on C2 key type="data/ANSI"
ACMB Usage bit=1
reserved (48:63)=X'0'

FIG. 63 shows the valid combination of C2 attributes which must be checked. Any combination other than the one in the table is cryptographically invalid and thus must not be allowed. E, D, MG, MV, ACMB are the usage bits for the data key control vector.

3. Checking on C3:

cv type="data/ANSI"
export control bit 1=1 (no export permitted)
reserved (48:63=X'0'

FIG. 64 shows the valid combination of C3 attributes which must be checked. Any combination other than the one in the table is cryptographically invalid and thus must not be allowed. E, D, MG, MV, ACMB are the usage bits for the data key control vector.

ICV/OCV Management

An initial chaining value (ICV) is a 64 bit random, pseudorandom, or, in some cases, nonrepeating value used with the cipher block chaining (CBC) mode of encryption of the DEA and with some algorithms for calculating message authentication codes (MACs).

ICV management includes options for electronic transmission and local storage of both plain and encrypted ICVs. However, encrypted ICVs must first be decrypted before being used as input parameters to any of the cryptographic functions.

An output chaining value (OCV) is a 64 bit value returned, under certain conditions, by the GENMAC and VERMAC cryptographic instructions. The same cryptographic instruction is again called and the OCV is passed as the ICV. The OCV is always encrypted in the form eKM.CV(OCV), where CV is a control vector for intermediate ICV. For the VERMAC instruction, an encrypted OCV is absolutely essential for reasons of security. A plain OCV, in this case, could be used to reveal MACs, which is something that the VERMAC instruction is not supposed to do. An encrypted OCV is also defined for the GENMAC instruction. This is done so that the GENMAC and VERMAC instructions are made as similar as possible, thus allowing for possible function overlap in hardware.

ICV Management Outside the Cryptographic Facility

The Communication Architecture permits the following three modes of electronic transmission of the ICV:

1. Plain ICV: sent in the clear.
2. Encrypted ICV: encrypted with a data key (KD) shared between the sender and receiver.
3. Private Protocol: ICV established using a private protocol between sender and receiver.

Under the CA, CFAP must handle both plain and encrypted ICVs. Although, applications may elect to manage their own encrypted ICVs thus passing plain ICVs to CFAP to encrypt ICVs for transmission and to decrypt all encrypted IDVs received from other nodes. Optionally, the cryptographic support program may also establish ICVs using a private protocol.

ICV Management Inside the Cryptographic Facility

Control vectors are not used for the electronic distribution of IDVs, nor are there any bits in the control vector that may be used by the cryptographic facility (hardware) to control ICV distribution. There is no checking or enforcement by the cryptographic facility of the mode of ICV distribution. Thus, ICV management is strictly a function of the cryptographic support program (i.e., software external to the cryptographic facility).

All ICV's passed as cryptographic function input parameters to the cryptographic facility must be plain ICVs. ICV=0, which is required by the GENMAC and VERMAC instructions, is just a subcase of Plain ICV. The affected cryptographic instructions are these:

1. Encipher
2. Decipher
3. Genmac
4. Vermac
5. Translate Cipher Text

Key Management

The Crypto Architecture Key Management is a set of techniques, rules and procedures for managing keys through the effective utilization of the instruction set and other facilities (e.g., key loading facility, registers, etc.) of the Cryptographic Facility.

It is the intent of the cryptographic architecture that key management is performed using the specified cryptographic functions in the stated ways. This ensures that systems implementing the common cryptographic architecture can communicate with each other using one common method. Some of the features of the CA Key management are listed below.

- The Key management is based on the control vector concept, which offers, among several advantages, powerful enforcement of the usage of keys to insure keys are separated and used as intended.
- Internal to a system, the Key management is a two-level-of-hierarchy concept, enforced by the cryptographic facility: Only the master key is stored in the clear inside the secured cryptographic facility. Other keys are encrypted under an exclusive OR of the master key with a control vector associated to each key, and can be stored outside the crypto facility. No clear key is allowed outside the crypto facility.
- The key management is also a three-level hierarchy in communication aspects, enforced by the CFAP (Cryptographic Facility Access Program): the master key is used to encrypt key-encrypting keys, key encrypting keys that are shared between nodes are used to encrypt other keys exchanged among them.
- It provides procedures of initializing keys on system and networks.
- It provides procedures for the generation, distribution, exchange and storage of keys.
- It provides communication protocols for the transmission of keys and control vectors between nodes.

CA Key Management Design Philosophy

Control Vector System

A control vector system is a cryptographic system implementing the CA.

Storage of Keys and Cryptographic Variables

All keys are stored in the form eKM.C(K), i.e., encrypted under a key formed by Exclusive-ORing the master key with a control vector. Intermediate MAC ICVs and Tokens are also encrypted similarly.

Key and Cryptographic Variable Types

The CV Type/Subtype field in the control vector designates the key or cryptographic variable encrypted. Thirteen CV types/subtypes are defined to CA:

CV Type/Subtype
  Data/Privacy
  Data/MAC
  Data/Xlate
  Data/Comp
  Data/ANSI
  KeK/Sender
  Kek/Receiver
  Kek/ANSI
  PIN/Encrypting
  PIN/Generating
  ICV/Intermediate MAC
  Key Part/Token/

The CV type/subtypes can be divided into three categories:
1. CA: defines keys shared only with other CA systems.
2. Compatibility: defines keys shared with other CA and non-CA systems.
3. ANSI: defines keys sent/received via ANSI X9.17 key distribution.

| Category | CV Type/Subtype |
|---|---|
| CA | Data/Privacy |
|  | Data/MAC |
|  | Data/Xlate |
|  | KeK/Sender |
|  | Kek/Receiver |
|  | Kek/ANSI |
|  | PIN/Encrypting |
|  | PIN/Generating |
|  | ICV/Intermediate MAC |
|  | Key Part/ |
|  | Token/ |
| Compatibility | Data/Comp |
| ANSI | Data/ANSI |
|  | Kek/ANSI |

Key Hierarchy

1. Master Key: encrypts all keys stored locally external to the cryptographic facility.
2. Key Encrypting Key: encrypts all keys (except master key) communicated from one cryptographic facility to another.
3. Data Key: encrypts data and ICV.
4. PIN Encrypting Key: encrypts PIN Blocks.

Key Distribution Protocols:

The CA supports three key distribution protocols:
1. Control Vector Mode (designated CV). All keys communicated on the link are of the form eKEK.C(K).
2. Compatibility Mode (designated CV=0) All keys communicated on the link are of the form eKEK(K).
3. ANSI X9.17 Mode (designated ANSI).

All keys communicated on the link conform to ANSI Standard X9.17.

Key Distribution Rules

Keys and cryptovariables are distributed (exported/imported) according to a set of rules which relates key categories to key distribution protocols, as follows:
1. CA keys and cryptovariables must be exported/imported using the Control Vector Mode.
2. Compatibility Keys can be exported/imported using either the Control Vector Mode (using the control vector on the link) or the Compatibility Mode (using CV=0 on the link.)
3. ANSI keys must be exported/imported using the ANSI X9.17 Mode.

These rules are summarized in the table below:

| | | Key Distribution Protocol | | |
|---|---|---|---|---|
| Category | CV Type/Subtype | CV | CV=0 | ANSI |
| CA | Data/Privacy | | | |
|  | Data/MAC | y | | |
|  | Data/Xlate | y | | |
|  | KeK/Sender | y | | |
|  | Kek/Receiver | y | | |
|  | Kek/ANSI | y | | |
|  | PIN/Encrypting | y | | |
|  | PIN/Generating | y | | |
|  | ICV/Intermediate MAC | y | | |
|  | Key Part/ | y | | |
|  | Token/ | y | | |
| Compatibility | Data/Comp | y | y | |
| ANSI | Data/ANSI | | | y |
|  | Kek/ANSI | | | y |

Legend: "y" denotes variable can be distributed via the indicated key distribution protocol.

Key States (non-ANSI)

The CA defines three key states:
1. Operational: key is encrypted under KM, i.e., in a form suitable for local use.
2. Export: key is encrypted under a KEK Sender, i.e., in a form suitable for export to another device.
3. Import: key is encrypted under a KEK Receiver, i.e., in a form suitable for import at this device.

Key Generation

1. Every key generated by a control vector system has a control vector associated with it.
2. Keys may be generated in the (a) operational state, (b) export state, (c) import state depending on the CV type/subtype of the key used to encrypt the generated key (item G in this list).
3. Keys are generated via the GKS and KGEN instructions.
  GKS generates a key in two forms using the two control vectors. The CV type/subtypes must both be of the CA category. (Key management does not permit a key to be both a CA and a compatibility category key.
  KGEN generates a key in one form using a control vector either of the CA or Compatibility Category.

Key State Transitions (non-ANSI)

The following key state transitions (via the indicated instructions) are supported by CA:

| Input State | Output State | | |
|---|---|---|---|
| | Operational | Import | Export |
| Operational | — | — | RFMK |
| Import | RTMK | — | XLATE KEY |
| Export | — | — | — |

Legend: "—" denotes not supported

Instruction Sequences to Perform Key Management

The tables in FIGS. 65, 66, 67 and 68 specify the CA functions to be used for key management purposes. Detailed descriptions can be found in the sections that follow.

Key States and Instructions

Figure 69:
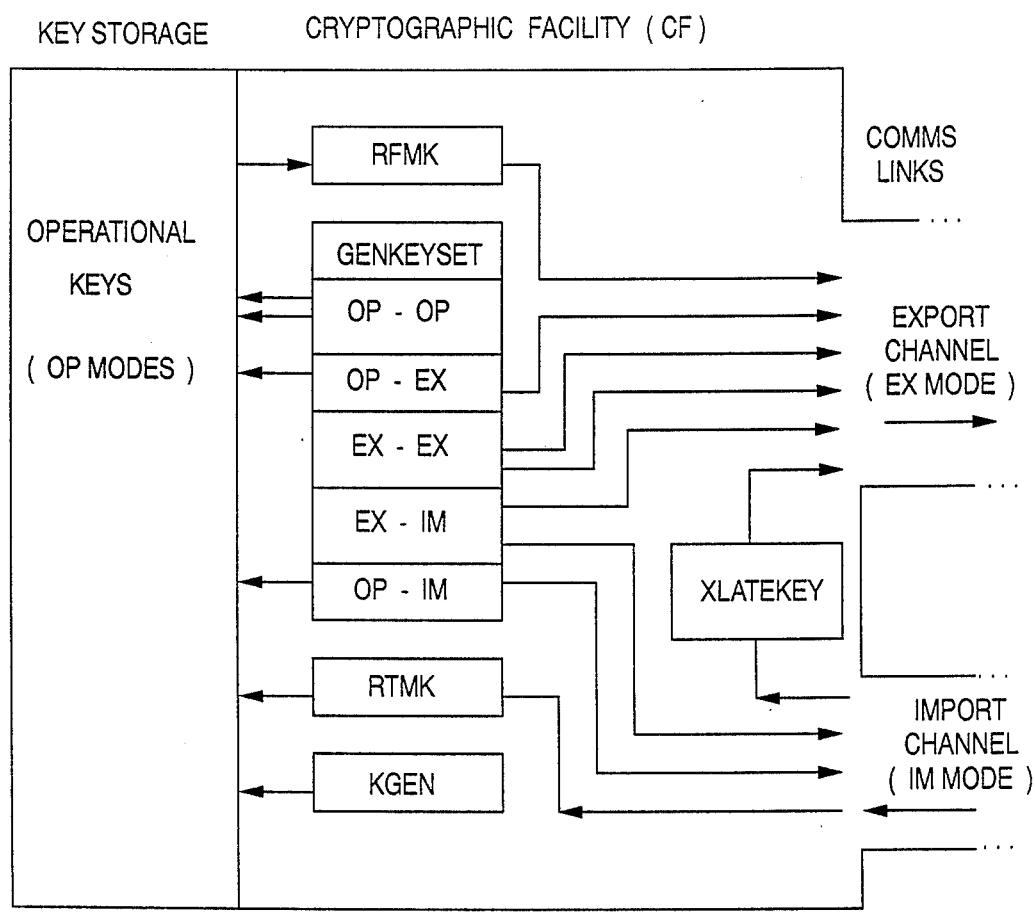
FIG. 69 shows the key state (OP, IM EX) transformations performed by certain instructions. Export and Import Channels represent unidirectional avenues of conveyance for keys imported and exported from the Cryptographic Facility.

FIG. 69 shows the relationship of Operations, Exported and Imported keys and how these keys may be created or transformed by various instructions in the crypto facility.

An Operational key is kept in key storage and is useable as an input parameter to crypto instructions. It is in the form eKM.C(K) where KM is the Master Key kept in the crypto facility and C is the CV associated with key K. An Export key is an Operational key that defines a channel to be used for sending keys to another system. An Import key is an Operational key that defines a channel to be used for receiving keys from another system or from yourself. An Exported key is a key of the form eKEK.C(K) where KEK is a KEK Sender and C is the CV associated with key K. An Imported Key is a key of the form eKEK.C(K) where KEK is a KEK Receiver and C is the CV associated with key K.

RFMK transforms an Operational key into an Exported key. RTMK transforms an Imported key into an Operational key. KGEN generates one form of an Operational key. XLATEKEY translates an Imported key to an Exported key. GKS, in general, generates a key in two forms. One form may have different usage attributes from the other form. GKS OP-OP generates a key in two forms, Operational and Exported. GKS OP-IM generates a key in two forms, Operational and Imported. GKS IM-EX generates a key in two forms, Imported and Exported. GKS EX-EX generates a key in two forms, Exported and Exported.

An Overview of Key Types

The CA instruction operates on the following key types:
1. Ken-encrypting keys
   These are the keys that are used to encrypt other keys. The Master key, Cross Domain keys and Terminal master keys are key-encrypting keys. Except for the master key, all key-encrypting keys can be classified into the following sub-types:
   Key-encrypting key sender (KEK sender): a key used to send keys to other nodes.
   Key-encrypting key receiver (KEK receiver): a key used to receive keys sent from other nodes.
   ANSI Key-encrypting key (ANSI KEK): a key used in the ANSI X9.17 key management environment. The ANSI KEK does not have the unidirectional characteristics of regular CA KEK (i.e., KEK Sender and KEK Receiver)
   Master Key The Master key is the key used to protect all other keys in the system. Only the master key needs to be stored in the clear inside the secured cryptographic facility. Other keys are protected under the encryption of the master key XORed with a control vector associated with each key. Since they are encrypted, they can be stored in storage areas outside the cryptographic facility.
   The CA requires that the master key is a double length key, i.e., it must be 128 bits long, of which 112 bits represent the actual value and 16 bits are the parity bits.
   Cross-domain key
   Key management calls for a unique double length key parity (128 bits each) to be shared with each cv-type (control vector type) node for which it desires to communciate.
   This is also true for non-cv-type system nodes, where for systems employing only single length keys a double length key pair is stored such that the left and right halves are equal. The cross-domain keys are used to encrypt (or ship) and retrieve keys exchanged between nodes that share the cross-domain keys.
   Terminal Master Keys
   Key management calls for a unique terminal master key to be shred with each terminal with which it desires to communicate. For terminals where it is necessary only to send keys to the terminal, but not receive keys, the terminal will ordinarily store only a single length terminal master key (64 bits). In these cases, the double length key is stored in the key storage, where the left and right halves are equal.
   In cases where the terminal stores a double length key, this key will be stored unchanged in the key storage.
2. Data keys
   Data keys are used to encrypt data. Authentication keys, file keys and session keys are included in this category.
3. PIN keys
   PIN keys are classified into two sub-types:
   PIN-encrypting keys: these are keys used to encrypt PINs.
   PIN-generating keys: these are keys used in PIN generation algorithms to generate PINs.
4. Key part
   A key part is a part or a component of a key, having the same length as the key. For example, a key K may have two key parts Ka and Kb such that Ka XOR Kb=K.
5. Intermediate ICV
   An Intermediate ICV is used to encrypt the intermediate Output Chaining vector of a segment of data or message. This OCV is then fed into the next segment of the data and used as an ICV. This occurs when a message or data on which a MAC to be generated/verified is long and must be divided into shorter segments.
6. Token
   Tokens are variables used to protect the integrity of the data keys stored in the Data Key Dataset (a key storage for Data keys). They help prevent the access of data keys by unauthorized users.

Key Initialization

The following is a discussion on mechanisms for key initialization.

When the system is first set up, the master key should be the first key to be installed. Then some key-encrypting keys such as Cross domain keys or transport keys can be manually installed. Once Cross domain keys are available, the system can exchange keys and encrypted data with other systems.

The master key and other key encrypting keys shall be manually installed under proper access controls.

The key entry device through which the key is entered to the Cryptographic Facility must have a secure interface to the Cryptographic Facility, as does the panel display (if not part of the key entry device). This is discussed in "Physical Facilities and Interface."

When a master key or any other key-encrypting key is to be manually installed, dual key entry, which aims to prevent complete knowledge of key(s) by any single individual, is highly desirable. In a dual key-entry procedure, the key is entered in two parts. Each key part is of equal length to the key and is entered by a separate person. The actual key is the Exclusive OR of the two key parts.

The CA also supports multiple-key entry (i.e., when a key K has more than two key parts; for example, the key may have n key parts KP1, KP2, ... KPn such that K=KP1 XOR KP2 ... XOR Kpn).

When dual key entry is required for a system, the key loading facility and other facilities of the crypto facility should be designed to readily support this. For example, there should be two physical key locks (or one key lock with two separate keys for two positions) to enable the entry of each key part separately. In systems where there is no physical key, schemes can employee passwords to be entered, one password for each key part. When a key or any part of a key is entered, it should be visually verified only by the person who enters it. Once that person sees that the display agrees with what he typed, he can activate the loading of the key or key part into registers inside the cryptographic facility (e.g., by means of a button that interfaces the key entry device with the key registers). Every key or key part to be entered must be of double length, including the 16 bit odd-parity. Parity is included for the purpose of error checking.

Manual entry of Master Key

The CA does not define a specific method for the manual installation of the master key. The method outlined in this section is provided as a guideline. It is recommended that the entered master key bed temporarily stored in a new master key register and is not made active until a Set Master Key function is issued.

This strategy permits the entered master key to be verified and reentered, if necessary, and the entered master key need not be activated until after a decision has been made that the entered key is correct and all processing requirements such as reenciperment of other keys from the current master key to the new master key have been done.

As part of the manual entry of the master key, a 32 to 64 bit nonsecret verification pattern (function of the entered master key) should be returned at the physical interface or programming interface or both. Alternatively, the verification pattern can be produced in response to a key installed utility invoking an instruction.

The verification pattern is useful in environments where it is not secure to display an entered key on a panel or console for the user to verify. Specific verification techniques are not within the scope of this document.

Manual key entry (of the Master Key or Key Encrypting Keys) may be implemented with a Keypad attached to the CF via a physically secure interface. A physical key switch and/or passwords may be used to enable and disable the loading of keys from the Keypad.

Master Key Activation

An entered master key is made active by issuing a Set Master Key function. This causes the contents of the new master key register to be transferred to the master key register (i.e., current master key register).

Optionally, the CA provides for an old master key register. In that case, a set master key function first causes the contents of the master key register to be stored in the old master key register and then the contents of the new master key register to be stored in the master key register.

Each master key register (new, current and optionally old) has an associated flag which is set (=1) whenever a key has been actively stored in the register and is reset (=0) whenever a key is deactivated or the cryptographic facility is powered on following a power off state.

Installation of Keys Via Program Interface

A key can also be installed via a program interface. However, this method requires manual intervention by security officers (or issuers) with the possession of the physical key or access passwords. In this method, the user changes the operating state of the cryptographic facility into a state called super-secure mode by means of the physical key (or passwords), then feeds a clear key and the associated control vector into the EMK instruction, which operates only in this mode. The EMK function enciphers the clear key under the master key XORed with the control vector. The encrypted key and the control vector are stored for use on the system.

Suggested Rules for Setting, Testing and Enforcing Odd Key Parity

Every short key consists of 64 bits, numbered by convention from 0 to 63, where bit 0 is the most significant bits. The parity bits are bits 7, 15, 23, 31, 39, 47, 55 and 63, where bit 7 is the parity bit of key bits 0 through 6, bit 15 is the parity bit of key bits 8 through 14, etc.

Setting Odd Key Parity

All non-data keys imported into the system should have odd parity adjusted on the key. This includes the master key and all key encrypting keys, PIN encrypting keys and PIN generating keys encrypted and stored in the Key Storage.

All generated keys are odd parity adjusted, except if the key is generated as a random number and defined as the desired key already encrypted under another key.

Testing Key Parity

Before the cryptographic facility uses a key, it should check the key for odd key parity. Condition codes should be set to indicate whether the key has odd parity or not. The CFAP should make a determination whether the lack of odd key parity is an error, and whether the output of a requested function using the key can be trusted or not.

Hardware Enforcement of Odd Key Parity

The hardware should enforce odd parity on the master key. If a parity error is detected, the requested crypt instruction should be aborted. The hardware should attempt a recover (e.g., by using a backup copy of the master key), and should set a condition code to indicate that an unrecoverable master key parity error has occurred.

In certain selected cases, a parity error for a key encrypting key or other non-data key may cause a requested cryptographic function to be aborted.

Generation of Keys

Keys should be generated in a random manner. This implies a hardware random number generator or a software implementation of an acceptable algorithm is required for electronic generation of keys. Keys can also be manually generated in a random manner, such as by coin tossings. Keys that are generated can be parity adjusted or non-parity. If parity is desired, keys must have odd parity.

Manual Generation of Keys

The CA recommends that master keys and key encrypting keys be installed and generated manually. A good method for manual generation of keys is the coin tossing or dice throwing. One way to do the dice throwing is as follows:

The involved courier or security officer selects eight 16-sided unbiased dies and assigns each side of a dice a value from 0 to 15 in hexadecimal. For example, side 1 has a value of 0, side 16 has a value of F, etc. The following steps are performed next:

1. Toss the dice (on a solid and level surface) and record the results in 8 HEX digits.
2. Rewrite the results from HEX values into eight bytes of 8 binary bits each.
3. Compute the odd parity of the first seven bits of each byte. A total of 8 parity bits are formed for 8 bytes.
4. Replace the eighth bit (last bit) of each byte by each corresponding parity bit computed in the preceding step. Rewrite the binary values into 8 hex digits. The result is the manually generated key in hex.

Electronic Generation of Keys

Keys can be generated by the KEYGEN and GENKEY SET instructions defined in the instruction set section.

KEY GENERATION BY THE KEYGEN INSTRUCTION

The KEYGEN instruction generates keys for immediate use on the system.
  The KEYGEN permits the generation of clear keys. This mode would be used where couriers are involved.
  The KEYGEN permits the generation of keys encrypted under the master key XORed with a specific control vector. This control vector is supplied to the instruction by the CFAP and is checked by the instruction for valid combinations.

KEY GENERATION BY THE GENKEY SET INSTRUCTION

The GENKEY SET instruction generates keys and outputs them encrypted forms. This instruction always produces a pair (i.e., two copies of a key, in the following modes:
  Mode 0: OP-OP (operational-operational) mode
    This mode generates only data keys for local use on the system. Two copies of a data key are generated. Each copy of the key has an associated control vector with different attributes. For example, one copy of the key may have the MG (GENMAC) attribute while the other copy may have the MV (VMAC) attribute. Each copy is encrypted under the master key XORed with the corresponding control vector.
  Mode 1: OP-EX (operational-export) mode
    This mode generates one copy of the key to be used (and stored) locally and one copy of the key in a form ready to be exported to another control vector node. The first copy, referred here as the local (or operational) copy, is encrypted under the master key (XORed with the associated control vector) and can later be exported to other nodes (by RFMK), depending whether it is allowed as specified in the export control field. (It is assumed that at the generation time, the owner of the key would know whether to allow the generated key to be exported. The other copy, referred here as the export copy, is encrypted under a KEK sender of the generating node (XORed with the copy's control vector).
  Mode 2: EX-EX (export-export) mode
    A key generated in this mode cannot be used locally on the system. This mode generates two copies of a key in the forms ready to be exported to two control vector nodes. Each copy of the generated key, called the export copy, is encrypted under a different KEK sender (Xred with a corresponding control vector). The control vector associated to one copy of the key has different usage attributes from the control vector of the other copy.
    This mode is useful for distributing keys by nodes act as key distribution centers.
  Mode 3: OP-IM (operational-import) mode
    This mode generates one copy of the key to be used locally and one copy of the key in a form ready to be imported to the generating node. The first copy (called the operational or local copy) is encrypted under the master key (XORed with the associated control vector) and can later be exported to other nodes (by RFMK), depending on whether it is allowed as specified in the export control field. The other copy (called the import copy), is encrypted under a KEK receiver (XORed with the copy's control vector).
    This mode is useful for file applications. For example, in archiving sensitive data, the encrypted data and the data key (encrypted) are stored on the tape. But under what key the data key must be encrypted and stored on the tape? It's not desirable to store the data key encrypted under the master key because the master key might be changed later. It is more practical to encrypt the data key under a KEK sender (which is a file master key in this case) since KEKs have longer lifetime. In one application, the GENKEY SET instruction, mode OP-IM, generates a pair of data keys. The operational copy has the CV type=data/privacy and the Encipher usage attribute. The import copy has the CV type=-data/xlate and the XDin=1 attribute. The data is then encrypted by the local copy (via the ENCIPHER instruction). The encrypted data and the import copy are then archived. Later on, when it is desired to retrieve the data and re-encrypt the data under a new key, etc., the import copy is pulled off from the tape and recovered (via the RTMK instruction). Since the import copy has the XDin=1 attribute, it can be used in the TRANSLATE CIPHER-TEXT instruction to translate the data to the encryption under a new key. Other applications that have been identified are the ones that require the operational copy and the import copy have usage attributes as specified in FIG. 37.

Note that this mode can only produce data keys.

Mode 4: IM-EX (import-export) mode

This mode generates one copy of the key to be later imported by the generating node, and one copy of the key in a form ready to be exported to another node. The first copy (called the import copy) is encrypted under a KEK receiver (XORed with the associated control vector). It can later be retrieved by the generating node using the RTMK instruction. The other copy (called the export copy) is encrypted under a KEK sender (XORed with the copy's control vector).

This mode is useful for IBM SNA multi-domain applications, where, for example, session keys are generated and distributed.

Note that for every copy of the generated key, the CFAP must supply the associated control vector to the GENKEY SET instruction. The GENKEY SET instruction checks the control vectors of the copies of the generated key for valid usage and valid combinations of other attributes, depending on the mode of the instruction.

Key Distribution

Keys can be distributed manually (e.g., by couriers) or electronically. Distribution by couriers is not desirable in networks with a large number of nodes since the distribution cost could be excessive. In many cases, electronic distribution of keys is the preferred method.

Key Distribution Protocols

Cryptographic nodes in a network usually is a mixture of nodes that have the control vector capability and some other nodes that do not have the control vector capability. The first type of nodes is referred to here as control vector nodes, and the second type is referred to as non control vector nodes. Examples of non control vector nodes are some existing IBM crypto products such as 4700, 3848/CUSP. Protocols for key distribution between nodes of the same type or different type are:

a. Control Vector Mode (designated CV)
b. Compatibility Mode (designated CV=0)
c. ANSI X9.17 Mode (designated ANSI)

Each distribution protocol is described as follows:

(a) The Control Vector Mode is a method whereby all keys communicated from one cryptographic facility to another (on the link) are cryptographically separated according to key type and designated key usage. Every key communicated on the link is of the form eKEK.C(K), where K is the key being communicated, KEK is the key encrypting key under which the key K is encrypted and C is the control vector associated with key K. The control vector C may or may not accompany the encrypted key eKEK.C(K) during transmittal. This mode is CV, since control vectors are maintained on the link.

(b) The Compatibility Mode is a method whereby all keys communicated from one cryptographic facility to another (on the link) are of the form eKEK(K). No cryptographic separation is provided in the compatibility mode. The compatibility mode is provided so that keys can be distributed to existing IBM cryptographic systems (PCF, CUSP/3848, 4700) which use this method of key distribution. Currently, SNA crypto support is limited to key distribution using this mode. Distribution of keys in this mode is limited to data keys (with encipher and decipher usage attributes) and MAC key (with MACGEN and MACVER usage attributes). This mode is designated CV=0, since it is equivalent to using a control vector of all zeros on the link. Key distribution is accomplished using the CV=0 option provided link. Key distribution is accomplished using the CV=0 option provided under the CA cryptographic instructions and the CA CFAP macros.

(c) The ANSI X9.17 Mode is a method of key distribution which complies with ANSI-specific CA-provided cryptographic instructions and a subset of ANSI-specific DDA-provided CFAP macros.

Each mode of key distribution has a set of associated rules and procedures which collectively define that key distribution method. Each key encrypting key shared between cryptographic facilities for the purpose of key transmittal between the respective cryptographic facilities defines a cryptographic communication CHANNEL, or key distribution channel. Such a channel may be a CV channel, a CV=0 channel, or an ANSI channel, depending on the key distribution protocol to be used between the two cryptographic facilities supported by that channel. A CV channel therefore means that keys communicated via that channel will conform to the Control Vector Mode of key distribution; a CV=0 channel therefore means that keys communicated via that channel will conform to the Compatibility Mode of key distribution; an ANS channel therefore means that keys communicated via that channel will conform to the ANSI X9.17 Mode of key distribution. It is also convenient for the same key encrypting key to be used alternatively to define two channels (e.g., the KEK may be used as a CV Channel or a CV=0 channel depending on the mode selected by the application (and ultimately reflected downward as a parameter at the crypto instruction level).

The key distribution channel is a convenient concept, especially so since the key distribution method does not necessarily reflect or depend on the method of key management implemented in the cryptographic facilities of the respective cryptographic devices. For example, key management could be control vector based or variant based, or something else, whereas the key distribution method selected for key transmittal could be based on operational considerations such as who you're talking with at the moment, what key distribution method your communicating partner supports or requires, conformance to standards and practices, prior networking agreements, etc.

A cryptographic facility in compliance with the CA (called a CA node) can establish a CV channel for communication with another CA node; it can establish a CV=0 channel for communication with an IBM PCF, IBM CUSP/3848 or IBM 4700 system node; or it can establish an ANSI channel for communication with another node supporting ANSI key distribution. The CA allows a mixed channel (CV or CV=0) so that a single pair of KEKs can be shared, yet current applications running in compatibility mode and newly written applications running concurrently on a CA node can communicate with another CA node using a single pair of KEKs.

Key Types and Channel Type

Under the CA, every CV has a designated type and subtype, which are encoded fields in the control vector. The key distribution mode by which a key can legitimately be transmitted is also implicitly defined by its type/subtype. (note this implicit definition is used in lie of encoding the allowed channel types in a separate field in the control vector. This avoids the situation of redundant fields in the control vector.) The table in FIG. 70 provides a description of which channel types (i.e., modes of key distribution) can be used to communicate which CV type/subtypes.

Declared Key Distribution Mode (via the crypto instruction)

In every instruction involving the export and import of keys (i.e., GKS, RFMK, and RTMK), the channel type (or key distribution mode) must be declared via a parameter of the instruction (called key distribution mode, or MODE for short). Since the ANSI crypto instructions are separated from the other CA instructions, it is only necessary for the mode parameter to distinguish CV from CV=0. Thus, the mode parameter has the form mode=CV or mode=(CV=0).

Link Control Field

For CV types="kek" there is a CV field defined called Link Control. The link control field defines the allowed channel types that the KEK will operate under. The link control field is defined as below.

| Link Control Encoding | Interpretation |
| --- | --- |
| 00 | not applicable |
| 01 | CV only |
| 10 | CV = 0 only |
| 11 | CV or CV = 0 |

The "not applicable" field is defined to allow for present and future definition of KEK subtypes for which the link control field has no meaning (i.e., does not apply). For example, for CV type/subtype="kek/ansi", link control has no meaning, and hence the field is always set to '00'. Note that link control ='11' means that KEK can be used to distribute keys using either a CV channel or a CV=0 channel, depending on which distribution mode is specified in the crypto instruction.

Key Distribution Mode and Link Control

The key distribution mode specified by the crypto instruction must always be an allowed mode, i.e., the link control field in the control vector of the KEK used to encrypt the transmitted key must permit/allow the specified key distribution mode. The rules are described in the table of FIG. 71.

General Checking Rules

The foregoing discussion has provided a set of rules which can now be summarized and discussed by way of an example.

In every crypto instruction which results in the import or export of a key there are three parameters of interest:

a. distribution mode specified in crypto instruction (call it M)
b. link control field in the control vector of KEK used for key transmittal (call it L)
c. CV type/subtype field in the control vector of the key transmitted (call it T)

To decide whether the instruction can be executed, two checks are performed. (Other checks are performed as well, but are not germain to the present discussion.) The two checks are these:

a. T must be permitted by M
b. M must be permitted by L.

i.e., the CV-type/subtype must be allowed to be transmitted via the key distribution mode specified by M and the mode specified by M must be a mode supported or allowed by L.

| | Channel Type | | |
| --- | --- | --- | --- |
| CV Type/Subtype | CV | CV = 0 | ANSI |
| Data/Privacy | y | n | n |
| Data/MAC | y | n | n |
| Data/Xlate | y | n | n |
| Data/Comp | y* | y | n |
| Data/ANSI | n | n | y |
| KeK/Sender | y | n | n |
| Kek/Receiver | y | n | n |
| Kek/ANSI | n | n | y |
| PIN/Encrypting | y | n | n |
| PIN/Generating | y | n | n |
| ICV/Intermediate MAC ICV | n | n | n |
| Key Part/not applicable | y | n | n |

*Note that a key of type/subtype = data/comp (i.e., a compatibility mode data key can be communicated on a CV channel using a control vector or on a CV = 0 channel by stripping off the control vector.

The Key Distribution Center Concept

The Key Distribution Center (KDC) is the center where keys are generated and distributed to other nodes of the network. The KDC cannot retain a local copy of these keys for use by itself, however.

Distribute keys for two control vector nodes.

Let C be the KDC center that distribute keys for two nodes A and B. Also, let KKca be the cross domain key used to send keys from C to A and kkcb be the cross domain key used to send keys from C to B. The GENKEY SET instruction, Export-Export mode can be used at the KDC to generate two copies of a key K and ship it to nodes A and B. The two copies of the generated key K are encrypted and shipped under the form: e*KKca.C3(K) and e*KKcb.C4(K), where C3 and C4 are the two control vectors specified the usage of the key K at node A and node B, respectively. The control vectors C3 and C4 are generated by CFAP based on user's specification at the generation time. The attributes of C3 and C4 must follow the following rules:

1. If the key K being distributed is a data key, then
   the CV TYPE attribute of both must have main type="data key" and both must have same subtype.
   C3 and C4 may have the same or opposite USAGE attribute. For example, both nodes A and B can use the key K for both encryption and decryption (same usage attributes in C3 and C4), or node A can use the key K for Generate a MAC only, and node B can use the key K for verify a MAC only (different usage attributes in C3 and C4). FIG. 34 describes all allowed combination of usage attributes for C3 and C4.

2. If K is a key-encrypting key, then
   If CV TYPE attribute in C3 is "EK sender", then CV TYPE attribute in C4 must be "KEK receiver", and vice versa. That is, if the key K is used at node A to send keys then it must be used at node B to receive keys, and vice versa.
   The LINK CONTROL attribute in both C3 and C4 must be the same.

3. If K is a PIN-encrypting key, then the CV TYPE
attribute in both C3 and C4 must be "PIN-encrypting key".

Besides the above attributes, the CFAP also sets the EXPORT CONTROL attribute field in C3 and C4, depending on how the KDC wants the receiving nodes A and B control the further exports of this key K. Section "Control Vectors" describes the meaning of the EXPORT CONTRO field.

At the receiving nodes A and B, the key K can be retrieved using the RTMK instruction. For example, A uses the RTMK to convert e*KKca.C3(K) to the encryption under its own master key (XORed with a control vector) for use on its system.

NOTE: Keys shipped from a CV node to CV nodes by the GENKEY SET instruction must use the CV channel. This implies that the LINK CONTROL field of the control vectors associated to cross domain keys KKca and KKcb must have the "CV only" or "CV or CV=0" attribute.

Distribute keys for more than two control vector nodes.

The main purpose of key distribution centers is to set up keys for two nodes to communicate. The need for distributing keys to more than two nodes seldom arises. However, it is possible for the KDC to distribute keys to more than two nodes, provided the control vectors associated with copies of the key being shipped are the same.

Let KKci be the cross domain key used to send keys from node C, which acts as a KDC, to node i (i=1,2, ... n). The KDC can distribute a key K to n nodes (n]2) by:

1. Using the KEYGEN instruction to generate a key K. K is encrypted under the KDC's master key KM. That is, K is of the form e*KM.C1(K), where C1 is the control vector that specifies the attributes of K. The EXPORT CONTROL field of C1 must have the last bit (bit 1) equal to "1" so that K can be exported by RFMK.

2. Using the RFMK function n times to convert e*KM.C1(K) to the form e*KKci.C2(K) (with i=1,2,...n), where C2 is the new control vector specifies the attribute of the key K for use at the receiving node. This form is then shipped to each node i.

At each receiving node, the key K can be retrieved using the RTMK instruction.

Note that in this application a local copy of the generated key K is available at the KDC. This should not be permitted, except in some application where no exposure is present. Thus, this application is very limited.

An alternative, which eliminates the need for the KDC to have local copies of generated keys, can be implemented as follows in the future:

1. The KDC uses the GENKEYSET instruction in the EXPORT-EXPORT mode to ship keys to one or two nodes.

2. The KDC re-import one copy of the key under a KEK that has the XLTKEY in and XLTKEY out attribute (assume CCA allows this) and then translates that copy to the forms suitable for shipping to the remaining nodes.

Distribute keys to non-CV nodes

The KDC can distribute only data keys to two or more non-CV nodes. Distribution of other types of keys to non-CV nodes are not permitted. Data keys are first generated by the KEYGEN instruction and then distributed to non-CV nodes using the RFMK instruction, via the compatability channel. This implies that the control vector associated to the KEK under which keys are shipped must have the "CV=0" attribute for the LINK CONTROL field. Of course the EXPORT CONTROL field of the control vector associated with the generated data key must allow the data key to be exported (via the RFMK instruction), in order for the key to be distributed.

Note that as in the above case, a local copy of the generated key K is available at the KDC. This should not be permitted, except in some limited application where no exposure is present. Thus, this application is very limited. The alternative that uses the combination of GENKEY SET/TRANSLATE KEY as proposed in the previous case can also be applied to this case.

Distribute keys to a control vector node and to a non control-vector node

The KDC can only distribute copies of a data key to both a CV node and a non-CV node. This is because only data keys can be distributed to non-CV node. The distribution can be done via the KEYGEN and RFMK combination or the GENKEY SET and RFMK combination. That is, the data key is first generated via the KEYGEN or GENKEY SET instruction. One copy is then shipped to the CV node by the RFMK instruction or by the GENKEY SET (mode OP-EX) instruction itself (the CV channel should always be used.) The other copy is shipped to the non-CV node by the RFMK instruction, under the CV=0 channel.

Again, a local copy of the generated key is available to the KDC. The GENKEY SET/-

TRANSLATE KEY alternative may be implemented to avoid this problem.

Key Translation

Keys can be translated from encryption under one key-encrypting key to encryption under another key-encrypting key, using the TRANLATE KEY function. This function is useful for the Key Translation Center (KTC) environment, i.e., the environment where one or more nodes act as a node that translates keys for other nodes. For example, consider three cryptographic nodes A, B and C shown in FIG. 72. Besides its normal function as a cryptographic node, C ascts ad a KTC for A and B. A can communicate with C via cross-domain keys KEKac and KEKca. Likewise, B communicates with C via KEKbc and KEKcb. Assume that A sends B data encrypted under data key KD, and A and B initially don't have common cross-domain keys to communicate. To decipher the data, B needs to know KD. Since A and B don't have common cross-domain keys, A cannot send encrypted keys that can be recovered at B. C can help B to receive KD by acting as a KTC. First, A sends C a copy of KD encrypted under KEKac (i.e., e*KEKac.C1(KD)). C invokes the TRANSLATE KEY function to translate e*KEKac.C1(KD) to e*-KEKcb.C1(KD) and then sends e*KEKcb.C1(KD) to B. At node B, KD is recovered using the TRMK function, and encrypted data can be deciphered using the decipher instruction with the received KD.

Note that the TRANSLATE KEY instruction is designed in such a way that the KTC cannot retain a copy of the KD. Also, for security reasons, the CA does not allow mix and match of channels under which the keys being translated would come in (input channel) and come out (output channel). That is, if the key to be translated comes in under a CV channel then the translated key must come out in a CV channel; if the input channel is a CV=0 channel then the output channel is a CV=0 channel. This means that the control vectors of the KEKs associated to the input channel and output channels (KEKac and KEKcb in the above example) must have the LINK CONTROL attribute agree with one of the valid combinations described in the TRANSLATE KEY instruction.

Export of Keys

The export of a key is the encipherment of the key under a form suitable for sending to other nodes. That is, the key is encrypted under a key encrypting key shared between communicating nodes.

A control vector system can exchange keys with other systems, whether the other systems have the control vector structure or not. Following are the rules defined by the CA with respect to the exportation of keys:

Export of Keys to CV System

A control vector system can export data keys, key-encrypting keys, PIN keys, Intermediate CVs, key parts and tokens to other CV nodes.

Keys are exported to CV nodes using the RFMK instruction or the GKS instruction, as discussed below.

Export of Keys With the RFMK Instruction

Keys used locally on a system can be exported to other CV nodes via the RFMK function if the export-control field in the control vectors of the keys allow it. Usually, these keys are either generated by the KEY-GEN or GKS instruction, or received from another node.

Let K be a key locally used on the system, encrypted in the form e*KM.C(K), where C is the control vector specifies the usage of A, created and supplied by CFAP. Whether K is generated on the system, or received from another node, or formed by a local transformation on an existing key (e.g., via the LCVA instruction), the decision on the export of K must be indicated in the EXPORT CONTROL of the control vector C. If the EXPORT CONTROL field of C allows K to be shipped to another CV node, then the RFMK can be used to export K. Let KK be the cross domain key used to ship keys from A to that node. The form of the key K to be shipped depends on the channel type under which it is shipped. The channel type is specified in the distribution mode of the RFMK instruction when it is invoked. For the RFMK instruction to be carried out, the distribution mode parameter of the RFMK instruction and the LINK CONTROL field of the control vector Ckk (associated to KK) must be one of the valid combinations specified in the table of FIG. 71.

- If distribution mode specifies the CV channel and the LINK CONTROL field of Ckk is either "CV" or "CV or CV=0" then the combination is valid. K is exported in the form e*KK.C1(K), where C1 is the control vector created by CFAP based on C and supplied to the RFMK instruction.
- If distribution mode specifies the CV=0 channel and the LINK CONTROL field of Ckk is either "CV=0" or "CV or CV=0" then the combination is valid. K is exported under the form e*KK(K). The control vector is stripped off in this case. Note that only keys of the CV type data/compatibility is allowed to be shipped under the CV=0 channel. Other keys are prohibited for security reasons (see the attack section). Existing applications (e.g., applications running on IBM CUSP/3848) that do not have control vector structures when ported to CCA nodes, use the CV=0 channel to export keys.

Export of Keys With the GKS Instruction

Keys can be exported to other CV nodes at generation time by the GKS instruction, in OP-EX mode, OP-IM mode, IM-EX mode and EX-EX mode. The modes of this instruction are described in "Electronic generation of keys..". In these modes, only the export copy is shipped to other nodes; the import copy is not shipped to other nodes, it is to be received later by the generating node itself; and the operational copy is for local use at the generating node.

Unlike the RFMK instruction, the GKS instruction exports the export copy to another CV node under the CV channel only. This means that the LINK CONTROL field of the control vector associated to the key-encrypting key used that encrypt the export copy must have the "CV" or "CV or CV=0" attribute. Using the same notation as above, the export copy is exported under the form e*KK.C1(K).

The GENKEY SET function provides a secure way to export keys to CV systems. It cannot be used directly to send keys to non-CV systems.

Note:
1. When the RFMK or the GKS export a key under the CV channel, there are instances where the control vector associated to the key is not sent on the link. The receiving node must be able to correctly reconstruct the control vector in order to recover the right key. "Control vectors on the link" discusses procedures for setting up the control vector at the sending node and for reconstructing it at the receiving node when it is not sent on the link.

2. When sending a key, the sending node has the option of allowing or disallowing the receiving node to further send the key to other nodes.

If the sending node does not want the receiving node to further ship the key to other nodes, CFAP sets the EXPORT CONTROL field of the control vector associated to the exported key to B'10'.

If the sending node allows the receiving node to have control on further export of this key, CFAP sets bit 0 of the EXPORT CONTROL field to 0, the remaining bit is "don't care". When the receiving node receives the key, it can set the two bits of the EXPORT CONTROL field to any desired value.

3. The CA permits the lowering of authority of the export control via the LCVA instruction. For example, after node A exporting a key K to another node, it may decide not to export it again. Node A can forbit the exporting of this key by applying the LCVA instruction on the key K and its control vector, reducing the export control authority down to B'00' or B'10' (no exporting).

Export of Keys to Non-CV Systems

Only the RFMK instruction can be used to directly export keys to non-CV systems, provided the EXPORT CONTROL field of the associated control vector allows this. Also, only keys of CV type Data/compatibility can be exported to non-CV nodes, for security reasons When the RFMK instruction exports a key to a non-CV node, only the CV=0 channel can be used to ship the key. This means that the distribution mode parameter in the RFMK instruction must specify the CV=0 channel, and the LINK CONTROL field of the control vector associated to the key-encrypting key used to ship the key must have the "CV=0" or "CV or CV=0" attribute. Using the same notation as above, the key is shipped to a non-CV node under the form e*KK(K).

Import of Keys

The import of a key is the re-encipherment of the key from the encryption under a key-encrypting key to the encryption under the master key of the receiving node. Keys that are in an importable form (i.e., encrypted under a key-encrypting key) are either sent from other nodes, or generated by the GKS instruction (in OP-IM mode or IM-EX mode). The RTMK instruction is the only instruction that can be used to import a key.

Import of Keys From CV Systems

A CV system can receive a key of any CA key type sent from a CV node. The key sent from another CV node can arrive under a CV channel or a CV=0 channel, and it must be received by the corresponding channel. The channel type is specified by the distribution mode parameter in the RTMK instruction when it is invoked.

If the distribution mode specifies the CV channel then the key is shipped and received under the CV channel. The key arrives from the sending node in the form e*KK.C3(K), where KK is the cross domain key shared between the communicating nodes and C3 is the control vector associated to the key K being shipped. The control vector C3 may or may not be sent with the key.

When C3 is sent with the key, CFAP (at the receiving node) creates a new control vector, called C2, based on the sent control vector C3. CFAP supplies C2, C3 and other parameters to the RTMK instruction. The RTMK uses C3 to recover the key K and then validates C2 and uses it to re-encipher the recovered key K to encipherment under the master key. The retrieved key is now in the form ready for local use, e*KM.C2(K).

When the control vector C3 is not sent, CFAP (at the receiving node) first reconstructs C3, creates a new control vector C2 based on C3 and then supplies these and other parameters to the RTMK instruction. As above, the key is retrieved as e*KM.C23(K).

CFAP may set the EXPORT CONTROL field of C2 different from that of C3, depending on the EXPORT CONTROL of C3:

If the EXPORT CONTROL of C3 is B'1Y', where Y is 0 or 1, then CFAP must set the EXPORT CONTROL of C2 equal to that of C3. If Y is 0, the sending node does not permit the receiving node to further export the key. If Y is 1, the key can be further exported to other nodes.

If the EXPORT CONTROL of C3 is B'0Y', where Y is 0 or 1, then CFAP can set the EXPORT CONTROL of C2 to any desired value. Thus, the EXPORT CONTROL of C2 and C3 can be different in this case. Observe that the second bit of the EXPORT CONTROL field of C3 does not control the further export of the received key. For example, if the EXPORT CONTROL of C3 is B'0Y'=B'00' (i.e., Y=0), the receiving node can allow the further export of the received key by setting the EXPORT CONTROL of C2 to B±01' or B'11'.

Note that for the RTMK instruction to be carried out, the LINK CONTROL field of the control vector associated to KK must have the "CV" or "CV or CV=0" attribute.

If the distribution mode specifies the CV=0 channel then the key is shipped and received under the CV=0 channel. The key arrives from the sending node in the form e*KK(K). At the receiving node, the key retrieved in the form e*KM.C2(K), where C2 is the control vector associated to K, created by CFAP and supplied to RTMK. The EXPORT CONTROL field of C2 can be set to any desired value by CFAP.

Note that only the data/compatibility key type is sent and received under the CV=0 channel. Therefore, C2 is of data/compatibility CV type and its usage attributes are limited to the combinations of the ENCIPHER, DECIPHER, GENMAD and VERMAC. Note also that for the TRMK instruction to be carried out, the LINK CONTROL field of the control vector associated to KK must have the "CV=0" or "CV or CV=0" attribute.

Receiving Keys From Non-CV System

A CV system can receive only data/compatibility key type from a non-CV system. The sent key arrives from the sending node under a CV=0 channel only (i.e., arriving in the form e*KK(K)). The manner in which this key is received is the same as in the case where the key is sent from a CV node under the CV-0 channel, described above.

Control Vectors on the Link

Introduction to Communication Protocols for Transmission of Keys

The Cryptographic Architecture includes communication protocols for the electronic transmission of cryptographic keys from one cryptographic facility to another. The CA communication protocol includes an on-the-link control vector definition and a specification of the allowed protocols for using this control vector definition for the electronic transmission of cryptographic keys.

Basically, the CA communication protocol provides a means for the cryptographic separation of electronically transmitted keys according to the key type or intended key usage. The communication protocol is such that if, during transmission, a key of one type is substituted for a key of a different type, then the substituted key will fail to be properly recovered at the receiver. In that event, the sending and receiving cryptographic facilities will not have matching keys, and therefore communication with such a key pair is not possible. At best, an adversary can disrupt the cryptographic system, but cryptographic attacks of the kind where an adversary attempts to force a receiving cryptographic facility to use a key in a way not intended by the sending cryptographic facility are thwarted.

Key Management Requirements for Communicating CFs

The CA Communication protocol has the following key management requirements for a communicating pair of cryptographic facilities, i and j:

1. i and j must share a key encrypting pair, KEKij and KEKji, where KEKij is used to send keys from i to j, KEKji is used to send keys from j to i, and KEKij and KEKji are both double length keys (128 bits). Optionally, i and j may share only KEKij for sending keys from i to j or KEKji for sending keys from j to i. Also optionally, i and j may share additional key encrypting keys or key pairs for purposes of electronic key distribution. These key-encrypting keys are commonly referred to as cross-domain keys.
2. At i and j, the keys KEKij and KEKji must be "marked" such that the use of these keys to electronically export and import keys (via GENKEYSET, RFMK, and RTMK) always requires the use of a control vector, as defined by this architecture. Additional optional shared key encrypting keys or key pair must also conform to this rule.

Note that i and j may also share one or more key encrypting keys (or key pairs) for purposes of electronic key distribution, where the shared keys use a method not involving control vectors. This may be necessary in order to maintain compatibility with existing hardware or software facilities at i or j or both. However, the keys must be "marked" such that the use the keys to electronically export and import keys (via GENKEYSET, RFMK, and RTMK) specifically calls for omitting the control vector, as defined by this architecture.

Note that if control vectors are used internal to the cryptographic facility, and as defined by the common set of cryptographic functions, then a method for "marking" the KEK's (as required under item "b") is already specified. Otherwise, the "marking" must be provided by other means.

Format for Electronic Transmission of Keys Using Control Vectors

All electronically transmitted keys sent from a cryptographic facility, key generation facility, key distribution facility, or key translation facility, to a receiving cryptographic facility must be encrypted using the format described below:

Let,

| | |
|---|---|
| *KEK = | 128 bit key shared by the sending and receiving facilities for the purpose of transmitting keys from the sending to the receiving facility |
| C = | 64 bit control vector |
| K = | 64 bit key to be transmitted |
| K1,K2 = | 128 bit key to be transmitted |

Then, the following format is specified for single and double length keys:

| Key to be Transmitted | Format of Transmitted Key |
|---|---|
| K | e*KEK.C(K)K |
| K1,K2 | e*KEK.C(K1), e*KEK.C(K2) |

The CA Communciation protocol also defines a default control vector of 64 zero bits for purposes of maintaining compatibility with existing IBM cryptographic products such as 3848/CUSP, PCF and 4700. This communication mode allows keys to be transmitted and received using a control vector of zero (i.e., effectively without using a control vector). In this case, a key K is sent in the form eKEK(K) instead of in the form eKEK.C(K).

Message Formats

The CA Communication protocol permits encrypted keys to be transmitted using two formats. The information which is sent is assumed to be included within a message. The Communciation protocol does not currently include a specification for message formats, as there may be many possible message formats which are acceptable or desirable depending on design requirements beyond the scope of this document to anticipate or define. The Communication protocol merely defines the information that must be sent in such a message depending on which format is selected:

First Format:

| First Format: | |
|---|---|
| a. For 64 bit K: | C, e*KEK.C(K) |
| b. For 128 bit K1,K2: | C, e*KEK.C(K1), e*KEK.C(K2) |

Second Format:

| Second Format: | |
|---|---|
| a. For 64 bit K: | e*KEK.C(K) |
| b. For 128 bit K1,K2: | e*KEK.C(K1), e*KEK.C(K2) |

Note that the degenerate case where CV=0 is also covered by the above two formats.

First Format—CV Transmitted

The first format covers the case where the control vector is transmitted with the encrypted key. Since a receiving cryptographic application or the cryptographic support program must always know for what purpose a received key is intended, the control vector may be found to be a convenient and compact way for all necessary key usage information to be conveyed from the sending station to a receiving station. Moreover, a received control vector may then be passed from the receiving application program to the cryptographic support program (e.g. IBM CUSP) and thence, depending on how the RTMK function is implemented, directly from the cryptographic support program to the cryptographic facility (i.e., hardware) as a parameter of the RTMK function. Thus, management of the control vector by the software (i.e. CFAP) is apt to be less complex.

Second Format—CV Not Transmitted

Two cases are possible with the second format. The first covers the case where the sending and receiving stations have made no prior agreement for reconstruction of the control vector. In this case, the receiving station follows a set of prescribed steps for reconstructing the control vector, which involves the use of certain default control vector values. The second case is where the sending and receiving stations have a prior agreement for reconstructing the control vector. In this case, the receiving station reconstructs the control vector according to the private previously established set of rules.

The basic difference between the first and second cases of the second format is that in the first case, the receiving station reconstructs the control vector using certain vendor-provided default assumptions. In the second case, the receiving station reconstructs the control vector according to a set of private agreed upon rules.

Control Vector Specification

The control vector specification for use on-the-link is the same as the internal control vector specification given in the Section entitled "Key Management". This means that the rules governing the creation and modification of control vectors, as specified by the CFAP macro definitions and the CF instructions, are also the same rules which apply on-the-link. These rules have been adopted to facilitate the smooth recovery of keys. The reader is reminded that key recovery via decryption requires that every bit in the control vector must be specified exactly the same as originally specified for encryption of the key.

Basically, the rules are these:

In general, CFAP has the responsibility for building all control vectors, and in some cases for checking/enforcing certain bits in the control vector. In general, the cryptographic facility has the responsibility for checking/enforcing bits in the control vector.

When a control vector is built, every bit in the control vector must be specified. Control vector bits are established as follows:

a. All reserved bits are set to zero. (This is easily accomplished by initially setting CV=0.
b. The anti-variant bits, or fixed bits are set.
c. The remaining bits, except for the 8 parity bits (i.e., those defined under the architecture) are set from the parameter values specified by the application in the called CFAP macro or according to the macro specified default values.

If a key is transmitted from a sender to a receiver in the form eKEK.C(K), where C is not the degenerate control vector of 0 and C is not sent on the link, then the following control vector defaults are defined at the receiver:
1. default CV version=0
2. default key type="data key"
3. default export control="0000", i.e., unrestricted
4. For key type="data key", default usage bits="1100", i.e., E and D
5. For key type="KEK Sender", default target system="00", i.e., "CV or CV=0" default usage bits="1111", i.e., unrestricted.
6. For key type="KEK Receiver", default target system="00", i.e., "CV or CV=0" efault usage bits="11", i.e., unrestricted.
7. For key type="PIN encrypting key", default usage bits="010101", i.e., Reformat PIN Block key in and key out, and verify PIN.
8. For key type="PIN generating key", default usage bits="01", i.e., verify PIN. These are the default values that should be used in the GEN-KEYSET, RFMK, XLATEKEY, KEYGEN, EMK, and RTMK instructions.

CA CV Defaults

| What is Known | What is Not Known | What Values to Use |
| --- | --- | --- |
| Nothing | If sender is CV system | use CV=0 |
| Sender is CV System | CV Version number | use Version =00 |
| Sender is CV System | Reserved Bits | use all binary zeros |
| Sender is CV System | CV Type | use DATA type |
| CV type is DATA | Attributes | E D |
| CV type is PINE | Attributes | RPB-I RPB-0 VP |
| CV type is PING | Attributes | VP |
| CV type is KEKS | Attributes | GKS-LR GKS-RR RFMK XLT-0 |
| CV type is KEKS | Target System | CV or CV =0 |
| CV type is KEKR | Attributes | RTMK XLT-I |
| CV type is KEKR | Target System | CV or CV =0 |
| CV type is KEYP | Attributes | (no defaults) |
| CV type is IICV | (no Attributes exist) | |

Storage of Keys

All keys external to the cryptographic facility are maintained in encrypted form, by encrypting them under a key formed by the XORing a control vector with the master key.

Encrypted keys stored external to the cryptographic facility may optionally be stored together with the control vector used to encrypt the stored key. But the storage of the clear control vector is not necessary as long as the control vector can be dynamically reconstructed on the basis of other information stored with the key or from the context in which the encrypted key is used.

All generated and imported keys are encrypted and stored in mass key storage outside the Cryptograhic Facility. The key storage is further partitioned into two separate areas: KKDS (KEK Data Set) and DKDS (Data Key Data Set). The distinction between these two storage areas is made due to the fact that different mechanisms are employed in the CA to manage the data keys and key-encrypting keys (and PIN related keys).

Encrypted key encrypting keys, PIN encrypting keys and PIN generating keys can be stored in a KKDS and addressed via nonsecret key labels.

Encrypted data keys can be stored in a DKDS, or clear data keys can be stored in the cryptographic facility, provided that applications accessing these keys do so using secret token values which have about 56 secret independent bits. Additional security can be provided to the encrypted keys stored in the DKDS by Exclusive ORing each encrypted key with a mask which is equal to a 1-way function of the secret token used to access the encrypted data key.

FIG. 73 illustrates the KKDS with several KEK entries. Every key-encrypting key (denoted here as KEKi) consists of two 64 bit key halves and is encrypted and stored in the form of two 64 bit halves. The first half is the encryption of the left half of the key (KEKiL) under the key formed by KM Xor CL, where CL is the control vector associated to KEKiL. Likewise, the second half is the encryption of the right half of the key (KEKiR) under the key formed by KM XOR CR, where CR is the control vector associated to KEKiR. The control vectors CL and CR are the same except in the value of the KEY FORM field, which indicates whether the key half is the left half or the right half. Note that if the key KEKi is short (i.e., single length) then it is still stored in the form of two 64 bit halves. However, the left half and the right half are equal since KEKiL=KEKiR and CL=CR=C. The coupling of the left key half and the right key half to the corresponding control vector that indicates the left or right position of the key half, is essential to defend against the type of attack knows as 'key half replicating' attack. In this kind of attack, suppose there is no such coupling, the opponent substitutes one encrypted half by the other half (i.e., he replicates one key half) so that the two halves of the encrypted key are equal. He can perform cryptographic operations on the key half to exhaust search half of the key. He then repeats the process for the other key half. In essence, the work factor of a long key is now reduced to the magnitude of the work factor of a short key.

For any cryptographic operation, the CFAP fetches the encrypted keys from the key storage and supplies it to the instruction being executed. These keys are decrypted and used by the instruction inside the CF only. The keys never appear outside the CF in the clear.

Note that for most of the key management instructions who usually operate on key-encrypting keys, when each instruction is invoked, it must be invoked twice in order to operate or produce the two key halves of double length key-encrypting keys. Each invocation will operate on and or produce each key half of the key-encrypting keys. Therefore, CFAP or application must provide appropriate values of parameters (such as encrypted key half and associate control vector with proper value for the KEY FORM field, etc.) to ensure correct result.

In high volume systems where keys are accessed frequently, cache mechanisms can be implemented to speed up the access of keys.

Outsider Versus Insider Attacks

It is the intent of the key management to provide security against outsider attacks and certain insider attacks.

ANSI X9.17 Key Management

It is the intent of key management to be able to coexist with the ANSI X9.17 key management without loss of security to either key management.

Compatibility With Current Products

Compatibility with current products, e.g., IBM 3848/CUSP, is handled on two levels. A combination of KEYGEN, RTMK, and RFMK will allow a data key to be produced in 4 different forms which correspond directly to the 4 different forms that can be produced by the GENKEY macro currently available in IBM 3848/CUSP. For example, to be compatible with the IBM 3848/CUSP in the generation of a session key, the KEYGEN function can be used to create a random number that is considered as a session key encrypted under the master key. Then the RFMK function can be used to ship it to other nodes. Similarly, a file key can be compatibly generated by first using the KEYGEN instruction to obtain a random number, considered as the file key encrypted under a file master key, and then the RTMK function can be used to convert this into a file key encrypted under the master key for use on the system. The RTMK and RFMK functions effectively allow a special case of import and export of data keys where the control vector is 64 zero bits (i.e., no control vector).

Software Interface

The CFAP provides the Applications Interface to the Cryptographic Facility. The interface may be implemented in the form of macros or subroutine calls and may include a Key Storage Manager component, which handles storage and retrieval of keys stored on a Key Storage Data Set.

ANSI X9.17 Key Management

Overview:

ANSI Node Architecture

FIG. 74 illustrates the basic components of an ANSI X9.17 node. This architecture is based on the basic System Diagrams shown in FIGS. 1, 2 and 3.

The ANSI Key Manager is an application program which utilizes the cryptographic services of the Cryptographic Facility Access Program (CFAP) to generate, import and export keys and to authenticate Cryptographic Service Messages (CSMs). CSMs are ANSI X9.17 defined messages used to exchange keying material or related information among communicating ANSI nodes.

The CFAP uses the services of a Key Storage Manager to access ANSI keys which are stored external to the Cryptographic Facility (CF). The storage area is known as the Key Storage. Such keys are always stored encrypted under the system master key (KM) with an appropriate Control vector. The CF provides the primitive cryptographic functions (encipher, decipher, MAC generation, etc.) to the CFAP. The CF also provides limited internal storage for the clear KM and a few working keys.

The ANSI Key Manager uses the system-provided Communications Services (e.g., VTAM or device-drivers) to send and receive CSMs to/from other ANSI nodes.

ANSI Node Functional Interfaces

Figure 75:
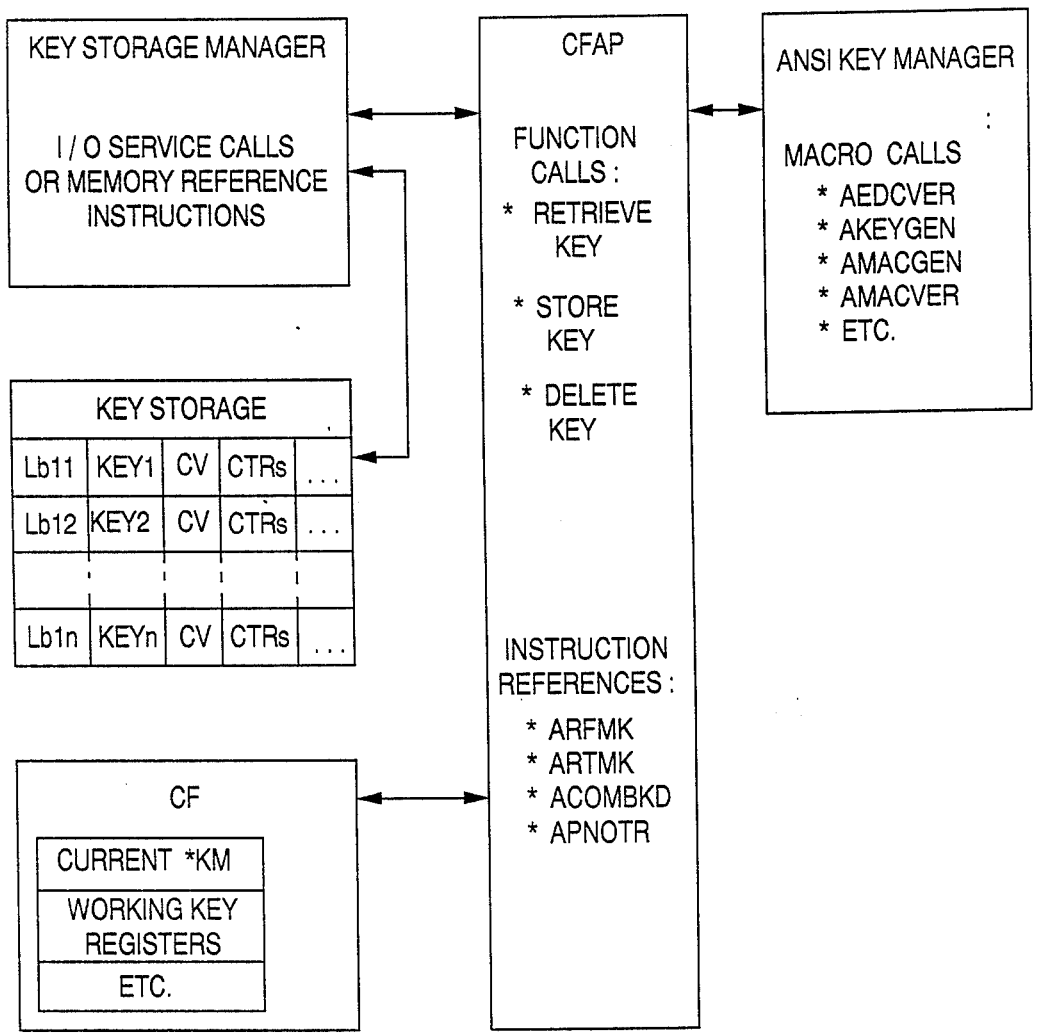
FIG. 75 shows the functional interfaces among components within an ANSI X9.17 node.

FIG. 75 illustrates some of the functional interfaces between components in an ANSI node. The ANSI Key Manger accesses CFAP services via Macro calls. CFAP retrieves and stores ANSI keys via function calls to the Key Storage Manager. The Key Storage Manager in turn uses system I/O services (or memory access instructions) to retrieve/store the requested keys from secondary (or primary) storage, known as the Key Storage. The Key Storage Manager may also verify key integrity on behalf of the CFAP. Each key entry record in the Key Storage may consist of an identifying label, the encrypted key, the explicit Control Vector (CV) under which it is stored, the Send and Receive Counters (for KEKs only), and other key-related parameters. The CFAP references CF instructions to perform primitive cryptographic functions.

Key Distribution Environments

ANSI X9.17 supports three basic environments for key distribution: Point-to-Point, Key Distribution Center and Key Translation Center.

Point-to-Point (P—P)

In this environment one node (say, Node B) wishes to communicate with another node (Node A) but does not have the ability to generate nor access data keys. It is assumed, however, that Nodes A and B already share a manually-installed key encrypting key, (*)KKab. (The notation '(*)' means either a single-length key-encrypting key, KK, or a double-length key-encrypting key, *KK.) Node a generates one or more keys as requested by Node B, stores a local copy and returns the duplicates encrypted under (*)KKab to Node B.

Figures 76, 80:
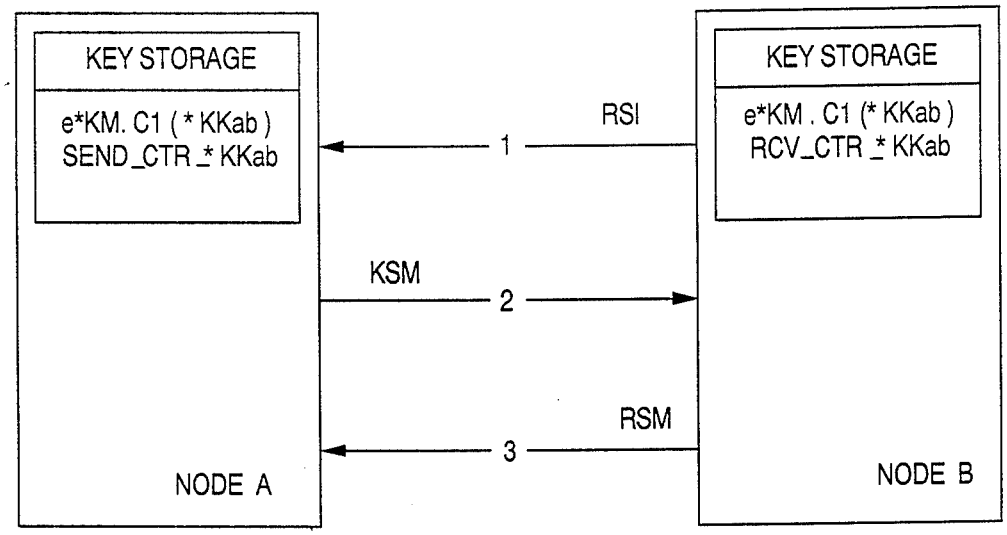

FIG. 76 shows two ANSI nodes in a Point-to-Point environment. The nodes share a key-encrypting key, *KKab, which is stored along with the associated send and receive counters in each node's Key Storage. Note that e*KM.Cl(*KKab) is actually stored as e*KM.C1(-KKabl), e*KM.C1(KKabr), the left-most and right-most 64 bits of *KKab respectively. Other key-related parameters may also be present in the Key Storage record for this key.

A sequence of CSM transmissions representing Point-to-point key distribution is shown: Node B requests one or more keys from Node A via an RSI (Request Service Initiation), Node A returns the requested key(s) via a KSM (Key Service Message), and Node B acknowledges receipt with an RSM (Response Service Message). Other CSM transactions are similarly defined in the Point-to-Point environment to support error handling and key discontinuance requests.

For example, Node B may request a single data encrypting key, KD, from Node A. Then the message format for a possible RSI for this request is as follows:
CSM(MCL/RSI
RCV/NodeA
ORG/NodeB
SVR/
EDC/aKDX(MCL/RSI ... SVR/))

Note that aKDj(X) represents the Message Authentication Code (MAC) of X using key KDj. KDX represents a special case of KDj: the fixed, non-secret hex key '0123456789ABCDEF'.

Node A generates the single KD, encrypts it under *KKab shared with Node B and offset with the Send Counter associated with *KKab, and forms the KSM to be sent to Node B:
CSM(MCL/KSM
RCV/NodeB
ORG/NodeA
KD/e*KKAB+Send_Ctr_*KKab(KD)
CTP/Send_Ctr_*KKab
MAC/aKD(MCL/KSM ... CTP/Send_Ctr_*KKab))

Here, e*KKab+Send_Ctr_*KKab(KD) is the ciphertext resulting from the triple encryption of KD under the key formed by offsetting *KKab with the current value of its Send Counter, denoted Send_Ctr_*KKab. Offsetting is described in Section 7.4 of ANSI X9.17-1985.

Node B receives the KSM, extracts the KD/ field, recovers the new KD and stores it under Node B's master key in the Key Storage, then formulates the RSM as an acknowledgement to Node A:
CSM(MCL/RSM
RCV/NodeA
ORG/NodeB
MAC/aKD(MCL/RSM ... ORG/NodeB))

Key Distribution Center (KDC)

Figure 77:
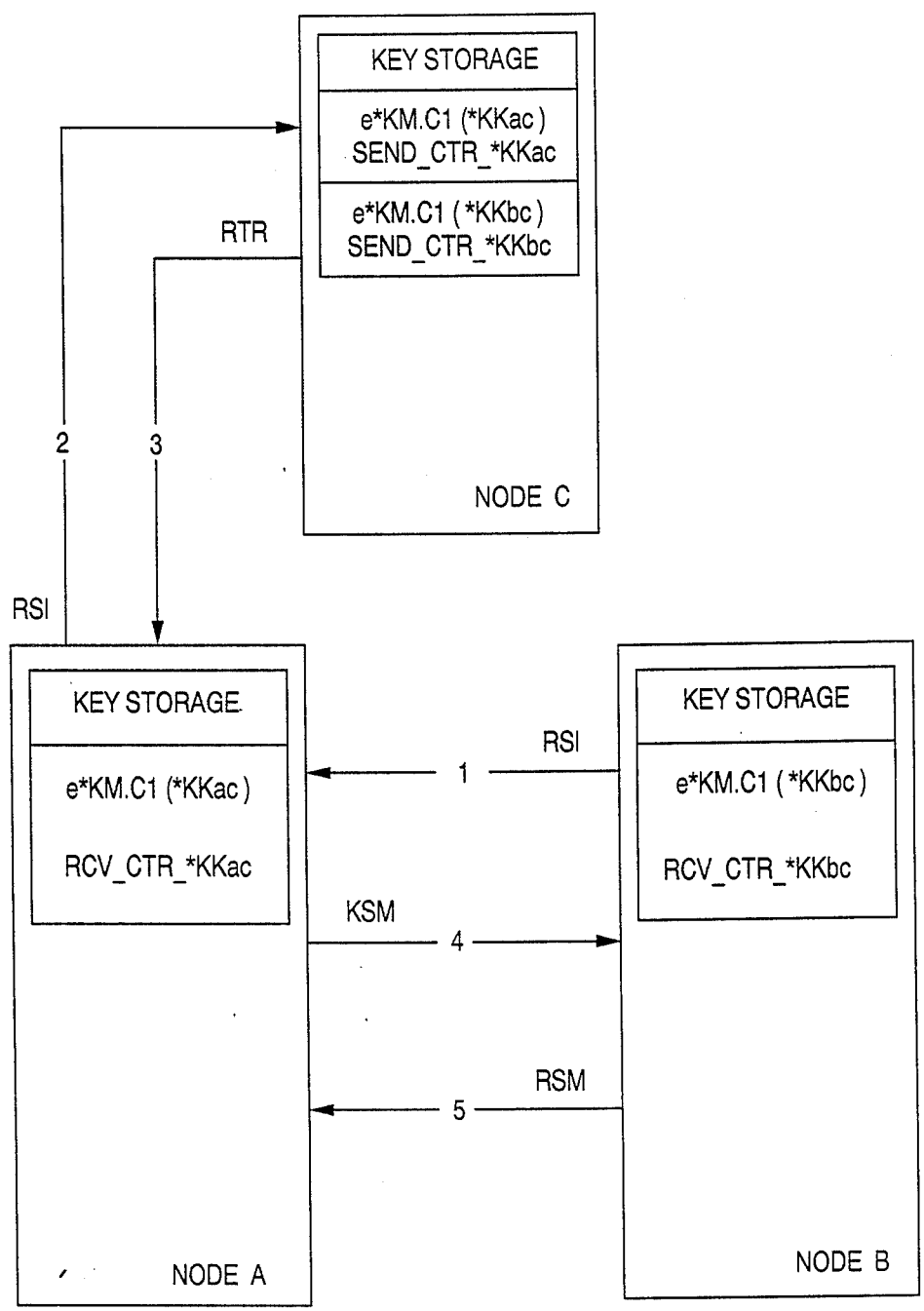
FIG. 77 is an ANSI Key Distribution Center (KDC) Environment System Diagram.

FIG. 77 shows there ANSI nodes in a KDC environment.

In this environment a Node B wishes to communicate with a Node A with which it shares no keys. It is assumed, however, that Node B shares a manually-installed key-encrypting key, (*)KKbc, with Node C, serving as a Key Distribution Center. Furthermore, Node C shares a manually-installed key-encrypting key, (*)KKbc, with Node C, serving as a Key Distribution Center. Furthermore, Node C shares a manually-installed key-encrypting key, (*)KKac, with Node A. Node A passes Node B's key request onto Node C, which generates two duplicate sets of keys. The first set is encrypted under (*)KKac and the second set under (*)KKbc. Both sets are then shipped back to Node A. Node A recovers and stores the first set of keys, and passes the second set onto Node B. Node B similarly recovers and stores its key set.

Key Translation Center (KTC)

Figure 78:
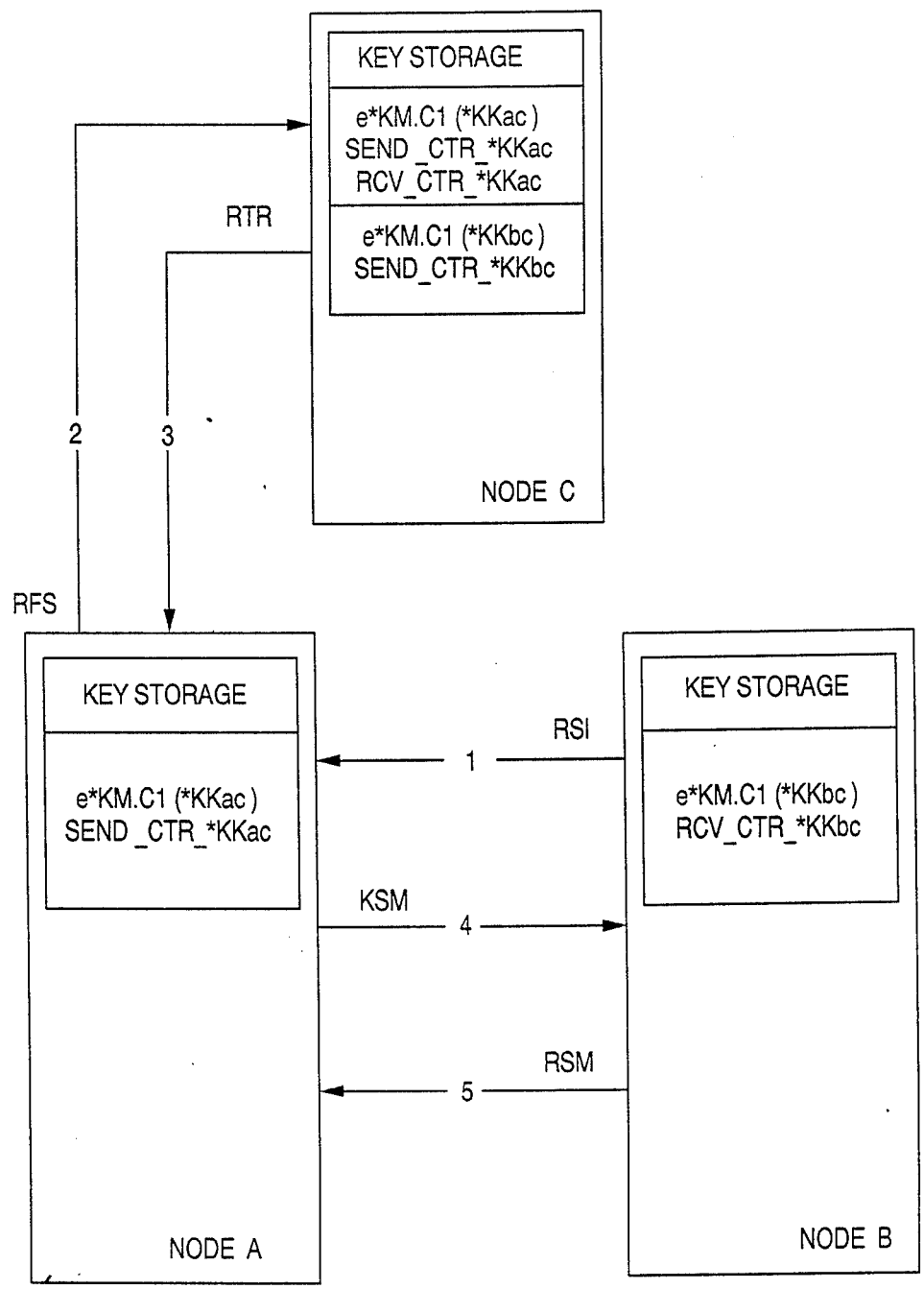
FIG. 78 is an ANSI Key Translation Center (KTC) Environment System Diagram.

FIG. 78 shows three ANSI nodes in a KTC environment.

In this environment a Node B wishes to communicate with a Node A with which it shares no keys. It is assumed that Node A has the capability to generate or access keys, and shares a manually-installed key-encrypting key, (*)KKac, with Node C, which serves as a Key Translation Center. Furthermore, Node C shares a manually-installed key-encrypting key, (*)KKbc, with Node B. Node A generates the requested key set, stores a local copy, and sends a duplicate set encrypted under (*)KKac to Node C. Node C recovers the key set, re-encrypts the keys under (*)KKbc, and returns the translated key set to Node A. Node A passes the key set onto Node B for its recovery and storage.

Key Distribution Scenarios

The following section summarizes the key distribution scenarios defined in ANSI X9.17. The scenarios are presented in tabular form, one for key-encrypting keys and one for data encrypting keys.

Furthermore, each table is divided into three environments: point-to-point, key translation center, and key distribution center. Only one environment applies for each cryptographic exchange. In general, a distribution scenario for a given environment is presented left-to-right, top-to-bottom. Where options exist, a given column will be split horizontally, reflecting the choice and outcome for a selected option. The CA does not support all ANSI X9.17 options. Unsupported options are marked "no" in the 'SUP?' column.

The columns are defined as follows:

| | |
|---|---|
| ENV | is the ANSI X9.17 distribution environment: Point-to-Point, Key Distribution Center, or Key Translation Center |
| NOD | is the party in the distribution scenario, where by convention, node B is typically the initial key requester, node A is the requestee, and KTC or KDC is the supporting Key Center |
| RCVS | specifies the key type (KK, *KK, KD or KDmac, a temporary MAC key) of a key received by NOD |
| FROM | is the party that generated or translated the received key; X via Y denotes that X passes the key through node Y to NOD |
| UNDR$^1$ | is the single or double-length KEK under which the key is received; subscripts denote the nodes sharing the KEK (a is node A, b is node B, c is the Key Center); offsetting is implicit; notarization is denoted by keys of the form (*)KNxy; 'new' denotes a new KEK accompanying the received key |
| GENS | specifies the key type (KK, *KK, KD, or KDmac) of a key generated by NOD |
| STORES | is the form of the received or generated key to be stored at NOD; KK//KK denotes replication of a single length KK to form a pseudo-double length KEK; (temp) denotes temporary storage only: this key is retained only for the purposes of processing CSMs |
| UNDR$^2$ | is the key under which the received or generated key is to be stored at NOD; ordinarily of the form KMx, denoting the Master Key of node X (a is node A, b is node B, c is the Key Center); Control Vector variation is implicit |
| SNDS | is the form of the generated or translated key which will be sent to the node specified by TO |
| TO | is the node to which the generated or translated key will be sent; X via Y denotes that NOD sends the key to X through node Y; X and Y denotes that NOD sends the key to X and Y (under different KEKs) |
| UNDR$^3$ | is the single or double-length KEK under which the generated or translated key will be sent; offsetting is implicit; notarization is denoted by KEKs of the form (*)KNxy; KK1 and KK2 denotes that the key is sent under two different KEKs corresponding to the destinations in column "TO'; 'new' denotes a new KEK accompanying the generated or translated key |
| SUP? | denotes whether the CA implementation of ANSI at NOD will support this option of the scenario |

*KK Distribution

The table summarizing the cryptographic exchange of key-encrypting keys is shown in FIG. 79.

KD Distribution

The table summarizing the cryptograhic exchange of data keys is shown in FIG. 80 and FIG. 81.

Instruction Set to Support ANSI X9.17

1. The following new instructions are added to the CA to support ANSI X9.17:
   a. ANSI Partial Notarize a Key (APNOTR)
   b. ANSI Reencipher From Master Key (ARFMK)
   c. ANSI Reencipher to Master Key (ARTMK)
   d. ANSI Translate a Key (AXLTKEY)
   e. ANSI Combine Data Keys (ACOMBKD)
2. The following existing CA instructions are needed to support ANSI X9.17:
   a. Keygen An extension to the Keygen instruction is added to allow control vectors of the type ANSI KEK.
   b. Encipher No change required.
   c. Decipher No change required
   d. Genmac No change required
   e. Vermac No change required Design Considerations Offsetting and Notarization Offsetting of keys is the process of translating a key-encrypting key (KEK) by exclusive-or'ing the key with a stored counter. Offsetting is always used to transform a KEK prior to encryption of a key by that KEK.

Notarization is a method for sealing KEKs with the identities of the sender and intended recipient. Ordinarily, a notarizing key KN is formed by computing a notary seal NS as a function of the KEK, the identities of the sender and receiver, and the offset counter for this KEK, then exclusive-or'ing NS with the KEK. Since the counter value for a given KEK increments over time, NS would normally be computed afresh each time KEK notarization is desired.

But since a given ANSI KEK is always associated with exactly one sender and receiver, NS and thus, KN, is a function of only one dynamic quantity: the offset counter for the KEK. Therefore we can define a function, APNOTR, to use the static quantities of the KEK (the key itself and the sender and receiver identities) to compute a partial notarizing key, KN'. KN' can be then stored with its corresponding KEK, retrieved when notarizing is desired, and simply offset with the current counter value to form KN. APNOTR is described in "ANSI Create Partial Notarizing Key (APNOTR)."

The advantage of this approach is to avoid recomputing KN every time it is needed, but more importantly, it reduces the complexity of the CA functions. Instead of having to support both notarizing and offsetting of KEKs in the CA functions used to import, translate, or export keys, only offsetting must be provided. If notarization must be performed, the partially notarized form of the KEK is provided to the appropriate CA function. Otherwise, the KEK itself is provided. Regardless, the CA function performs offsetting on the specified key prior to suing it to encrypt or decrypt a key.

ANSI X9.17 Subsets

The KK and KD distribution scenarios shown in FIGS. 79, 80 and 81 include all ANSI X9.17-defined options. The last column in each table, labelled 'SUP?', indicates whether CA support is provided for this option.

At this time, the only ANSI distribution options not supported by the CA are those related to the generation of single length key-encrypting keys. For example, in FIG. 79, an ANSI Node A in the Point-to-Point environment may generate a new single-length KK and ship it to an ANSI Node B under four (*)KK options: KKab, *KKab, KNab, or *KNab. However, the CA does not support generation of single-length KKs. Thus the 'SUP?' column for the four ANSI distribution options is marked 'NO'.

In order to provide ANSI compatibility with non-CA nodes, the CA does support importation of new single-length KKs. For example, using the same table as above, an ANSI Node B may receive a single-length KK from an ANSI Node A under one of four forms of another (\*)KK: KKab, \*KKab, KNab, or \*KNab. The 'SUP?' column for each option is marked 'YES' to indicate support for each option. Note that imported single-length KKs are always stored in replicated form (i.e. 128 bits as KK//KK).

The single-length KK restriction impacts KD distribution options as well. ANSI X9.17 requires that if a new (\*)KK is distributed with one or two new KDs, then the KDs will be encrypted under the new (\*)KK. But since CA does not support single-length KK generation, the option to distribute new KDs under a new single-length KK is not supported. An example of this is shown in FIG. 80, Point-to-Point for Node A. The table shows that KD distribution under a new single-length KKab is not supported.

ICV Management

ANSI X9.17 supports distribution of encrypted or plaintext 64-bit Initial Chaining Values (ICVs or IVs). A CA macro, GENIV, will be defined which supports generation and storage of ICVs. ICVs will be stored in the Key Storage alongside the KD with which it is to be used. GENIV will use the CF instruction KEYGEN to generate a 64-bit clear, non-parity adjusted random number, RN. GENIV will store RN and an ICV_Mode flag in the Key Storage entry for KD. The ICV_Mode flag indicates whether RN should be treated as an enciphered ICV or a plaintext ICV. If the mode is enciphered, RN must be deciphered using key KD before using it as an ICV in the ENCIPHER or DECIPHER functions. The ANSI X9.17 RTR and KSM messages are used to distribute the generated ICV and a similar flag indicating whether the ICV is enciphered or plaintext. GENIV will also be used at the receiver to store the received ICV into Key Storage. The receiver of course must specify the ICV_Mode based on the flag in the RTR or KSM message.

| Acronyms and Abbreviations | |
|---|---|
| CC | Condition code |
| CA | Cryptographic Architecture |
| CV | Control Vector (nothing to do with ICV or OCV) |
| CBC | Cipher Block Chaining. An encryption mode of the Data Encryption Standard. |
| DED | Decipher, Encipher and Decipher |
| DEA | Data Encryption Algorithm |
| DES | Data Encryption Standard |
| ECB | Electronic Code Book. An encryption mode of DES. |
| EDE | Encipher, Decipher and Encipher |
| ICV | Input Chaining Value (Nothing to do with CV) |
| KDx | Data Key (x = integer) |
| KEKx | Key Encrypting Key (x = integer) |
| KM | Master Key |
| KMN | New master key |
| KMO | Old master key |
| KPEx | Pin Encrypting Key (x = integer) |
| KPGx | Pin Generation Key (x = integer) |
| KPVx | Pin Validation Key (x = integer) |
| KKNI | Immediate notarized key, 128 bits |
| KKNIL | Left 64 bits of KKNI |
| KKNIR | Right 64 bits of KKNI |
| KDmac | Temporary MAC key for ANSI message |
| MAC | Message Authentication Code |
| MDC | Modification Detection Code |
| OCV | Output Chaining Value |
| PIN | Personal Identification Number (used with ATMs) |

Algorithms

Encode and Decode Algorithm

Figure 82:
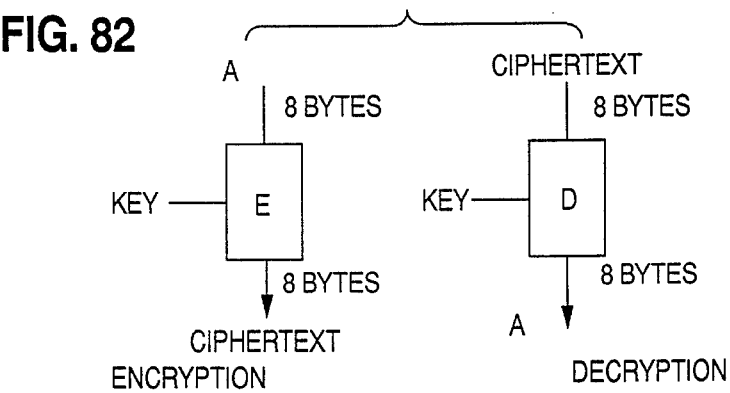
FIG. 82 shows the Electronic Code Book (ECB) mode of DES encryption.

The Encode and Decode instructions use the ECB (Electronic Code Book) mode of the DES. There is no chaining or feedback in this mode. FIG. 82 illustrates the operation of the ECB mode of encryption and decryption.

Cipher Algorithm

Figure 83:
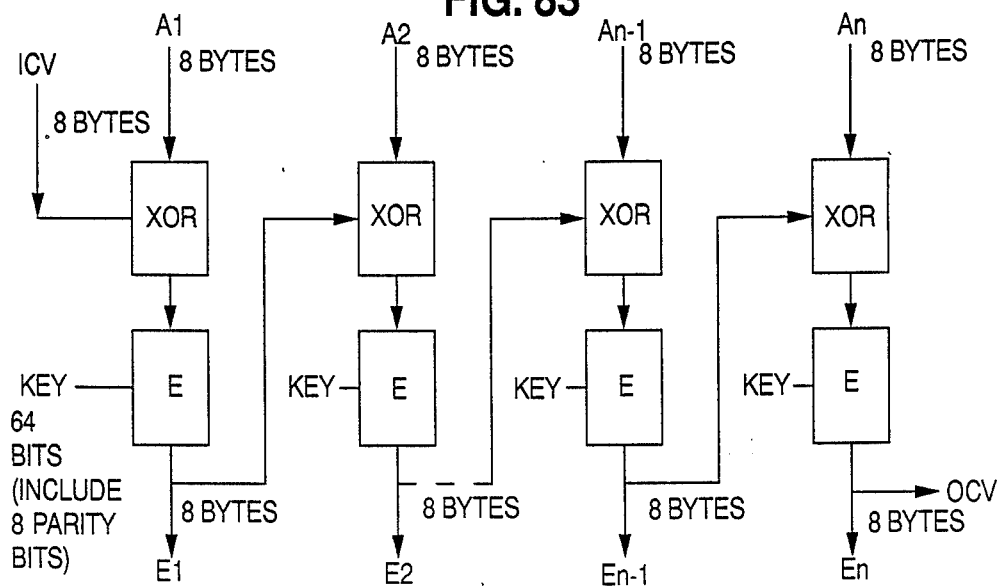
FIG. 83 shows the Cipher Block Chaining (CBC) mode of DES encipherment.
Figure 84:
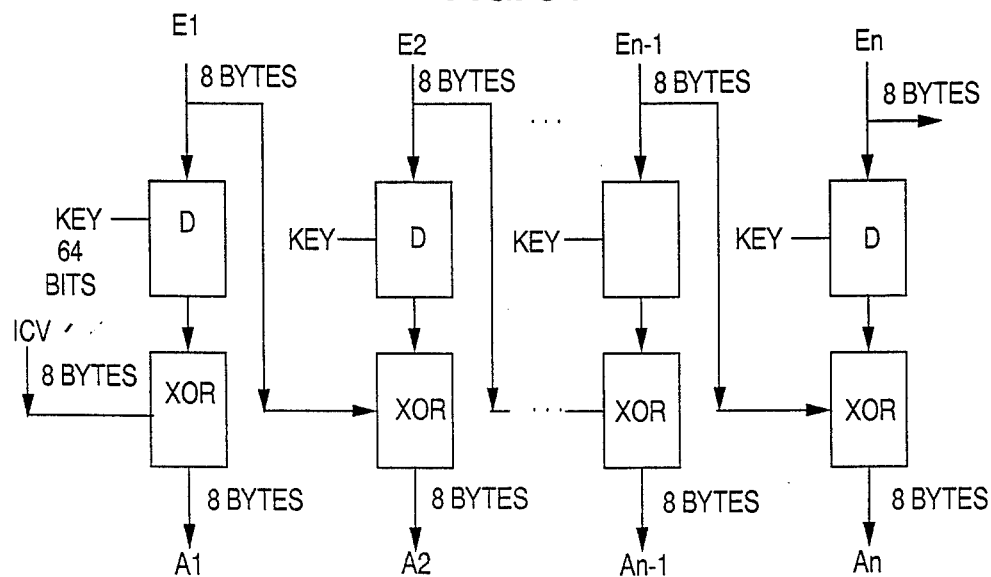
FIG. 84 shows the CBC mode of DES decipherment.

The Enciphering/Deciphering Algorithm is the National Bureau of Standards Data Encryption Standard (DES) or equivalently the American National Standards Institute Data Encryption Algorithm (ANSI DEA) X9.92-1981. Cipher Block Chaining (CBC) is done as specified in ANSI Cryptographic Modes of Operation X9.106-1983. FIGS. 83 and 84 show the CBC mode of operation of Encipher and Decipher operations respectively.

Message Authentication (MAC)

The Financial Institution Message Authentication Standard (Wholesale ANSI X9.9) as referenced in References (6), defines a process for authentication of messages from originator to recipient. This process is independent of communication media and payment systems.

The authentication process includes the computation, transmission, and verification of a Message Authentication code (MAC). The MAS=C is based on either of the complete message text or a selected message elements of the text. The MAC is added to the message by the originator and is transmitted to the recipient. The message or message elements are accepted as authentic by the recipient if the same algorithm and secret key produce a MAC identical to the received MAC. The security of the authentication process is directly dependent on the security afforded to the secret key.

The MAC is generated as shown in FIG. 85. The authentication algorithm as described in this standard may be implemented using either the 64 bit CBC or CFB modes of operation as described in ANSI X3.106-1983. Both modes shall be initialized so as to produce equivalent MAC's. KEY is a 64 bit key, and A1 thru An are 64 bit data blocks. Initial chaining value is '0' in this standard and CBC mode of operation should be implemented as shown in FIG. 85. If An is less than 64 bits, then '0's are appended (padded) to the right of the remaining bits. The left most 32 bits of (on) are taken as the MAC.

Note: The capability should exist to generate and to process 48 to 64 bit MAC's. For these cases, the left most 48 bits or the entire final output (On) are taken a the MAC.

The algorithm describes the MAC generation for binary data. Message authentication for "Coded Character Sets" should be implemented as described in the ANSI X9.9-1986, the MAC algorithm is invoked after the characters are represented in binary data.

MDC Algorithms

Two MDC algorithms exist:

1. MDC_2—Two encipherments per 8 byte input data block
2. MDC_4—Four encipherments per 8 byte input data block Two different algorithms allow the invoker to trade a 50% performance improvement for a slight decrease in security depending on his applications.

MDC_2 (text)

1. Pad the input text with X'FF' to a multiple of 8 bytes.

2. Partition the input text into [n] 8 byte blocks T8[1] to T8[n].
3. If n=1 then set n=2 and T8[2]=8 bytes of x'00'.
4. Set initial values of KD1 and KD2 (see below).
5. For [i]=1,2,...,n:
   a. MDCOP(KD1,KD2,T8[i],T8[i]
   b. KD1:=OUT1
   c. KD2:=OUT2
   d. end of FOR loop
6. Output of MDC_2 is the 16 byte MDC:=(KD1 // KD2).

MDC_4 (text)
1. Pad the input text with X'FF' to a multiple of 8 bytes.
2. Partition the input text into [n] 8 byte blocks T8[1] to T8[n]
3. If n=1 then set n=2 and T8[2]=8 bytes of x'00'
4. Set initial values of KD1 and KD2 (see below)
5. For [i]=1,2,...,n:
   a. MDCOP(KD1,KD2,T8[i],T8[i])
   b. KD1int:=OUT1
   c. KD2int:=OUT2
   d. MDCOP(KD1int,KD2int,KD2,KD1)
   e. KD1:=OUT1
   f. KD2:=OUT2
   g. end of FOR loop
6. Output of MDC_4 is the 16 byte MDC:=(KD1 // KD2)

The initial values of KD1 and KD2 are as follows:
1. KD1:=X'5252525252525252'
2. KD2:=X'2525252525252525'

MDC Test patterns—to be done.

Notarization Algorithms

Using KK

Let KK be the key which is to be used to compute the notarization key. Then:

KKR=KK+FM1 (+ is exclusive or operation, and FM1 is first 8 bytes of from ID)
KKL=KK+TO1 (TO1 is the first 8 bytes of to ID)
NS1=eKKR(T02) T02 is the second 8 bytes of to ID)
NSr=eKKL(FM2) FM2 is the second 8 bytes of from ID)
NS=(left most 32 bits of NS1) // right most 32 bits of NSr)+CT
(CT is a 64 bit counter associated with KK)
KN=KK+NS
KN is a notarized key used to encrypt either a KD or KK.

Using *KK

Let *KK be the key which is to be used to computer the notarization key. Then:

*KK=KK1 // KKr
KKR=KKr+FM1 (+ is exclusive or operation, and FM1 is first 8 bytes of from ID)
KKL=KK1+T01 (T01 is the first 8 bytes of to ID)
NS1-eKKR(T02)+CT (T02 is the second 8 bytes of to ID and CT is a 64 counter associated with *KK)
NSr=eKKL(FM2)+CT (FM2 is the second 8 bytes of from ID)
*KN=(KK1+NS1) // (KKr+NSr)
*KN is a notorized key used to encrypt either a KD a (*)KK.

Standards and Definitions

Standards

ANSI X2.92—1981 *"Data Encryption Algorithm"*.

ANSI X9.106—1983 *"Modes of DEA Operation"*.

ANSI X9.2—198X *"Interchange Message Specification for Debit and Credit Card Message Exchange Among Financial Institutions"*. This standard specifies a common interface by which bank card originated messages relating to a financial transaction may be interchanged between private systems. It specifies message structure, format and content, data elements and values for data elements.

ANSI X9.8—1982 *"American National Standard for Personal Identification Number (PIN) Management and Security"*. This standard establishes standards and guidelines for the management and security of the Personal Identification Number's (PIN's) life cycle.

ANSI X9.9—1986 *"American National Standard for Financial Institution Message Authentication (Wholesale)"*. This standard established a method to authenticate financial messages (wholesale), including fund transfers (e.g. wire transfers), letters of credit, security transfers, loan agreements and foreign exchange contracts.

ANSI X9.17—1985 *"Financial Institution Key Management (Wholesale)"*. This standard establishes methods (including the protocol) for the generation, exchange and use of cryptographic keys of authentication and encryption.

ANSI X9.19—198X *"Financial Institution Retail Message Authentication"*. This standard establishes a method to authenticate financial messages for retail transactions.

ANSI X9.23—198X *"Encryption of Wholesale Financial Messages"*. This standard established a method to encrypt wholesale financial messages in order to provide confidentiality (e.g., wire transfers, letters of credit, etc.)

ISO DIS 8583 *"Bank Card Originated Messages—Interchange Message Specifications—Content for Financial Transactions"*. This international standard specifies a common interface by which bank card originated messages relating to a financial transaction may be interchanged between private systems. It specifies message structure, format and content, data elements and values.

ISO DIS 8720 *"Message Authentication"*

ISO DP 8730 *"Banking—Requirements for Standard Message Authentication (wholesale)"*. This international standard specifies a technique for protecting the authenticity of messages passing between financial institutions by means of a Message Authentication Code (MAC).

ISO DP 8731 *"Banking—Approved Algorithms for Message Authentication—Part 1:DES-1 Algorithm"*. This part of ISO 8731 deals with the Data Encryption Algorithm (DEA-1) as a method for use in the calculation of the Message Authentication Code (MAC). Part-2 Other non DEA Algorithms ISO DP 8732 *"Banking—Key Management Wholesale"* This international standard specifies methods for the management of keying material used for the encryption and authentication of messages exchanged in the course of wholesale financial transactions.

ISO DP 9546 *"Personal Identification Number Management and Security Part 1—PIN Protection Principles and Technique"* This standard specifies the minimum security measures required for effective PIN management. Standard means of interchanging PIN data are provided.

Instructions and Macros Summary Chart

FIGS. 86, 87 and 88 summarize the equations for each of the CA instructions.

References

1. GC31-2070-0: 4700 Finance Communication System, Controller Programming Library, Volume 5, Cryptographic Programming
2. ANSI for Information Systems—DEA—Modes of Operations ANSI X3.106-1983
3. ANSI Data Encryption Algorithm—ANSI X3.92-1981
4. Financial Institution Message Authentication (Wholesale) ANSI X9.9-1986
5. Financial Institution Key Management (Wholesale) ANSI X9.17-1985
6. R. C. Summers, Systems Journal, Vol. 23, No. 4, 1984, pp. 309-325, "An Overview of Computer Security"
7. W. L. Price, National Physical Laboratory Technical Memo DITC 4/86, January 1986, "Physical Security of Transaction Devices"
8. A. E. Winblad (Sandia National Laboratories), SAND85-0766C, Dec. 85, "Future Developments in Physical Protection Against the Insider Threat"
9. John Horgan, IEEE Spectrum, July 1985, pp. 30-41 "Thwarting the Information Thieves"
10. T. H. DiStefano, NBS Special Publication 400-23, ARPA/NBS Workshop IV, Gaithersburg, Md., issued March 1976 "Photoemission and Photovoltanic Imaging of Semiconductor Surfaces"
11. D. C. Shaver, et al., IEEE Electron Device Letters, Vol. EDL-4, No. 5, May 1983, "Electron-Beam Programmable 128K-Bit Wafer-Scale EPROM"
12. A. Gercekci (Motorola), U.S. Pat. No. 4,394,750, July 19, 1983 "PROM Erase Detector"
13. D. J. DiMaria, Proceedings of the International Topical Conference, Yorktown Heights, N.Y., March 1978, S. Pantelides—ed., Pergamon Press, "The Physics of SiO2 and its Interfaces"
14. D. R. Young, et al., J. Appl Phys. 50(10), Oct. 1979, pp. 6366-72, "Electron Trapping in SiO2 at 295 and 77K"
15. R. Singh, et al., IEEE Trans. on Nuclear Science, Vol. NS-31, No. 6, December 1984, pp. 1518-23, "Total-Dose and Charge-Trapping Effects in Gate Oxides for CMOS LSI Devices"
16. R. Reich, IEEE Electron Device Letters, Vol. EDL-7, No. 4, April 1986, pp. 235-7, "Radiation-Dependent Hot-Carrier Effects"
17. David Chaum—ed., Advances in Cryptology, Proceedings of Crypto 83, Plenum Press, N.Y., 1984, "Design Concepts for Tamper Responding Systems"

Although specific embodiments of the invention have been disclosed, it will be understood by those having skill in the art that changes can be made to these specific embodiments without departing from the spirit and the scope of the invention.

What is claimed is:

1. In a data processing system which processes cryptographic service requests for the management of cryptographic keys which are associated with control vectors defining the functions which each key is allowed by its originator to perform, an apparatus for validating that key management functions requested for a crytographic key have been authorized by the originator of the key, comprising:

a crytographic facility characterized by a secure boundary through which passes an input path for receiving said cryptographic service requests, cryptographic keys and their associated control vectors, and an output path for providing responses thereto, there being included within said boundary a cryptographic control means coupled to said input path, a control vector checking means and a cryptographic processing means coupled to said control means, and a master key storage coupled to said processing means, for providing a secure location for executing key management functions in response to said received service requests;

said cryptographic control means receiving over said input path a cryptographic service request for performing a key management function with a cryptographic key;

said control vector checking means having an input coupled to said input path for receiving a control vector associated with said cryptographic key and an input coupled to said cryptographic, control means for receiving control signals to initiate checking that said control vector authorizes the key management function which is requested by said cryptographic service request;

said control vector checking means having an authorization output coupled to an input of said cryptographic processing means, for signalling that said key management function is authorized, the receipt of which by said cryptographic processing means initiates the performance of the requested key management function with said cryptographic key.

2. The apparatus of claim 1, which further comprises: a cryptographic key storage means coupled to said cryptographic facility over said input and output paths, for storing said cryptographic key in an encrypted form in which said cryptographic key is encrypted under a storage key which is a logical product of said associated control vector and a master key stored in said master key storage.

3. The apparatus of claim 2, which further comprises: said cryptographic control means receiving over said input path a cryptographic service request for recovering said cryptographic key from said cryptographic key storage means and said control vector checking means outputting in response thereto, an authorization signal to said cryptographic processing means that the function of recovering said cryptographic key is authorized;

said cryptographic processing means operating in response to said authorization signal, to receive said encrypted form of said cryptographic key from said cryptographic key storage means and to decrypt said encrypted form under said storage key which is a logical product of said associated control vector and said master key stored in said master key storage.

4. The apparatus of claim 2, wherein said storage key is the exclusive-OR product of said associated control vector and said master key stored in said master key storage.

5. The apparatus of claim 2, wherein said associated control vector is stored with said encrypted form of said cryptographic key in said cryptographic key storage means.

6. The apparatus of claim 1, wherein said associated control vector includes fields defining authorized tyes of cryptographic functions including key management functions, data encryption/decryption functions and PIN processing functions, and the key management functions type is designated;

said associated control vector further including fields defining export control and usage.

7. The apparatus of claim 1, for performing a generate key set function, which further comprises:

a random number source having an input connected to said cryptographic processing means, for supplying a random number thereto;

said cryptographic control means receiving over said input path a cryptographic service request for the generation of a key pair from said random number with associated first and second control vectors C3 and C4 and said control vector checking means outputting in response thereto, an authorization signal to said cryptographic processing means that the function of generating a key pair from said random number is authorized;

said cryptographic processing means operating in response to said authorization signal, to output said random number as a first generated key in an encrypted form in which said random number is encrypted under a key which is a logical product of said first associated control vector C3 and a first key K1;

said cryptographic processing means operating in response to said authorization signal, to output said random number as a second generated key in an encrypted form in which said random number is encrypted under a key which is a logical product of said second associated control vector C4 and a second key K2.

8. The apparatus of claim 7, for producing two keys which are operational in said data processing system, which further comprises:

said first and second keys K1 and K2 are said master key, local enabling operational usage within said data processing system.

9. The apparatus of claim 7, for producing a first generated key which is only operational in said data processing system which is a local data processing system, and a second generated key which can be exported to a remote data processing system connected to said local system, which further comprises:

said first key K1 is the master key, enabling operational usage within said local data processing system;

said second key K2 is a key encrypting key KEK2 with an associated control vector C2 and said control vector C2 authorizes exportation to said remote data processing system.

10. The apparatus of claim 7, for producing a first generated key which can be exported to a first remote data processing system connected to said data processing system which is a local data processing system and a second generated key which can be exported to a second remote data processing system connected to said local system, which further comprises:

said first key K1 is a key encrypting key KEK1 with an associated control vector C1 and said control vector C1 authorizes exportation to said first remote data processing system;

said second key K2 is a key encrypting key KEK2 with an associated control vector C2 and said control vector C2 authorizes exportation to said second remote data processing system.

11. The apparatus of claim 7, for producing a first generated key which is only operational in said data processing system which is a local data processing system, and a second generated key which can be imported from a utilization device connected to said local system, which further comprises:

said first key K1 is the master key, which only authorizes operational usage within said local data processing system;

said second key K2 is a key encrypting key KEK2 with an associated control vector C2 and said control vector C2 authorizes importation from said utilization device to said local system.

12. The apparatus of claim 7, for producing a first generated key which can be imported from a utilization device connected to said data processing system which is a local data processing system and a second generated key which can be exported to a remote data processing system connected to said local system, which further comprises:

said first key K1 is a key encrypting key KEK1 with an associated control vector C1 and said control vector C1 authorizes importation from said utilization device;

said second key K2 is a key encrypting key KEK2 with an associated control vector C2 and said control vector C2 authorizes exportation to said second remote data processing system.

13. The apparatus of claim 2, for performing a reencipherment from master key function, which further comprises:

said data processing system being a local data processing system connected to a first remote data processing system with which a secret key encrypting key KEK is shared;

said cryptographic key storage means storing said key encrypting key KEK in an encrypted form in which said KEK is encrypted under a storage key which is a logical product of an associated control vector C1 and said master key;

said cryptographic key storage means storing said cryptographic key as key K in an encrypted form in which said key K is encrypted under a storage key which is a logical product of an associated control vector C2 and said master key;

said cryptographic control means receiving over said input path a cryptographic service request for the reenciphering said cryptographic key K from said master key to encipherment under said key encrypting key KEK for export with an associated control vector C3 to said first remote processor and said control vector checking means outputting in response thereto, an authorization signal to said cryptographic processing means that the function of reenciphering said cryptographic key K from said master key to encipherment under said key encrypting key KEK for export is authorized;

said cryptographic processing means operating in response to said authorization signal, to receive said encrypted form of said cryptographic key K from said cryptographic key storage means and to decrypt said encrypted form thereof under a storage key which is a logical product of said associated control vector C2 and said master key;

said cryptographic processing means operating in response to said authorization signal, to receive said encrypted form of said key encrypting key KEK from said cryptographic key storage means and to decrypt said encrypted form thereof under a storage key which is a logical product of said associated control vector C1 and said master key;

said cryptographic processing means operating in response to said authorization signal, to reencipher said cryptographic key K under a logical product of said associated control vector C3 and said key encrypting key KEK and outputting said reenciphered cryptographic key K and said associated control vector C3 for transmission to said first remote data processing system.

14. The apparatus of claim 2, for performing a reencipherment to master key function, which further comprises:

said data processing system being a local data processing system connected to a first remote data processing system with which a secret key encrypting key KEK is shared;

said cryptographic key storage means storing said key encrypting key KEK in an encrypted form in which said KEK is encrypted under a storage key which is a logical product of an associated control vector C1 and said master key;

said first remote data processing system transmitting to said local data processing system a cryptographic key K enciphered under said key encrypting key KEK with an associated control vector C3;

said cryptographic control means receiving over said input path a cryptographic service request for the reenciphering said cryptographic key K from said encrypting key KEK to encipherment under said master key with an associated control vector C2 for storage in said cryptographic key storage means and said control vector checking means outputting in response thereto, an authorization signal to said cryptographic processing means that the function of reenciphering said cryptographic key K from said KEK to encipherment under said master key for storage is authorized;

said cryptographic processing means operating in response to said authorization signal, to reencipher said key K from said key encrypting key KEK to encipherment under said master key with said control vector C2 and outputting said reenciphered key K to said cryptographic key storage means.

15. The apparatus of claim 1, for performing a generate key function, which further comprises:

a random number source having an output connected to said cryptographic processing means, for supplying a random number thereto;

said cryptographic control means receiving over said input path a cryptographic service request for the generation of a key from said random number with an associated control vector C1 and said control vector checking means outputting in response thereto, an authorization signal to said cryptographic processing means that the function of generating a key from said random number is authorized;

said cryptographic processing means operating in response to said authorization signal, to output said random number as a generated key in an encrypted form in which said random number is encrypted under a key which is a logical product of said associated control vector C1 and said master key.

16. The apparatus of claim 2, for performing a translate key function, which further comprises:

said data processing system being a local data processing system connected to a first remote data processing system with which a secret import key encrypting key KEK1 is shared;

said data processing system being connected to a second remote data processing system with which a secret export key encrypting key KEK2 is shared;

said cryptographic key storage means storing said import key encrypting key KEK1 in an encrypted form in which said KEK1 is encrypted under a storage key which is a logical product of an associated control vector C1 and said master key;

said cryptographic key storage means storing said export key encrypting key KEK2 in an encrypted form in which said KEK2 is encrypted under a storage key which is a logical product of an associated control vector C2 and said master key;

said first remote data processing system transmitting to said local data processing system a cryptographic key K enciphered under said key encrypting key KEK1 with an associated control vector C3;

said cryptographic control means receiving over said input path a cryptographic service request for translating said cryptographic key K from encipherment under said import key encrypting key KEK1 to encipherment under said export key encrypting key KEK2 with an associated control vector C3 for transmission to said second data processing system and said control vector checking means outputting in response thereto, an authorization signal to said cryptographic processing means that the function of translating said cryptographic key K from encipherment under said import key encrypting key KEK1 to encipherment under said export key encrypting key KEK2 is authorized;

said cryptographic processing means operating in response to said authorization signal, to translate said cryptographic key K from encipherment under said import key encrypting key KEK1 to encipherment under said export key encrypting key KEK2 with said associated control vector C3 for transmission to said second data processing system.

17. The apparatus of claim 2, for performing a reencipherment from current master key to new master key function, which further comprises:

a current master key storage storing a current master key and a new master key storage storing a new master key coupled to said cryptographic processing means in said cryptographic facility;

said cryptographic key storage means storing said cryptographic key as key K in an encrypted form in which said key K is encrypted under a storage key which is a logical product of an associated control vector C1 and said current master key;

said cryptographic control means receiving over said input path a cryptographic service request for the reenciphering said cryptographic key K from said master key to encipherment under said new master key with said associated control vector C1 and said control vector checking means outputting in response thereto, an authorization signal to said cryptographic processing means that the function of reenciphering said cryptographic key K from said current master key to encipherment under said new master key is authorized;

said cryptographic processing means operating in response to said authorization signal, to receive said encrypted form of said cryptographic key K from said cryptographic key storage means and to decrypt said encrypted form thereof under a storage key which is a logical product of said associated control vector C1 and said current master key;

said cryptographic processing means operating in response to said authorization signal, to reencipher said cryptographic key K under a logical product of said associated control vector C1 and said new master key and outputting said reenciphered cryptographic key K and said associated control vector C1 to said cryptographic key storage means.

18. The apparatus of claim 2, for performing a lower control vector authority function, which further comprises:

said cryptographic key storage means storing said cryptographic key as key K in an encrypted form in which said key K is encrypted under a storage key which is a logical product of an associated control vector C1 and said master key;

said associated control vector C1 including a field defining export control;

said cryptographic control means receiving over said input path a cryptographic service request for lowering control vector authorit for said associated control vector C1 and said control vector checking means outputting in response thereto, an authorization signal to said cryptographic processing means that the function of lowering control vector authority for said associated control vector C1 is authorized;

said cryptographic processing means operating in response to said authorization signal, to receive said encrypted form of said cryptographic key K from said cryptographic key storage means and to decrypt said encrypted form thereof under a storage key which is a logical product of said associated control vector C1 and said master key;

said cryptographic processing means operating in response to said authorization signal, to substitute a second control vector C2 for said associated control vector C1, with said second control vector C2 having an export control field designating a lower authority;

said cryptographic processing means operating in response to said authorization signal, to encipher said key K under said master key with said second control vector C2 and outputting said enciphered key K to said cryptographic key storage means with said second control vector C2.

19. The apparatus of claim 2, for performing a reencipherment from master key function with a reduction in the export authority for the recipient, which further comprises:

said data processing system being a local data processing system connected to a first remote data processing system with which a secret key encrypting key KEK is shared;

said cryptographic key storage means storing said key encrypting key KEK in an encrypted form in which said KEK is encrypted under a storage key which is a logical product of an associated control vector C1 and said master key;

said cryptographic key storage means storing said cryptographic key as key K in an encrypted form in which said key K is encrypted under a storage key which is a logical product of an associated control vector C2 and said master key, said associated control vector C2 having an export field designating a first export authority;

said cryptographic control means receiving over said input path a cryptographic service request for reenciphering said cryptographic key K from said master key to encipherment under said key encrypting key KEK for export with an associated control vector C3 to said first remote processor, said associated control vector C3 having an export field designating a second export authority which is less than said first export authority of C2;

said control vector checking means outputting in response thereto, an authorization signal to said cryptographic processing means that the function of reenciphering said cryptographic key K from said master key to encipherment under said key encrypting key KEK for export is authorized;

said cryptographic processing means operating in response to said authorization signal, to receive said encrypted form of said cryptographic key K from said cryptographic key storage means and to decrypt said encrypted form thereof under a storage key which is a logical product of said associated control vector C2 and said master key;

said cryptographic processing means operating in response to said authorization signal, to receive said encrypted form of said key encrypting key KEK from said cryptographic key storage means and to decrypt said encrypted form thereof under a storage key which is a logical product of said associated control vector C1 and said master key;

said cryptographic processing means operating in response to said authorization signal, to reencipher said cryptographic key K under a logical product of said associated control vector C3 and said key encrypting key KEK and outputting said reenciphered cryptographic key K and said associated control vector C3 for transmission to said first remote data processing system.

said first remote data processing system having a lower authority to reexport said cryptographic key K because of said lower authority designated in said export field of said associated control vector C3.

20. The apparatus of claim 1, wherein said associated control vector further comprises:

said associated control vector includes a field defining link control which specifies whether a control vector associated with a cryptographic key can be omitted from transmission from said data processing system to a remote data processing system connected thereto due to the characteristics of said remote data processing system.

21. The apparatus of claim 1, wherein said associated control vector further comprises:

said associated control vector includes a field specifying whether the key assoicated therewith can be processed by an ANSI-type data processing system.

22. The apparatus of claim 1, wherein said associated. control vector includes fields enforcing the separation of key encryption keys based on two mutually exclusive intended uses.

23. The apparatus of claim 22, wherein said mutually exclusive intended uses are for notarized and non-notarized keys.

24. The apparatus of claim 22, wherein said mutually exclusive intended uses are for first type key encrypting keys using control vectors and second type key encrypting keys not using control vectors.

25. The apparatus of claim 22, wherein said mutually exclusive intended uses are for first type key encrypting keys used only by senders and second type key encrypting keys used only by receivers.

26. The apparatus of claim 22, wherein said mutually exclusive intended uses are for first type key encrypting keys used for translation of keys for shipment without allowing export of existing data keys stored under a master key and second type key encrypting keys used for translation of keys for shipment with allowance for export of existing data keys stored under a master key.

27. The apparatus of claim 22, wherein said mutually exclusive intended uses are for first type key encrypting keys which can be generated for export only and second type key encrypting keys which can be generated for local operational use and for export.

28. The apparatus of claim 22, wherein said mutually exclusive intended uses are for first type key encrypting keys which can be used in translation without allowing local operational use and second type key encrypting keys which can be used in translation and which are allowed for local operational use.

29. The apparatus of claim 22, wherein said mutually exclusive intended uses are for first type key encrypting keys which can be used in reencipher from master key operations and second type key encrypting keys which cannot be used in reencipher from master key operations.

30. The apparatus of claim 1, wherein said associated control vector includes a field to designate whether said cryptographic key is a single length key or a double length key.

31. In a data processing system which processes cryptographic service requests for the management of cryptographic keys which are associated with control vectors defining the functions which each key is allowed by its originator to perform, a method for validating that key management functions requested for a cryptographic key have been authorized by the originator of the key, comprising the steps of:
receiving a cryptographic service request for performing a key management function on a cryptographic key in a cryptographic facility characterized by a secure boundary through which passes an input path and an output path;
receiving a control vector associated with said cryptographic key and checking that said control vector authorizes the key management function which is requested by said cryptographic service request;
signalling that said key management function is authorized and initiating the performance of the requested key management function with said cryptographic key.

32. The method of claim 31, which further comprises the steps of:
storing in a storage means said cryptographic key in an encrypted form in which said cryptographic key is encrypted under a storage key which is a logical product of said associated control vector and a master key.

33. The method of claim 32, which further comprises: said cryptographic service request being for the recovery of said cryptographic key from said storage means;
receiving said encrypted form of said cryptographic key from said storage means and decrypting said encrypted form under said storage key which is a logical product of said associated control vector and said master key.

34. The method of claim 32, wherein said storage key is the exclusive-OR product of said associated control vector and said master key.

35. The method of claim 32, wherein said associated control vector is stored with said encrypted form of said cryptographic key in said storage means.

36. The method of claim 31, wherein said associated control vector includes fields defining authorized types of cryptographic functions including key management functions, data encryption/decryption functions and PIN processing functions, and the key management functions type is designated;
and wherein said associated control vector further includes fields defining export control and usage.

37. The method of claim 31, wherein said associated control vector further comprises:
said associated control vector includes a field defining link control which specifies whether a control vector associated with a cryptographic key can be omitted from transmission from said data processing system to a remote data processing system connected thereto due to the characteristics of said remote data processing system.

38. The method of claim 31, wherein said associated control vector further comprises:
said associated control vector includes a field specifying whether the key associated therewith can be processed by an ANSI-type data processing system.

39. The method of claim 31, wherein said associated control vector includes fields enforcing the separation of key encryption keys based on two mutually exclusive intended uses.

40. The method of claim 39, wherein said mutually exclusive intended uses are for notarized and non-notarized keys.

41. The method of claim 39, wherein said mutually exclusive intended uses are for first type key encrypting keys using control vectors and second type key encrypting keys not using control vectors.

42. The method of claim 39, wherein said mutually exclusive intended uses are for first type key encrypting keys used only by senders and second type key encrypting keys used only by receivers.

43. The method of claim 39, wherein said mutually exclusive intended uses are for first type key encrypting keys used for translation of keys for shipment without allowing export of existing data keys stored under a master key and second type key encrypting keys used for translation of keys for shipment with allowance for export of existing data keys stored under a master key.

44. The method of claim 39, wherein said mutually exclusive intended uses are for first type key encrypting keys which can be generated for export only and second type key encrypting keys which can be generated for local operational use and for export.

45. The method of claim 39, wherein said mutually exclusive intended uses are for first type key encrypting keys which can be used in translation without allowing local operational use and second type key encrypting keys which can be used in translation and which are allowed for local operational use.

46. The method of claim 39, wherein said mutually exclusive intended uses are for first type key encrypting keys which can be used in reencipher from master key operations and second type key encrypting keys which cannot be used in reencipher from master key operations.

47. The method of claim 21, wherein said associated control vector includes a field to designate whether said cryptographic key is a single length key or a double length key.

48. The apparatus of claim 13, for performing a reencipherment from master key function, which further comprises:
   said control vector checking means checking said control vector C1 associated with said key encrypting key KEK to ensure that the reencipher from master key function is authorized and said control vector checking means checking that said control vector C2 associated with said key K authorizes that said key K may be allowed to be exported using the reencipher from master key function.

49. The apparatus of claim 48 for performing a reencipherment from master key function, wherein said associated control vector C3 selectively enables said remote processor to reexport said cryptographic key K.

50. The apparatus of claim 14 for performing a reencipherment to master key function, wherein said control vector C1 associated with said key encrypting key KEK is checked to ensure that the reencipher to master key function is authorized.

51. The apparatus of claim 50 for performing a reencipherment to master key function, wherein said control vector C3 received from said remote data processing system, selectively permits further reexportation of said key K from said local data processing system.

52. The apparatus of claim 51 for performing a reencipherment to master key function, wherein said control vector C2 is selectively set by said local data processing system to permit further reexportation of said cryptographic key K from said local data processing system.

53. The apparatus of claim 16 for performing a translate key function, which further comprises:
   said control vector checking means checking said control vector C1 associated with said import key encrypting key KEK1, to ensure that KEK1 is authorized as an import key encrypting key in the translate key function and,
   said control vector checking means checking that said control vector C2 associated with said export key encrypting key KEK2 so as to ensure that KEK2 is authorized as an export key encrypting key in said translate key function.

54. The apparatus of claim 19 for performing a reencipherment from master key function with a reduction in the export authority for the recipient, said control vector checking means checking said control vector C1 associated with said key encrypting key KEK to ensure that the reencipher from master key function is authorized and said control vector checking means checking that said control vector C2 associated with said key K authorizes that said key K may be allowed to be exported using the reencipher from master key function.

55. In a data processing system which processes cryptographic service requests for the management of cryptographic keys which are associated with control vectors defining the functions which each key is allowed by its originator to perform, an apparatus for validating that key management functions requested for a cryptographic key have been authorized by the originator of the key, comprising:
   an information path for receiving said cryptographic service requests, cryptographic keys and their associated control vectors, and for providing responses thereto;
   a control means coupled to said information path, for receiving a cryptographic service request for performing a key management function with a cryptographic key;
   a control vector checking means coupled to said information path, for receiving a control vector associated with said cryptographic key and having an input coupled to said control means, for receiving control signals to initiate checking that said control vector authorizes the key management function which is requested by said cryptographic service requests;
   a cryptographic processing means coupled to said control means, for performing key management functions;
   said control vector checking means having an authorization output coupled to an input of said cryptographic processing means, for signaling that said key management function is authorized, the receipt of which by said cryptographic processing means initiates the performance of the requested key management function with said cryptographic key.

56. The apparatus of claim 55, which further comprises:
   a master key storage coupled to said cryptographic processing means, for storing a master key;
   a cryptographic key storage means coupled to said information path, for storing said cryptographic key.

57. The apparatus of claim 56, wherein said cryptographic key is stored in said key storage means in an encrypted form in which said cryptographic key is encrypted under a storage key which is a logical product of said associated control vector and said master key stored in said master key storage.

58. The apparatus of claim 57, wherein said storage key is the exclusive-OR product of said associated control vector and said master key stored in said master key storage.

59. The apparatus of claim 55, wherein said control vector checking means and said cryptographic processing means are located inside a cryptographic facility characterized by a secure boundary, for providing a secure location for executing said key management functions.

60. The apparatus of claim 55, wherein said key management function is a generation of a key set.

61. The apparatus of claim 55, wherein said key management function is a reencipherment from master key function.

62. The apparatus of claim 55, wherein said key management function is a reencipherment to master key function.

63. The apparatus of claim 55, wherein said key management function is a generate key function.

64. The apparatus of claim 55, wherein said key management function is a translate key function.

65. The apparatus of claim 55, wherein said key management function is a reencipherment from current master key to new master key function.

66. The apparatus of claim 55, wherein said key management function is a lower control vector authority function.

67. The apparatus of claim 55, wherein said key management function is a reencipherment from master key function with a reduction in the export authority for the recipient.

* * * * *